(12) United States Patent
Robinson et al.

(10) Patent No.: US 12,158,602 B2
(45) Date of Patent: Dec. 3, 2024

(54) ILLUMINATION APPARATUS

(71) Applicant: RealD Spark, LLC, Beverly Hills, CA (US)

(72) Inventors: Michael G. Robinson, Boulder, CO (US); Jonathan Harrold, Leamington Spa (GB); Graham J. Woodgate, Henley-on-Thames (GB)

(73) Assignee: RealD Spark, LLC, Boulder, CO (US)

( * ) Notice: Subject to any disclaimer, the term of this patent is extended or adjusted under 35 U.S.C. 154(b) by 0 days.

(21) Appl. No.: 17/844,238

(22) Filed: Jun. 20, 2022

(65) Prior Publication Data
US 2022/0404540 A1    Dec. 22, 2022

Related U.S. Application Data

(60) Provisional application No. 63/352,038, filed on Jun. 14, 2022, provisional application No. 63/217,535, filed on Jul. 1, 2021, provisional application No. 63/213,463, filed on Jun. 22, 2021.

(51) Int. Cl.
*F21V 8/00* (2006.01)
(52) U.S. Cl.
CPC ......... *G02B 6/0045* (2013.01); *G02B 6/0021* (2013.01); *G02B 6/0051* (2013.01)
(58) Field of Classification Search
CPC ... G02B 6/0045; G02B 6/0021; G02B 6/0051
See application file for complete search history.

(56) References Cited

U.S. PATENT DOCUMENTS

| 5,091,288 A | 2/1992 | Zappella et al. |
|---|---|---|
| 5,184,114 A | 2/1993 | Brown |
| 5,812,105 A | 9/1998 | Ven |
| 6,547,423 B2 | 4/2003 | Marshall et al. |

(Continued)

FOREIGN PATENT DOCUMENTS

| CN | 102859268 A | 1/2013 |
|---|---|---|
| CN | 103109226 A | 5/2013 |

(Continued)

OTHER PUBLICATIONS

EP18200530.6 Notification of the First Office Action dated Jun. 21, 2023.

(Continued)

*Primary Examiner* — Fatima N Farokhrooz
(74) *Attorney, Agent, or Firm* — Penny L. Lowry

(57) ABSTRACT

A directional illumination apparatus comprises an array of light emitting diodes formed on a support substrate, a waveguide and a light turning optical component. An array of light input wells are arranged in the waveguide to receive light from the respective aligned array of light emitting diodes. An array of light deflecting wells are arranged in the waveguide to reflect guided light in the region around each light emitting diode. Extracted light from the waveguide is output by means of refraction and total internal reflection by a light turning optical component. A directional illumination output may be provided. A backlight for a high dynamic range display may achieve high efficiency and luminance. A privacy display with high security factor and high dynamic range may be achieved.

63 Claims, 57 Drawing Sheets

(56) References Cited

U.S. PATENT DOCUMENTS

| | | |
|---|---|---|
| 6,570,324 B1 | 5/2003 | Tutt et al. |
| 7,014,964 B1 | 3/2006 | Hsu et al. |
| 7,084,435 B2 | 8/2006 | Sugimoto et al. |
| 7,171,874 B1 | 2/2007 | Huang |
| 7,863,614 B2 | 1/2011 | Toyama et al. |
| 7,994,531 B2 | 8/2011 | Lin et al. |
| 8,721,115 B2 | 5/2014 | Ing et al. |
| 8,794,792 B1 | 8/2014 | Moghal et al. |
| 8,985,810 B2 | 3/2015 | Woodgate et al. |
| 9,519,153 B2 | 12/2016 | Robinson et al. |
| 9,773,457 B2 | 9/2017 | Peterson et al. |
| 10,121,772 B1 | 11/2018 | Wu et al. |
| 10,126,575 B1 | 11/2018 | Robinson et al. |
| 10,303,030 B2 | 5/2019 | Robinson et al. |
| 10,533,730 B2 | 1/2020 | Harrold et al. |
| 10,976,578 B2 | 4/2021 | Robinson et al. |
| 11,063,193 B2 | 7/2021 | Woodgate et al. |
| 11,652,195 B2 | 5/2023 | Harrold et al. |
| 2004/0080938 A1 | 4/2004 | Holman et al. |
| 2004/0089935 A1 | 5/2004 | Lehner |
| 2004/0126911 A1 | 7/2004 | Kimura |
| 2004/0161871 A1 | 8/2004 | Omori |
| 2004/0192082 A1 | 9/2004 | Wagner et al. |
| 2004/0218390 A1 | 11/2004 | Holman et al. |
| 2004/0239243 A1 | 12/2004 | Roberts et al. |
| 2004/0263061 A1 | 12/2004 | Ishikawa et al. |
| 2005/0111100 A1 | 5/2005 | Mather et al. |
| 2005/0219693 A1 | 10/2005 | Hartkop et al. |
| 2006/0141761 A1 | 6/2006 | Brody et al. |
| 2006/0152931 A1 | 7/2006 | Holman |
| 2006/0154393 A1 | 7/2006 | Doan et al. |
| 2006/0221611 A1 | 10/2006 | Noh et al. |
| 2006/0252163 A1 | 11/2006 | Yaniv et al. |
| 2006/0256255 A1* | 11/2006 | Minami ............... G02B 6/0036 349/65 |
| 2006/0258028 A1 | 11/2006 | Paolini et al. |
| 2006/0290276 A1 | 12/2006 | Cok et al. |
| 2007/0007237 A1 | 1/2007 | Wu et al. |
| 2007/0019131 A1 | 1/2007 | Choi et al. |
| 2007/0047254 A1 | 3/2007 | Schardt et al. |
| 2007/0116424 A1 | 5/2007 | Ting et al. |
| 2007/0165394 A1 | 7/2007 | Chang |
| 2007/0176195 A1 | 8/2007 | Kuiseko et al. |
| 2007/0236628 A1 | 10/2007 | Epstein |
| 2007/0242477 A1 | 10/2007 | Yoo et al. |
| 2007/0256453 A1 | 11/2007 | Barnes et al. |
| 2008/0043466 A1 | 2/2008 | Chakmakjian et al. |
| 2008/0089093 A1 | 4/2008 | Miller et al. |
| 2008/0123350 A1 | 5/2008 | Choe et al. |
| 2008/0176398 A1 | 7/2008 | Jain et al. |
| 2008/0225523 A1 | 9/2008 | Samber et al. |
| 2008/0237612 A1 | 10/2008 | Cok |
| 2008/0258162 A1 | 10/2008 | Koung et al. |
| 2008/0285310 A1 | 11/2008 | Aylward et al. |
| 2008/0315755 A1 | 12/2008 | Han |
| 2009/0001869 A1 | 1/2009 | Tanimoto et al. |
| 2009/0073350 A1 | 3/2009 | Toyama et al. |
| 2009/0086508 A1 | 4/2009 | Bierhuizen |
| 2009/0109656 A1 | 4/2009 | Chang |
| 2009/0128735 A1* | 5/2009 | Larson ............... G02B 6/0018 362/244 |
| 2009/0148972 A1 | 6/2009 | Fang et al. |
| 2009/0180273 A1 | 7/2009 | Kim et al. |
| 2009/0242929 A1 | 10/2009 | Lin |
| 2009/0268428 A1 | 10/2009 | Tsukada |
| 2009/0296389 A1 | 12/2009 | Hsu |
| 2010/0061096 A1 | 3/2010 | Sato |
| 2010/0097809 A1 | 4/2010 | Munro et al. |
| 2010/0165635 A1 | 7/2010 | Chen et al. |
| 2010/0171215 A1 | 7/2010 | Fischer et al. |
| 2010/0172152 A1 | 7/2010 | Boonekamp |
| 2010/0195330 A1 | 8/2010 | Schaefer et al. |
| 2010/0207852 A1 | 8/2010 | Cok |
| 2010/0258543 A1 | 10/2010 | Mizuno et al. |
| 2010/0295762 A1 | 11/2010 | Yeom et al. |
| 2010/0317132 A1 | 12/2010 | Rogers et al. |
| 2011/0003410 A1 | 1/2011 | Tsay et al. |
| 2011/0018860 A1 | 1/2011 | Parry-Jones et al. |
| 2011/0038150 A1 | 2/2011 | Woodgate et al. |
| 2011/0090672 A1 | 4/2011 | Zhu et al. |
| 2011/0151602 A1 | 6/2011 | Speier |
| 2011/0193114 A1 | 8/2011 | Lerman et al. |
| 2011/0194034 A1 | 8/2011 | Shimizu |
| 2011/0255303 A1 | 10/2011 | Nichol et al. |
| 2012/0020055 A1 | 1/2012 | Ligas et al. |
| 2012/0038266 A1 | 2/2012 | Moriyama et al. |
| 2012/0082332 A1 | 4/2012 | Park |
| 2012/0086875 A1 | 4/2012 | Yokota |
| 2012/0119237 A1 | 5/2012 | Leatherdale et al. |
| 2012/0140462 A1 | 6/2012 | Pickard |
| 2012/0147296 A1 | 6/2012 | Montgomery et al. |
| 2012/0193799 A1 | 8/2012 | Sakuma et al. |
| 2012/0258963 A1 | 10/2012 | Berger et al. |
| 2012/0268963 A1 | 10/2012 | Gourlay |
| 2012/0299883 A1 | 11/2012 | Sumida et al. |
| 2012/0320627 A1 | 12/2012 | Araki et al. |
| 2013/0021799 A1 | 1/2013 | Veerasamy et al. |
| 2013/0033849 A1 | 2/2013 | Roberts et al. |
| 2013/0039062 A1 | 2/2013 | Vinther et al. |
| 2013/0094126 A1 | 4/2013 | Rappoport et al. |
| 2013/0107525 A1 | 5/2013 | Woodgate et al. |
| 2013/0121000 A1 | 5/2013 | Lee et al. |
| 2013/0194812 A1 | 8/2013 | Tseng |
| 2013/0235580 A1 | 9/2013 | Smith |
| 2013/0258663 A1 | 10/2013 | Woodgate et al. |
| 2013/0293793 A1 | 11/2013 | Lu |
| 2013/0301240 A1 | 11/2013 | Liu et al. |
| 2014/0016314 A1 | 1/2014 | Woodgate et al. |
| 2014/0022619 A1 | 1/2014 | Woodgate et al. |
| 2014/0098418 A1 | 4/2014 | Lin |
| 2014/0140654 A1* | 5/2014 | Brown ............... G02B 27/4272 385/10 |
| 2014/0186979 A1 | 7/2014 | Tu et al. |
| 2014/0211462 A1 | 7/2014 | Keller et al. |
| 2014/0211503 A1 | 7/2014 | Tarsa |
| 2014/0239326 A1 | 8/2014 | Perng |
| 2014/0240828 A1 | 8/2014 | Robinson et al. |
| 2014/0240839 A1 | 8/2014 | Yang et al. |
| 2014/0268641 A1 | 9/2014 | Tordini |
| 2014/0299897 A1 | 10/2014 | Zhang et al. |
| 2014/0306612 A1 | 10/2014 | Woodgate et al. |
| 2014/0316742 A1 | 10/2014 | Sun et al. |
| 2015/0023051 A1 | 1/2015 | Jepsen et al. |
| 2015/0054011 A1 | 2/2015 | Koizumi et al. |
| 2015/0062490 A1 | 3/2015 | Kwon |
| 2015/0160396 A1 | 6/2015 | Wilcox et al. |
| 2015/0268479 A1 | 9/2015 | Woodgate et al. |
| 2015/0268513 A1 | 9/2015 | Chang et al. |
| 2015/0295154 A1 | 10/2015 | Tu et al. |
| 2015/0308635 A1 | 10/2015 | Li et al. |
| 2015/0325816 A1 | 11/2015 | Haag et al. |
| 2016/0018077 A1 | 1/2016 | Mallory et al. |
| 2016/0203742 A1 | 7/2016 | Peterson et al. |
| 2016/0211413 A1 | 7/2016 | Park et al. |
| 2016/0299281 A1 | 10/2016 | Robinson et al. |
| 2016/0349437 A1 | 12/2016 | Peterson et al. |
| 2017/0031085 A1 | 2/2017 | Lim et al. |
| 2017/0045666 A1 | 2/2017 | Vasylyev |
| 2017/0059127 A1 | 3/2017 | Jansma et al. |
| 2017/0102127 A1 | 4/2017 | Woodgate et al. |
| 2017/0139114 A1 | 5/2017 | Woodgate et al. |
| 2017/0154919 A1 | 6/2017 | Chen et al. |
| 2017/0161179 A1 | 6/2017 | Maple et al. |
| 2017/0205959 A1 | 7/2017 | Seong |
| 2017/0219883 A1 | 8/2017 | Yin |
| 2017/0248289 A1 | 8/2017 | Vasylyev |
| 2017/0254518 A1* | 9/2017 | Vasylyev ............... F21V 9/08 |
| 2017/0261179 A1 | 9/2017 | Wu et al. |
| 2018/0014007 A1 | 1/2018 | Brown |
| 2018/0022881 A1* | 1/2018 | Seki ............... G02B 6/0061 257/211 |
| 2018/0052524 A1 | 2/2018 | Peterson et al. |
| 2018/0135831 A1 | 5/2018 | Smith et al. |
| 2018/0190625 A1 | 7/2018 | Steckel et al. |

(56) References Cited

U.S. PATENT DOCUMENTS

| | | |
|---|---|---|
| 2018/0226384 A1 | 8/2018 | Park et al. |
| 2018/0245776 A1 | 8/2018 | Gladden et al. |
| 2018/0277523 A1 | 9/2018 | Ahmed et al. |
| 2018/0321553 A1 | 11/2018 | Robinson et al. |
| 2018/0328581 A1 | 11/2018 | Komanduri et al. |
| 2018/0329245 A1* | 11/2018 | Robinson .......... G02F 1/134309 |
| 2019/0086706 A1 | 3/2019 | Robinson et al. |
| 2019/0113727 A1 | 4/2019 | Tamma et al. |
| 2019/0139243 A1 | 5/2019 | You et al. |
| 2019/0215509 A1 | 7/2019 | Woodgate et al. |
| 2019/0220121 A1 | 7/2019 | Kim et al. |
| 2019/0250458 A1 | 8/2019 | Robinson et al. |
| 2019/0257497 A1 | 8/2019 | Harrold et al. |
| 2019/0265478 A1 | 8/2019 | Cok et al. |
| 2019/0278135 A1 | 9/2019 | Woodgate et al. |
| 2019/0294004 A1 | 9/2019 | Hashimoto |
| 2019/0324184 A1* | 10/2019 | Cai ..................... G02B 6/0023 |
| 2019/0377067 A1 | 12/2019 | Han et al. |
| 2019/0378744 A1 | 12/2019 | Liu et al. |
| 2020/0049876 A1 | 2/2020 | Watanabe et al. |
| 2020/0096171 A1 | 3/2020 | Han et al. |
| 2020/0124834 A1 | 4/2020 | Woodgate et al. |
| 2020/0127169 A1 | 4/2020 | Ahmed |
| 2020/0150408 A1 | 5/2020 | Fard et al. |
| 2020/0159055 A1 | 5/2020 | Robinson et al. |
| 2020/0166783 A1 | 5/2020 | Roy et al. |
| 2020/0249531 A1 | 8/2020 | Adeyshvili et al. |
| 2020/0259307 A1 | 8/2020 | Sharma et al. |
| 2020/0309341 A1 | 10/2020 | Fleszewski et al. |
| 2020/0321553 A1 | 10/2020 | Kwon et al. |
| 2020/0355896 A1 | 11/2020 | Woodgate et al. |
| 2021/0302650 A1 | 9/2021 | Song et al. |
| 2022/0404540 A1 | 12/2022 | Robinson et al. |

FOREIGN PATENT DOCUMENTS

| | | | |
|---|---|---|---|
| CN | 103117348 A | | 5/2013 |
| CN | 105556374 A | | 5/2016 |
| CN | 105849595 A | | 8/2016 |
| CN | 107402475 A | | 11/2017 |
| CN | 108287438 A | | 7/2018 |
| CN | 112394449 A | | 2/2021 |
| CN | 115826293 A | * | 3/2023 |
| DE | 102010031945 A1 | | 1/2012 |
| DE | 102012109052 A1 | | 12/2013 |
| EP | 1387412 A1 | | 2/2004 |
| EP | 1835550 A2 | | 9/2007 |
| EP | 1890343 A1 | | 2/2008 |
| EP | 1956423 A1 | | 8/2008 |
| EP | 1986023 A1 | | 10/2008 |
| EP | 2182783 A2 | | 5/2010 |
| EP | 2595295 A1 | | 5/2013 |
| EP | 2824387 A1 | | 1/2015 |
| EP | 3762757 A1 | | 1/2021 |
| GB | 2405542 A | | 3/2005 |
| GB | 2464102 A | | 4/2010 |
| GB | 2484711 A | | 4/2012 |
| GB | 2496183 A | | 5/2013 |
| JP | H11266035 A | | 9/1999 |
| JP | 2000323755 A | | 11/2000 |
| JP | 2007048489 A | | 2/2007 |
| JP | 2007294411 A | | 11/2007 |
| JP | 2009152161 A | | 7/2009 |
| JP | 2009294282 A | | 12/2009 |
| JP | 2009295309 A | | 12/2009 |
| JP | 2010205698 A | | 9/2010 |
| JP | 2010238846 A | | 10/2010 |
| JP | 2011134485 A | | 7/2011 |
| JP | 2013219397 A | | 10/2013 |
| JP | 2015533713 A | | 11/2015 |
| JP | 2016085797 A | | 5/2016 |
| JP | 2018022683 A | | 2/2018 |
| JP | 3220267 U | | 2/2019 |
| KR | 20090106062 A | | 10/2009 |
| KR | 20190053312 A | | 5/2019 |
| WO | 2005071474 A2 | | 8/2005 |
| WO | 2006115313 A1 | | 11/2006 |
| WO | 2007069198 A2 | | 6/2007 |
| WO | 2007074932 A1 | | 7/2007 |
| WO | 2008080165 A2 | | 7/2008 |
| WO | 2008109296 A1 | | 9/2008 |
| WO | 2010038025 A2 | | 4/2010 |
| WO | 2010038025 A3 | | 6/2010 |
| WO | 2011131200 A1 | | 10/2011 |
| WO | 2012052722 A2 | | 4/2012 |
| WO | 2012052723 A1 | | 4/2012 |
| WO | 2013064801 A1 | | 5/2013 |
| WO | 2013112435 A1 | | 8/2013 |
| WO | 2014043384 A1 | | 3/2014 |
| WO | 2015089517 A1 | | 6/2015 |
| WO | 2016044284 A1 | | 3/2016 |
| WO | 2017007770 A2 | | 1/2017 |
| WO | 2017169123 A1 | | 10/2017 |
| WO | 2018040708 A1 | | 3/2018 |
| WO | 2018185475 A1 | | 10/2018 |
| WO | WO-2018185476 A1 * | 10/2018 | ......... G02B 19/0028 |
| WO | 2018208618 A1 | | 11/2018 |
| WO | 2018231344 A1 | | 12/2018 |
| WO | 2019067846 A1 | | 4/2019 |
| WO | 2019107826 A1 | | 6/2019 |
| WO | 2019173816 A1 | | 9/2019 |

OTHER PUBLICATIONS

EP20856156.3 Extended European Search Report of European Patent Office dated Aug. 11, 2023.
PCT/US2022/034145 International search report and written opinion of the international searching authority mailed Oct. 6, 2022.
EP-20835231.0 Extended European Search Report of European Patent Office dated May 15, 2023.
JP2020-571342 Non-Final Notice of Reasons for Rejection dated Apr. 4, 2023.
CN201880036805.8 Notification of the First Office Action dated Jul. 23, 2021.
CN201880036842.9 Notification of the First Office Action dated Jul. 23, 2021.
CN201980016364.X Notification of the First Office Action dated Dec. 27, 2021.
CN201980030275.0 Notification of the First Office Action dated Mar. 4, 2022.
EP18200530.6—European Search Report of the European Patent Office dated May 23, 2019.
EP19804311.9—Extended European Search Report of the European Patent Office dated Dec. 15, 2021.
IN-202018039329 First Examination Report received from the Indian Intellectual Property Office mailed Feb. 17, 2022.
International search report and written opinion of international searching authority for PCT application PCT/GB2018/050893 mailed Aug. 27, 2018.
International search report and written opinion of international searching authority for PCT application PCT/GB2018/050894 mailed Aug. 27, 2018.
International search report and written opinion of international searching authority for PCT application PCT/GB2019/050076 mailed May 9, 2019.
International search report and written opinion of international searching authority for PCT application PCT/US2019/021570 mailed May 24, 2019.
International search report and written opinion of international searching authority for PCT application PCT/US2019/031526 mailed Jul. 29, 2019.
International search report and written opinion of international searching authority for PCT application PCT/US2020/040686 mailed Nov. 20, 2020.
International search report and written opinion of international searching authority for PCT application PCT/US2020/047383 mailed Dec. 4, 2020.
International search report and written opinion of international searching authority for PCT application PCT/US2020/050460 mailed Dec. 8, 2020.

(56) References Cited

OTHER PUBLICATIONS

International search report and written opinion of international searching authority for PCT application PCT/US2020/050527 mailed Feb. 3, 2021.
International search report and written opinion of international searching authority for PCT application PCT/US2020/053825 mailed Dec. 30, 2020.
International search report and written opinion of international searching authority for PCT application PCT/US2020/053864 mailed Dec. 14, 2020.
CN202080059812.7 Notification of the First Office Action dated Oct. 19, 2023.
EP18715949.6 Notification of the First Office Action dated Sep. 21, 2023.
EP19763362.1 Notification of the First Office Action dated Oct. 12, 2023.
EP19804311.9 Notification of the First Office Action dated Sep. 11, 2023.
EP20863341.2 Extended European Search Report of European Patent Office dated Sep. 18, 2023.
EP20872979.8 Extended European Search Report of European Patent Office dated Oct. 19, 2023.
PCT/US2023/024329 International search report and written opinion of the international searching authority mailed Sep. 6, 2023.
EP20872718.0 Extended European Search Report of European Patent Office dated Jan. 2, 2024.
EP21758026.5 Extended European Search Report of European Patent Office dated Feb. 14, 2024.
EP23218625.4 Extended European Search Report of European Patent Office dated Feb. 23, 2024.
JP2022-519797 Non-Final Notice of Reasons for Rejection dated Apr. 23, 2024.
KR10-2020-7035806 Notice of Preliminary Rejection mailed Mar. 18, 2024.
JP2022-512316 Non-Final Notice of Reasons for Rejection dated Jul. 30, 2024.

\* cited by examiner

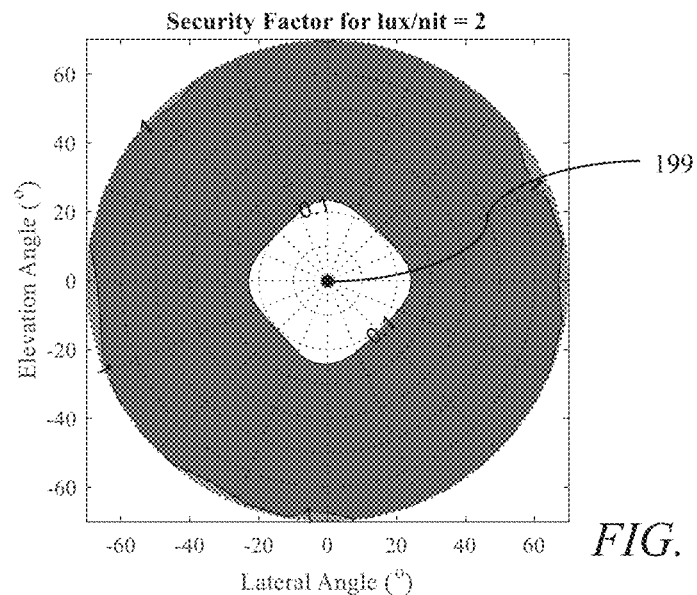
FIG. 15D
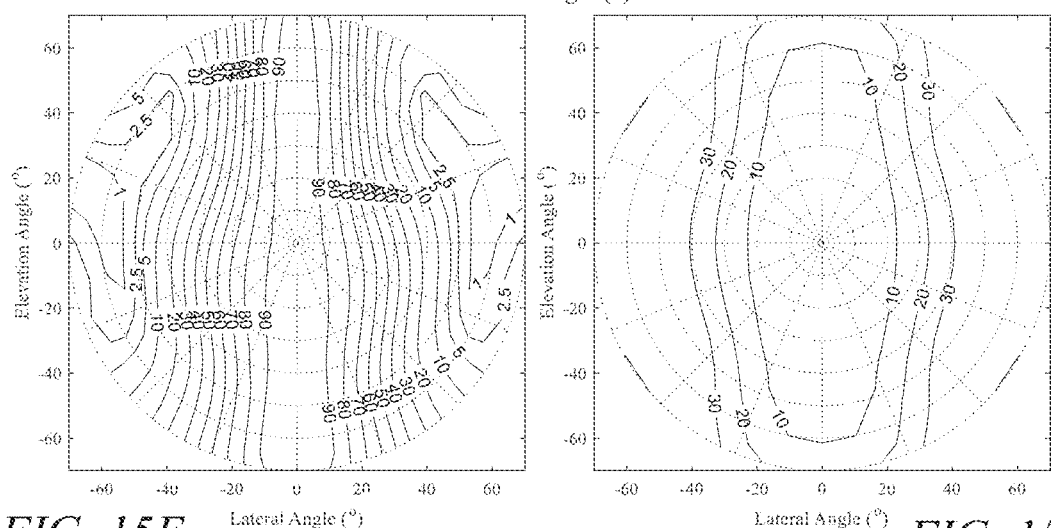
FIG. 15E
FIG. 15F
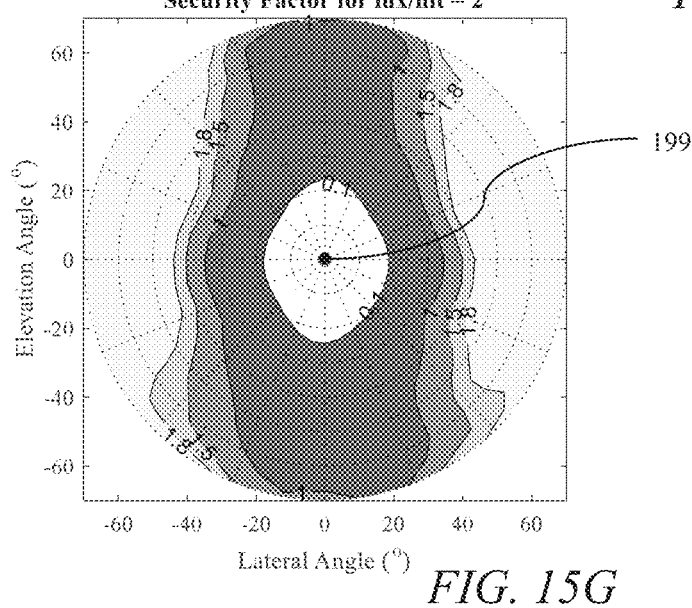
FIG. 15G

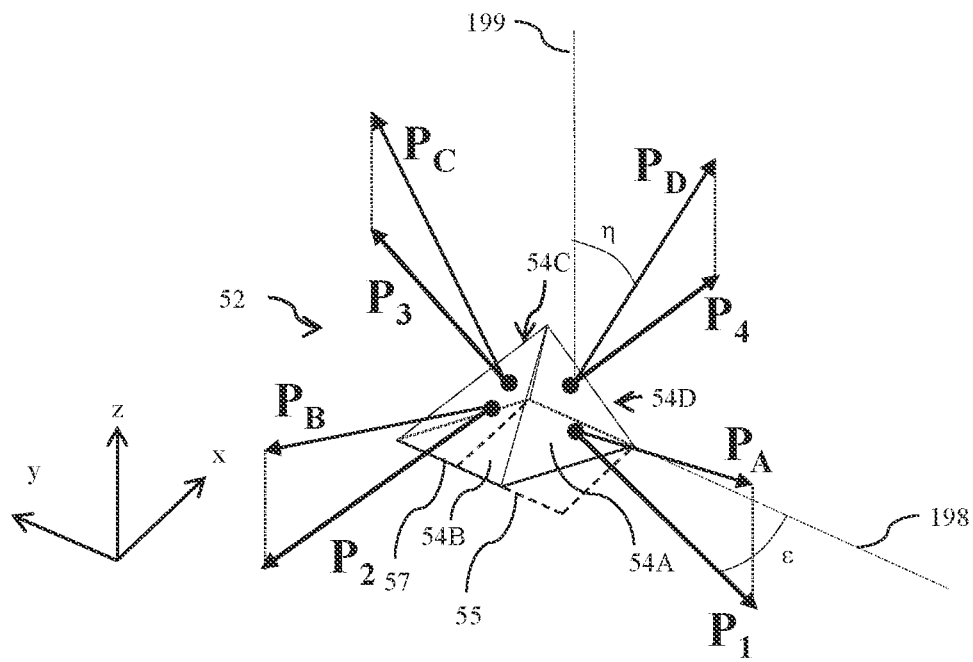
FIG. 17D
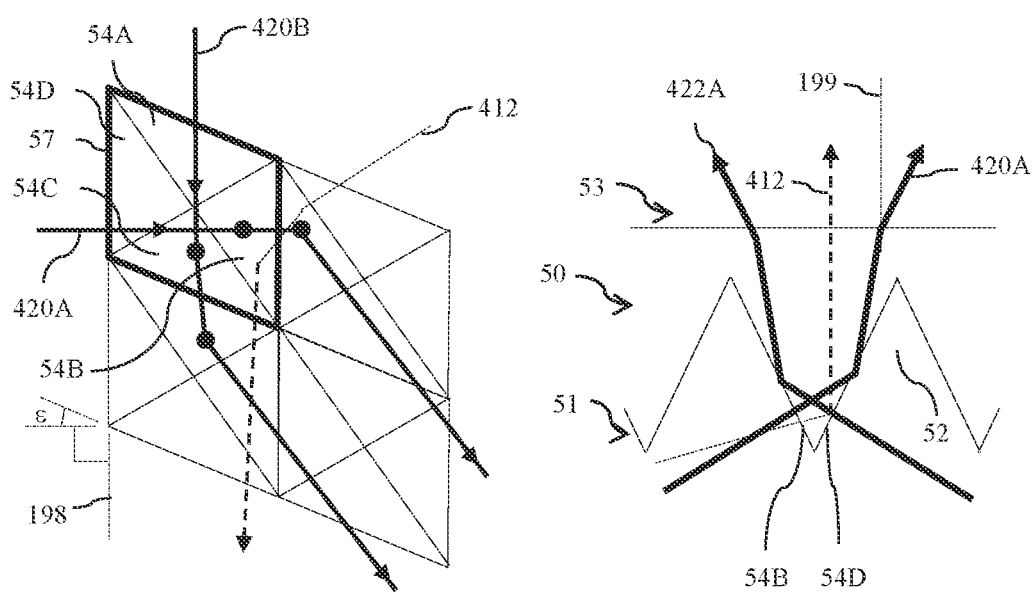
FIG. 17E
FIG. 17F

ILLUMINATION APPARATUS

TECHNICAL FIELD

This disclosure generally relates to illumination from light modulation devices, and more specifically relates to optical stack for providing illumination with reduced solid angle for use in display including privacy display, high efficiency display and high dynamic range display; and for use in environmental illumination.

BACKGROUND

Privacy displays provide image visibility to a primary user that is typically in an on-axis position and reduced visibility of image content to a snooper, that is typically in an off-axis position. A privacy function may be provided by micro-louvre optical films that transmit a high luminance from a display in an on-axis direction with low luminance in off-axis positions, however such films are not switchable, and thus the display is limited to privacy only function.

Switchable privacy displays may be provided by control of the off-axis optical output from a spatial light modulator. Control may be provided by means of off-axis luminance reduction, for example by means of switchable polarisation control layers between display polarisers and additional polarisers.

Backlights with reduced off-axis luminance can be used to provide or enhance the privacy function. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted faces as described in U.S. Pat. No. 9,519,153, which is herein incorporated by reference in its entirety.

Backlights formed from arrays of individually controllable light sources arranged in series with a liquid crystal spatial light modulator can provide high dynamic range by reducing output luminous flux of the light sources in alignment with low luminance regions of the image displayed on the spatial light modulator. High dynamic range LCDs (HDR-LCD) can achieve dynamic ranges that are superior to that which can be provided by an LCD optical mode alone. An array of light sources such as LEDs (light emitting diodes) that is addressed with lower resolution image data is provided in a local dimming LCD backlight, such that dark areas of an image are illuminated by the backlight with low luminance, and bright areas are illuminated with high luminance.

Thin substrate and polymer substrate LCD panels can provide mechanical characteristics such as flexibility that is similar to organic LED (OLED) displays. Such thin substrate LCDs desirably use backlights with similar mechanical characteristics.

One type of LCD backlight comprises a light guide plate, and array of input light sources such as LEDs at one end of the light guide plate. Light that propagates by total internal reflection within the waveguide is output by means of surface features that adjust the propagation angle of light within the waveguide and allow extraction at angles close to grazing the outside of the waveguide. Such light is directed in a normal direction to the LCD by means of a turning film and/or rear reflectors. Such optical stack may have high efficiency, but have multiple optical components with total backlight thickness typically 1 mm or greater. Such an edge illuminated light guide plate is not typically appropriate for two-dimensional local dimming for HDR-LCD illumination, or free-form shaped LCD.

Other known backlights incorporate an array of light emitting diodes (LEDs) in a matrix behind the LCD such as described in U.S. Patent Publ. No. 2017-0261179 comprises a plurality of spatially separated packaged LEDs and a multiple "batwing" optical elements, each batwing optical element arranged to direct light from the packaged LED in a lateral direction. Such light is strongly diffused to provide output illumination. Such backlights require expensive pick-and-place LED and individual optics alignment and have a high thickness and reduced efficiency in comparison to edge illuminated backlights.

Illumination systems for environmental lighting such as automobile headlights, architectural, commercial or domestic lighting may provide a narrow directional light output distribution, for example by means of focussing optics to provide spotlighting effects, or can achieve a wide directional light output distribution for example by means of diffusing optics.

White LED lighting sources can be comprised of separate spectral bands such as red, green, blue and yellow, each created by a separate LED element. Such sources enable users to resolve the separate colours, and as a result of the separation of the sources in the lamp, can create coloured illumination patches.

Catadioptric elements combine refractive surfaces (dioptrics) and reflective surfaces (catoptrics), which may provide total internal reflection or reflection from metallised surfaces. Backlights employing catadioptric optical elements with small output luminous intensity solid angles are described in WIPO International Publ. No. WO2010038025, which is herein incorporated by reference in its entirety.

BRIEF SUMMARY

According to a first aspect of the present disclosure there is provided an illumination apparatus for providing illumination over a predetermined area, the illumination apparatus comprising: a waveguide extending over the predetermined area, the waveguide comprising front and rear light guiding surfaces for guiding light along the waveguide; an array of light emitting elements arrayed across the predetermined area behind the waveguide, wherein: the rear light guiding surface comprises: an array of light input wells, each arranged over a respective light emitting element; and an array of light deflecting wells that are not arranged over the light emitting elements, each light input well comprising a light input surface extending towards the front light guiding surface that is arranged to input light from the respective light emitting element into the waveguide, each light deflecting well comprising a light deflecting surface extending towards the front light guiding surface so that some guided light is incident thereon and some guided light passes over the light deflecting surface, the light deflecting surface being arranged to reflect at least some of the guided light that is incident thereon, and the light deflecting wells having an arrangement around each light input well that causes guided light that has been input through the light input surface of the light input well to be distributed around the light input well; and at least one of the front light guiding surface and the rear light guiding surface comprises light extraction features arranged to extract guided light from the waveguide as output light; and a light turning arrangement arranged to redirect at least some of the output light towards a normal to a plane of the waveguide. An illumination apparatus may be provided in a thin package with high efficiency and high uniformity of luminance. The output illumination may be localized to the region around the light input well. A backlight for a high dynamic range display may be provided.

The light input surface of each light input well comprises four light input faces having surface normals with average components in a plane of the waveguide, which average components are oriented with respect to a reference axis at angles within at most 10°, preferably at most 5°, of 0°, 90°, 180°, and 270°. Light may be input into the waveguide with maximum luminous intensity that is at input angles in the plane of the waveguide that are around parallel, anti-parallel or orthogonal to the reference axis.

The four light input faces may be contiguous. Light may be efficiently captured from the respective aligned light emitting element.

Each of the light input faces may be planar. A tool for the light input well may be conveniently provided. The light cone that propagates within the waveguide may provide desirable uniformity across the region near to each respective light input well.

Each of the light input faces may be convex in material of the waveguide. The size of the collimated light output cone may be reduced, brightness may be increased, and power consumption reduced. The security factor of a privacy image for snooper viewing locations may be increased.

The light extraction features may comprise an array of sets of four light extraction faces, each light extraction face having a surface normal with an average component in a plane of the waveguide, which average components are oriented with respect to the reference axis at angles within at most 10°, preferably at most 5°, of 0°, 90°, 180°, and 270°. Light may be extracted from the waveguide with maximum luminous intensity that is at input angles in the plane of the waveguide that are around parallel, anti-parallel or orthogonal to the reference axis.

The light deflecting surfaces of the light deflecting wells may comprise at least one light deflecting face having a surface normal with an average component in a plane of the waveguide, and the average components in respect of the light deflecting surfaces of the light deflecting wells across the array of light deflecting wells may be variously oriented with respect to the reference axis at angles within at most 10°, preferably at most 5°, of 45°, 135°, 225°, and 315°. Light rays may be guided in the waveguide with maximum luminous intensity that is at angles in the plane of the waveguide that are maintained to be around parallel, anti-parallel or orthogonal to the reference axis. Light rays may be provided that are confined to a region near to the respective light input well. Uniformity may be improved, and contrast of high dynamic range increased.

The light deflecting surface of the light deflecting wells may comprise at least one pair of opposed light deflecting faces, the average components in respect of the opposed light deflecting faces extending in opposite directions. The light deflecting wells may provide reflection of light from more than one illumination direction, and may provide confinement around at least adjacent light input wells, improving uniformity.

The light deflecting surfaces of the light deflecting wells may comprise first and second pairs of opposed light deflecting faces, the first pair of opposed faces having surface normals with average components in a plane of the waveguide that are oriented with respect to the reference axis at angles within at most 10°, preferably at most 5°, of 45° and 225°, respectively, and the second pair of opposed faces having surface normals with average components in a plane of the waveguide that are oriented with respect to the reference axis at angles within at most 10°, preferably at most 5°, of 135°, and 315°, respectively. Uniformity of output for the region around the adjacent light input wells may be increased. Confinement of the light around nearby light input wells is advantageously provided.

The first and second pairs of opposed faces may be contiguous. Advantageously the faces may be conveniently replicated. Confinement of light around a respective light input well may be achieved with high efficiency.

The light deflecting surfaces of the light deflecting wells may comprise four intermediate light deflecting faces extending between the light deflecting surfaces of the first and second pairs. The complexity of tooling and coating of the light deflecting wells may be reduced, reducing cost.

The light deflecting wells may be connected at ends of the pairs of opposed faces to form a grid of complete loops around the light input wells. Uniformity of output near to the respective light input well may be improved. Complexity of manufacture may be reduced.

Each of the light deflecting faces may be planar. Light rays may be guided in the waveguide with maximum luminous intensity that is at angles in the plane of the waveguide that are maintained to be around parallel, anti-parallel or orthogonal to the reference axis. Light rays may be provided that are confined to a region near to the respective light input well. Uniformity may be improved and the contrast ratio of high dynamic range images increased.

The waveguide may have a rectangular shape and the reference axis may be parallel to a side of the rectangular shape. The width of the bezel region at the edge of the illumination apparatus may be reduced.

The light turning arrangement may comprise a light turning optical component comprising an input surface extending across the front light guiding surface of the waveguide and arranged to receive output light from the waveguide, and an output surface facing the input surface, wherein the input surface is prismatic and arranged to provide deflection of the output light towards the normal to the plane of the waveguide. The input surface may comprise an array of pyramidal recesses arranged to provide deflection of the output light towards the normal to the plane of the waveguide, each pyramidal recess comprising four light turning faces. In other words, the light turning arrangement may comprise a light turning optical component that may comprise a light turning film input surface extending across the front light guiding surface of the waveguide and arranged to receive output light from the waveguide, and an output surface facing the input surface, the input surface comprising an array of pyramidal recesses arranged to provide deflection of the output light towards a normal to a plane of the waveguide. Each pyramidal recess may comprise four light turning faces having surface normals with average components in a plane of the waveguide, wherein the four light turning faces of the pyramidal recesses have average components that are oriented with respect to the reference axis at angles within at most 10°, preferably at most 5°, of 0°, 90°, 180°, and 270°. Light rays with maximum luminous intensity that are extracted from the waveguide at angles may be directed near to the normal direction to the waveguide with a small cone angle. Uniformity of output for the region around the respective light input well may be increased. Confinement of the light around the light input well is advantageously provided. Image brightness may be increased in desirable user directions. Power consumption may be reduced. A backlight for a privacy display with high security factor may be achieved.

The deflection provided by the input surface of the light turning optical component may vary in at least one direction across a plane of the light turning optical component so that the deflected light is directed towards a common optical window in front of the illumination apparatus. Advantageously improved uniformity may be achieved.

The light turning arrangement may comprise a light turning optical component comprising a light turning film input surface extending across the front light guiding surface of the waveguide and arranged to receive output light from the waveguide, and an output surface facing the input surface, the input surface comprising an array of pyramidal recesses arranged to provide deflection of the output light towards a normal to a plane of the waveguide. Each pyramidal recess may comprise four light turning faces having surface normals with average components in a plane of the waveguide, which average components are oriented with respect to the reference axis at angles within at most 20°, preferably at most 10°, of 25°, 90°, 205°, and 270°. Light rays with maximum luminous intensity that are extracted from the waveguide at angles may be directed in two directions away from the normal direction to the waveguide, each with a small cone angle. Image brightness may be increased in desirable user directions. Power consumption may be reduced. A backlight suitable for use by two observers with high brightness and efficiency may be provided. A backlight for a centre stack display for an automotive application may be provided.

The surface normals of the faces of the pyramidal recesses may have a tilt angle from the normal to a plane of the waveguide in a range from 35 to 80 degrees, and preferably in a range from 45 to 65 degrees. Desirable output directions for illumination cones from the illumination apparatus may be provided.

Corresponding light turning faces of the pyramidal recesses may have surface normals with inclinations that vary in at least one direction across a plane of the light turning optical component so that the deflection provided by the prismatic input surface of the light turning optical component varies in the at least one direction so that the deflected light is directed towards a common optical window in front of the illumination apparatus. At least a pair of opposed light turning faces of the pyramidal recesses may have surface normals with average components in a plane of the waveguide, which average components vary in at least one direction across a plane of the light turning optical component so that the deflection provided by the prismatic input surface of the light turning optical component varies in the at least one direction so that the deflected light is directed towards a common optical window in front of the illumination apparatus. The light turning faces may be curved along the direction in which they are extended or may be straight along the direction in which they extended. Advantageously pupillated luminance output may be achieved and increased uniformity of luminance and security factor achieved.

The light turning arrangement may comprise a light turning optical component comprising a light turning film input surface extending across the front light guiding surface of the waveguide and arranged to receive output light from the waveguide, and an output surface facing the input surface, wherein the input surface is prismatic and arranged to provide deflection of the output light towards a normal to a plane of the waveguide. Light extracted from the waveguide may be directed towards a desirable output direction with high efficiency.

The light turning arrangement may comprise a light diffusing layer. Light output from the waveguide may be directed into a wide illumination cone. A backlight for a display that may be observed with high image visibility from a wide range of polar locations may be provided.

The light diffusing layer comprises a colour conversion material. The light emitting elements may be provided with a single colour such as blue. The cost of the light emitting elements may be reduced. The complexity of the array of light emitting elements may be reduced. Uniform illumination may be provided over the colour conversion material to achieve a uniform backlight suitable for a high dynamic range display.

The illumination apparatus may further comprise at least one light recycling film component comprising a light recycling film input surface extending across the light diffusing layer and arranged to receive the output light from the light diffusing layer, and a light recycling film output surface facing the light recycling film input surface, wherein the a light recycling film output surface is prismatic and arranged to provide recirculation of the output light towards a normal to a plane of the waveguide. The efficiency of the output may be increased in directions towards a head-on viewing location.

The light input surfaces may have surface normals that may be inclined from a plane of the waveguide by at most 3°. The visibility of hotspots in the region near to the light input wells may be reduced.

Each of the light deflecting surfaces may have surface normals that may be inclined from a plane of the waveguide by at most 3°. The visibility of hotspots in the region near to the light deflecting wells may be reduced.

Each inclined light extraction feature may have surface normals that may be inclined from the normal of a plane of the waveguide by at most 3°. The visibility of hotspots from the light deflecting wells may be reduced.

The light deflecting surfaces may be coated with a reflective material. The visibility of hotspots from the light deflecting wells may be reduced. The confinement in the region around the respective light input well may be improved.

The light input wells may have openings that are larger than the respective light emitting elements over which they are arranged. Advantageously the visibility of hot spots may be reduced. Alignment tolerances of light input wells to light emitting elements may be reduced advantageously reducing cost and complexity.

Each light input well further may comprise an input well end surface extending across the light input surface, the light input well end surface being arranged to guide the guided light over the light input well. The light input well end surface may be planar. The light input well end surface may be coated with a reflective material. The visibility of hotspots from the light deflecting wells may be reduced.

The light deflecting well further may comprise a light deflecting well end surface extending across the light deflecting surface, the light deflecting well end surface being arranged to guide the guided light over the light deflecting well. The light deflecting well end surface may be planar. The light deflecting well end surface may be coated with a reflective material. Efficiency may be increased and the visibility of hotspots reduced. Confinement in a region around the respective light input well may be achieved with high uniformity.

The light deflecting wells may be arranged in a grid having four-fold rotational symmetry around the light input wells. Light rays may be guided in the waveguide with maximum luminous intensity that is at angles in the plane of the waveguide that are maintained to be around parallel, anti-parallel or orthogonal to the reference axis. Extracted light may be directed into a light output cone with a narrow solid angle. An efficient collimated output illumination may be provided.

The light deflecting well end surfaces may have the same areas. The complexity and cost of tooling and replication may be reduced. The visibility of the light deflecting wells may be reduced.

The light deflecting well end surfaces may have areas that vary with distance from the respective aligned light input well. The uniformity of the output light that is confined around a respective light input well may be increased.

The illumination apparatus may be arranged to emit light in a light output distribution, wherein a ratio of luminous intensity half maximum solid angle of the light output distribution to the luminous intensity half maximum solid angle of a Lambertian light distribution may be less than 1, preferably less than 0.5, more preferably less than 0.25 and most preferably less than 0.1. A backlight for a switchable display suitable for a privacy mode of operation with high security factor for off-axis snoopers and a share mode of operation with high image visibility for off-axis users may be provided.

The light emitting elements may have a maximum width of at most 1000 micrometres, preferably at most 500 micrometres and more preferably at most 250 micrometres. The thickness of the illumination apparatus may be reduced.

In at least one cross-sectional plane the distance between centres of the light input wells may be at most 20 mm, preferably at most 10 mm and more preferably at most 2.5 mm. The visibility of the regions for high dynamic range operation may be reduced.

The front light guiding surface may be arranged to guide light by total internal reflection. The rear light guiding surface may be arranged to guide light by total internal reflection. High efficiency of guided light may be achieved.

The illumination apparatus may further comprise a reflective layer behind the rear light guiding surface that may be arranged to reflect light extracted from the waveguide through the rear light guiding surface back through the waveguide for output forwardly. The efficiency of the illumination apparatus may be increased.

The rear light guiding surface may be coated with a reflective material. The visibility of hot-spots around the light input well may be reduced. Confinement around a respective light input well may be increased.

The deflection provided by the prismatic input surface of the light turning optical component may vary in at least one direction across a plane of the light turning optical component so that the deflected light may be directed towards a common optical window in front of the illumination apparatus. For a viewer arranged in front of a display comprising a backlight illumination apparatus the uniformity of luminance across the illumination apparatus may be increased.

The array of light emitting elements may be supported on a support substrate. The waveguide may be attached to the support substrate. Resilience to mechanical and thermal variations may be increased.

The illumination apparatus may further comprise light blocking elements extending around the light input wells between the support substrate and the rear light guiding surface of the waveguide. Visibility of hot-spots around the light input well may be reduced.

The support substrate may further support electronic components connected to the light emitting elements. The light emitting elements may be controlled to provide high dynamic mode operation and other light control modes of operation.

At least some the electronic components may protrude into at least some of the light deflecting wells. The thickness of the illumination apparatus may be reduced.

Each light emitting element may comprise at least one light emitting diode may be provided on a semiconductor substrate that may be mounted on the support substrate. The semiconductor substrate may comprise at least part of a drive circuit for the at least one emitting diode. The cost and complexity of the light emitting elements may be reduced.

Each light emitting element may comprise at least one light emitting diode. High efficiency illumination may be provided for the input light.

At least some of the light emitting elements may further comprise a colour conversion layer.

The colour conversion layer may be provided on a light emitting diode or inside the light input well separated from the at least one light emitting diode. White light may be provided for the input light. The thermal fluctuations of the colour conversion layer may be reduced, increasing conversion efficiency and uniformity.

Each light emitting element may comprise plural light emitting diodes. The plural light emitting diodes may have different colours of emission. Each light emitting element may comprise four light emitting diodes, each aligned with a light input face of the respective light input well. The light emitting elements in respect of different light input wells may have different colours of emission. The colour of the input light may be controlled and uniform illumination may be provided across the array.

An illumination apparatus may further comprise a control system arranged to control the light emitting elements. The control system may provide image information to the illumination apparatus and the illumination apparatus may be operated as a display. A high dynamic range backlight apparatus may be provided.

The illumination apparatus may further comprise a control system arranged to control clusters of light emitting elements in common. The cost and complexity of the control system may be reduced.

According to a second aspect of the present disclosure there is provided a display device comprising: an illumination apparatus; and a transmissive spatial light modulator illuminated by the illumination apparatus. A high dynamic range display apparatus may be provided. The output may be collimated in at least one direction. High brightness, high power efficiency and uniformity may be achieved in a thin package. A display suitable for a switchable privacy display may be provided. A display suitable for an automotive console display may be provided. The display may be curved and have free-form shapes.

According to a third aspect of the present disclosure there is provided an eyepiece optical element arranged in front of the spatial light modulator. The eyepiece optical element may be a lens. The output from a virtual reality display apparatus may be provided to advantageously achieve immersive viewing of display content with high dynamic range. Light from the spatial light modulator may be efficiently coupled into the lens, improving efficiency.

According to a fourth aspect of the present disclosure there is provided a waveguide extending over the predetermined area, the waveguide comprising front and rear light guiding surfaces for guiding light along the waveguide, wherein: the rear light guiding surface comprises: an array of light input wells for arrangement over respective light emitting elements; and an array of light deflecting wells, each light input well comprising a light input surface extending towards the front light guiding surface that is arranged to input light from the respective light emitting element into the waveguide, each light deflecting well comprising a light deflecting surface extending towards the front light guiding surface so that some guided light is incident thereon and some guided light passes over the light deflecting surface, the light deflecting surface being arranged to reflect at least some of the guided light that is incident thereon, and the light deflecting wells having an arrangement around each light input well that causes guided light that has been input through the light input surface of the light input well to be distributed around the light input well; and at least one of the front light guiding surface and the rear light guiding surface comprises light extraction features arranged to extract guided light from the waveguide as the output light.

Such an apparatus may be used for LCD backlighting or at least for automotive, domestic or professional lighting.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying figures, wherein like reference numbers indicate similar parts.

FIG. 15D is a schematic graph illustrating the variation in security factor, S with polar location for the privacy display device of FIG. 1D comprising the waveguide of FIGS. 13A-B when illuminated by a single light emitting diode, operating in share mode of operation with a display head-on luminance, of value $Y_{max}$ measured in nits that is half of the illuminance of value I measured in lux;

FIG. 15E is a schematic graph illustrating the variation in transmission with polar location for an exemplary polar control retarder of FIG. 1D operating in privacy mode;

FIG. 15F is a schematic graph illustrating the variation in reflectivity of the display device of FIG. 1D comprising the exemplary polar control retarder and operating in privacy mode;

FIG. 15G is a schematic graph illustrating the variation in security factor, S with polar location for the privacy display device of FIG. 1D comprising the waveguide of FIGS. 13A-B when illuminated by a single light emitting diode, operating in privacy mode of operation with a display head-on luminance, of value $Y_{max}$ measured in nits that is half of the illuminance of value I measured in lux;

FIG. 17D is a schematic diagram illustrating a pyramidal recess of the light turning optical component of FIG. 17C;

FIG. 17E is a schematic diagram illustrating in top view the refraction and reflection of light rays by the faces of the light turning optical component of FIG. 17C;

FIG. 17F is a schematic diagram illustrating in side view the refraction and reflection of light rays by the faces of the light turning optical component of FIG. 17C;

DETAILED DESCRIPTION

Figure 1A:
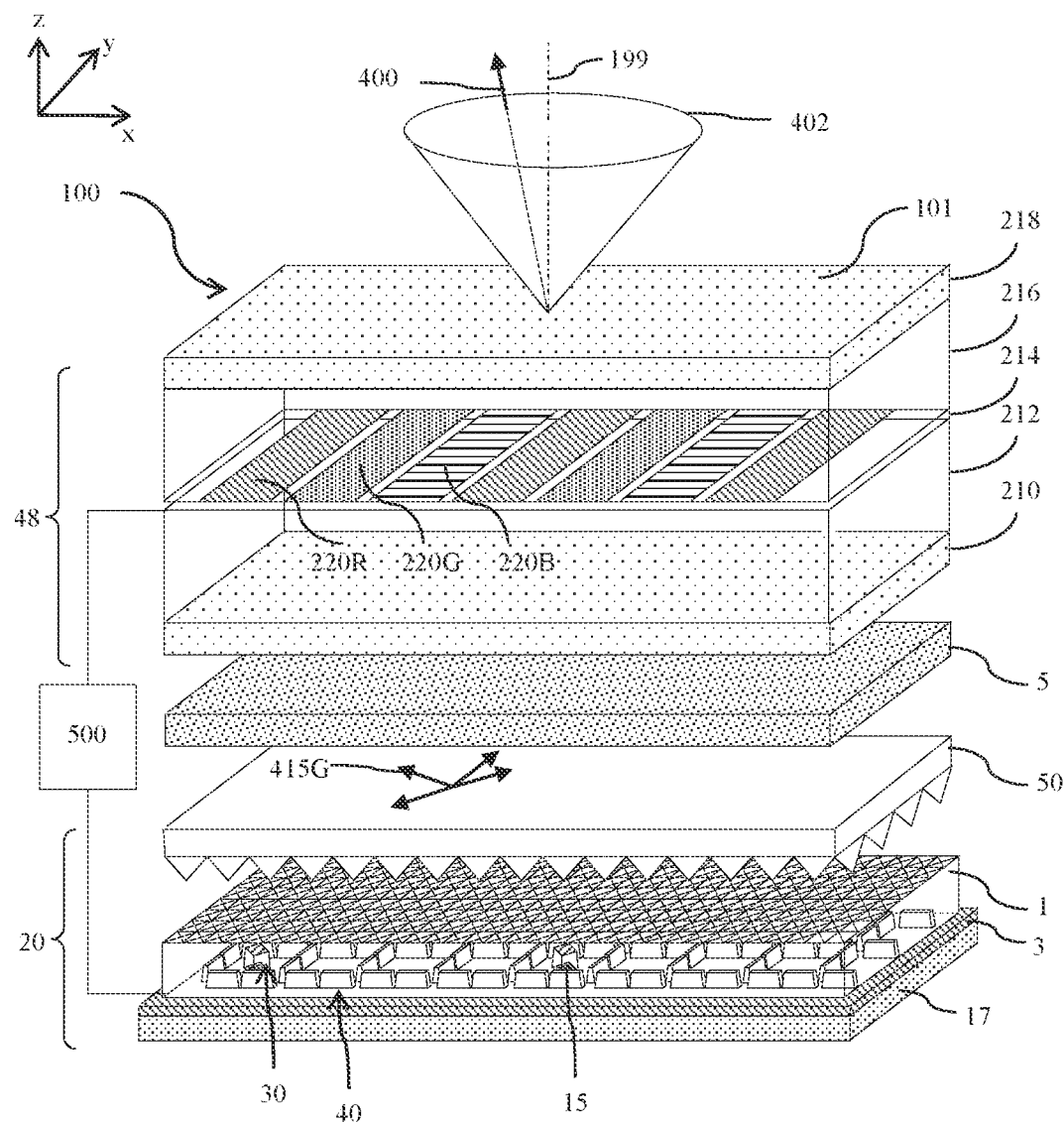
FIG. 1A is a schematic diagram illustrating in side perspective view a display apparatus comprising a backlight comprising a mini-LED array and a catadioptric optical element comprising a waveguide and turning film arranged to illuminate an LCD.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL=(Y+R)/(Y-K) \qquad \text{eqn. 1}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 2}$$

For high contrast optical LCD modes, the white state transmission remains substantially constant with viewing angle. In the contrast reducing liquid crystal modes of the present embodiments, white state transmission typically reduces as black state transmission increases such that $$Y+K{\sim}P.L \qquad \text{eqn. 3}$$

The visual security level may be further given as:

$$VSL = \left(\frac{C}{C-1} \cdot \left(1 + \frac{\rho.I}{\pi.L.P}\right)\right) \qquad \text{eqn. 4}$$

where off-axis relative luminance, P is typically defined as the percentage of head-on luminance, L at the snooper angle and the display may have image contrast ratio C and the surface reflectivity is ρ.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL = 1 + I.\rho/(\pi.P.L) \qquad \text{eqn. 5}$$

The perceptual image security may be determined from the logarithmic response of the eye, such that $$S = \log_{10}(V) \qquad \text{eqn. 6}$$

Desirable limits for S were determined in the following manner. In a first step a privacy display device was provided. Measurements of the variation of privacy level, ρ(θ) of the display device with polar viewing angle and variation of reflectivity ρ(θ) of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer positions at a polar angle of greater than 0° to the normal to the display device. The variation I(θ) of illuminance of a substantially Lambertian emitting lightbox with polar viewing angle was determined by measuring the variation of recorded reflective luminance with polar viewing angle taking into account the variation of reflectivity ρ(θ). The measurements of P(θ), I(θ) and I(θ) were used to determine the variation of Security Factor S(θ) with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the observer's eye was recorded. From the relationship S(θ), the security factor at said polar location was determined. The measurement was repeated for the different images, for various display luminance $Y_{max}$, different lightbox illuminance I(q=0), for different background lighting conditions and for different observers.

From the above measurements S<1.0 provides low or no visual security, 1.0≤S<1.5 provides visual security that is dependent on the contrast, spatial frequency and temporal frequency of image content, 1.5≤S<1.8 provides acceptable image invisibility (that is no image contrast is observable) for most images and most observers and S≥1.8 provides full image invisibility, independent of image content for all observers.

In comparison to privacy displays, desirably wide-angle displays are easily observed in standard ambient illuminance conditions. One measure of image visibility is given by the contrast sensitivity such as the Michelson contrast which is given by:

$$M = (I_{max} - I_{min})/(I_{max} + I_{min}) \qquad \text{eqn. 7}$$

and so:

$$M = ((Y+R)-(K+R))/((Y+R)+(K+R)) = (Y-K)/(Y+K+2.R) \qquad \text{eqn. 8}$$

Thus the visual security level (VSL), is equivalent (but not identical to) 1/M. In the present discussion, for a given off-axis relative luminance, P the wide-angle image visibility, W is approximated as $$W = 1/VSL = 1/(1 + I.\rho/(\pi.P.L)) \qquad \text{eqn. 9}$$

In the present discussion the colour variation Δε of an output colour $(u_w' + \Delta u', v_w' + \Delta v)$ from a desirable white point $(u_w', v_w')$ may be determined by the CIELUV colour difference metric, assuming a typical display spectral illuminant and is given by:

$$\Delta\varepsilon = (\Delta u'^2 + \Delta v'^2)^{1/2} \qquad \text{eqn. 10}$$

Catadioptric elements employ both refraction and reflection, which may be total internal reflection or reflection from metallised surfaces.

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

It would be desirable to provide a collimated illumination apparatus 100 that provides a relatively narrow output cone angle for a display apparatus. In the present disclosure, collimated is used as an accepted term for narrow angle illumination from a display and/or backlight, for example full width half maximum (FWHM) luminance cone angles of less than 40 degrees, and typically less than 30 degrees.

In comparison to conventional wide angle backlights, collimated backlights can provide high efficiency light output for head-on observers, achieving increased luminance for a given power consumption or reduced power consumption for a given luminance. Collimated backlights can also provide low off-axis image visibility for privacy display.

It would further be desirable to provide a switchable collimated illumination apparatus 100 for a privacy display with a narrow angle output in a first mode of operation and a wide angle output in a second mode of operation. In operation, narrow angle output may be provided for a single head-on user, while wide angle output may be provided for multiple display users.

It would further be desirable to provide an environmental illumination apparatus for illumination of an ambient environment with collimated illumination from a large area of illumination with low glare.

It would be desirable to provide a thin switchable illumination apparatus for display, display backlighting or for domestic or professional environmental lighting. Environmental lighting may include illumination of a room, office, building, scene, street, equipment, or other illumination environment. Display backlighting means an illumination apparatus arranged to illuminate a transmissive spatial light modulator such as a liquid crystal display. The light emitting elements such as LEDs of a display backlight may be provided with image information, for example in high dynamic range operation as will be described herein. However, in general pixel data is provided by the spatial light modulator.

It would further be desirable to provide a thin backlight for a spatial light modulator that can provide local area dimming for high dynamic range, a thin package, a widely spaced array of light sources and high uniformity. It would be further desirable to provide thin, flexible and free-form shapes (for example circular) backlights for thin substrate LCDs with very low bezel widths that achieve appropriate light output distributions with high uniformity, high efficiency and HDR capability.

The structure and operation of various illumination devices will now be described. In this description, common elements have common reference numerals. It is noted that the disclosure relating to any element applies to each device in which the same or corresponding element is provided. Accordingly, for brevity such disclosure is not repeated.

It may be desirable to provide a high efficiency display with high dynamic range.

FIG. 1A is a schematic diagram illustrating in side perspective view a display device 100 comprising an illumination apparatus 20 comprising an array of light emitting elements 15 and a catadioptric optical element comprising a waveguide 1 and light turning optical componet 50 arranged to illuminate a transmissive spatial light modulator 48 and switchable privacy optical stack 300.

The display device 100 comprises: an illumination apparatus 20 and optical stack 5 arranged to illuminate a predetermined area 101 of a transmissive spatial light modulator 48. Illumination apparatus 20 and spatial light modulator 48 are controlled by means of controller 500.

Transmissive spatial light modulator 48 comprises an input display polariser 210 arranged on the input side of the spatial light modulator 48, and an output display polariser 218 arranged on the output side of the spatial light modulator 48. Liquid crystal layer 214 comprising pixels 220R, 220G, 220B is arranged between transparent substrates 212, 216.

Output light rays 400 from the display device 100 are provided within light output cone 402, that in the illustrative embodiment of FIGURE 1A has highest luminance in the direction 199 that is normal to the display device 100. In other embodiments such as described in FIG. 18A and FIG. 18B hereinbelow the highest luminance direction may be different to the direction 199.

The size and profile of the light output cone 402 is determined by the structure and operation of the backlight illumination apparatus 20 and other optical layers in the optical stack 5. As will be described hereinbelow the backlight illumination apparatus 20 is arranged to provide a distribution of luminous intensity within a relatively small cone angle 402 in comparison with conventional backlights using brightness enhancement films such as BEF™ from 3M corporation.

The structure of the backlight comprising illumination apparatus 20 and optical stack 5 will now be described.

The optical stack 5 may comprise diffusers, reflective polarisers, anti-wetting layers and other desirable structures for manipulation of output light cone 402 from the illumination apparatus 20.

Illumination apparatus 20 comprises a support substrate 17, reflective layer 3, an array of light emitting elements 15 and an optical waveguide 1 comprising light input wells 30 and light deflecting wells 40. The light emitting elements 15 are aligned to the light input wells 30. The light deflecting wells 40 are arranged in an array between the light input wells 30.

The waveguide 1 comprises rear and front light guiding surfaces 6, 8 and may be comprise a light transmitting material such as PMMA, PC, COP or other known transmissive material. The light input wells may comprise air between the rear light guiding surface 6 and the end 34. The waveguide 1 comprises an array of catadioptric elements wherein light is refracted at the light input well and is reflected by total internal reflection and/or reflection at coated reflective surfaces.

The illumination apparatus 20 further comprises a reflective layer 3 behind the rear light guiding surface 6 that is arranged to reflect light extracted from the waveguide 1 through the rear light guiding surface 6 back through the waveguide 1 for output forwardly.

The illumination apparatus 20 further comprises a light turning optical arrangement that is a light turning optical componet 50 arranged to direct light output rays 415G from the waveguide 1 into desirable light output cone 402. Light turning optical componet 50 may comprise a film. Advantageously low thickness may be achieved.

Control system 500 is arranged to control the light emitting elements 15 and the pixels 220R, 220G, 220B of the spatial light modulator 48. High resolution image data may be provided to the spatial light modulator 48 and lower resolution image data may be provided to the light emitting elements 15 by the control system. The display device 100 may advantageously be provided with high dynamic range, high luminance and high efficiency as will be described further hereinbelow The display 100 may be curved or bent. The display 100 may have freeform shapes, for example for use in an automotive cabin.

It may be desirable to provide a near-eye display 100.

Figure 1B:
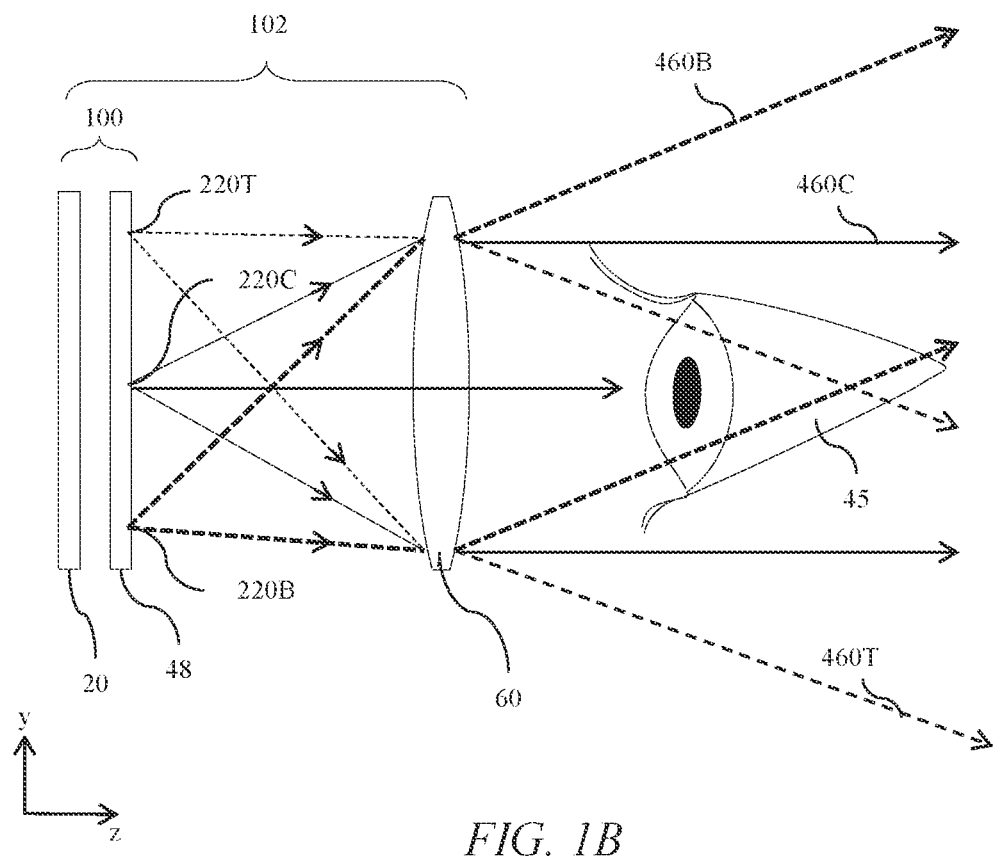
FIG. 1B is a schematic diagram illustrating in side view a near eye display apparatus comprising a backlight comprising a mini-LED array and a catadioptric optical element comprising a waveguide and turning film similar to the backlight of FIG. 1A and arranged to illuminate an eyepiece through an LCD.

FIG. 1B is a schematic diagram illustrating in side view, a near eye display apparatus 102 comprising illumination apparatus 20 comprising a mini-LED array and a catadioptric optical element comprising a waveguide 1 and turning film 50 similar to the illumination apparatus 20 of FIGURE 1A and arranged to illuminate an eyepiece 60 through a transmissive spatial light modulator 48. Features of the embodiment of FIG. 1B not discussed in further detail may be assumed to correspond to the features with equivalent reference numerals as discussed above, including any potential variations in the features.

In the alternative embodiment of FIG. 1B, a display device 102 further comprises an eyepiece optical element 60 arranged in front of the spatial light modulator 48, wherein the eyepiece optical element 60 is a lens and the display apparatus 100 comprises an illumination apparatus 20 arranged to illuminate the spatial light modulator 48.

In operation, the alternative arrangement of FIG. 1B provides illumination from the illumination apparatus 20 through the spatial light modulator 48 such that light rays are collected by eyepiece 60 and directed towards the eye of an observer 45. In the embodiment of FIG. 1B, eyepiece 60 is a lens arranged to magnify the image on the spatial light modulator 48.

Top pixel 220T provides light rays 460T, central pixel 220C provides light rays 460C and bottom pixel 220B provides light rays 460B. The eye of the observer 45 collects the light rays 460T, 460C, 460B and produces an image on the retina of the eye such that an image is perceived with angular size that is magnified in comparison to the angular size of the spatial light modulator 48. The operation of the backlight 20 in the near eye display apparatus 102 will be further described in FIG. 39A and FIG. 40 hereinbelow.

The display device 100 may provide a virtual reality display functionality. Advantageously high brightness images may be provided with high dynamic range. Scanning of illumination phase of the mini-LED array may provide increased response speed and less motion blur, advantageously reducing nausea cues. Light scatter from the spatial light modulator 48 may be reduced and image contrast advantageously increased.

It may be desirable to provide a privacy display.

Figure 1C:
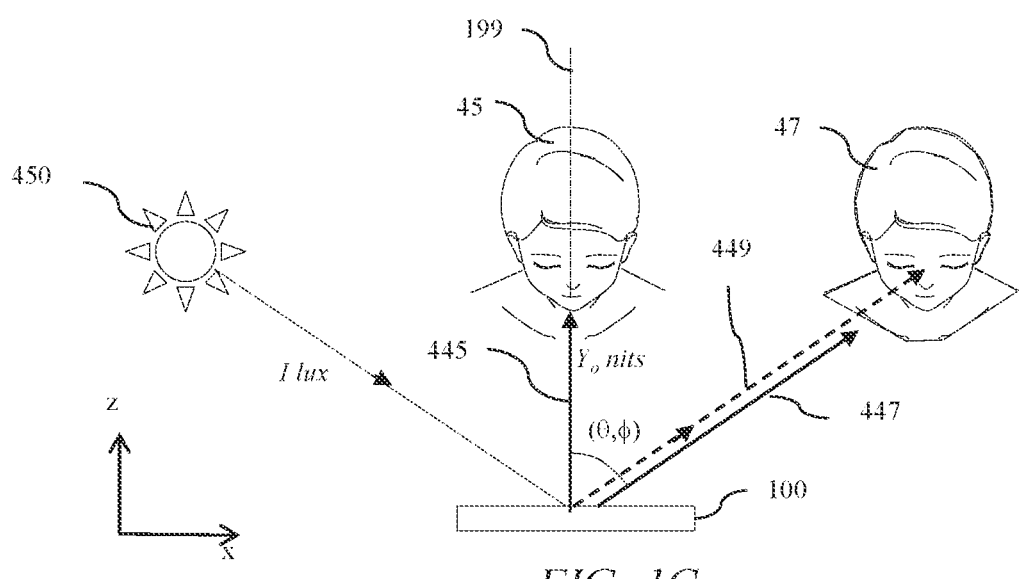
FIG. 1C is a schematic diagram illustrating in top view an illustrative viewing condition for a privacy display.

FIG. 1C is a schematic diagram illustrating in top view an illustrative viewing condition for a privacy display device 100. Primary user 45 is arranged close to the axis 199 of the display and receives an image luminance of $Y_o$ measured in nits along ray 445. Off-axis snooper 47 at polar angle $(\theta,\phi)$ receives light rays 447 from the display device 100 and reflected light rays 449 from ambient light source 450 that has an illuminance/measured in lux.

It would be desirable to provide a switchable privacy display that can switch between share mode and privacy mode of operation.

Figure 1D:
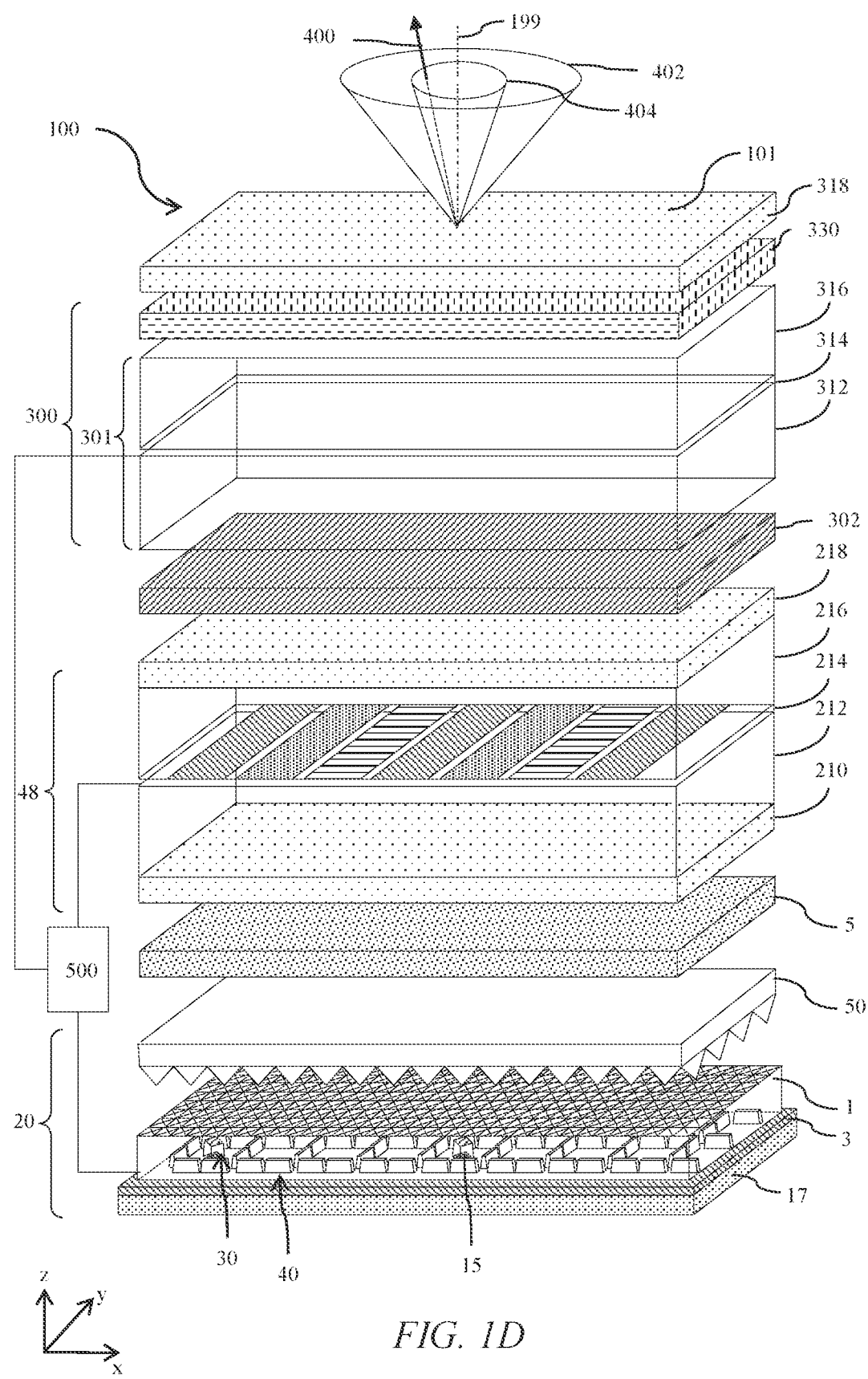
FIG. 1D is a schematic diagram illustrating in side perspective view the display apparatus of FIG. 1A further comprising a view angle control arrangement comprising an additional polariser, a reflective polariser and a polar control retarder.

FIG. 1D is a schematic diagram illustrating in side perspective view the display apparatus of FIG. 1A further comprising a view angle control arrangement comprising an additional polariser 318, a reflective polariser 302 and a polar control retarder 300 arranged on the output side of the spatial light modulator 48 between the reflective polariser 302 and the additional polariser 318. Features of the embodiment of FIG. 1D not discussed in further detail may be assumed to correspond to the features with equivalent reference numerals as discussed above, including any potential variations in the features.

The additional polariser 318 is arranged on the output side of the spatial light modulator 48 and the polar control retarder 300 is arranged between the additional polariser 318 and the output display polariser 218. The polar control retarder 300 comprises a liquid crystal retarder 301 comprising a switchable liquid crystal retarder layer 314 arranged between transparent substrates 312, 316; and a passive retarder 330.

In a privacy mode of operation, the liquid crystal retarder 301 may be controlled by controller 500 to achieve a high luminance image and low display reflectivity to an observer in light cone 404 at polar locations near to the optical axis 199; and a low luminance image and high display reflectivity to a snooper at polar locations inclined to the optical axis 199, outside the cone 404.

In a share mode of operation, the liquid crystal retarder 301 may be controlled by a controller to provide a high luminance image and low display reflectivity to an observer in light cone 402 at polar locations near to the optical axis 199 and an increased luminance image and low display reflectivity to a snooper at polar locations inclined to the optical axis 199, inside the cone 402. A switchable privacy display device 100 with high security factor may advantageously be provided. Further the display may be provided with high dynamic range, high luminance and high efficiency as will be described further hereinbelow.

Structures and operation of the polar control retarder 300, reflective polariser 302 and additional polariser 318 are described further in U.S. Pat. No. 10,976,578, which is herein incorporated by reference in its entirety.

In an alternative embodiment (not shown) the reflective polariser 302 may be omitted. The additional polariser 318 may be arranged between the illumination apparatus 20 and the input polariser 210. The polar control retarder 300 may be arranged between the additional polariser 318 and the input polariser 210. The front surface reflectivity of the display may advantageously be reduced.

In other alternative embodiments (not shown) further additional polarisers and further polar control retarders may be provided. The luminance for off-axis viewing locations may advantageously be reduced and the security factor increased.

The structure of an illustrative embodiment of an illumination apparatus 20, for example for use as a backlight of the displays of FIG. 1A and FIG. 1D or for environmental illumination will now be described.

Figure 2:
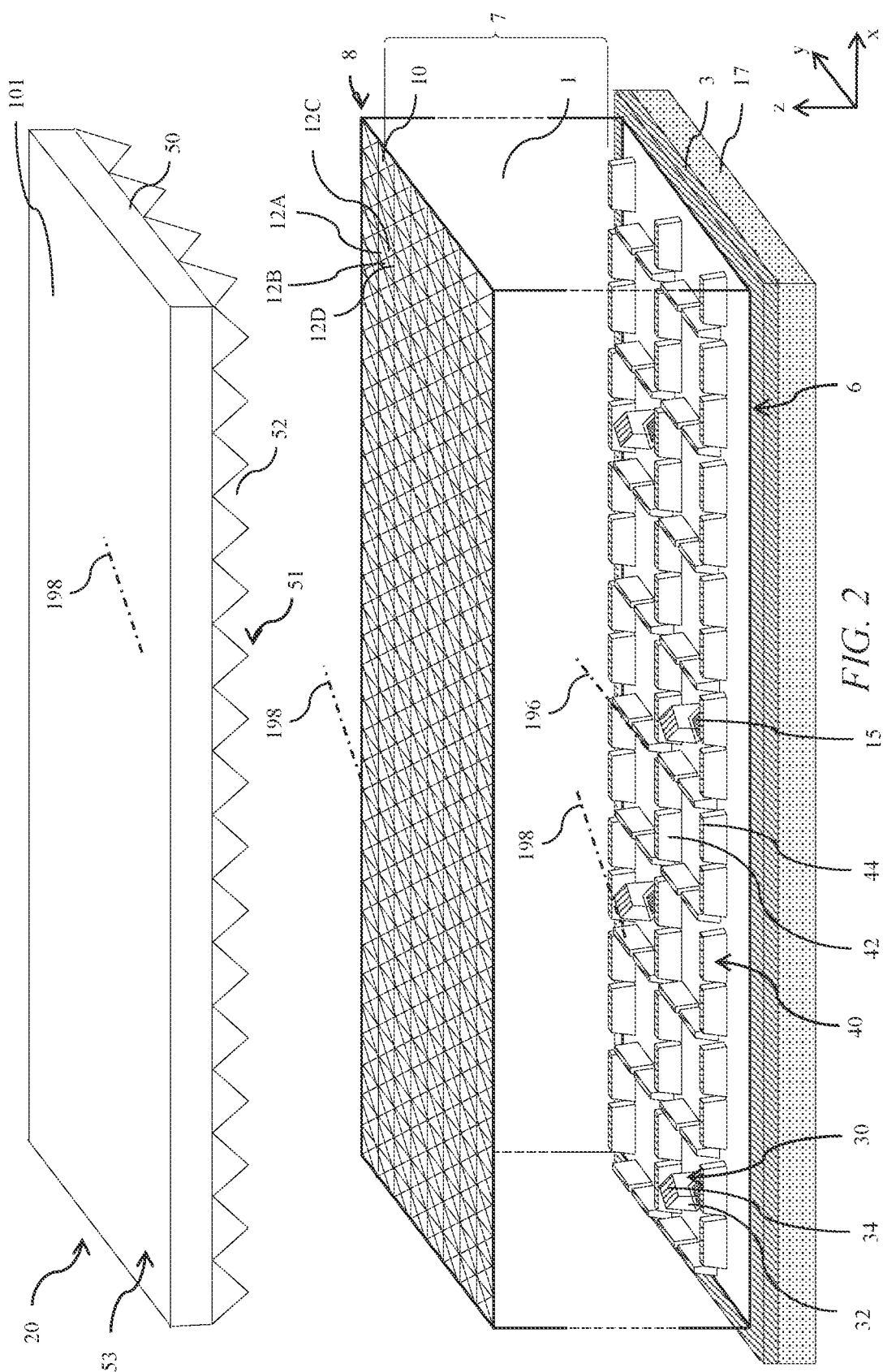
FIG. 2 is a schematic diagram illustrating in side perspective expanded view the backlight of FIG. 1A.
Figure 3A:
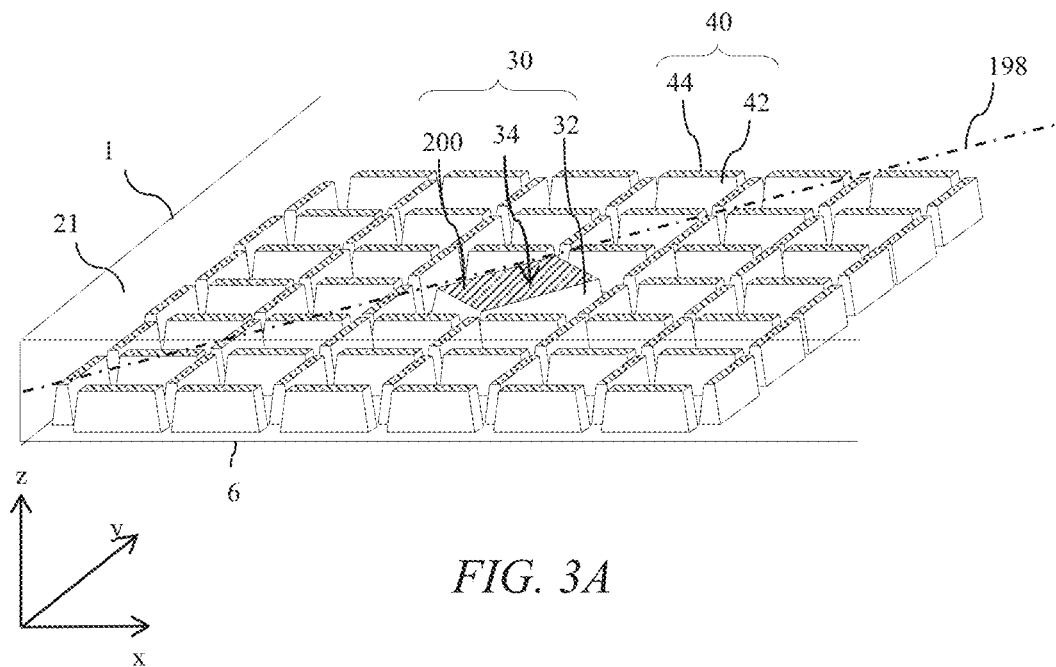
FIG. 3A is a schematic diagram illustrating in side perspective view an arrangement of light input wells and light deflecting wells of the waveguide of FIG. 1A.

FIG. 2 is a schematic diagram illustrating in side perspective expanded view an illumination apparatus 20; and FIG. 3A is a schematic diagram illustrating in side perspective view an arrangement of light input wells 30 and light deflecting wells 40 of the waveguide 1 of FIGURE 1A and FIG. 2. Features of the embodiment of FIG. 2 and FIG. 3A not discussed in further detail may be assumed to correspond to the features with equivalent reference numerals as discussed above, including any potential variations in the features.

The illumination apparatus 20 may be provided for example as a backlight for illumination of the spatial light modulator of FIG. 1A and FIG. 1D, or for example to provide illumination of ambient environments with light with a desirably small cone angle 402 from a large area advantageously achieving desirable uniformity of illumination across the predetermined area 101 of the illumination apparatus 20. Lighting applications may include but are not limited to automotive headlights and indicator lights, downlighting, street illumination and other known ambient lighting applications.

The illumination apparatus 20 for providing illumination over a predetermined area 101. comprises: a waveguide 1 extending over the predetermined area 101, the waveguide 1 comprising front and rear light guiding surfaces 8, 6 for guiding light along the waveguide 1; an array of light emitting elements 15 arrayed across the predetermined area 101 behind the waveguide 1; and a light turning arrangement that is arranged to redirect at least some of the output light towards a normal to a plane of the waveguide. In the embodiment of FIG. 2 the light turning arrangement is a light turning optical component 50.

Each light emitting element 15 comprises a light emitting diode such as an unpackaged mini-LED. In an illustrative embodiment the light emitting elements 15 have a maximum width of at most 1000 micrometres, preferably at most 500 micrometres and more preferably at most 250 micrometres. In at least one cross-sectional plane the distance between centres of the light input wells 30 is at most 20 mm, preferably at most 10 mm and more preferably at most 2.5 mm.

The rear light guiding surface 6 of the waveguide 1 comprises: an array of light input wells 30, each arranged over a respective light emitting element 15, and an array of light deflecting wells 40 that are not arranged over light emitting elements 15. In other words the rear light guiding surface 6 of the waveguide 1 comprises: an array of light input wells 30, each arranged to receive light from a light emitting element 15; and an array of light deflecting wells 40 that do not receive light from the light emitting elements 15.

The light emitting elements 15 may be arranged on the substrate 17 by means of a pick-and-place machine. It may be desirable to improve the speed on placement of light emitting elements 15.

The illumination apparatus 20 may be manufactured at least in part using the method provided in U.S. Pat. No. 8,985,810, which is herein incorporated by reference in its entirety.

The method may comprise: forming a monolithic array of light-emitting elements on a substrate such as wafer. The wafer may for example be a sapphire wafer on which gallium nitride multiple quantum well light emitting diodes are grown.

A plurality of light-emitting elements 15 may be selectively removed from the monolithic array in a manner that preserves the relative spatial position of the selectively removed light-emitting elements 15. Such a method may comprise a laser lift off method to transfer an array of gallium nitride LEDs arranged on a sapphire wafer for example.

A non-monolithic array of light-emitting elements 15 may be formed, for example on the substrate 17, with the selectively removed light-emitting elements 15 in a manner that preserves the relative spatial position of the selectively removed light-emitting elements 15.

The non-monolithic array of light-emitting elements may be aligned with an array of optical elements that are the light input wells 30 of the waveguide 1. The plurality of light-emitting elements 15 that are selectively removed from the monolithic array are selected such that, in at least one direction, for at least one pair of the selectively removed light-emitting elements 15 in the at least one direction, for each respective pair there is at least one respective light-emitting element 15 that is not selected that was positioned in the monolithic array between the pair of selectively removed light-emitting elements 15 in the at least one direction.

In other words, the method may comprise: forming a monolithic array of light-emitting elements; selectively removing a plurality of light-emitting elements 15 from the monolithic array in a manner that preserves the relative spatial position of the selectively removed light-emitting elements 15; forming a non-monolithic array of light-emitting elements 16 with the selectively removed light-emitting elements 16 by mounting the selectively removed light-emitting elements on a substrate 17 in a manner that preserves the relative spatial position of the selectively removed light-emitting elements 15; and separately forming an integrated optical body 1 that is a waveguide 1 comprising an array of catadioptric optical elements with refractive light input wells 30, refractive and reflective light extraction features 10, refractive and reflective rear and front surfaces 6, 8, and reflective light deflecting wells 40.

The method may further comprise the step of aligning the substrate 17 comprising the non-monolithic array of light-emitting elements 15 with the integrated body that is the waveguide 1 comprising the array of catadioptric optical elements 30, 40, 6, 8, 10. The plurality of light-emitting elements that are selectively removed from the monolithic array are selected such that, in at least one direction, for at least one pair of the selectively removed light-emitting elements 15 in the at least one direction, for each respective pair there is at least one respective light-emitting element that is not selected that was positioned in the monolithic array between the pair of selectively removed light-emitting elements 15 in the at least one direction.

In other words, the method may comprise a method of manufacturing an illumination apparatus 20; the method comprising: forming a monolithic array of light-emitting elements; selectively removing a plurality of light-emitting elements 15 from the monolithic array in a manner that preserves the relative spatial position of the selectively removed light-emitting elements 15; forming a non-monolithic array of light-emitting elements 15 with the selectively removed light-emitting elements 15 in a manner that preserves the relative spatial position of the selectively removed light-emitting elements; and aligning the non-monolithic array of light-emitting elements 15 with an array of optical elements 30, 40; wherein the plurality of light-emitting elements 15 that are selectively removed from the monolithic array are selected such that, in at least one direction, for at least one pair of the selectively removed light-emitting elements 15 in the at least one direction, for each respective pair there is at least one respective light-emitting element that is not selected that was positioned in the monolithic array between the pair of selectively removed light-emitting elements 15 in the at least one direction.

Such methods may provide an array of light emitting elements 15 with separation and orientation that is defined in a controlled manner over a large number of light emitting elements. The cost of the transfer of light emitting elements 15 may be substantially reduced. The accuracy of the alignment of the light emitting elements 15 to the light input wells 30 arranged over the light emitting elements 15 may be increased. Advantageously increased uniformity may be provided.

Each light input well 30 comprises a light input surface 32 extending towards the front light guiding surface 8 that is arranged to input light from the respective light emitting element 15 into the waveguide 1. The light input well 30 end surface 34 is provided with a reflective material 200, for example as illustrated hereinbelow.

In the present embodiments, a reference axis 198 is provided. The alignment of at least some of the surfaces of the illumination apparatus 20 with respect to the reference axis 198 are provided with respect to the alignment within a plane that is in a plane of the waveguide 1. The alignment of one face of the light input surface 32 of each light input well 30 with respect to the reference axis 198 will be described further hereinbelow.

As described further herein the light turning optical componet 50 that is arranged to receive light from the waveguide 1 has an input surface 51 that is parallel to the front surface 8 of the waveguide. A plane in which the light turning optical componet 50 extends may be the same as the plane in which the waveguide 1 extends. In embodiments wherein the waveguide 1 is curved then the plane in which the waveguide 1 extends is provided for at least one region of the waveguide 1.

The light deflecting wells 40 comprise light deflecting surfaces 42 and reflective end 44. The light deflecting wells 40 have an arrangement around each light input well 30 that causes guided light that has been input through the light input surface 32 of the light input well 30 to be distributed around the light input well 30 as will be described hereinbelow. In the embodiment of FIG. 2 and FIG. 3A the light deflecting well 40 end surface 44 is coated with a reflective material 200.

At least one of the front light guiding surface 8 and the rear light guiding surface 6 comprises light extraction features 10 arranged to extract guided light from the waveguide 1 as the output light 400 as will be described further hereinbelow. In the embodiment of FIG. 2 the front light guiding surface 8 comprises light extraction features 10. Light extraction features 10 each comprises faces 12A, 12B, 12C, 12D.

Light turning optical componet 50 comprises an input surface 51 comprising pyramidal recesses 52 as will be described further hereinbelow. The input surface 51 extends across the front light guiding surface 8 of the waveguide 1 and is arranged to receive output light 400 from the waveguide 1. An output surface 53 faces the input surface 51. As will be described further hereinbelow the light turning optical componet 50 in the embodiment of FIG. 2 is arranged to provide deflection of the output light 400 from the waveguide 1 towards a normal 199 to a plane of the waveguide 1.

The waveguide 1 thus comprises front and rear light guiding surfaces 8, 6 for guiding light along the waveguide 1, wherein: the rear light guiding surface 6 comprises: an array of light input wells 30, for arrangement over a respective light emitting elements 15; and an array of light deflecting wells 40, each light input well 30 comprising a light input surface 32 extending towards the front light guiding surface 8 that is arranged to input light from the respective light emitting element 15 into the waveguide 1, each light deflecting well 40 comprising a light deflecting surface 42 extending towards the front light guiding surface 8 so that some guided light is incident thereon and some guided light passes over the light deflecting surface 42, the light deflecting surface 42 being arranged to reflect at least some of the guided light that is incident thereon, and the light deflecting wells 40 having an arrangement around each light input well 30 that causes guided light that has been input through the light input surface 32 of the light input well 30 to be distributed around the light input well 30; and at least one of the front light guiding surface 8 and the rear light guiding surface 6 comprises light extraction features 10 arranged to extract guided light from the waveguide 1 as the output light 400.

In the embodiment of FIG. 3A the waveguide 1 has a rectangular shape and the reference axis 198 is inclined at an angle of 45 degrees to a side 21 of the rectangular shape. An alternative arrangement of light input wells 30 and light deflecting wells 40 over the predetermined area will now be described.

Figure 3B:
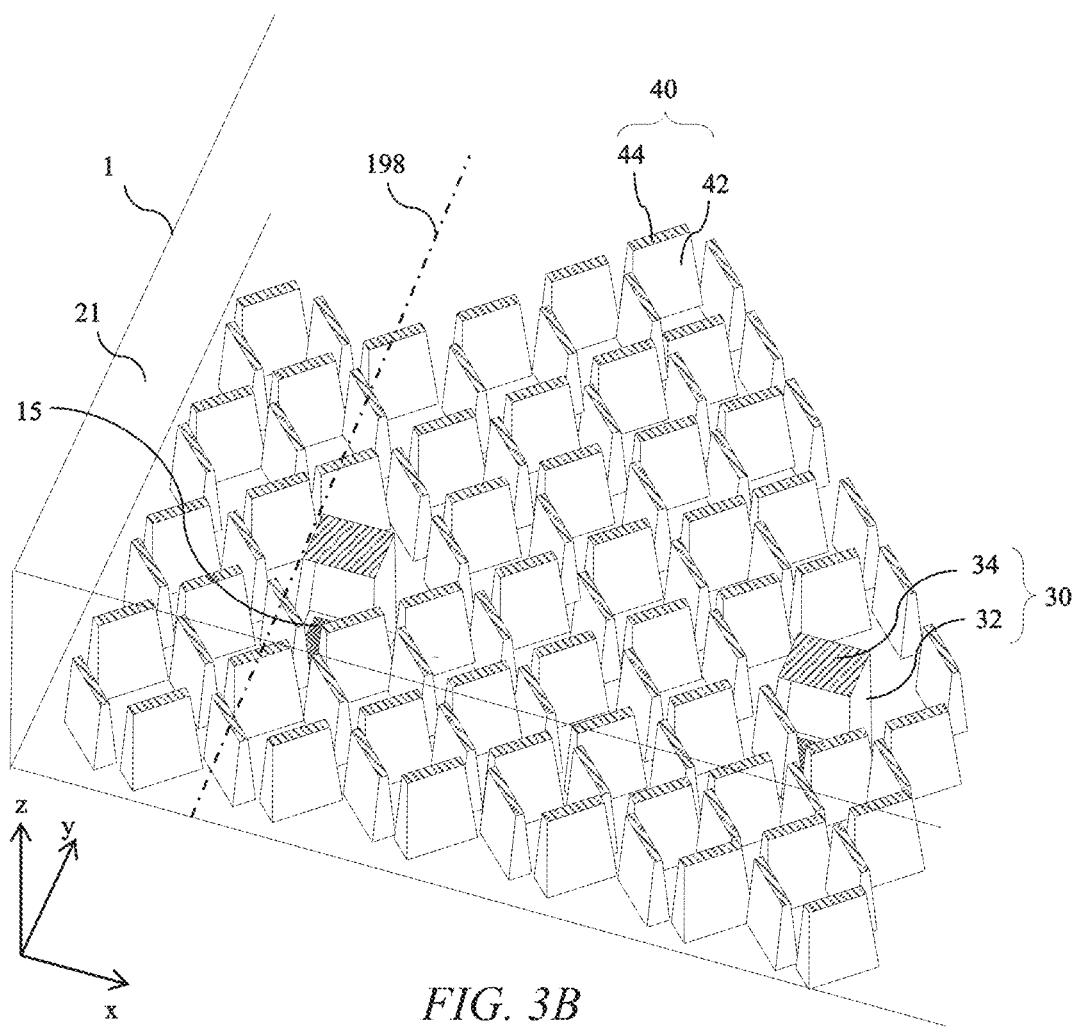
FIG. 3B is a schematic diagram illustrating in side perspective view an alternative arrangement of light input wells and light deflecting wells of a waveguide.

FIG. 3B is a schematic diagram illustrating in side perspective view an alternative arrangement of light input wells 30 and light deflecting wells 40 of a waveguide 1. Features of the embodiments of FIGS. 3A-B not discussed in further detail may be assumed to correspond to the features with equivalent reference numerals as discussed above, including any potential variations in the features.

In the alternative embodiment of FIG. 3B the waveguide 1 has a rectangular shape and the reference axis 198 is parallel to a side 21 of the rectangular shape. In comparison to the arrangement of FIG. 3A, the width of the border region at the edge of the illumination apparatus 20 to provide uniform illumination of output may be reduced. Bezel width of the backlight may advantageously be reduced.

The structure of various features of the illumination apparatus 20 will now be described. The structure of the input surface 51 of the light turning optical componet 50 will now be described.

Figure 4A:
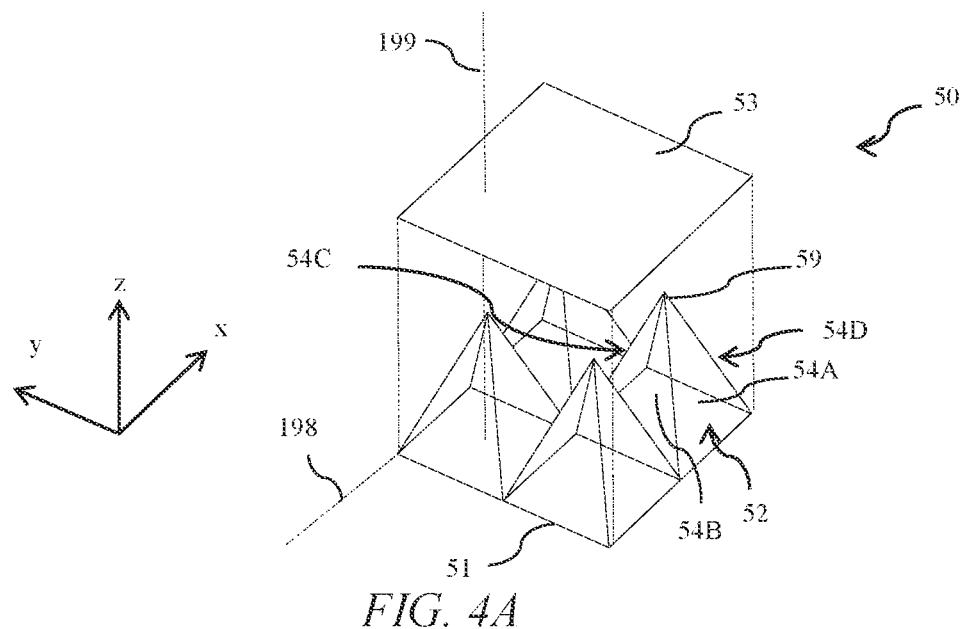
FIG. 4A is a schematic diagram illustrating in side perspective view a portion of a light turning optical component.
Figure 4B:
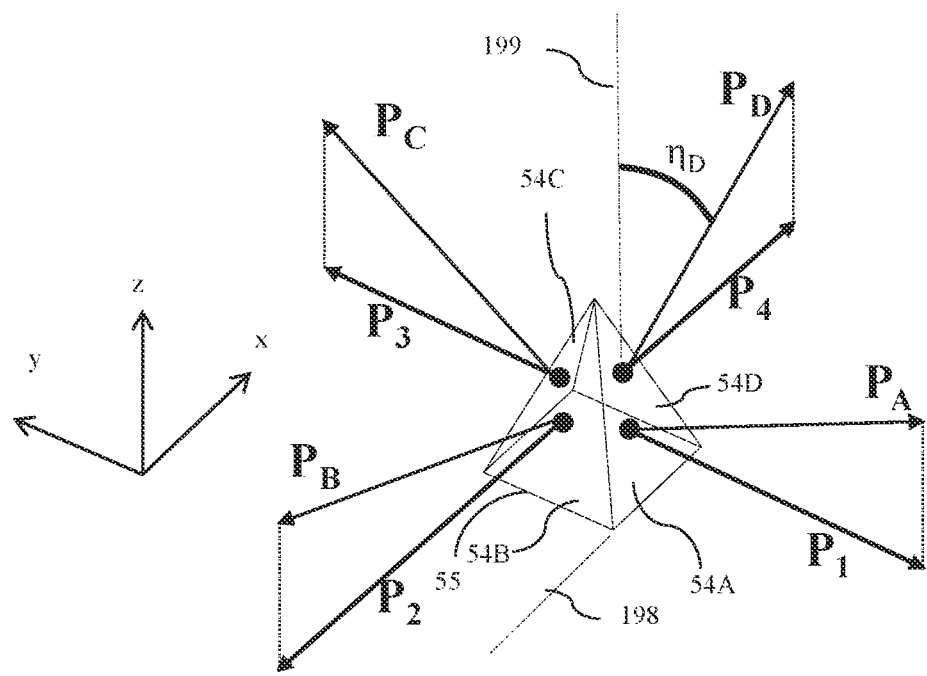
FIG. 4B is a schematic diagram illustrating a pyramidal recess of a light turning optical component.

FIG. 4A is a schematic diagram illustrating in side perspective view a portion of a light turning optical component 50; and FIG. 4B is a schematic diagram illustrating a pyramidal recess 52 of a light turning optical component. Features of the embodiments of FIGS. 4A-B not discussed in further detail may be assumed to correspond to the features with equivalent reference numerals as discussed above, including any potential variations in the features.

The input surface 51 of the light turning optical componet 50 comprises an array of pyramidal recesses 52 each comprising a square base with base locus 55 and four light turning faces 54A, 54B, 54C, 54D having surface normals $P_A$, $P_B$, $P_C$, $P_D$ with an average components $P_1$, $P_2$, $P_3$, $P_4$ in a plane of the waveguide 1 and inclined at angles $\eta_A$, $\eta_B$, $\eta_C$, $\eta_D$, respectively to the optical axis 199.

The faces 54A, 54B, 54C, 54D may be planar or may have some other shape, for example to provide some diffusion of the deflected light. The average components $P_1$, $P_2$, $P_3$, $P_4$ are oriented with respect to the reference axis 198 at angles within at most 10°, preferably at most 5°, of 0°, 90°, 180°, and 270°.

The four light turning faces 54A, 54B, 54C, 54D are contiguous. The light output from the light emitting element is advantageously deflected with high efficiency.

The base loci 55 may be considered as ridges in the material of the light turning optical componet 50 and the faces 54A-D of the recesses 52 may provide troughs 59 in the material of the light turning optical componet 50 that may be points for example or may have some other profile that may be arranged to enable convenient tooling of the faces 54A-D.

The structure of a light input well 30 of the waveguide 1 will now be described.

Figure 4C:
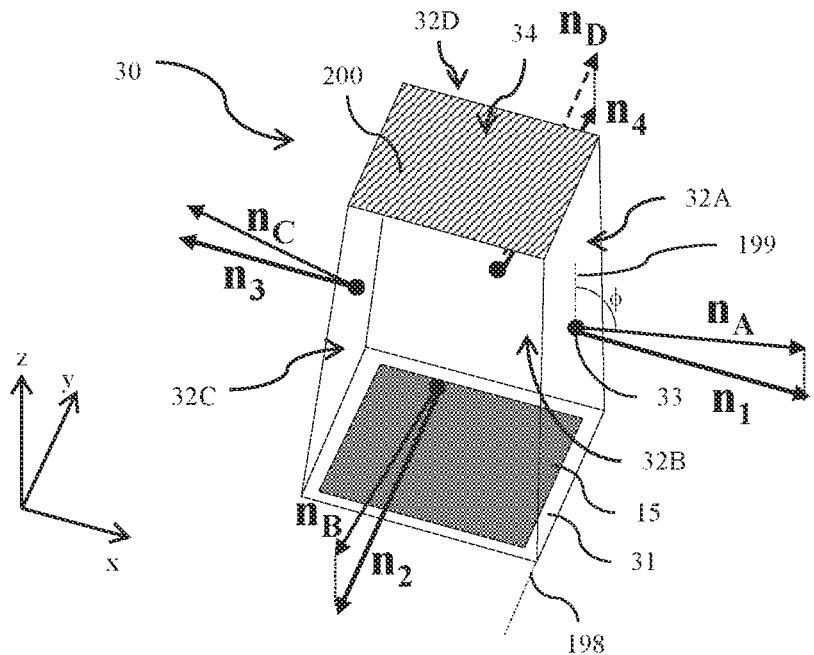
FIG. 4C is a schematic diagram illustrating in side perspective view a light input well and aligned light emitting diode of FIG. 3B.

FIG. 4C is a schematic diagram illustrating in side perspective view a light input well 30 and aligned light emitting element 15 of FIG. 3B. Features of the embodiment of FIG. 4C not discussed in further detail may be assumed to correspond to the features with equivalent reference numerals as discussed above, including any potential variations in the features.

The light input surface 32 of each light input well 30 comprises four light input faces 32A, 32B, 32C, 32D having surface normals $n_A$, $n_B$, $n_C$, $n_D$ with average components $n_1$, $n_2$, $n_3$, $n_4$ in a plane of the waveguide 1. The average components $n_1$, $n_2$, $n_3$, $n_4$ a are oriented with respect to a reference axis at angles within at most 10°, preferably at most 5°, of 0°, 90°, 180°, and 270°. In other words the average components $n_1$, $n_2$, $n_3$, $n_4$ are oriented at angles of at most 10°, preferably at most 5°, from the average components $P_1$, $P_2$, $P_3$, $P_4$ in the plane of the waveguide 1 of the surface normal $P_A$, $P_B$, $P_C$, $P_D$ of the light turning faces, preferably at angles of at most 5° from the average components $P_1$, $P_2$, $P_3$, $P_4$ in the plane of the waveguide 1 of the surface normal $P_A$, $P_B$, $P_C$, $P_D$ of a respective one of the light turning faces 54A, 54B, 54C, 54D.

The four light input faces 32A, 32B, 32C, 32D are contiguous and in the embodiment of FIG. 4C each of the light input faces 32A, 32B, 32C, 32D is planar.

Each light input well 30 further comprises an input well 40 end surface 34 extending across the light input surface 32, the light input well 30 end surface being arranged to guide the guided light over the light input well 30. The light input well 30 end surface 34 is planar and is coated with a reflective material 200.

The light input wells 30 have openings 31 that are larger than the respective light emitting elements 15 over which they are arranged. Advantageously the efficiency of capture of light from the light emitting elements 15 is increased.

Alternative structures of a light deflecting wells 40 of the waveguide 1 will now be described.

Figure 4D:
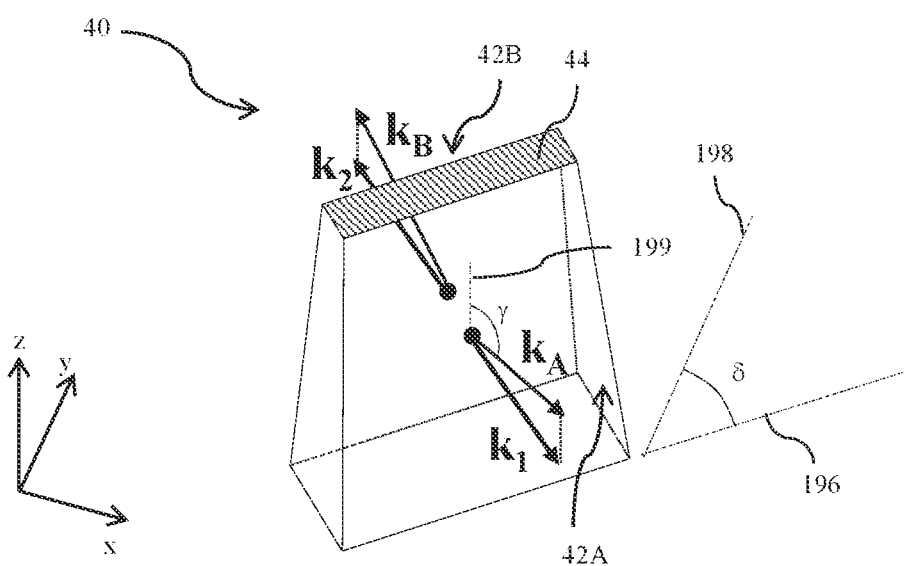
FIG. 4D is a schematic diagram illustrating in side perspective view a light deflecting well with two opposing faces.

FIG. 4D is a schematic diagram illustrating in side perspective view a light deflecting well 40 of FIG. 3B. Features of the embodiment of FIG. 4D not discussed in further detail may be assumed to correspond to the features with equivalent reference numerals as discussed above, including any potential variations in the features.

The light deflecting surfaces 42 of each the light deflecting wells 40 comprise at least one light deflecting face 42 having a surface normal $k_A$ with an average component $k_1$ in a plane of waveguide 1.

In the embodiment of FIG. 4D, the light deflecting surfaces 42 of the light deflecting well 40 comprises two light deflecting face 42A, 42B having surface normals $k_A$, $k_B$ with average components $k_1$, $k_2$ in a plane of the waveguide 1. The light deflecting surface 42 of the light deflecting well 40 comprises a pair of opposed light deflecting faces 42A, 42B, the average components $k_1$, $k_2$ in of the opposed light deflecting faces extending opposite directions.

The average components $k_1$, $k_2$ in respect of the light deflecting surfaces 42 of the light deflecting wells 40 across the array of light deflecting wells 40 are aligned to the axis 196 and are oriented at angles δ of in a range from 35° to 55°, preferably in a range from 40° to 50°, from various ones of the average components $P_1$, $P_2$, $P_3$, $P_4$ in the plane of the waveguide 1 of the surface normals $P_A$, $P_B$, $P_C$, $P_D$ of the light turning faces 54A, 54B, 54C, 54D that are aligned to reference axis 198 as described hereinabove.

The light deflecting well 40 further comprises a light deflecting well 40 end surface 44 extending across the light deflecting surface 42, the light deflecting well 40 end surface 44 being arranged to guide the guided light over the light deflecting well 40.

In the embodiment of FIG. 4D the light deflecting well 40 end surface 44 is planar and is coated with a reflective material 200.

Figure 4E:
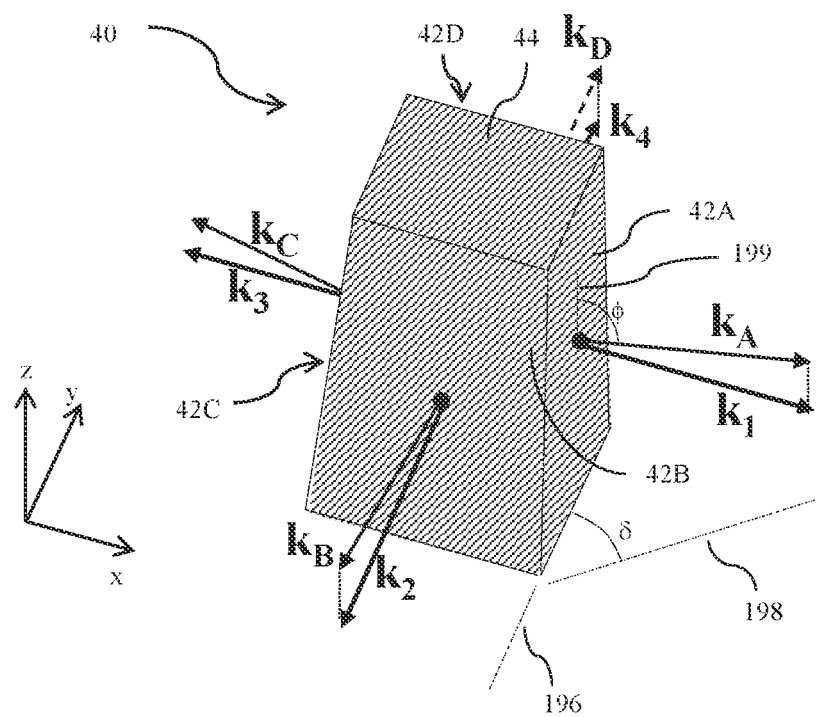
FIG. 4E is a schematic diagram illustrating in side perspective view a light deflecting well with four opposing faces comprising reflective coatings.

FIG. 4E is a schematic diagram illustrating in side perspective view a light deflecting well 40 with four opposing faces 42A, 42B, 42C, 42D further comprising a reflective coating. Features of the embodiment of FIG. 4E not discussed in further detail may be assumed to correspond to the features with equivalent reference numerals as discussed above, including any potential variations in the features.

In the alternative embodiment of FIG. 4E the light deflecting surfaces 42 of the light deflecting wells 40 comprise first and second pairs of opposed light deflecting faces 42A, 42C, the first pair of opposed faces 42A, 42C having surface normals $k_A$, $k_C$ with average components $k_1$, $k_3$ in a plane of the waveguide 1 that are oriented with respect to the reference axis 198 at angles δ within at most 10°, preferably at most 5° of 45° and 225°, respectively, and the second pair of opposed faces 42B, 42D have surface normals $k_B$, $k_D$ with average components $k_2$, $k_4$ in a plane of the waveguide 1 that are oriented with respect to the reference axis 198 at angles δ within at most 10°, preferably at most 5° of 135°, and 315°, respectively.

More generally the light deflecting surfaces 42A, 42B, 42C, 42D of the light deflecting wells 40 comprise at least one light deflecting face 42 having a surface normal $k_A$ with an average component $k_1$ in a plane of the waveguide 1, the average components $k_{1-4}$ in respect of the light deflecting surfaces 42A-D of the light deflecting wells 40 across the array of light deflecting wells 40 being variously oriented with respect to the reference axis 198 at angles within at most 10°, preferably at most 5°, of 45°, 135°, 225°, and 315°.

The first and second pairs of opposed faces 42A, 42C and 42B, 42D are contiguous. Each of the light deflecting faces 42A, 42C and 42B, 42D is planar and are coated with a reflective material 200.

The structure of alternative light extraction features 10 of the waveguide 1 will now be described.

Figure 4F:
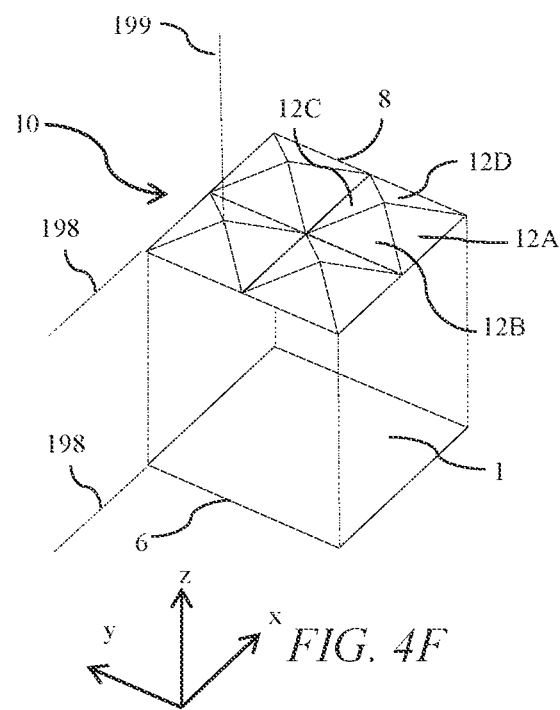
FIG. 4F is a schematic diagram illustrating in top perspective view a portion of a waveguide comprising light extraction features.
Figure 4G:
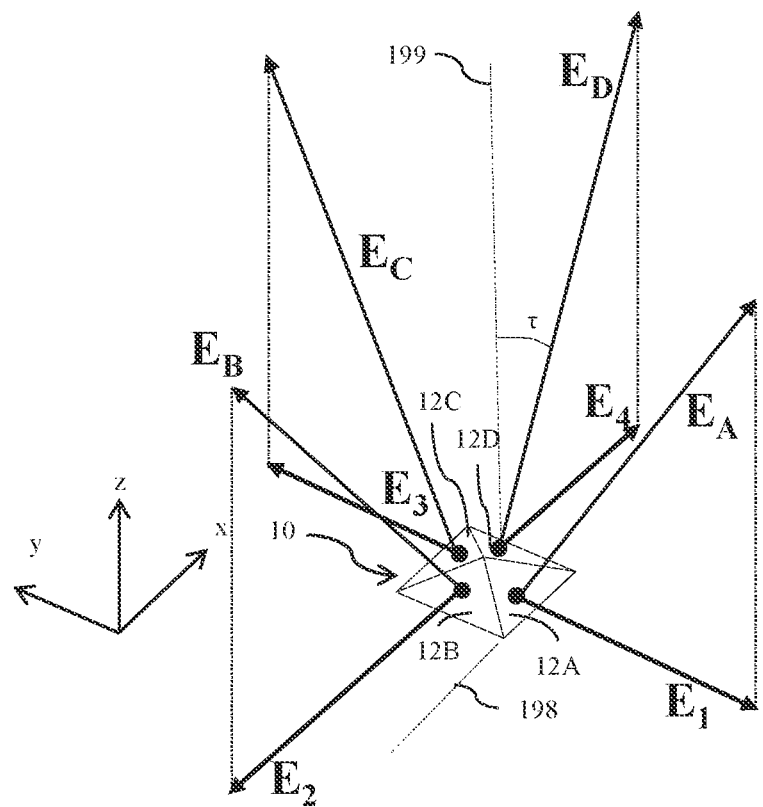
FIG. 4G is a schematic diagram illustrating in top perspective view a light extraction feature of a waveguide.

FIG. 4F is a schematic diagram illustrating in top perspective view a portion of the waveguide 1 comprising light extraction features 10; and FIG. 4G is a schematic diagram illustrating in top perspective view a light extraction feature 10 of the waveguide 1. Features of the embodiments of FIGS. 4F-G not discussed in further detail may be assumed to correspond to the features with equivalent reference numerals as discussed above, including any potential variations in the features.

The light extraction features 10 comprise an array of sets of four light extraction faces 12A, 12B, 12C, 12D each light extraction face 12A, 12B, 12C, 12D having a surface normal $E_A$, $E_B$, $E_C$, $E_D$ with an average component $E_1$, $E_2$, $E_3$, $E_4$ in a plane of the waveguide 1.

The average components $E_1$, $E_2$, $E_3$, $E_4$ are oriented with respect to the reference axis 198 at angles within at most 10°, preferably at most 5°, of 0°, 90°, 180°, and 270°. In other words, the average components $E_1$, $E_2$, $E_3$, $E_4$ a are oriented at angles of at most 10° from the average components $P_1$, $P_2$, $P_3$, $P_4$ in the plane of the waveguide 1 of the surface normal of the light turning faces $P_A$, $P_B$, $P_C$, $P_D$, preferably at angles of at most 5° from the average components $P_1$, $P_2$, $P_3$, $P_4$ in the plane of the waveguide 1 of the surface normal $P_A$, $P_B$, $P_C$, $P_D$ of a respective one of the light turning faces. In other words, the average components $E_1$, $E_2$, $E_3$, $E_4$ a are aligned at angles close to parallel to, anti-parallel to, or orthogonal to the reference axis 198.

Figure 4H:
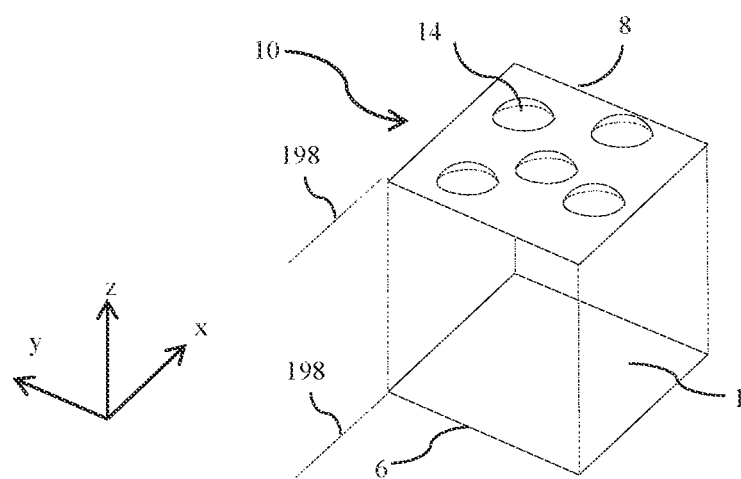
FIG. 4H is a schematic diagram illustrating in top perspective view a portion of a waveguide comprising alternative light extraction features.

FIG. 4H is a schematic diagram illustrating in top perspective view a portion of the waveguide 1 comprising alternative light extraction features 14. Features of the embodiment of FIG. 4H not discussed in further detail may be assumed to correspond to the features with equivalent reference numerals as discussed above, including any potential variations in the features. In comparison to the embodiment of FIGS. 4F-G, the alternative embodiment of FIG. 4H illustrates that the light extraction features 10 may have other shapes, such as raised or recessed bumps 14. Complexity of manufacture may advantageously be reduced.

The relative orientation of the surfaces 32, 42 of light input wells 30 and light deflecting wells 40 will now be described further.

Figure 5:
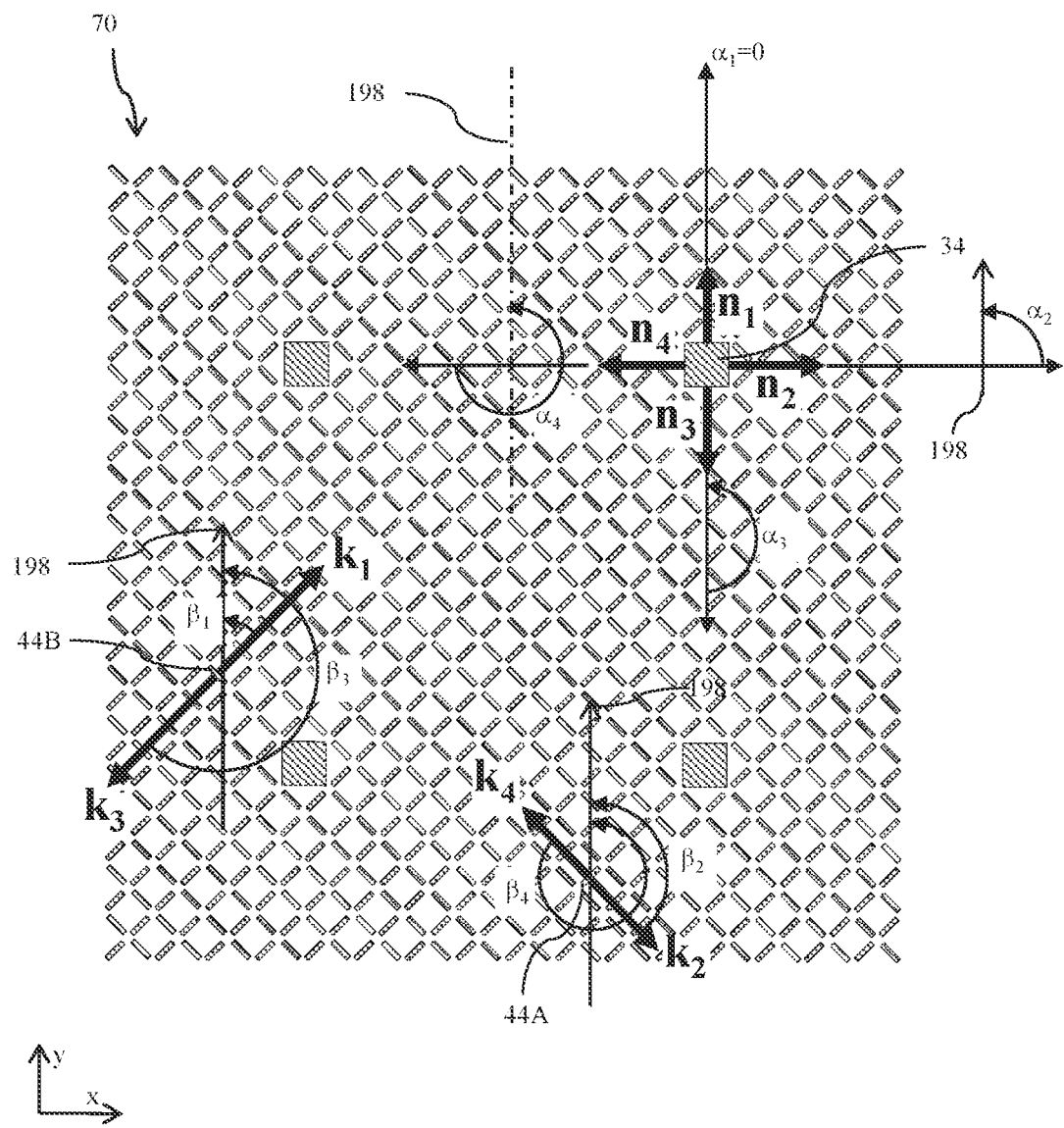
FIG. 5 is a schematic diagram illustrating in top view the arrangement of reflective ends of the light input wells and light deflecting wells of FIG. 3B.

FIG. 5 is a schematic diagram illustrating in top view the arrangement of reflective ends 34 of the light input wells 30 and light deflecting wells 40 of FIG. 3B. Features of the embodiment of FIG. 5 not discussed in further detail may be assumed to correspond to the features with equivalent reference numerals as discussed above, including any potential variations in the features.

In the embodiment of FIG. 5, the light input wells and light deflecting wells form pattern 70.

The light input wells 30 are arranged in a grid having four-fold rotational symmetry that is the angles $α_1$, $α_2$, $α_3$, $α_4$ of the components $n_1$, $n_2$, $n_3$, $n_4$ are arranged at angles of 0°, 90°, 180°, 270° with respect to reference axis 198.

The light deflecting wells 40 are arranged in a grid having four-fold rotational symmetry around the light input wells 30, that is the angles $β_1$, $β_2$, $β_3$, $β_4$ of the components $k_1$, $k_2$, $k_3$, $k_4$ are arranged at angles of 45°, 135°, 225°, 315° with respect to reference axis 198. In the embodiment of FIG. 5, the light deflecting well 40 end surfaces 44 have the same areas.

The structure of an alternative illumination apparatus 20 will now be described in further detail.

Figure 6A:
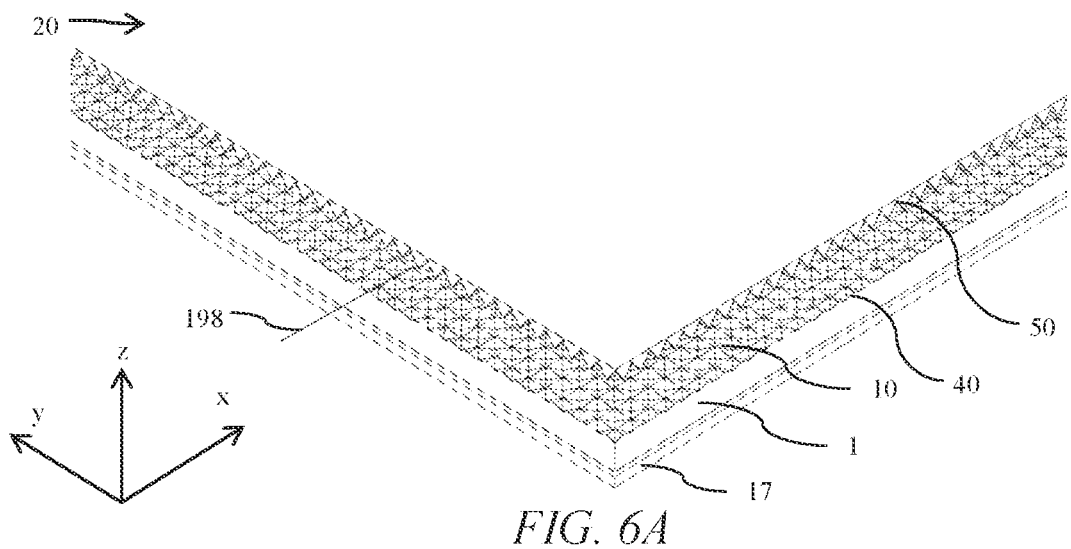
FIG. 6A is a schematic diagram illustrating in top perspective view a backlight arrangement comprising the light input wells and light deflecting wells of FIG. 3B.
Figure 6B:
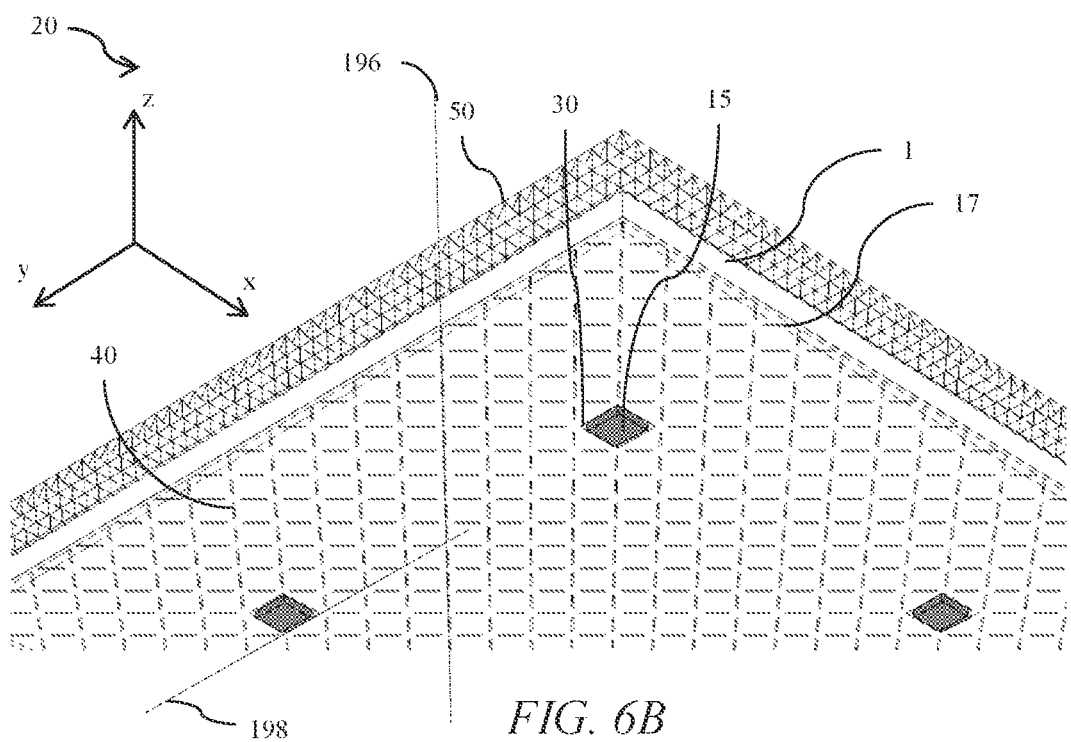
FIG. 6B is a schematic diagram illustrating in bottom perspective view a backlight arrangement comprising the light input wells and light deflecting wells of FIG. 3B.
Figure 7A:
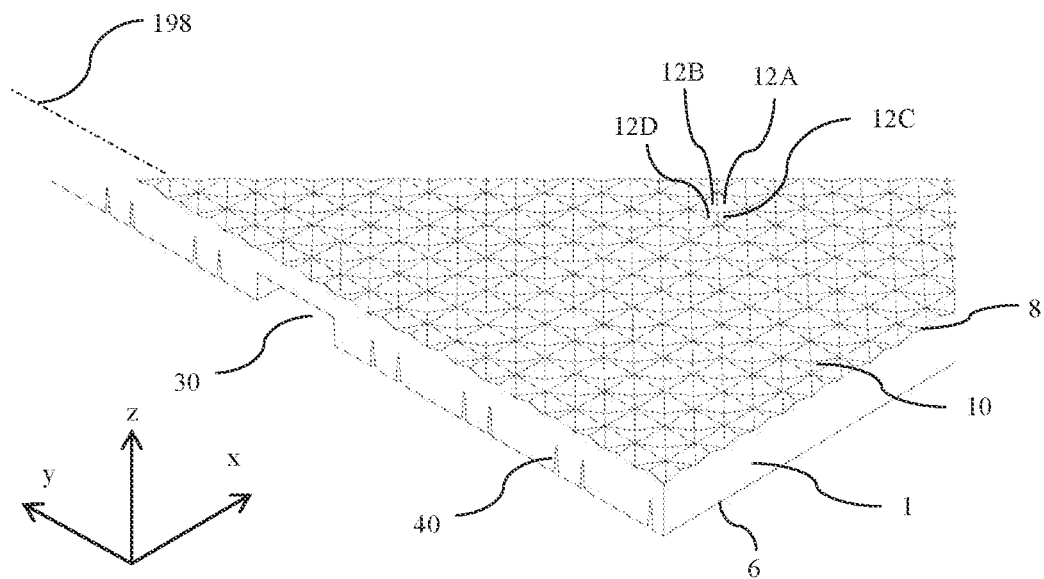
FIG. 7A is a schematic diagram illustrating in top perspective view a waveguide comprising the light input wells and light deflecting wells of FIG. 3B.
Figure 7B:
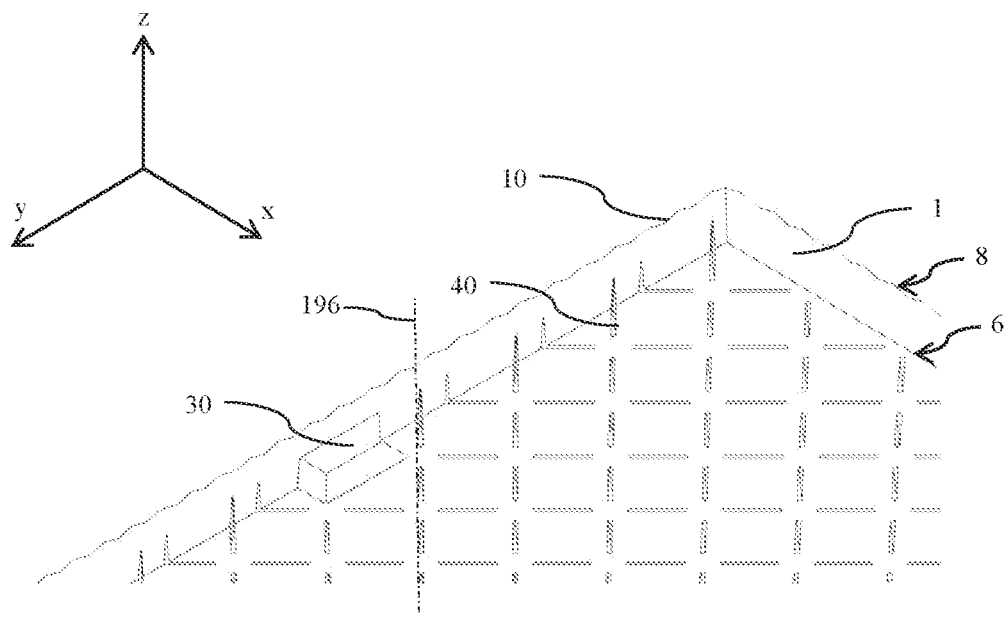
FIG. 7B is a schematic diagram illustrating in bottom perspective view a waveguide comprising the light input wells and light deflecting wells of FIG. 3B.

FIG. 6A is a schematic diagram illustrating in top perspective view an illumination apparatus 20 arrangement comprising the light input wells 30 and light deflecting wells 40 of FIG. 3B; FIG. 6B is a schematic diagram illustrating in bottom perspective view an illumination apparatus 20 arrangement comprising the light input wells 30 and light deflecting wells 40 of FIG. 3B; FIG. 7A is a schematic diagram illustrating in top perspective view a waveguide 1 of FIGS. 6A-B comprising the light input wells 30 and light deflecting wells 40 of FIG. 3B; and FIG. 7B is a schematic diagram illustrating in bottom perspective view a waveguide 1 comprising the light input wells 30 and light deflecting wells 40 of FIG. 3B. Features of the embodiment of FIGS. 7A-B not discussed in further detail may be assumed to correspond to the features with equivalent reference numerals as discussed above, including any potential variations in the features. The relative alignment of various optical structures 10, 30, 40, 52 is as described hereinbefore.

The structure of the waveguide 1 and aligned light emitting elements 15 will now be described in further detail.

Figure 8A:
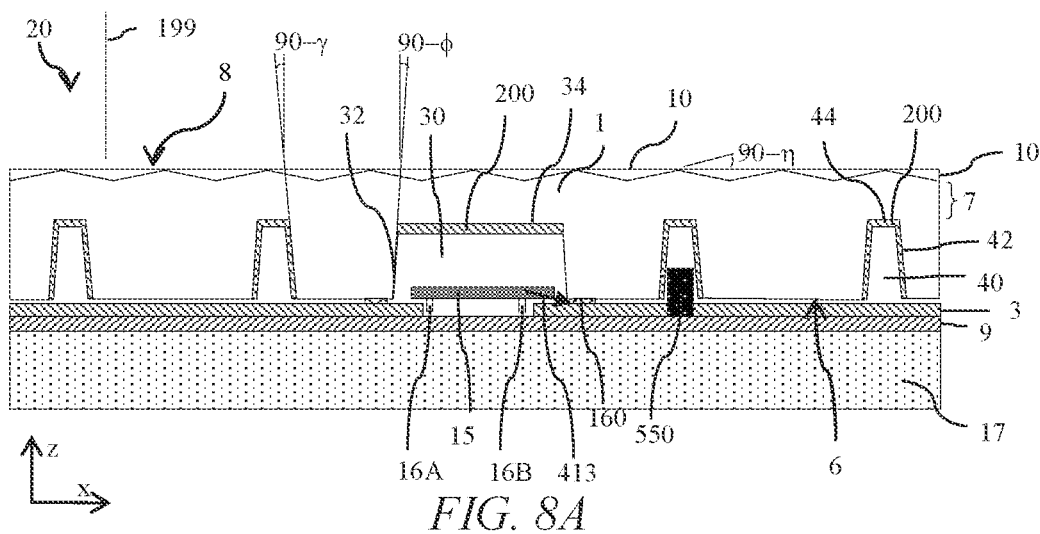
FIG. 8A is a schematic diagram illustrating in side view the waveguide and an aligned light emitting diode of FIG. 1A.

FIG. 8A is a schematic diagram illustrating in side view the waveguide 1 and an aligned light emitting element 15 of FIG. 1A. Features of the embodiment of FIG. 8A not discussed in further detail may be assumed to correspond to the features with equivalent reference numerals as discussed above, including any potential variations in the features.

The array of light emitting elements 15 are supported on a support substrate 17, for example by means of seal 160. The seal 160 is provides attachment to the support substrate 17. Thermal and mechanical resilience may advantageously be improved. The substrate 17 may for example be a glass or polyimide layer and may be provided with a connection layer 9 that may further comprise thin film transistors (TFTs) for addressing of the light emitting elements.

The illumination apparatus 20 may further comprise light blocking elements extending around the light input wells 30 between the support substrate 17 and the rear light guiding surface 6 of the waveguide 1. The seal 160 may prevent light rays 413 propagating under the waveguide 1. Hot spots of extracted light near the light input well 30 may advantageously be reduced.

The support substrate 17 further supports electronic components connected to the light emitting elements 15. At least some of the electronic components 550 protrude into at least some of the light deflecting wells 40. Connections 16A, 16B may be provided from electrodes provided on the support substrate 17 to the light emitting element 15. The optical output may advantageously not be degraded by the optical elements.

Reflective layer 3 may be provided on the support substrate. Output efficiency may advantageously be increased.

The normal 199 is illustrated for a region of the illumination apparatus 20. The illumination apparatus 20 may be curved and so the normal 199 may have a different direction across the predetermined area.

The operation of the waveguide will now be described in further detail by considering various illustrative light rays emitted from a source 13 of the light emitting element 15.

Figure 8B:
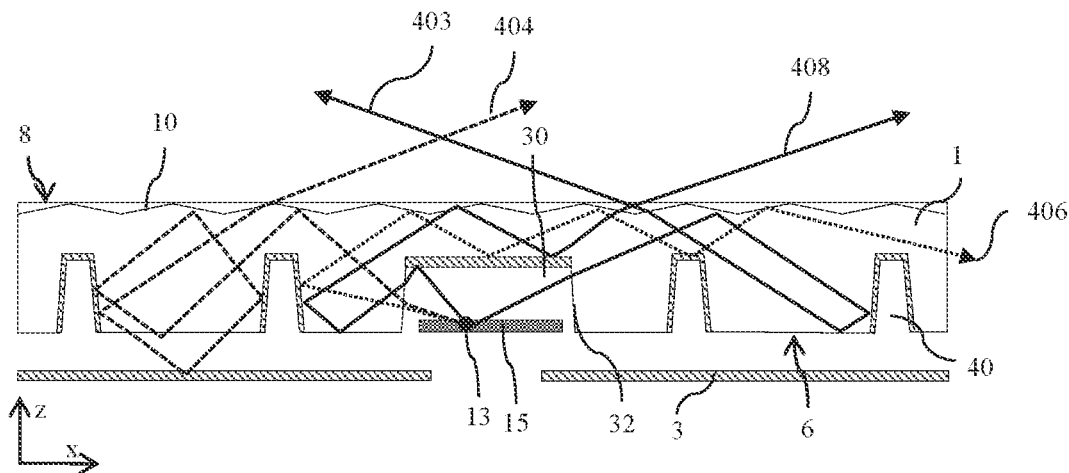
FIG. 8B is a schematic diagram illustrating in expanded side view the operation of the waveguide and an aligned light emitting diode of FIG. 8A.

FIG. 8B is a schematic diagram illustrating in expanded side view the operation of the waveguide 1 and an aligned light emitting element 15 of FIG. 8A. Features of the embodiment of FIG. 8B not discussed in further detail may be assumed to correspond to the features with equivalent reference numerals as discussed above, including any potential variations in the features.

Illustrative light ray 403 is output from the light emitting element 15 and refracted by a face of the light input surface 32 of the light input well 30. The front light guiding surface 8 is arranged to guide light ray 403 by total internal reflection and the rear light guiding surface 6 is arranged to guide light by total internal reflection.

The light ray 403 is guided within the waveguide 1 and is incident on the rear and front light guiding surfaces 6, 8. Overlayer thickness 7 of waveguide 1 is provided between the ends 34, 44 of the features 30, 40 and the front light guiding surface 8 such that some guided light passes over the light deflecting surface 42 as will be described hereinbelow. In particular some guided light passes over light deflecting wells 40. Such light enables the light deflecting wells to be hidden to the output light, that is the visibility due to light leaking and causing hotspots around the light deflecting wells is minimised.

In the present embodiments, the area of the waveguide 1 around each input well 30 that is illuminated from a single well can be modified by the selection of the density of the light deflection wells and overlayer thickness 7.

Some of the light is incident onto the light deflection surface 42 of a light deflection well 40. The light deflecting surface 42 of each light deflecting well is arranged to reflect at least some of the guided light that is incident thereon.

At least one of the front light guiding surface 8 and the rear light guiding surface 6 comprises light extraction features 10 arranged to extract guided light from the waveguide 1 as the output light 400. At the extraction features 10 the angle of propagation of light within the waveguide 1 is adjusted. Some light that is near the critical angle may be extracted as output light with angles that is close to grazing the front surface 8 of the waveguide 1.

Another illustrative light ray 404 is output after reflection at rear reflector 3. Another illustrative light ray 406 is guided within the waveguide 1 and propagates towards neighbouring light input wells. Another illustrative light ray 408 is incident on the reflective material 200 arranged on the end 34 of the light input well before refraction at the light input surface 32 of the light input well 30.

The operation of the light turning optical componet 50 will now be described in further detail.

Figure 9:
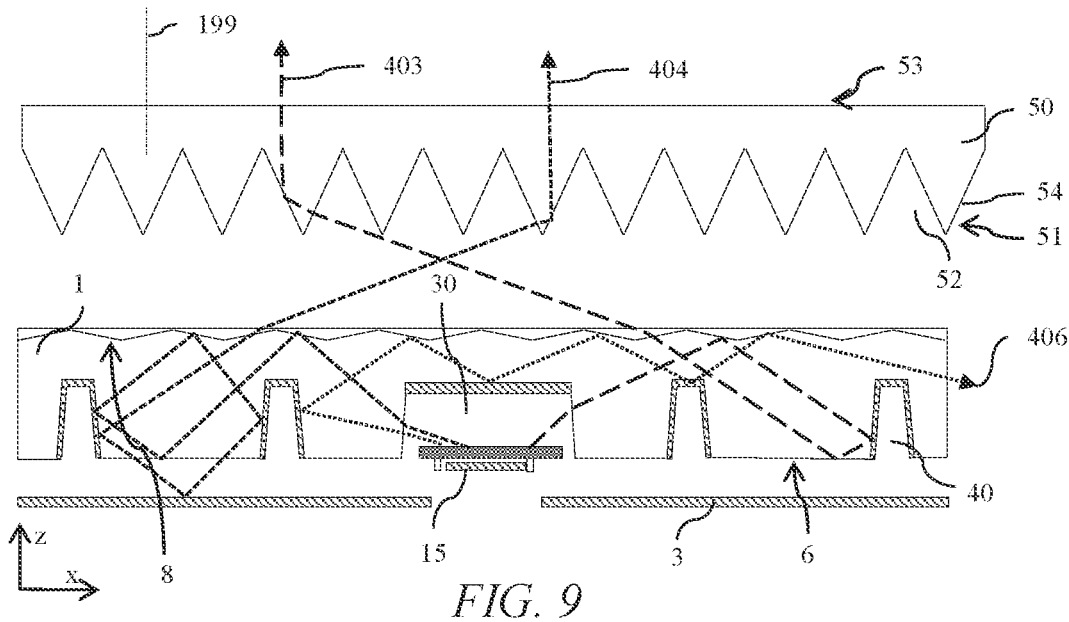
FIG. 9 is a schematic diagram illustrating in expanded side view the operation of the waveguide, light turning optical component and an aligned light emitting diode of FIG. 8A.

FIG. 9 is a schematic diagram illustrating in expanded side view the operation of the waveguide 1, light turning optical componet 50 and an aligned light emitting element 15 of FIG. 8A. Features of the embodiment of FIG. 9 not discussed in further detail may be assumed to correspond to the features with equivalent reference numerals as discussed above, including any potential variations in the features.

Light turning optical componet 50 is arranged to receive output light 400 from the waveguide 1 and is provided with indented prismatic features 52 as described in FIGS. 4A-B hereinabove. The light turning optical componet 50 is arranged to provide deflection of the output light 400 from the waveguide 1 towards a normal to a plane of the waveguide 1. The light turning optical componet 50 is arranged to provide deflection of the output light 400 from the waveguide 1 towards a normal 199 to a plane of the waveguide 1.

Figure 10A:
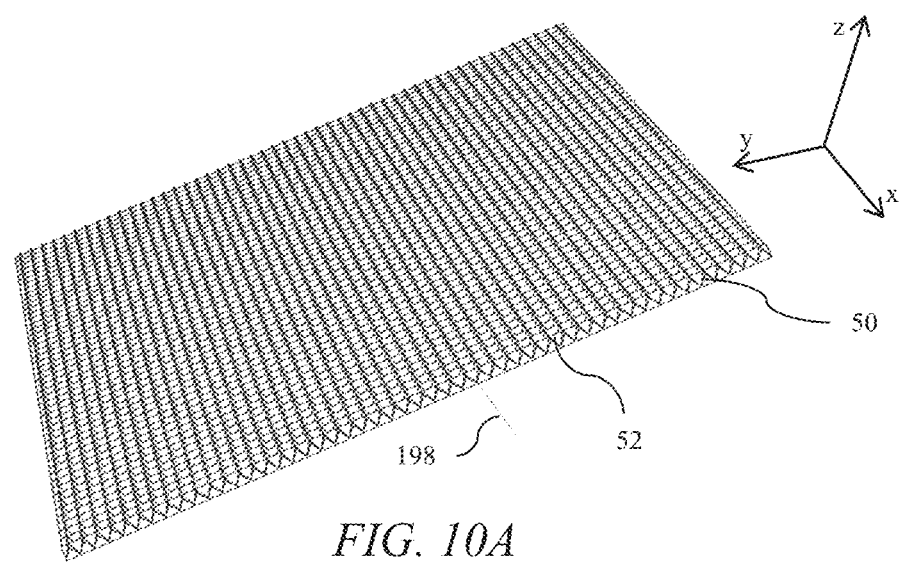
FIG. 10A is a schematic diagram illustrating in bottom perspective view the light turning optical component of FIG. 1A.
Figure 10B:
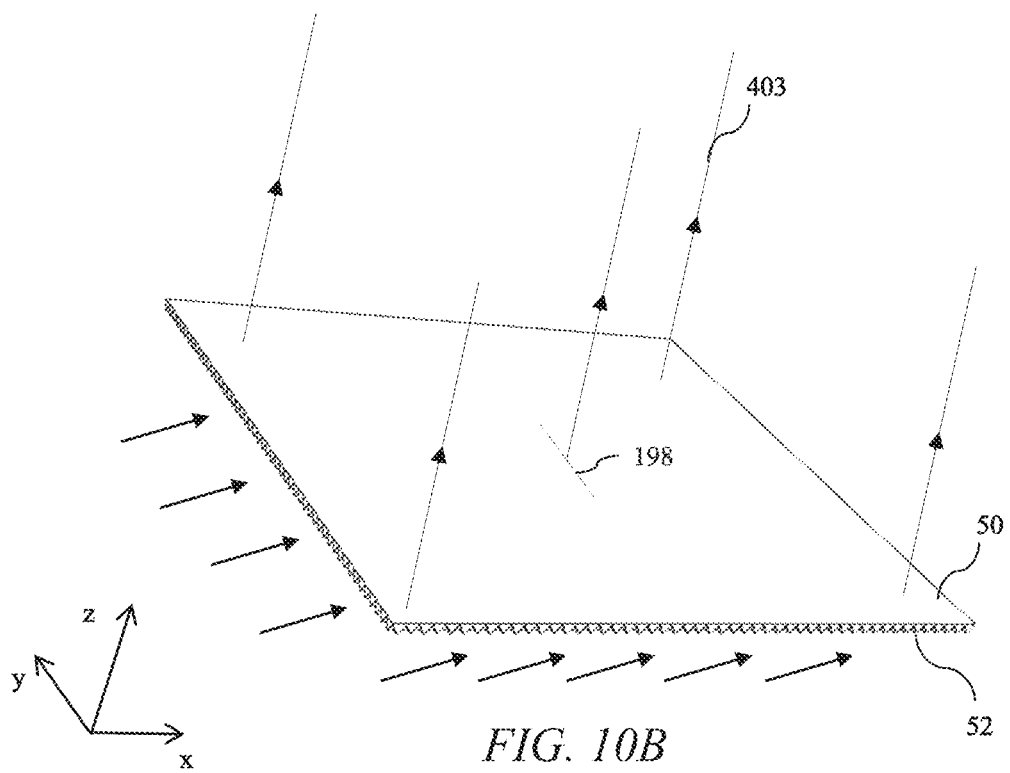
FIG. 10B, FIG. 10C, and FIG. 10D are schematic diagrams illustrating in top perspective view different output pupillations for a light turning optical component for use in the backlight of FIG. 1A.
Figure 10C:
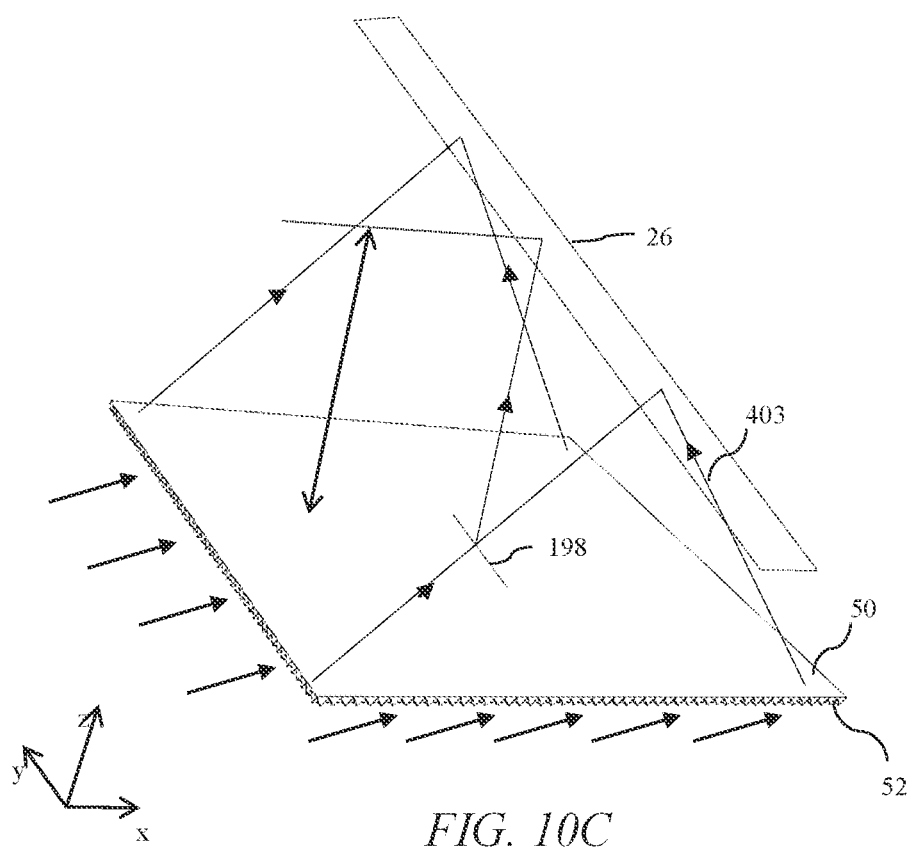
Figure 10D:
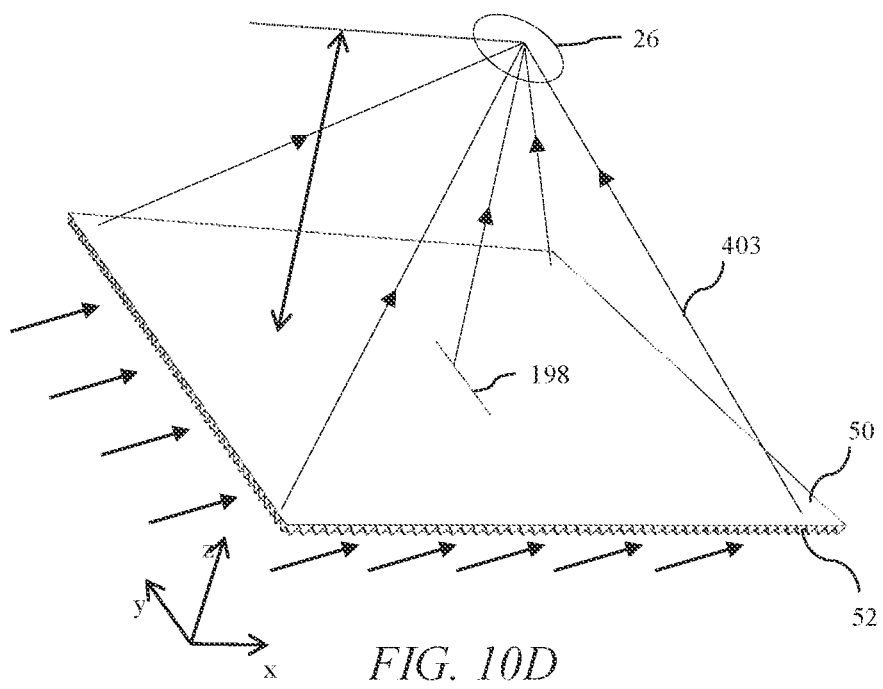

FIG. 10A is a schematic diagram illustrating in bottom perspective view the light turning optical componet 50 of FIG. 1A; and FIGS. 10B-D are schematic diagrams illustrating in top perspective view different output arrangements for a light turning optical componet 50 for use in the illumination apparatus 20 of FIG. 1A. Features of the embodiments of FIGS. 10A-D not discussed in further detail may be assumed to correspond to the features with equivalent reference numerals as discussed above, including any potential variations in the features.

In the embodiment of FIG. 10B, the deflection provided by the prismatic input surface 51 of the light turning optical componet 50 is the same across a plane of the light turning optical component 50 so that the deflected light rays 403 are directed towards a common direction in front of the illumination apparatus 20. Thus, all output light rays 403 are parallel. The complexity of tooling of the light turning optical component 51 may advantageously be reduced.

In the alternative embodiment of FIG. 10C the deflection of light rays 403 provided by the prismatic input surface 51 of the light turning optical componet 50 varies in one direction across a plane of the light turning optical componet 50 so that the deflected light rays 403 are directed towards a common elongate optical window 26 in front of the illumination apparatus 20.

In the present disclosure optical window 26 refers to the directing of light by illumination apparatus 110 from light sources such as sources 15 to defined spatial regions in a window plane 197, that is at the window distance $Z_{wA}$ from the illumination apparatus. The optical window 26 may also be referred to as an optical pupil. An observation from a location within the optical window provides light rays with common or substantially common optical properties from across the illumination apparatus 110. An observer 45 located at the window 26 of a collimated light cone 410 of the present embodiments sees increased uniformity in comparison to the arrangement of FIG. 10B (in which the optical window 26 is located substantially at infinity and can be considered not to be provided).

The use of the term optical window 26 in the present embodiments is distinct and different from the use of the term window when used to refer to sheets or panes of glass or other transparent material such as plastics for use in house windows, car windows and windscreens, and other types of protective windows. The optical window 26 is not a physical layer and refers to a region in space towards which light is directed. Such sheets or panes do not contribute to the creation of desirable viewing regions with improved uniformity as described herein.

Increased uniformity of luminance in one direction such as the lateral direction (x-axis) may advantageously be provided for an observer at or near to the optical window 26. Increased viewing freedom is achieved in the orthogonal direction.

In the alternative embodiment of FIG. 10D the deflection of light rays 403 provided by the prismatic input surface 51 of the light turning optical componet 50 varies in two directions across a plane of the light turning optical componet 50 so that the deflected light rays 403 are directed towards a common optical window 26 in front of the illumination apparatus 20. Increased uniformity of luminance may advantageously be provided for an observer at or near to the optical window 26.

Pupillated light turning optical components are described in U.S. Pat. No. 11,340,482, which is herein incorporated by reference in its entirety. The operation of light turning optical componet 50 for the pupillated output of FIGS. 10C-D will now be further described.

Figure 10E:
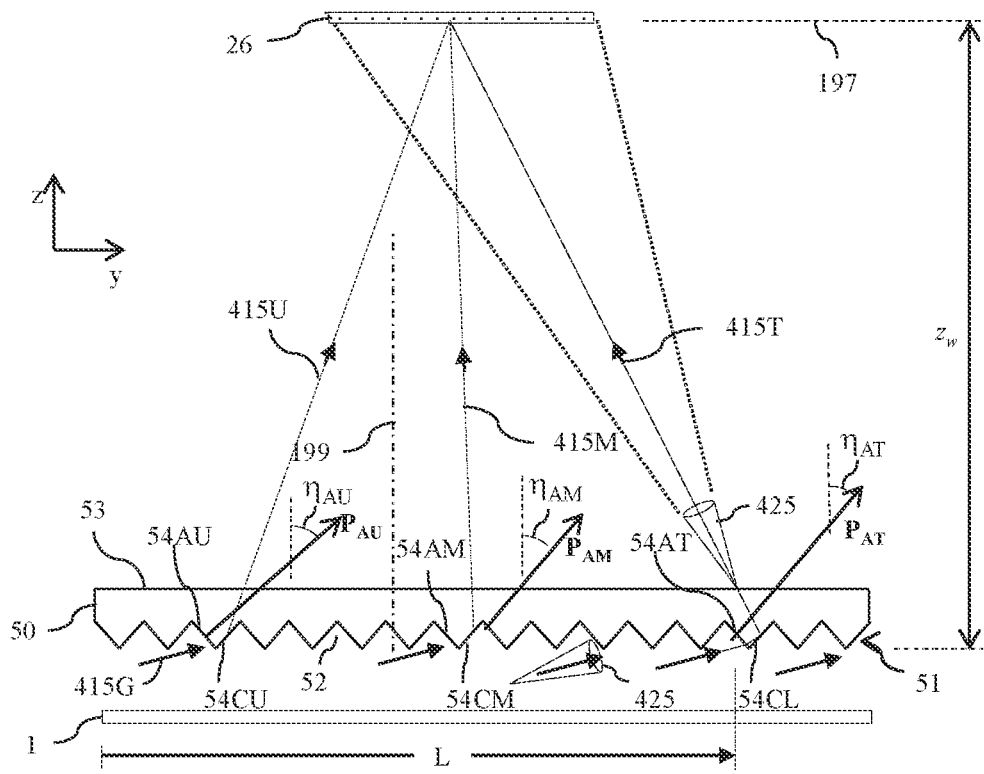
FIG. 10E is a schematic diagram illustrating pupillation of the output of a light turning film by means of adjusting the face angles of the light turning optical component in at least one direction across the light turning optical component.

FIG. 10E is a schematic diagram illustrating in side view of operation of variable tilt light turning faces 54 of an light turning optical componet 50 of a pupillated illumination apparatus 20. Features of the embodiment of FIG. 10E not discussed in further detail may be assumed to correspond to the features with equivalent reference numerals as discussed above, including any potential variations in the features.

In the alternative embodiment of FIG. 10E, the corresponding light turning faces 54A, 54C of the pyramidal recesses 52 have surface normal $P_A$, $P_C$ with inclinations $\eta_A$, $\eta_D$ that vary in at least one direction across a plane of the light turning film componet 50 so that the deflection provided by the prismatic input surface 51 of the light turning film componet 50 varies in the at least one direction so that the deflected light is directed towards a common optical window 26 in front of the illumination apparatus 20. At least a pair of opposed light turning faces 54A, 54C of the pyramidal recesses 52 have surface normals $P_A$, $P_C$ with average components in a plane of the waveguide 1, which average components vary in at least one direction across a plane of the light turning film componet 50 so that the deflection provided by the prismatic input surface 51 of the light turning film componet 50 varies in the at least one direction so that the deflected light is directed towards a common optical window 26 in front of the illumination apparatus.

Grazing output light rays 415G are output from the waveguide 1 with a light cone 425 and substantially uniform output angle across the plane (x-y plane) of the waveguide 1.

In comparison to the light turning optical componet 50 of FIG. 10B, the light turning optical componet 50 of the alternative embodiment of FIG. 10E has faces 54 that are arranged to deflect the light 415G exiting the waveguide 1, the deflection varying in at least one direction across the plane (x-y plane). Thus the tilt of the light turning faces 54 have an angle η that varies with position, L.

Considering each recess 52 for example as illustrated in FIG. 4B, near the upper edge of the light turning optical component 50, light rays 415G are refracted by faces 54AU with face angle $\eta_{AU}$ and reflected by total internal reflection at faces 54CU with surface normal direction $\eta_{CU}$ such that output light ray 415U is directed towards the optical window 26 at a window distance $Z_w$ from the light turning optical component 50. In at least one cross sectional plane (y-z plane in FIG. 10E), the size of the window 26 in the window plane 197 is determined by the angular width of the light cone 425.

Near the middle of the light turning optical component 50, light rays 415M are refracted by faces 54AM with face angle $\eta_{AM}$ and reflected by total internal reflection at faces 54CM with surface normal direction $\eta_{CM}$ such that output light ray 415M is directed towards the optical window 26; and near the lower edge of the light turning optical component 50, light rays 415L are refracted by faces 54AT with face angle $\eta_{AL}$ and reflected by total internal reflection at faces 54CT with surface normal direction $\eta_{CL}$ such that output light ray 41ST is directed towards the optical window 26.

Face angles η may vary continuously from face 54 to face 54 with location L across the length of the light turning optical component 50. The deflected light rays 415U, 415M, 41ST are directed towards a common optical window 26 in front of the illumination apparatus 110.

Advantageously increased uniformity may be achieved for an observer 45 located at the viewing window 26.

A further arrangement of light turning optical componet 50 to achieve pupillation of window 26 will now be described.

Figure 10F:
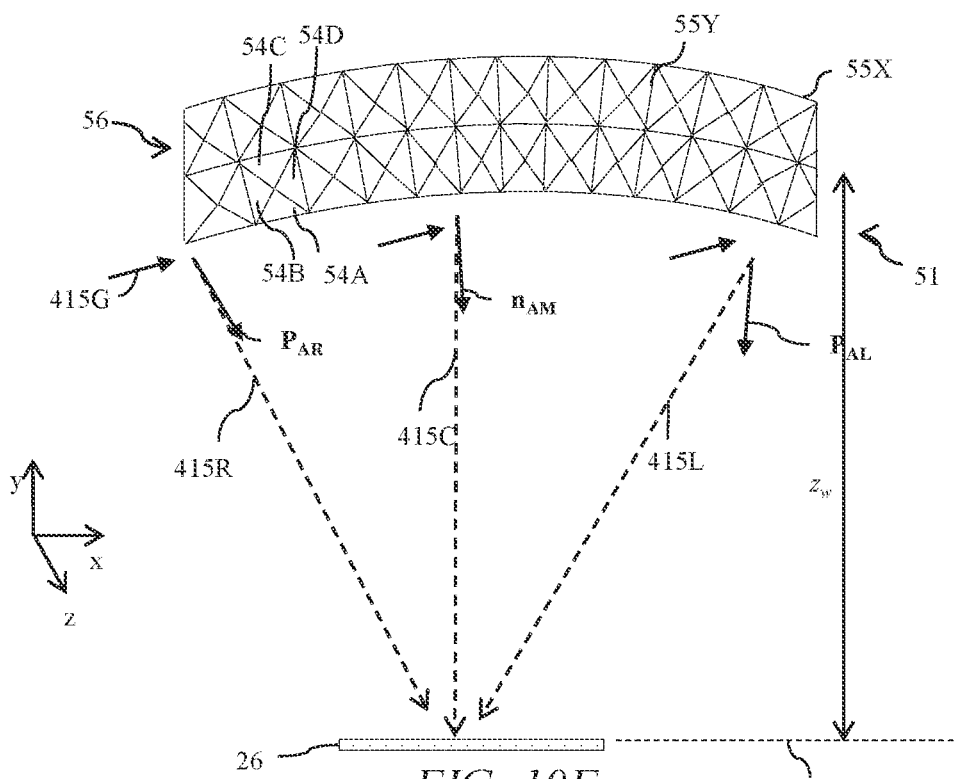
FIG. 10F is a schematic diagram illustrating pupillation of the output of a light turning film by means of adjusting the curvature of the faces of the light turning optical component in at least one direction across the light turning optical component.

FIG. 10F is a schematic diagram illustrating a perspective view of light output from a light turning optical componet 50 comprising curved loci 55. Features of the embodiment of FIG. 10F not discussed in further detail may be assumed to correspond to the features with equivalent reference numerals as discussed above, including any potential variations in the features.

In the alternative embodiment of FIG. 10F, the recesses 52 have base loci 55X that are curved in the direction in which the loci are extended across the light turning optical componet 50 in comparison to the arrangement of FIG. 10A, wherein the lines of the base loci 55 are all straight. In the present disclosure, the prismatic faces 54A typically are planar, and curvature is arranged to provide variation of the surface normal directions across the light turning optical componet 50. Curvature of the faces 54 may be additionally provided to achieve some diffusion of output light rays.

The faces 54A have surface normal directions $P_{AR}$, $P_{AM}$, $P_{AL}$ (and correspondingly for faces 54C) that vary across the width of the optical turning film 50, such that light rays 415G from the waveguide 1 are directed towards a common window 26 in a window plane 197B at a distance $Z_W$ from the light turning optical componet 50 (in the z-direction that is out of the x-y plane and illustrated in perspective view for illustrative convenience).

In an alternative embodiment, the faces 54 may be provided with varying tilt as illustrated in FIG. 10E and with varying curved base loci 55X as illustrated in FIG. 10F. The optical window distance $Z_W$ of FIG. 10E may be the same as the optical window distance $Z_W$ of FIG. 10F. Advantageously increased uniformity is achieved at the common window plane 197. Alternatively the optical window distance $Z_W$ of FIG. 10E may be different to the optical window distance $Z_W$ of FIG. 10F. Advantageously increased uniformity is achieved for viewer 45 distance away from a nominal viewing distance $Z_W$.

In the embodiments of FIGS. 10A-F, the centre of the optical window 26 is illustrated as aligned with the centre of the illumination apparatus 20, that is the common optical window 26 is aligned with an optical axis 199 that extends from the centre of light turning optical componet 50 normal to the plane (x-y plane). The offset $Z_{OB}$ of the optical window 26 is zero and the lines of the array have an arithmetic mean tangential angle projected on to the plane (x-y plane) that is inclined at 0° from the lateral direction. In other embodiments, the curvature of the loci 55 and face angles η may be arranged to provide an optical window 26 that is offset from the centre of the light turning optical componet 50 as described elsewhere herein.

Alternative arrangements of recess base loci 55 for the light turning optical componet 50 will now be described in further detail.

Figure 10G:
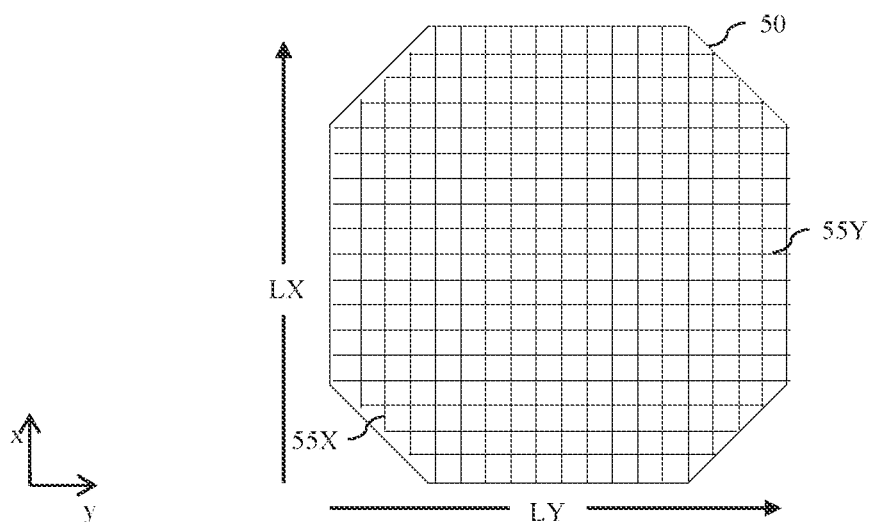
FIG. 10G is a schematic diagram illustrating in front view a pupillated turning optical component to provide pupillation from the illumination apparatus using linear face loci with tilts that vary across the light turning optical component, as illustrated in FIG. 10E to provide optical windows as illustrated in FIG. 10D.

FIG. 10G is a schematic diagram illustrating in front view a pupillated turning optical component to provide pupillation from the illumination apparatus using linear face base loci 55X, 55Y with tilt angles η that vary across the light turning optical component 50, as illustrated in FIG. 10E to provide optical windows 26 as illustrated in FIG. 10D. Features of the embodiment of FIG. 10G not discussed in further detail may be assumed to correspond to the features with equivalent reference numerals as discussed above, including any potential variations in the features.

In the alternative embodiment of FIG. 10G, the light turning optical componet 50 is arranged with linear base loci 55X, 55Y that are crossed as illustrated elsewhere herein, for example in FIG. 10A. Pupillation is achieved by the variation of face 54 tilt angle η such as illustrated in FIG. 10E and may be provided by variation of face 54A, 54C angles $η_A$, $η_C$ with distance $L_X$. The linear base loci 55X, 55Y may be mastered using linear motions of a cutting head for a molding tool, advantageously achieving reducing cost and reduced mura and Moire artefacts.

Figure 10H:
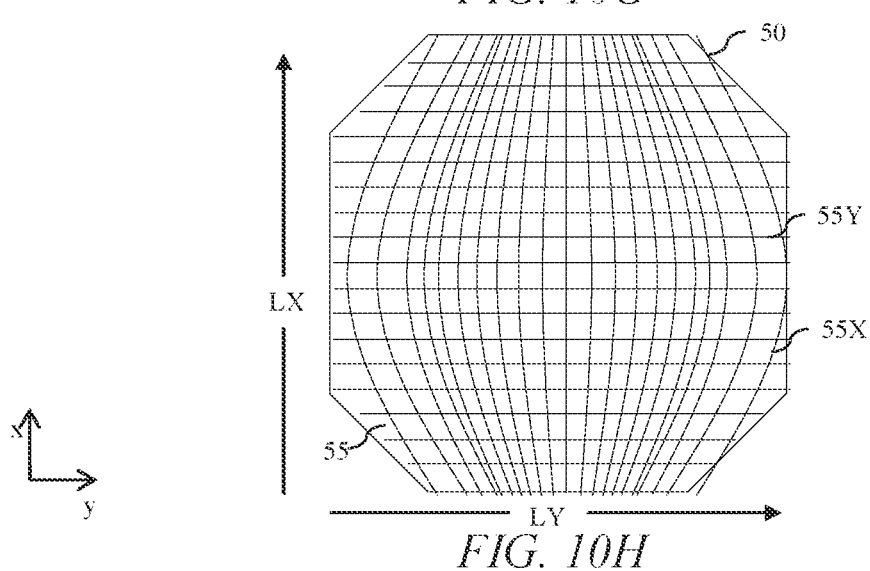
FIG. 10H is a schematic diagram illustrating in front view a pupillated turning optical component to provide pupillation from an illumination apparatus using curved recess base loci crossed with linear face base loci.

FIG. 10H is a schematic diagram illustrating in front view a pupillated turning optical componet 50 to provide pupillation from the illumination apparatus 20 using base loci 55X that are curved in the direction in which they are extended as illustrated in FIG. 10F and crossed base loci 55Y that are linear in the direction in which they are extended. Features of the embodiment of FIG. 10H not discussed in further detail may be assumed to correspond to the features with equivalent reference numerals as discussed above, including any potential variations in the features.

In the alternative embodiment of FIG. 10H curved base loci 55X and linear base loci 55Y are provided. The light turning optical componet 50 may or may not further comprise faces 54A-D that have tilt angles $η_{A-D}$ that varies across the light turning optical component 50. A reduced sized window 26 may be achieved, advantageously increasing optical efficiency of illumination from illumination apparatus 20.

Figure 10I:
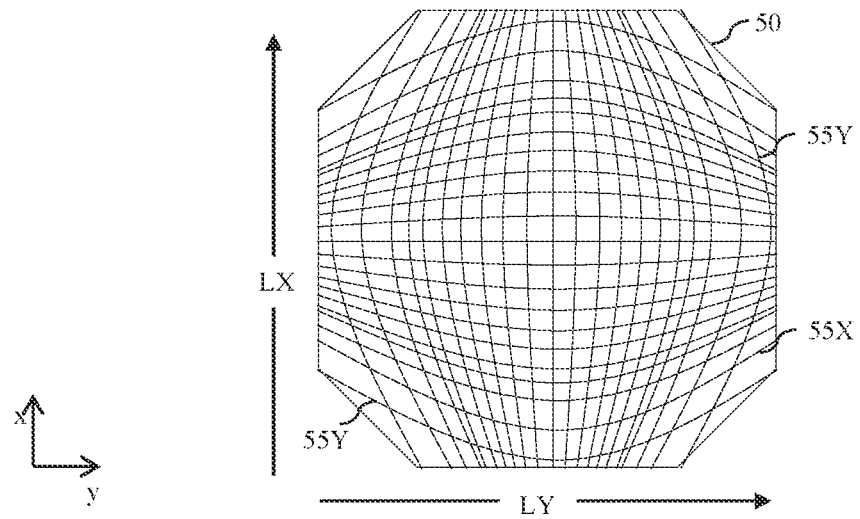
FIG. 10I is a schematic diagram illustrating in front view a pupillated turning optical component to provide pupillation from an illumination apparatus using curved recess base loci crossed with curved recess base loci.

FIG. 10I is a schematic diagram illustrating in front view a pupillated turning optical component to provide pupillation from the illumination apparatus using recess base loci 55X that are curved in the direction in which they are extended and crossed with recess base loci 55Y that are curved in the direction in which they are extended. Features of the embodiment of FIG. 10I not discussed in further detail may be assumed to correspond to the features with equivalent reference numerals as discussed above, including any potential variations in the features.

In the alternative embodiment of FIG. 10H curved base loci 55X, 55Y are provided. The light turning optical componet 50 may or may not further comprise faces 54A-D that have a tilt angles $η_{A-D}$ that varies across the light turning optical component 50. Further reduction of window 26 size may be achieved, advantageously increasing optical efficiency of illumination from illumination apparatus 20.

The alternative embodiments of FIGS. 10G-I may be provided in a near eye display apparatus 102, such as illustrated in the alternative embodiment of FIG. 40 hereinbelow. Advantageously cost and complexity may be reduced.

The profiles of FIG. 10G-I may be mastered using linear cutting of a mold for example by diamond machining of a tooling surface such as a metal block, and then replicated into an optical surface. Cutting of the crossed turning optical component 50 is illustrated further hereinbelow with respect to FIG. 17C.

The propagation of light rays between light input wells 30, light deflecting wells 40 in the waveguide 1 and pyramidal recesses 52 of the light turning optical componet 50 to achieve output with the small output cone angle 402 of FIGURE 1A will now be further described.

Figure 11A:
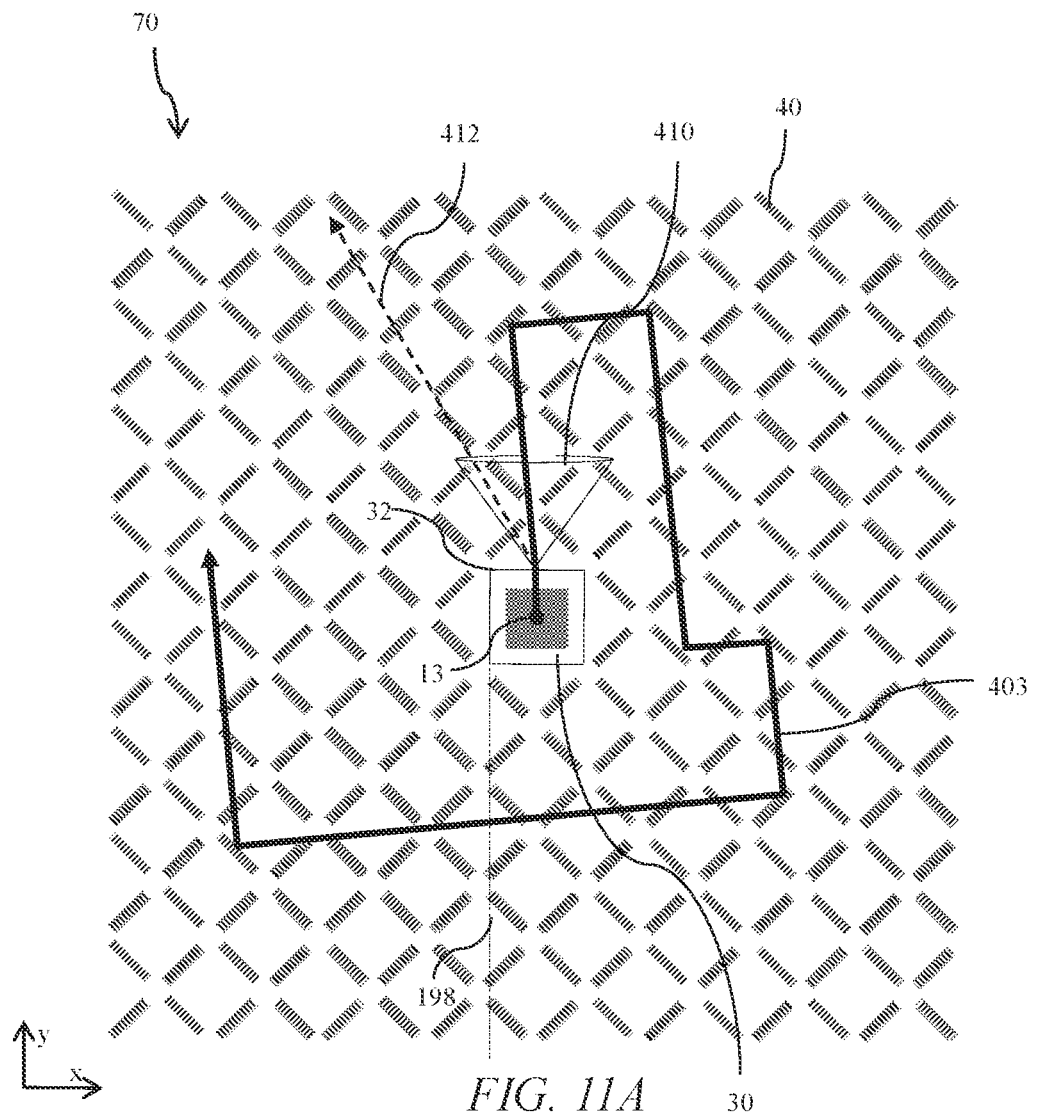
FIG. 11A is a schematic diagram illustrating in top view ray paths for the waveguide and an aligned light emitting diode of FIG. 3B.

FIG. 11A is a schematic diagram illustrating in top view ray paths for the waveguide 1 and an aligned light emitting element 15 of FIG. 3B. Features of the embodiment of FIG. 11A not discussed in further detail may be assumed to correspond to the features with equivalent reference numerals as discussed above, including any potential variations in the features.

Light rays 412 from source 13 are output with a substantially Lambertian cone into the air-filled light input well 30. Said light rays are refracted at the face 32A of the light input surface 32, with a light cone 410 propagating in the waveguide 1 from the face 32A before incidence on the light extraction features 10 (not shown). As will be described hereinbelow with reference to FIGS. 11B-D, the maximum luminance of the light ray output from the face 32A propagates close to the positive y direction.

The light ray 403 is reflected by faces of the light deflecting well 40 surfaces 42. The arrangement of light deflecting wells 40 with respect to the light input wells 30 provides propagation of the highest luminance rays at angles that when viewed in the top view of FIG. 11A are near to the reference axis 198 direction or are orthogonal to the reference axis 198 direction. The present embodiments desirably achieve confinement of the light rays 403 around the light input well 30.

Figure 11B:
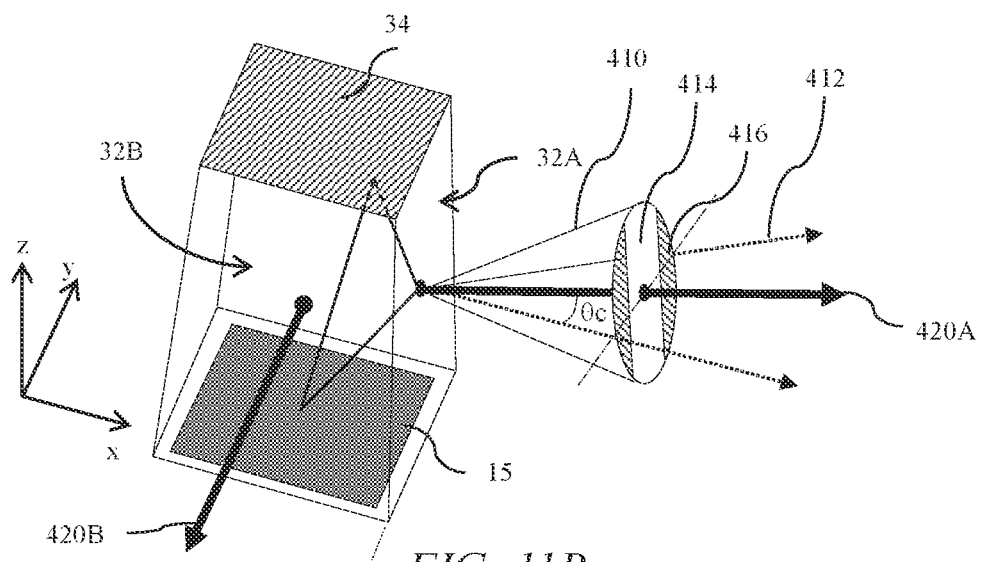
FIG. 11B is a schematic diagram illustrating in perspective side view a light output cone from a face of a light input well.
Figure 11C:
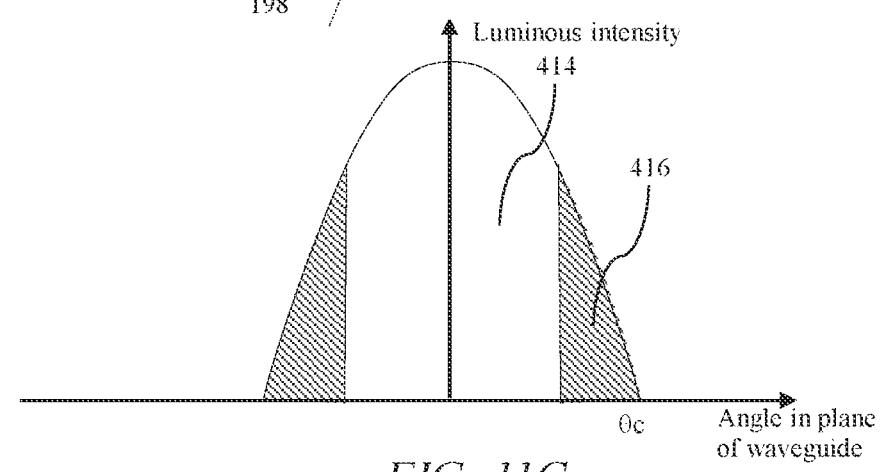
FIG. 11C is a schematic graph illustrating the variation of luminous intensity of light rays resolved into the plane in which a waveguide extends against the angle in the plane of the waveguide.
Figures 11D, 11E:
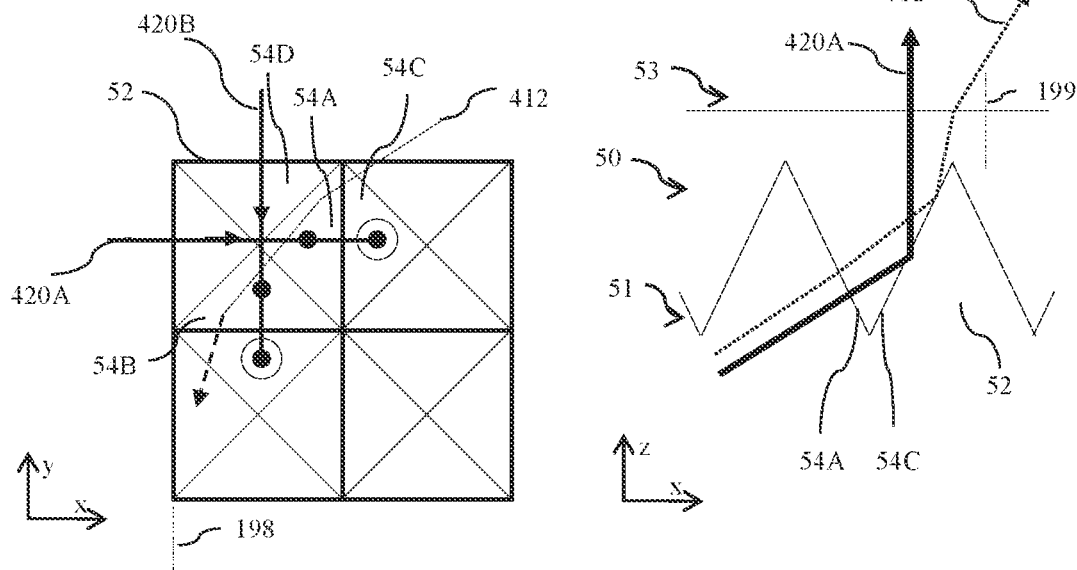
FIG. 11D is a schematic diagram illustrating in top view the refraction and reflection of light rays by the faces of a light turning optical component.
FIG. 11E is a schematic diagram illustrating in side view the refraction and reflection of light rays by the faces of a light turning optical component.

FIG. 11B is a schematic diagram illustrating in perspective side view a light output cone from a face of a light input well 30; FIG. 11C is a schematic graph illustrating the variation of luminous intensity of light rays resolved into the plane in which the waveguide 1 extends against the angle in the plane of the waveguide 1; FIG. 11D is a schematic diagram illustrating in top view the refraction and reflection of light rays by the faces of the light turning optical component 50; and FIG. 11E is a schematic diagram illustrating in side view the refraction and reflection of light rays by the faces of the light turning optical component. Features of the embodiment of FIGS. 11B-D not discussed in further detail may be assumed to correspond to the features with equivalent reference numerals as discussed above, including any potential variations in the features.

FIG. 11B illustrates the light cone 410 from the light emitting element 15 at angles up to the critical angle θc. Such a cone 410 is provided by refraction at the input surface 32 of the light input well 30. The light cone 410 is reflected within the waveguide prior to output from the front light guiding surface 8. Thus, the waveguide 1 is a catadioptric optical element as defined above. Both refraction and reflection properties of the waveguide contribute to the collimation effect of the waveguide 1 as will be described hereinbelow.

FIG. 11C illustrates the profile 418 of the luminous intensity in the cone 410 that is resolved into the plane of the waveguide, with regions 414 around the centre of the cone contributing to higher luminous intensity than regions 416 that are away from the centre of the cone 410. Thus the highest luminous intensity rays 420A are those with resolved component in the plane of the waveguide with angles that are close to orthogonal to the reference axis 198. Similarly the highest luminous intensity rays 420B are those with resolved component in the plane of the waveguide with angles that are close to parallel to the reference axis 198. Referring again to FIG. 11A, the ray 403 has an angle with component in the plane of the waveguide that is close to parallel to or orthogonal with the reference axis 198.

The propagation of directions with high and low luminous intensity will now be considered.

Figure 18A:
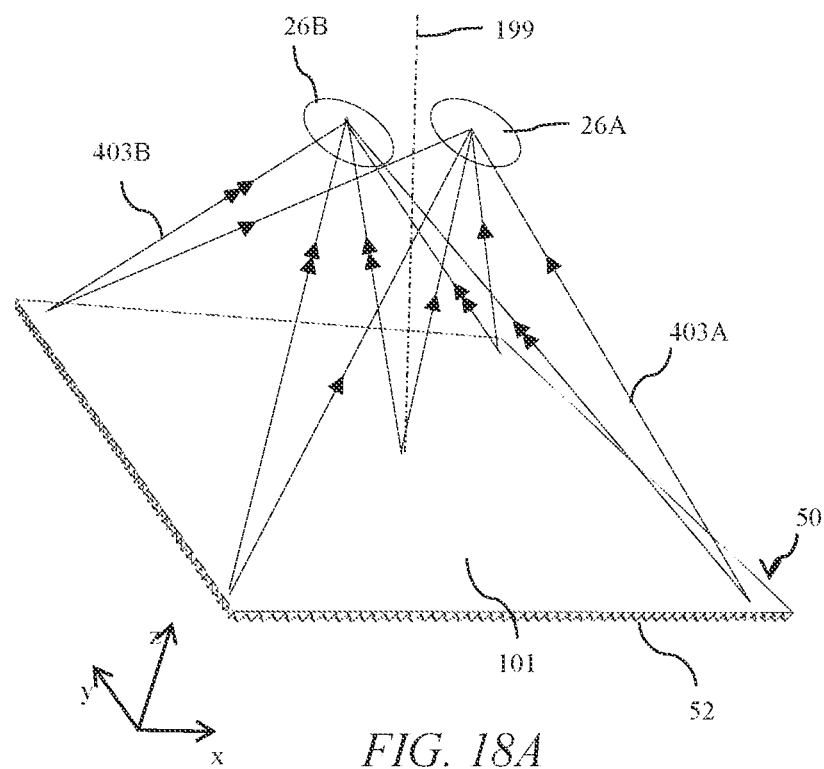
FIG. 18A is a schematic diagram illustrating in top perspective the output pupillation for the light turning optical component of FIG. 17C for use in the backlight of FIGS. 17A-B.

FIGS. 11D-E illustrate the path of light rays 420A, 420B with high luminous intensity that are parallel or orthogonal to the reference axis 198. The faces 54A, 54B, 54C, 54D of the pyramidal recess 52 are arranged to deflect such light rays 412 towards the normal direction 199, or in other directions for example to pupillate the output as illustrated in FIGS. 10B-10C or FIG. 18A herein.

By way of comparison, exemplary light rays such as ray 412 that does not propagate close to parallel or orthogonal to the reference axis 198 are output at angles different to the desired direction 199.

In the above manner, the present embodiments achieve light that may be termed collimated, that is the maximum luminous intensity is directed into desirable directions of output.

The optical output from an illustrative embodiment of the type illustrated in FIGS. 6A-B will now be described.

Figure 12A:
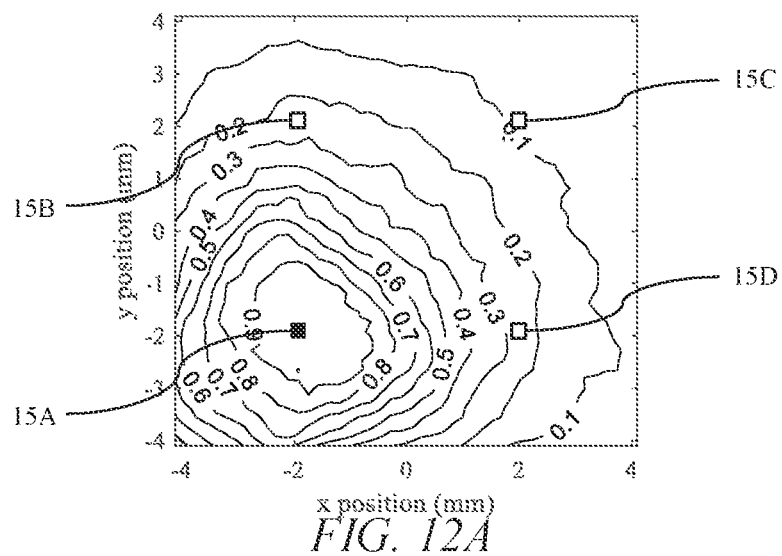
FIG. 12A is a schematic graph illustrating the variation in luminance with spatial location for a region of the backlight of FIGS. 6A-B when illuminated by a single light emitting diode.
Figure 12B:
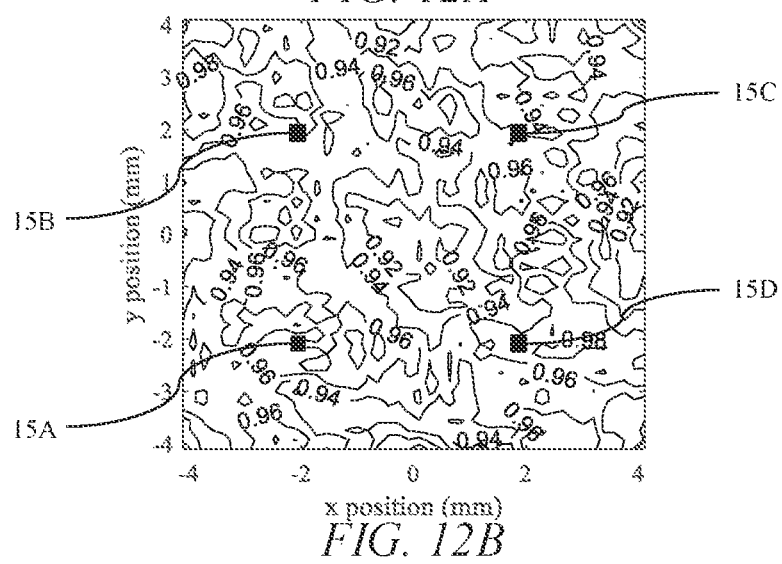
FIG. 12B is a schematic graph illustrating the variation in luminance with spatial location for a region of the backlight of FIGS. 6A-B when illuminated by all light emitting diodes.
Figure 12C:
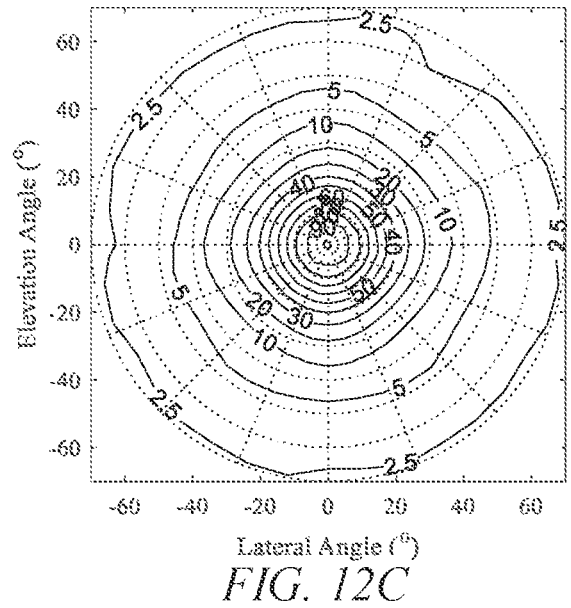
FIG. 12C is a schematic graph illustrating the variation in luminance with polar location for the backlight of FIGS. 6A-B when illuminated by a single light emitting diode.

FIG. 12A is a schematic graph illustrating the variation in luminance with spatial location for a region of the illumination apparatus 20 of FIGS. 6A-B when illuminated by a single light emitting element 15A; FIG. 12B is a schematic graph illustrating the variation in luminance with spatial location for a region of the illumination apparatus 20 of FIGS. 6A-B when illuminated by four light emitting elements 15A-D; and FIG. 12C is a schematic graph illustrating the variation in luminance with polar location for the illumination apparatus 20 of FIGS. 6A-B when illuminated by a single light emitting element 15A for the illustrative embodiment of TABLE 1. The light emitting elements 15 and respective aligned light input wells 30 of waveguide 1 are arranged on a pitch of 4 mm in x and y directions in the plane of the waveguide 1.

TABLE 1

| Surface | Surface normal | Surface normal tilt angle to axis 199, η | In-plane surface component | In-plane component rotation to axis 198, ε |
|---|---|---|---|---|
| 32A | $n_A$ | 87° | $n_1$ | 270° |
| 32B | $n_B$ | 87° | $n_2$ | 0° |
| 32C | $n_C$ | 87° | $n_3$ | 90° |
| 32D | $n_D$ | 87° | $n_4$ | 180° |
| 42A | $k_A$ | 87° | $k_1$ | 45° |
| 42B | $k_B$ | 87° | $k_2$ | 135° |
| 42C | $k_C$ | 87° | $k_3$ | 225° |
| 42D | $k_D$ | 87° | $k_4$ | 315° |
| 12A | $E_A$ | 3° | $E_1$ | 270° |
| 12B | $E_B$ | 3° | $E_2$ | 0° |
| 12C | $E_C$ | 3° | $E_3$ | 90° |
| 12D | $E_D$ | 3° | $E_4$ | 180° |
| 54A | $P_A$ | 56° | $P_1$ | 90° |
| 54B | $P_B$ | 56° | $P_2$ | 0° |
| 54C | $P_C$ | 56° | $P_3$ | 270° |
| 54D | $P_D$ | 56° | $P_4$ | 180° |

In the illustrative embodiment of TABLE 1, each of the surfaces is planar. The light input surfaces 32 have surface normals $n_A$, $n_B$, $n_C$, $n_D$ that are inclined at angle 90-φ from a plane of the waveguide 1 by at most 3°. Each of the light deflecting surfaces 42 have surface normals $k_A$, $k_B$, $k_C$, $k_D$ that are inclined at angle 90-γ from a plane of the waveguide 1 that may be at most 3°. Each of the inclined light extraction features 12A, 12B, 12C, 12D has surface normals $E_A$, $E_B$, $E_C$, $E_D$ that are inclined from the normal 199 of a plane of the waveguide 1 by at least 3°. The surface normals $P_A$, $P_B$, $P_C$, $P_D$ of the faces 54A, 54B, 54C, 54D of the pyramidal recesses 52 have a tilt angle η from the normal 199 to a plane of the waveguide 1 in a range from 35 to 80 degrees, and preferably in a range from 45 to 65 degrees.

The present embodiments desirably achieve confinement of the light around the light input well 30. FIG. 12A illustrates that the light from the light emitting element 15A in a light input well 30A is provided in the region close to the light emitting well, and overlaps with adjacent wells. Image information from the light emitting element 15A is provided over a desirable region, and provides some overlap with adjacent regions to advantageously reduce visibility of the light patch.

FIG. 12B illustrates that the light from the light emitting elements 15A-D in adjacent light input wells 30A-D is provided with high image uniformity. A uniform image may advantageously be seen, for example for a uniform white screen. Additional diffusers may be provided, for example in optical stack 5 to further improve uniformity.

FIG. 12C illustrates that the light from the light emitting element 15A in a light input well 30A is output in an angular range with full width half maximum polar angle of about 35 degrees, such an output may be termed as collimated.

Collimated light will now be further described.

Figure 13A:
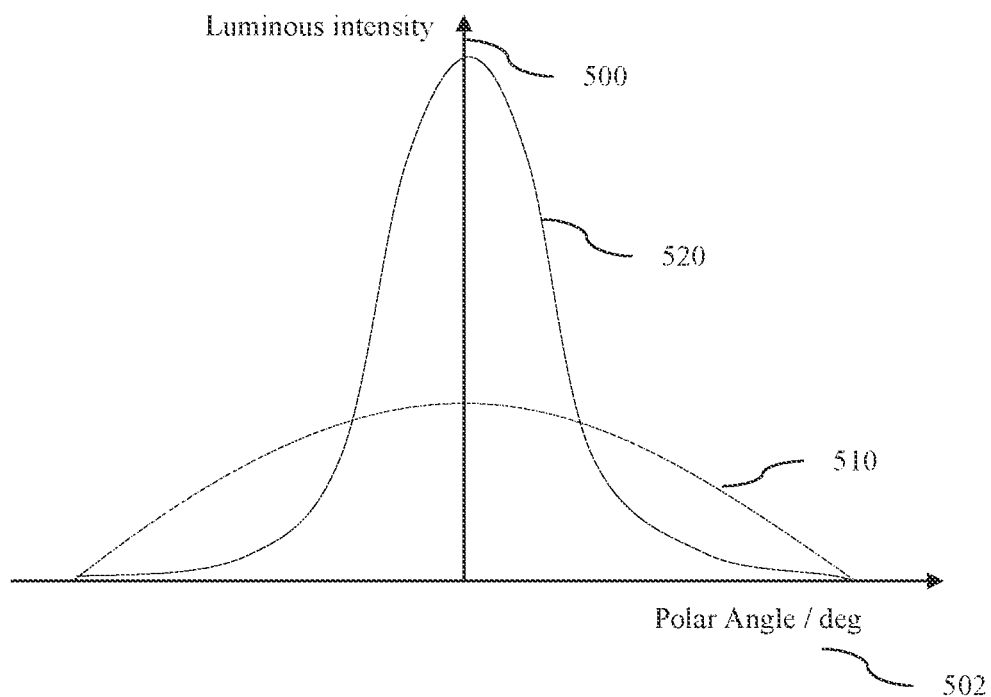
FIG. 13A is a schematic graph illustrating the variation in luminance with polar location for the backlight of FIGS. 6A-B in comparison to a Lambertian directional distribution.
Figure 13B:
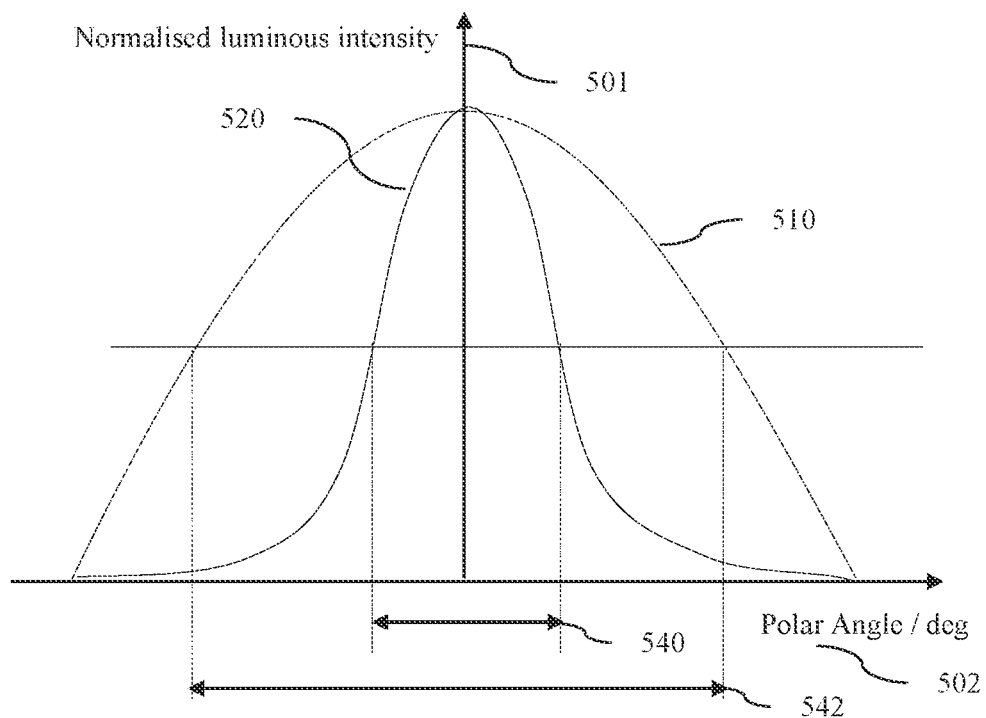
FIG. 13B is a schematic graph illustrating the normalized luminous intensity variation of a directional distribution in comparison to a Lambertian directional distribution.

FIG. 13A is a schematic graph illustrating in one cross-sectional plane the directional distribution 520 from the array of the present embodiments in comparison to a Lambertian directional distribution 510; and FIG. 13B is a schematic graph illustrating in one cross-sectional plane the solid angle of a normalised directional distribution 520 in comparison to a normalised Lambertian directional distribution 510.

Luminous intensity is a measure of the energy density in a light cone and is the number of lumens per unit solid angle. In the present embodiments the luminous intensity half maximum solid angle describes the subtended size of the illumination output cone for which the luminous intensity is half of the peak luminous intensity in each direction.

Luminance of a display is determined by the luminous intensity per subtended unit area. A Lambertian surface has a luminance that is independent of viewing angle and thus luminous intensity that is proportional to the cosine of the angle of observation to the normal direction to the surface.

The luminous intensity half maximum solid angle is the solid angle defined by the cone of light in which the luminous intensity in any direction falls to 50% of the peak luminous intensity. The solid angle $\Omega$ of a symmetric cone of full width half maximum angle $2\theta$ is given by:

$$\Omega = 2\pi*(1-\cos\theta) \qquad \text{eqn. 11}$$

Figure 29:
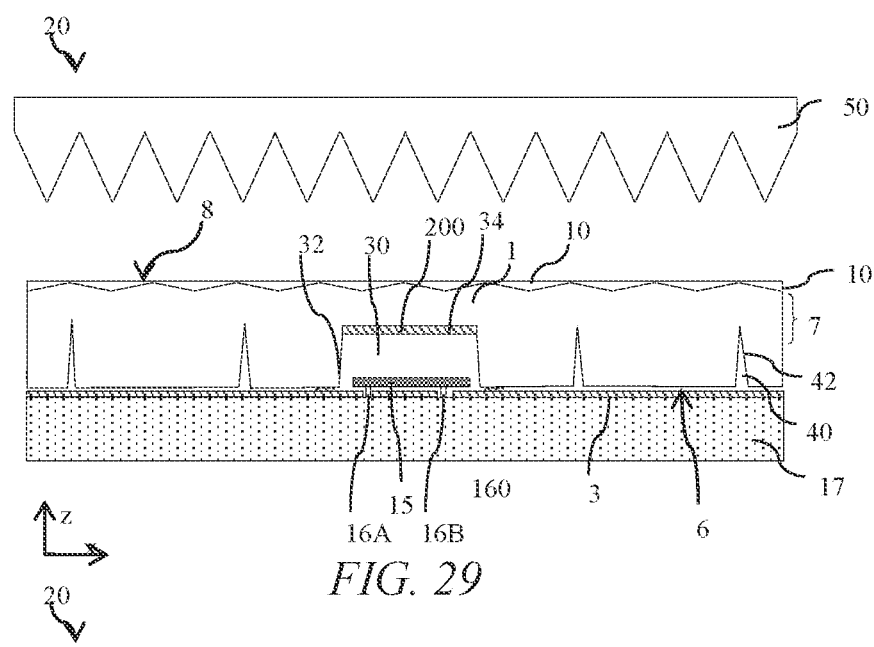
FIG. 29 is a schematic diagram illustrating in side view an alternative arrangement of waveguide and aligned light emitting diode wherein the light deflecting wells do not comprise a reflective end.

A Lambertian light source has a cosine distribution of luminous intensity such that the FWHM 542 illustrated in FIG. 29 is 120 degrees and the half angle, $\theta$ is 60 degrees. In the two-dimensional arrays of the present embodiments, the directional distribution is also two dimensional, so that the profiles 520, 510 are representative of the solid angle of the output.

In the present embodiments, the output is directional, that is the light output distribution 540 thus has a luminous intensity half maximum solid angle that is smaller than the luminous intensity half maximum solid angle of the light output distribution from each of the plurality of light emitting elements 15 (that have substantially Lambertian output). The present embodiments achieve half maximum solid angles that are less than $\pi$ steradian and the half cone angle $\theta$ in a single cross-sectional plane is less than 60 degrees, preferably less than approximately 40 degrees, more preferably less than approximately 30 degrees and most preferably less than approximately 20 degrees. In other words, the ratio of luminous intensity half maximum solid angle of the present embodiments to the luminous intensity half maximum solid angle of a Lambertian light source is less than 1, preferably less than 50% and more preferably less than 25%. For a privacy display the ratio is most preferably less than 10%.

In the present disclosure, the angular directional distribution refers to the distribution of luminous intensity for a point on the display, in other words the angular directional distribution is the spread of ray density with angle for the point. The uniformity of a display represents the spatial distribution across the optical array for any given viewing angle.

In the present embodiments the illumination apparatus 20 is arranged to emit light in a light output distribution, wherein a ratio of luminous intensity half maximum solid angle of the light output distribution to the luminous intensity half maximum solid angle of a Lambertian light distribution is less than 1, preferably less than 0.5, more preferably less than 0.25 and most preferably less than 0.1.

An alternative arrangement of waveguide 1 will now be described.

Figure 14A:
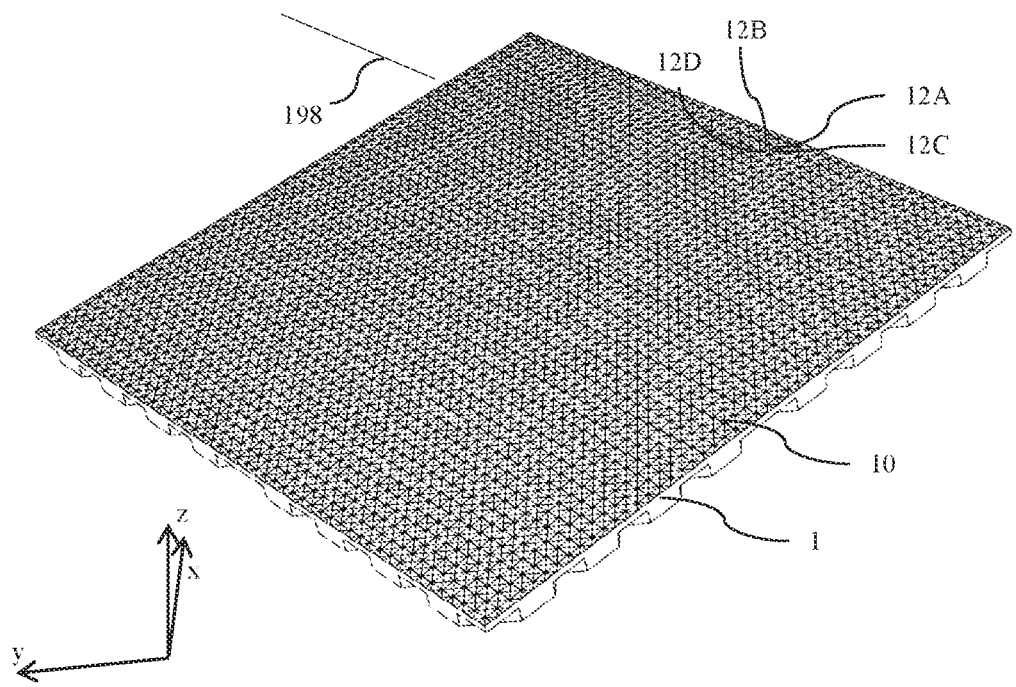
FIG. 14A is a schematic diagram illustrating in top perspective view a waveguide comprising alternative light input wells and light deflecting wells.
Figure 14B:
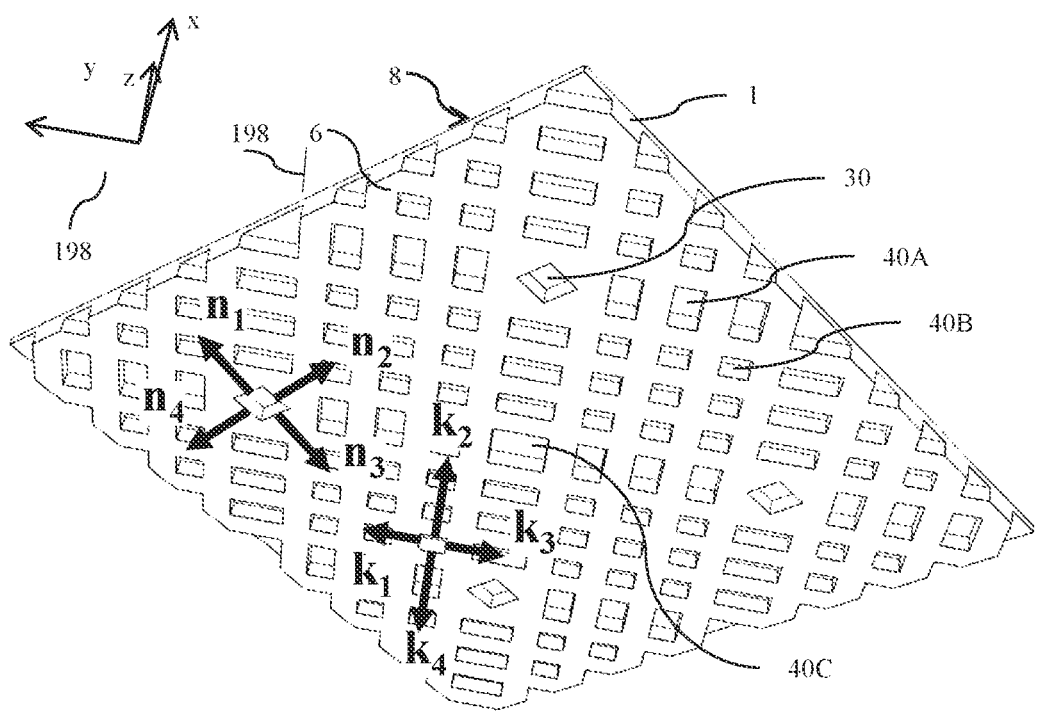
FIG. 14B is a schematic diagram illustrating in bottom perspective view a waveguide comprising alternative light input wells and light deflecting wells.
Figure 14C:
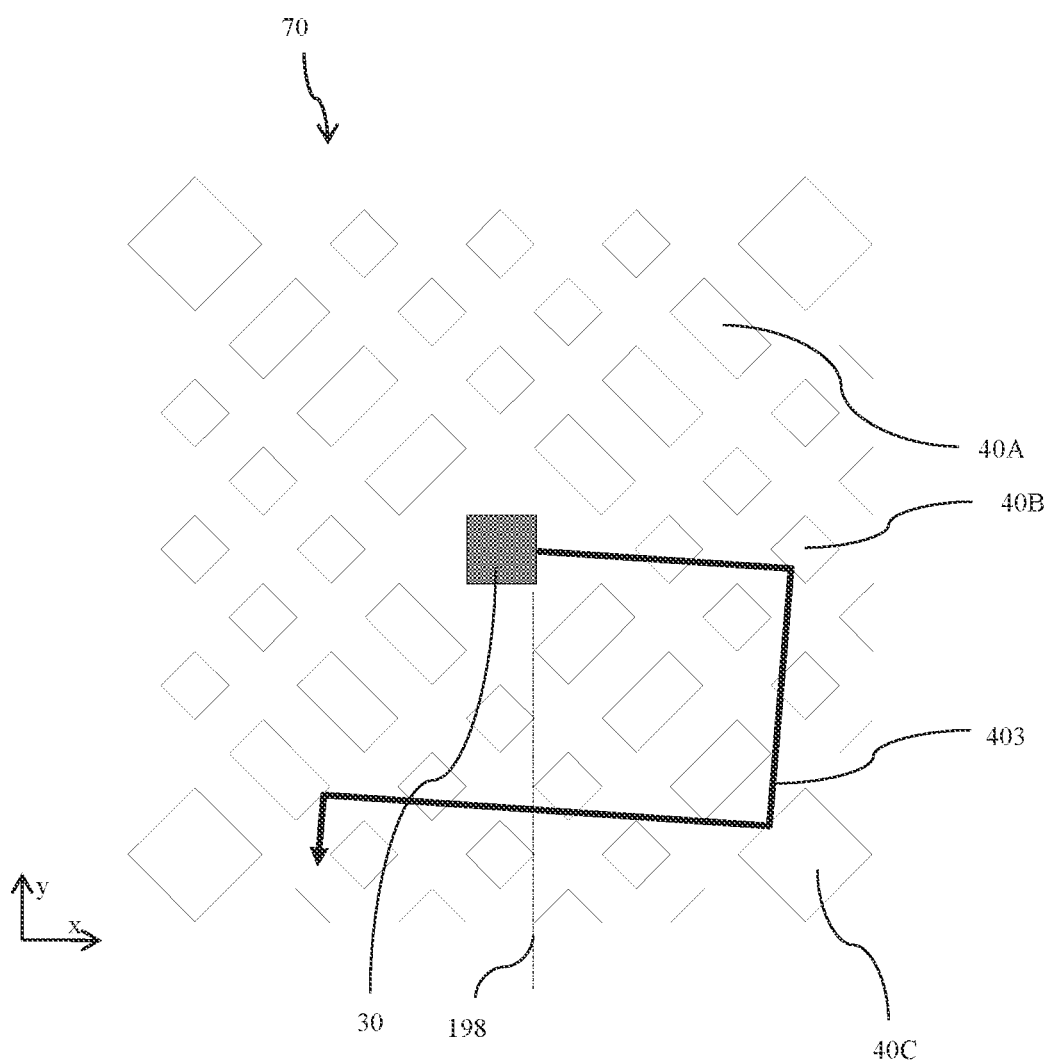
FIG. 14C is a schematic diagram illustrating in top view the arrangement of light input wells and light deflecting wells for the waveguide of FIGS. 13A-B.

FIG. 14A is a schematic diagram illustrating in top perspective view a waveguide 1 comprising alternative light input wells 30 and light deflecting wells 40A-C; and FIG. 14B is a schematic diagram illustrating in bottom perspective view a waveguide 1 comprising alternative light input wells 30 and light deflecting wells 40A-C; FIG. 14C is a schematic diagram illustrating in top view the arrangement of light input wells 30 and light deflecting wells 40A-C for the waveguide 1 of FIGS. 13A-B. Features of the embodiment of FIGS. 14A-C not discussed in further detail may be assumed to correspond to the features with equivalent reference numerals as discussed above, including any potential variations in the features.

In the alternative embodiment of FIG. 14C, the light input wells and light deflecting wells form the pattern 70 that is different to the pattern of FIG. 5 for example.

In comparison to the embodiment of FIGS. 6A-B the light deflecting wells 40 have different areas. The light deflecting wells 40A, 40B, 40C end surfaces 44A, 44B, 44C have areas that vary. The areas vary with distance from the respective aligned light input well. Uniformity of luminance output may advantageously be increased. The size of additional electronic components 550 that are provided in the light deflecting wells 40 may advantageously be increased. Further the aspect ratio of the light deflecting wells may be reduced. Higher fidelity of tooling and reproduction of tooling may advantageously be achieved. Reflective coatings 200 may be applied to the ends 44 of light deflecting wells 40 with increased uniformity using known coating methods. Yield and uniformity may advantageously be increased.

FIG. 14C illustrates an illustrative guiding light ray 403. In a similar manner to that illustrated in FIG. 11A, the light ray 403 with high luminous intensity is propagated to be close to parallel or orthogonal to the reference axis 198. As illustrated in FIGS. 11A-E, such an arrangement advantageously achieves collimation of the optical output.

The arrangement of FIGS. 6A-B and FIGS. 14A-C may be provided without reflective coatings 200 on the surface 42 of the respective light deflecting wells 40. Efficiency may advantageously be increased.

The optical output from an illustrative embodiment of the type using the waveguide illustrated in FIGS. 14A-B will now be described.

Figure 15A:
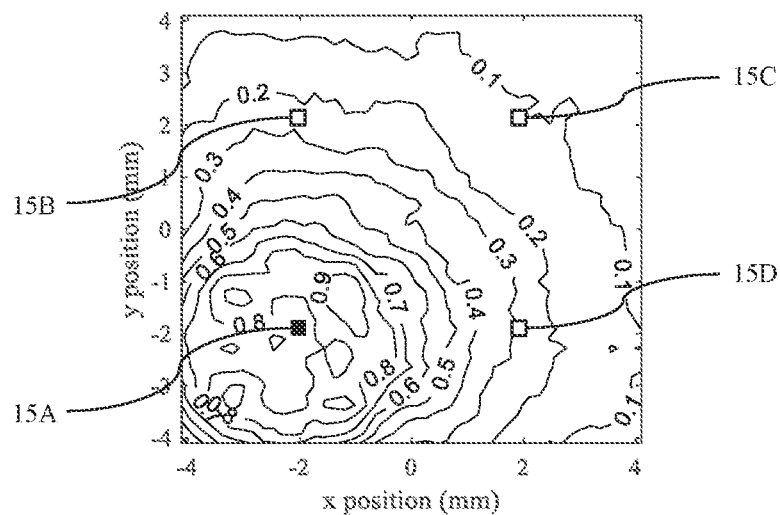
FIG. 15A is a schematic graph illustrating the variation in luminance with spatial location for a region of a backlight comprising the waveguide of FIGS. 13A-B when illuminated by a single light emitting diode.
Figure 15B:
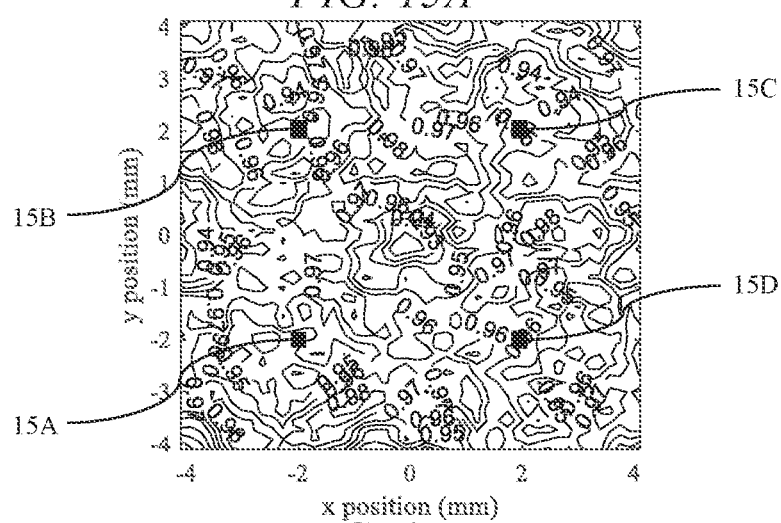
FIG. 15B is a schematic graph illustrating the variation in luminance with spatial location for a region of a backlight comprising the waveguide of FIGS. 13A-B when illuminated by all light emitting diodes.
Figure 15C:
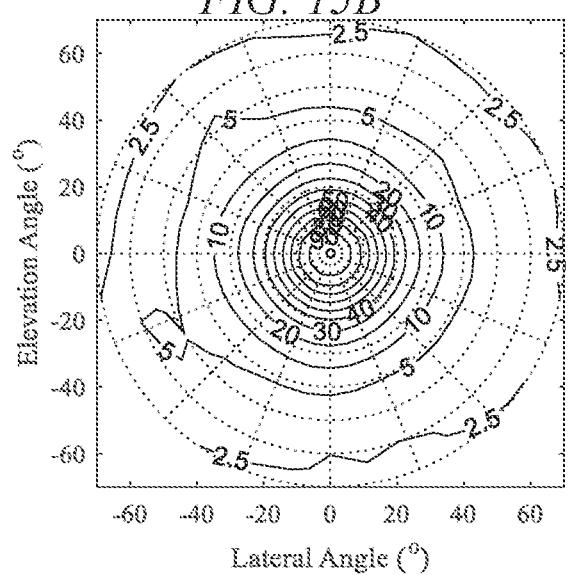
FIG. 15C is a schematic graph illustrating the variation in luminance with polar location for a backlight comprising the waveguide of FIGS. 13A-B when illuminated by a single light emitting diode.

FIG. 15A is a schematic graph illustrating the variation in luminance with spatial location for a region of an illumination apparatus 20 comprising the waveguide 1 of FIGS. 13A-B when illuminated by a single light emitting element 15A; FIG. 15B is a schematic graph illustrating the variation in luminance with spatial location for a region of the illumination apparatus 20 comprising the waveguide 1 of FIGS. 13A-B when illuminated by all light emitting elements 15A-D; and FIG. 15C is a schematic graph illustrating the variation in luminance with polar location for the illumination apparatus 20 comprising the waveguide 1 of FIGS. 13A-B when illuminated by a single light emitting element 15A. The light emitting elements 15 and respective aligned light input wells 30 of waveguide 1 are arranged on a pitch of 4 mm in x and y directions in the plane of the waveguide 1.

An illustrative embodiment of the switchable privacy display of FIG. 1D in share mode of operation will now be described.

FIG. 15D is a schematic graph illustrating the variation in security factor, S with polar location for the privacy display device 100 of FIG. 1D comprising the waveguide 1 of FIGS. 13A-B when illuminated by a single light emitting diode 15A, operating in share mode of operation with a display head-on luminance, of value $Y_{max}$ measured in nits that is half of the illuminance of value I measured in lux. Polar control retarder 300 of FIG. 1D provides substantially no variation of transmission with polar viewing angle and the variation of reflectivity with viewing angle is determined by front surface reflections.

FIG. 15D illustrates that in share mode, the Security Factor, S is less than 1.0 over a wide field of view, that is all image data is visible for a condition of image visibility where the head-on luminance to the user 45 is half of the illuminance to a snooper 47, for a viewing arrangement for example as illustrated in FIG. 1C. High image visibility (S<0.1) is advantageously visible near to the optical axis 199 so that the primary user 45 can see a high contrast image.

An illustrative embodiment of the switchable privacy display of FIG. 1D in share mode of operation will now be described.

FIG. 15E is a schematic graph illustrating the variation in transmission with polar location for an exemplary polar control retarder 300 of FIG. 1D operating in privacy mode; FIG. 15F is a schematic graph illustrating the variation in reflectivity of the display device of FIG. 1D comprising the exemplary polar control retarder 300 operating in privacy mode; and FIG. 15G is a schematic graph illustrating the variation in security factor, S with polar location for the privacy display device 100 of FIG. 1D comprising the waveguide 1 of FIGS. 13A-B when illuminated by a single light emitting diode 15A, operating in privacy mode of operation with a display head-on luminance, of value $Y_{max}$ measured in nits that is half of the illuminance of value I measured in lux.

Illustrative embodiments of polar control retarder 300 of FIG. 1D are described in U.S. Pat. No. 10,976,578, which is herein incorporated by reference in its entirety. The reduced off-axis transmission and increased off-axis reflection provides reduced image visibility as illustrated in FIG. 15G that illustrates that in privacy mode, the Security Factor, S is greater than 1.0 for lateral angles greater than 35° so that snooper 47 has reduced visibility of the image. For angles greater than 45° all images are invisible. High image visibility (S<0.1) is advantageously visible near to the optical axis 199 so that the primary user 45 can see a high contrast image. A switchable privacy display with high security factor is advantageously achieved. Further such a display device 100 may be provided with reduced power consumption and high dynamic range with low thickness.

It may be desirable to provide a display for a centre console of an automotive vehicle.

Figure 16:
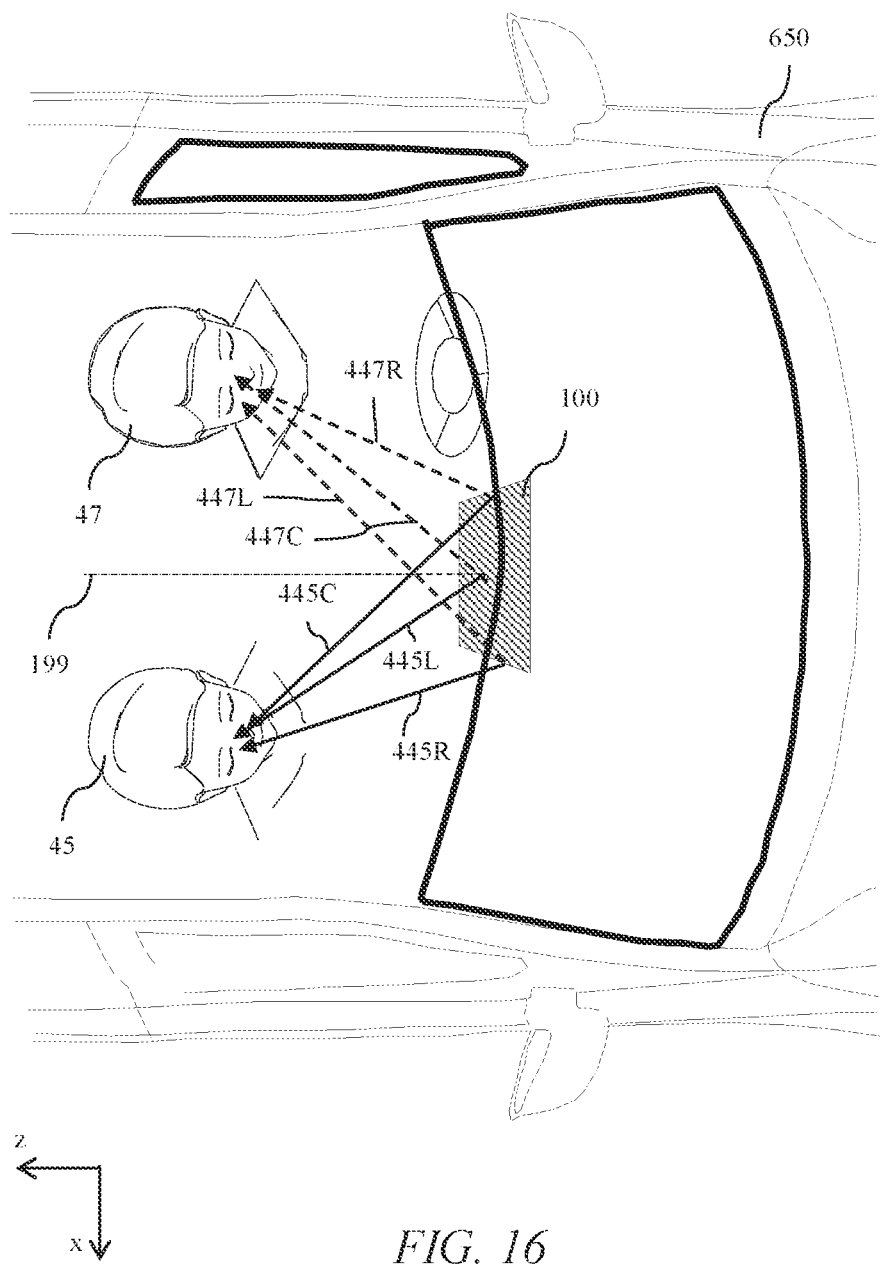
FIG. 16 is a schematic diagram illustrating a top view of a vehicle having a centre console display apparatus.

FIG. 16 is a schematic diagram illustrating a top view of a vehicle 650 having a centre console display apparatus 100. The output light is directed either side of the optical axis 199 of the display 100 to achieve efficient illumination of the driver 47 and passenger 45.

It may be desirable that display 100 is operated for the passenger 45 and the driver 47 across the width of the display 100 with high efficiency and high luminance and image visibility uniformity such that rays 445L, 445C, 445R for the passenger and rays 447L, 447C, 447R for the driver provide each with an image with substantially uniform and high luminance at low power consumption and with high dynamic range. Further stray light for night-time operation is advantageously reduced by minimising light that is not directed towards the driver 47 or passenger 45. In alternative embodiment, the rays 445L, 445C, 445R and rays 447L, 447C, 447R are parallel, for example using a light turning optical component 50 with the pupillation as illustrated in FIG. 10B. The complexity of the light turning optical componet 50 tooling is advantageously reduced.

Figure 17A:
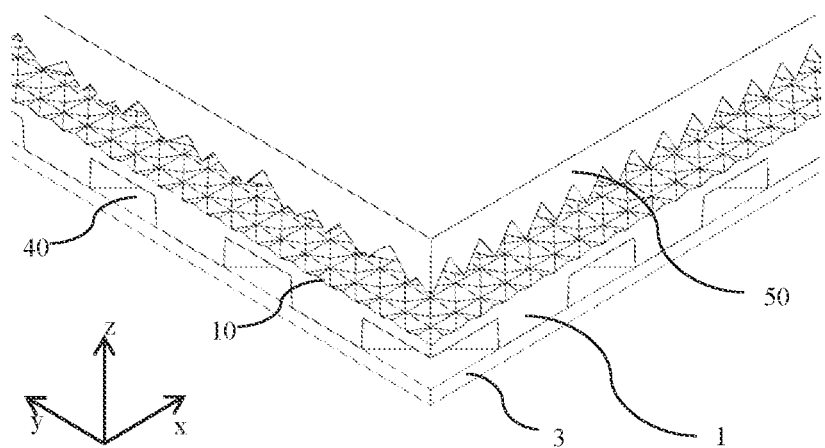
FIG. 17A is a schematic diagram illustrating in top perspective view a backlight arrangement comprising the waveguide of FIGS. 13A-B and an alternative light turning optical component.
Figure 17B:
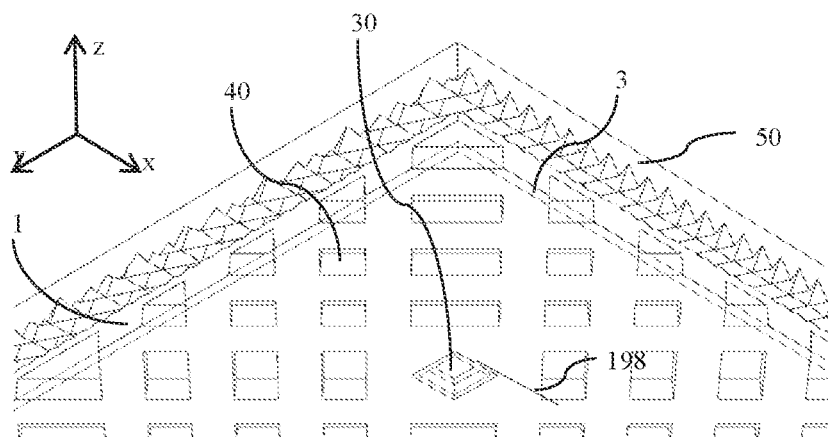
FIG. 17B is a schematic diagram illustrating in bottom perspective view a backlight arrangement comprising the waveguide and the alternative light turning optical component of FIG. 17A.

FIG. 17A is a schematic diagram illustrating in top perspective view an illumination apparatus 20 arrangement comprising the waveguide 1 of FIGS. 13A-B and an alternative light turning optical component 50; and FIG. 17B is a schematic diagram illustrating in bottom perspective view an illumination apparatus 20 arrangement comprising the waveguide 1 and the alternative light turning optical componet 50 of FIG. 17A. Features of the embodiment of FIGS. 17A-B not discussed in further detail may be assumed to correspond to the features with equivalent reference numerals as discussed above, including any potential variations in the features.

Figure 17C:
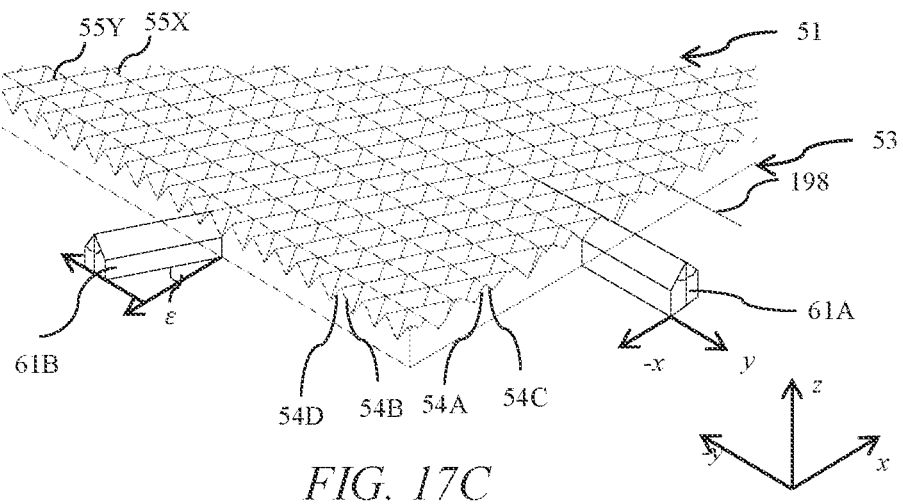
FIG. 17C is a schematic diagram illustrating in bottom perspective view the light turning optical component of FIGS. 17A-B.

FIG. 17C is a schematic diagram illustrating in bottom perspective view the light turning optical componet 50 of FIGS. 17A-B. Features of the embodiment of FIG. 17C not discussed in further detail may be assumed to correspond to the features with equivalent reference numerals as discussed above, including any potential variations in the features.

The light turning optical componet 50 comprises a first array of prismatic elements arranged on the input surface 51 each comprising a pair of faces 54A, 54C defining base loci 55X therebetween, the loci 55X extending along a first array of lines across the plane in which the input surface 51 extends and parallel to the y axis. The light turning optical componet 50 further comprises a second array of prismatic elements arranged on the input surface 51, each comprising a pair of faces 54B, 54D defining a base locus 55Y therebetween, the base loci 55Y extending along a second array of lines across the plane in which the input surface extends. The alternative embodiment of FIGS. 17A-C comprise an alternative light turning optical componet 50 wherein the base loci 55X, 55Y are not crossed at 90 degrees, but have an angle that is different by angle ε from 90 degrees and as further illustrated in FIG. 17D.

The first array of lines and the second array of lines extend at different angles projected on to the plane so that the first array of prismatic elements and the second array of prismatic elements deflect the light exiting from the waveguide into different lobes as will be described in FIGS. 18A-B.

FIG. 17C further illustrates the arrangement of cutting tools 61A, 61B such as diamonds that may be provided to cut such a structure into a mold such as a metal mold. In manufacture such a mold is replicated with the replicated parts being formed in a transparent material with the inverse shape.

The loci 55X, 55Y may further be curved, such as illustrated in FIG. 10F, FIG. 10H and FIG. 10I hereinabove to achieve pupillation and advantageously increase efficiency and uniformity.

FIG. 17D is a schematic diagram illustrating a pyramidal recess 52 of the light turning optical component of FIG. 17C; FIG. 17E is a schematic diagram illustrating in top view the refraction and reflection of light rays by the faces of the light turning optical component of FIG. 17C; and FIG. 17F is a schematic diagram illustrating in side view the refraction and reflection of light rays by the faces of the light turning optical component of FIG. 17C. Features of the embodiments of FIGS. 17D-F not discussed in further detail may be assumed to correspond to the features with equivalent reference numerals as discussed above, including any potential variations in the features.

FIG. 17D illustrates the parallelogram base locus 57 of the pyramidal recess 52 is different to the square base locus 55 of the pyramidal recess of FIG. 4C.

The operation of the illumination apparatus of FIGS. 17A-C will now be described.

FIGS. 17E-F illustrate that for rays 420A, 420B with high luminous intensity, off-axis deflection is provided in a direction different to the normal 199 to the plane of the waveguide 1. Similarly light rays 422A illustrated in FIG. 17F provides a different deflection direction that is in a direction different to the normal 199 to the plane of the waveguide 1.

An illustrative embodiment will now be described.

FIG. 18A is a schematic diagram illustrating in top perspective the output pupillation for the light turning optical componet 50 of FIG. 17C for use in the illumination apparatus 20 of FIGS. 17A-B. Features of the embodiment of FIG. 18A not discussed in further detail may be assumed to correspond to the features with equivalent reference numerals as discussed above, including any potential variations in the features.

In comparison to the arrangement of FIG. 10D, the light turning optical componet 50 of FIG. 17C is arranged to provide two windows 26A, 26B that are offset either side of the optical axis 199 normal to the display surface. An observer 45, 47 positioned near to each window 26A, 26B respectively advantageously sees an image with high brightness and uniformity across the predetermined area 101.

Figure 18B:
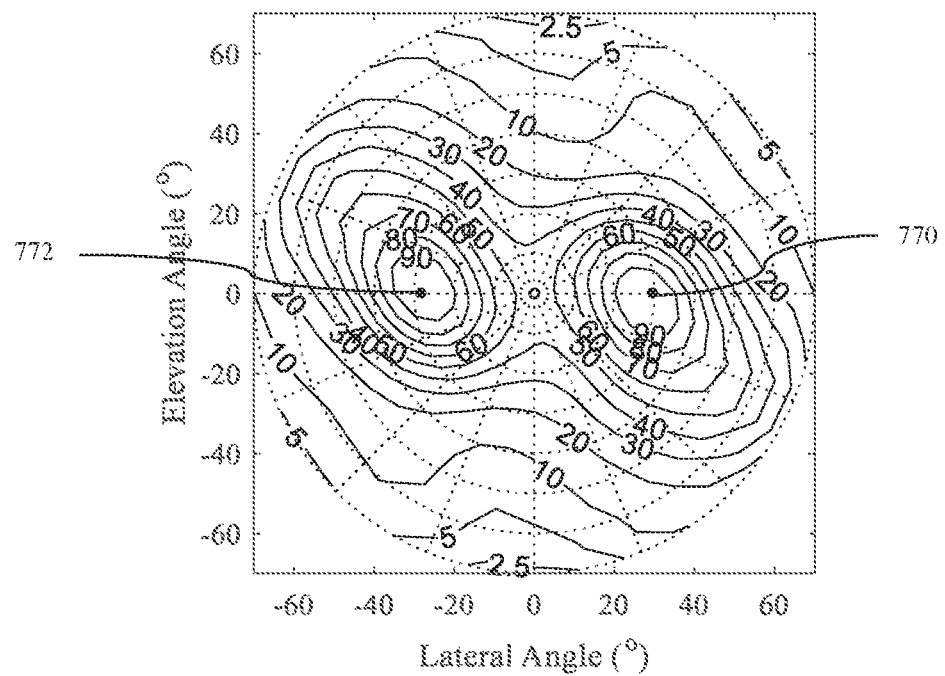
FIG. 18B is a schematic graph illustrating the variation in luminance with polar location for a backlight comprising the backlight of FIGS. 17A-B when illuminated by a single light emitting diode.

FIG. 18B is a schematic graph illustrating the variation in luminance with polar location for the illumination apparatus 20 comprising the illumination apparatus 20 of FIGS. 17A-B when illuminated by a single light emitting element 15 for the illustrative embodiment of TABLE 2.

TABLE 2

| Surface | Surface normal | Surface normal tilt angle to axis 199, η | In-plane surface component | In-plane component rotation to axis 198, ε |
|---|---|---|---|---|
| 32A | $n_A$ | 87° | $n_1$ | 270° |
| 32B | $n_B$ | 87° | $n_2$ | 0° |
| 32C | $n_C$ | 87° | $n_3$ | 90° |
| 32D | $n_D$ | 87° | $n_4$ | 180° |
| 42A | $k_A$ | 87° | $k_1$ | 45° |
| 42B | $k_B$ | 87° | $k_2$ | 135° |
| 42C | $k_C$ | 87° | $k_3$ | 225° |
| 42D | $k_D$ | 87° | $k_4$ | 315° |
| 12A | $E_A$ | 3° | $E_1$ | 270° |
| 12B | $E_B$ | 3° | $E_2$ | 0° |
| 12C | $E_C$ | 3° | $E_3$ | 90° |
| 12D | $E_D$ | 3° | $E_4$ | 180° |
| 54A | $P_A$ | 57° | $P_1$ | 25° |
| 54B | $P_B$ | 49° | $P_2$ | 90° |
| 54C | $P_C$ | 57° | $P_3$ | 205° |
| 54D | $P_D$ | 49° | $P_4$ | 270° |

The input surface 51 of the light turning optical componet 50 comprises an array of pyramidal recesses 52 each comprising a parallelogram base with base locus 57 and four light turning faces 54A, 54B, 54C, 54D. Surface normals $P_A$, $P_C$ have average components $P_1$, $P_3$ respectively in a plane of the waveguide 1, which average components $P_1$, $P_2$, $P_3$, $P_4$ are in the present embodiment oriented with respect to the reference axis 198 at angles within at most 20°, preferably at most 10°, of 25°, 90°, 205°, and 270°.

Two light output polar locations 770, 772 with maxima of luminance are provided, achieving high efficiency and brightness for the viewers 45, 47 of FIG. 16. Power consumption may advantageously be reduced and display brightness increased for a high dynamic range image for driver 47 and passenger 45. Stray light may be reduced for night-time operation.

It may be desirable to provide a passenger infotainment display (PID) with a privacy mode of operation.

Figure 19A:
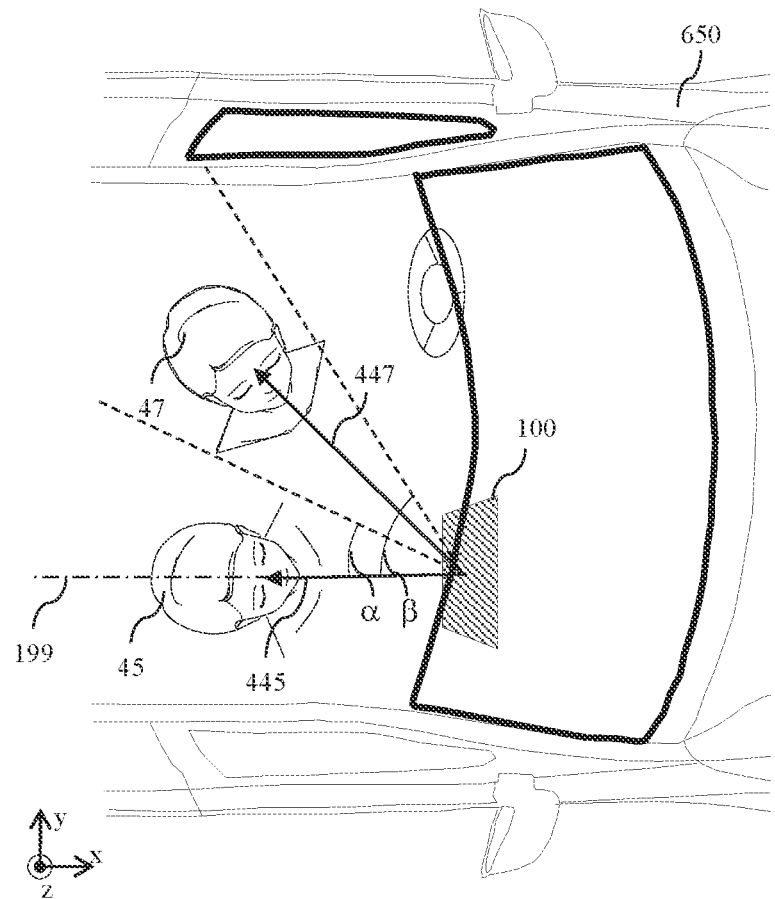
FIG. 19A is a schematic diagram illustrating a top view of a vehicle having a passenger infotainment display apparatus.

FIG. 19A is a schematic diagram illustrating a top view of a vehicle 650 having a passenger infotainment display apparatus 100. Features of the embodiment of FIG. 19A not discussed in further detail may be assumed to correspond to the features with equivalent reference numerals as discussed above, including any potential variations in the features.

The arrangement of FIG. 19A is similar to that of FIG. 16, however the passenger 45 is illuminated by on-axis rays 445 and the driver 47 is illuminated by off-axis rays 447, and in particular in the light cone between off-axis angles α and β. It would be desirable that in a share mode of operation the driver can see a high brightness image and in a privacy mode of operation sees an image with high security factor.

Figure 19B:
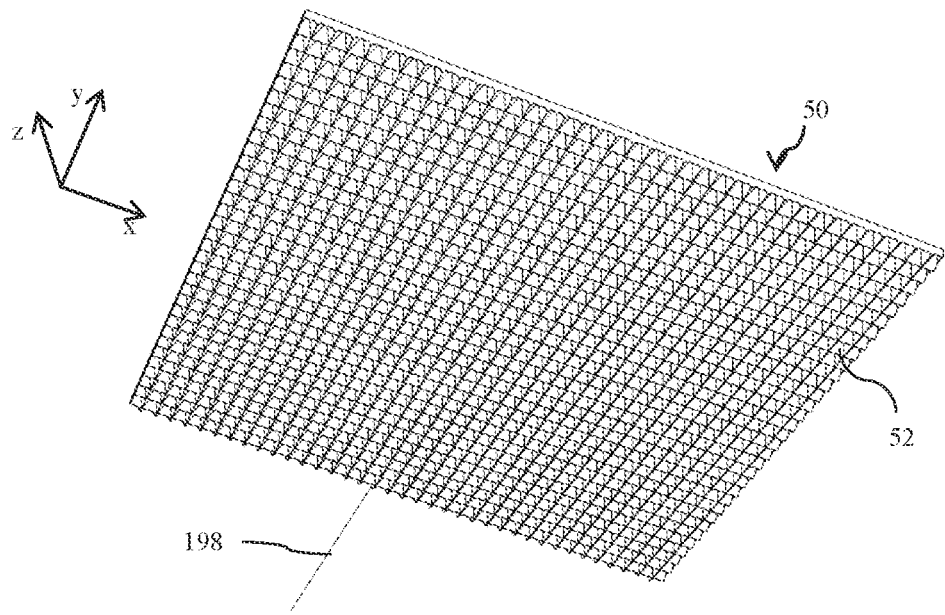
FIG. 19B is a schematic diagram illustrating in bottom perspective a light turning optical component for arrangement with the waveguide of FIG. 14A to provide illumination for the passenger infotainment display apparatus of FIG. 19A.

FIG. 19B is a schematic diagram illustrating in bottom perspective a light turning optical componet 50 for arrangement with the waveguide 1 of FIG. 14A to provide illumination for the passenger infotainment display apparatus 100 of FIG. 19A, comprising the illustrative pyramidal recesses 52 of TABLE 3. Features of the embodiment of FIG. 19B not discussed in further detail may be assumed to correspond to the features with equivalent reference numerals as discussed above, including any potential variations in the features.

TABLE 3

| Surface | Surface normal | Surface normal tilt angle to axis 199, η | In-plane surface component | In-plane component rotation to axis 198, ε |
|---|---|---|---|---|
| 54A | $P_A$ | 56° | $P_1$ | 0° |
| 54B | $P_B$ | 73° | $P_2$ | 90° |
| 54C | $P_C$ | 56° | $P_3$ | 180° |
| 54D | $P_D$ | 40° | $P_4$ | 270° |

In operation, the light rays 445 that are reflected by total internal reflection at surfaces 54A, 54C are directed in a direction close to the display normal 199, near to the passenger 45 while the light rays that are reflected by total internal reflection at surfaces 54B, 54D is deflected towards the driver 47 in an off-axis direction 447.

Figure 19C:
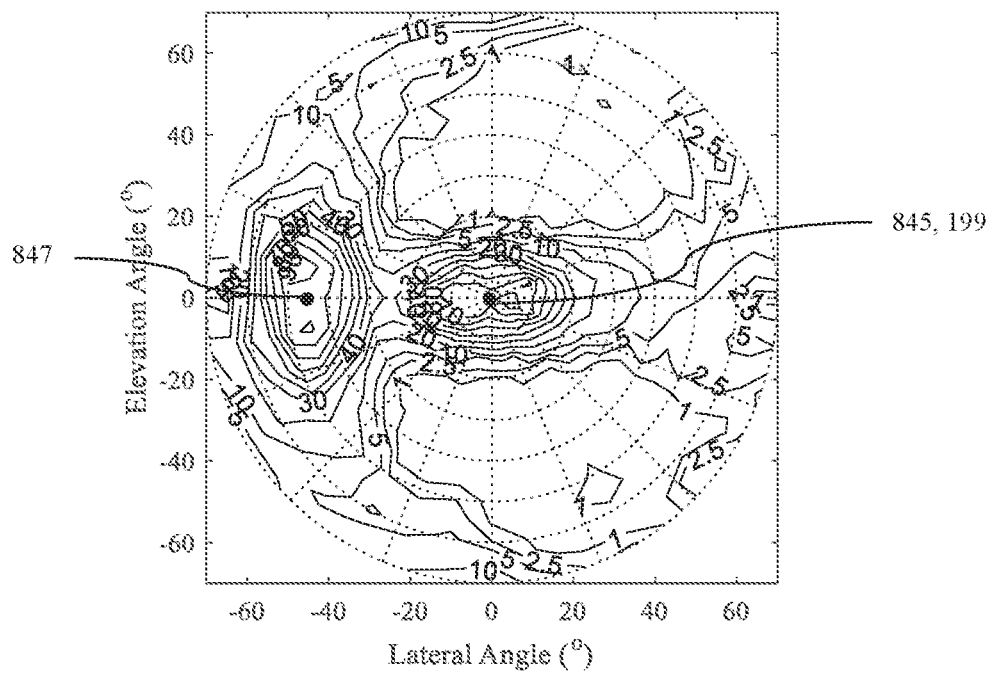
FIG. 19C is a schematic graph illustrating the variation in luminance with polar location for a backlight comprising the waveguide of FIG. 14 and the light turning optical component of FIG. 19B.

FIG. 19C is a schematic graph illustrating the variation in luminance with polar location for the backlight comprising the waveguide 1 of FIG. 14 and the light turning optical componet 50 of FIG. 19B. Peak luminance is observed at passenger 45 polar location 845 and at driver 47 polar location 847. A high brightness image may be advantageously observed in share mode of operation. High power efficiency may be achieved.

Figure 19D:
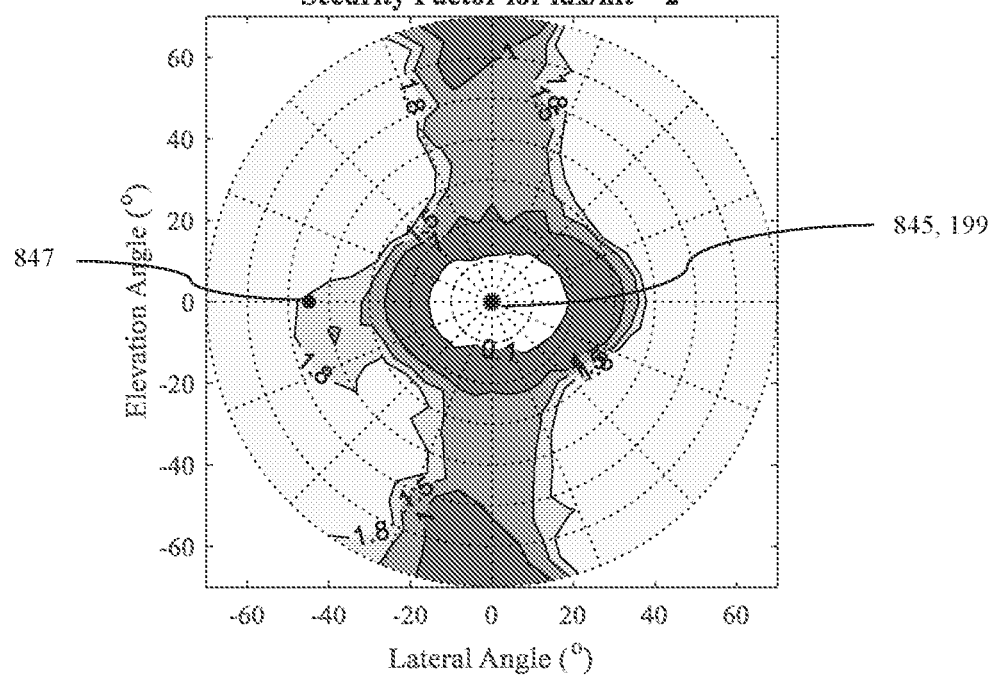
FIG. 19D is a schematic graph illustrating the variation in security factor, S with polar location for a passenger infotainment display apparatus of FIG. 19A comprising a privacy display device of FIG. 1D and comprising the waveguide of FIG. 14A and the light turning optical component of FIG. 19B when illuminated by a single light emitting diode, operating in privacy mode of operation with a display head-on luminance, of value $Y_{max}$ measured in nits that is half of the illuminance of value I measured in lux.

FIG. 19D is a schematic graph illustrating the variation in security factor, S with polar location for a passenger infotainment display apparatus of FIG. 19A comprising a privacy display device 100 of FIG. 1D and comprising the waveguide 1 of FIG. 14A and the light turning optical componet 50 of FIG. 19B and TABLE 3 when illuminated by a single light emitting diode, operating in privacy mode of operation with a display head-on luminance, of value $Y_{max}$ measured in nits that is half of the illuminance of value I measured in lux.

Illustrative embodiments of polar control retarder 300 of FIG. 1D are described in U.S. Pat. No. 10,976,578. The reduced off-axis transmission and increased off-axis reflection provides reduced image visibility as illustrated in FIG. 19D that illustrates that in privacy mode, the Security Factor, S is greater than 1.0 for lateral angles greater than 26° so that snooper 47 has reduced visibility of the image. For angles greater than 45° all images are invisible. High image visibility (S<0.1) is advantageously visible near to the optical axis 199 so that the passenger 45 can see a high contrast image. A switchable passenger infotainment display with high security factor is advantageously achieved. Further such a display device 100 may be provided with reduced power consumption and high dynamic range with low thickness.

Figure 19E:
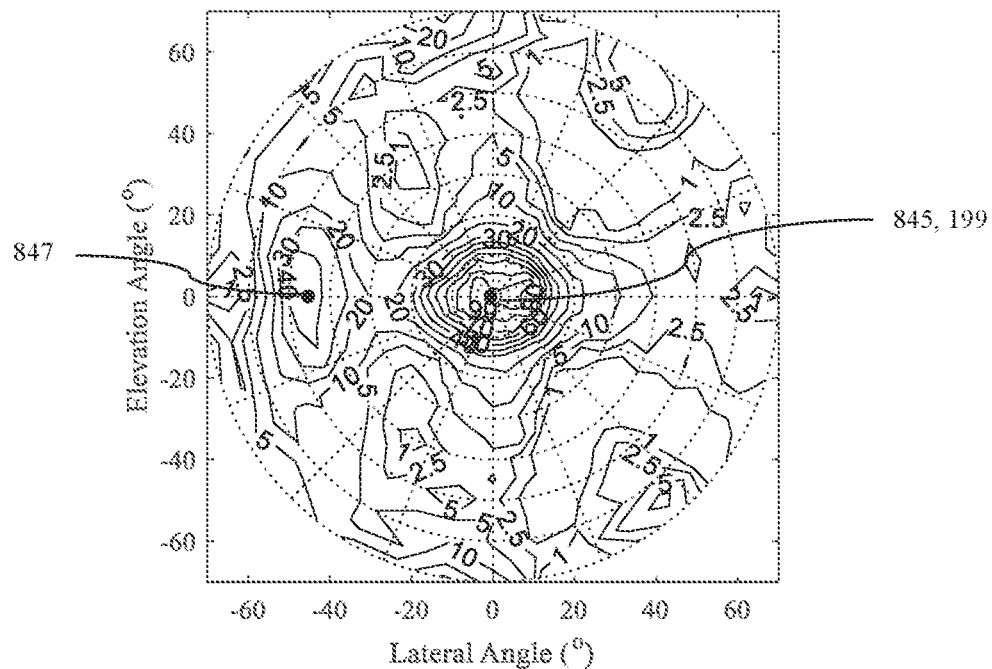
FIG. 19E is a schematic graph illustrating the variation in luminance with polar location for the backlight comprising the waveguide of FIG. 14 and an alternative light turning optical component of FIG. 19B.

FIG. 19E is a schematic graph illustrating the variation in luminance with polar location for the backlight comprising the waveguide of FIG. 14 and an alternative light turning optical component of FIG. 19B and TABLE 4.

TABLE 4

| Surface | Surface normal | Surface normal tilt angle to axis 199, η | In-plane surface component | In-plane component rotation to axis 198, ε |
|---|---|---|---|---|
| 54A | $P_A$ | 56° | $P_1$ | 0° |
| 54B | $P_B$ | 70° | $P_2$ | 90° |
| 54C | $P_C$ | 56° | $P_3$ | 180° |
| 54D | $P_D$ | 53° | $P_4$ | 270° |

Figure 19F:
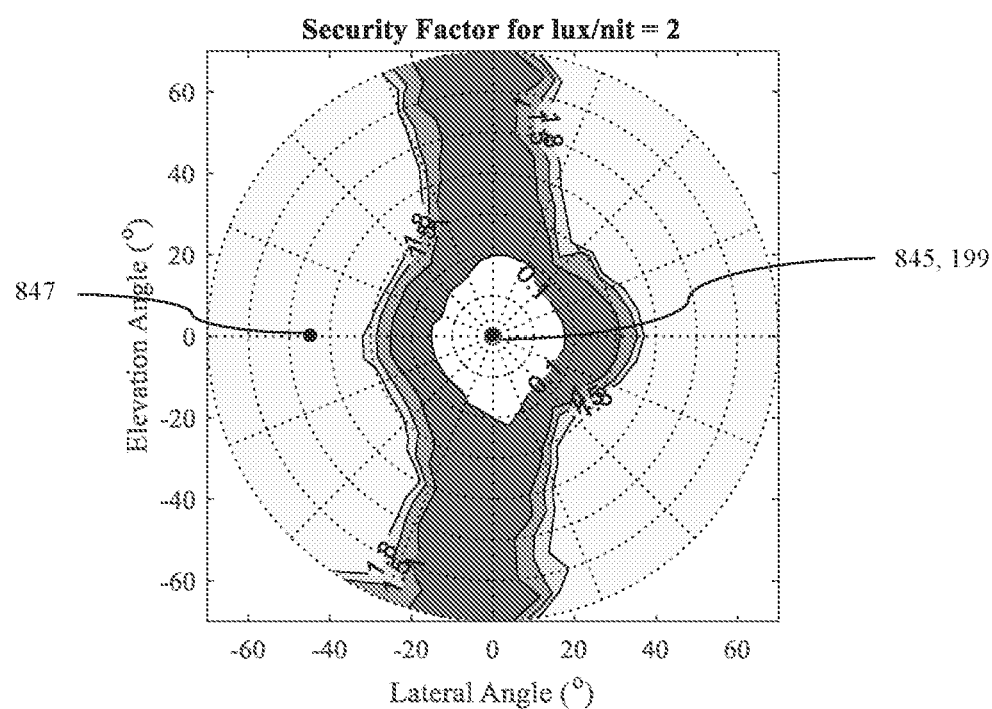
FIG. 19F is a schematic graph illustrating the variation in security factor, S with polar location for a passenger infotainment display apparatus of FIG. 19A comprising a privacy display device of FIG. 1D and comprising the waveguide of FIG. 14A and the alternative light turning optical component of FIG. 19B when illuminated by a single light emitting diode, operating in privacy mode of operation with a display head-on luminance, of value $Y_{max}$ measured in nits that is half of the illuminance of value I measured in lux.

FIG. 19F is a schematic graph illustrating the variation in security factor, S with polar location for a passenger infotainment display apparatus of FIG. 19A comprising a privacy display device of FIG. 1D and comprising the waveguide of FIG. 14A and the alternative light turning optical component of FIG. 19B when illuminated by a single light emitting diode, operating in privacy mode of operation with a display head-on luminance, of value $Y_{max}$ measured in nits that is half of the illuminance of value I measured in lux.

In operation, the light rays 445 that are reflected by total internal reflection at surfaces 54A, 54C, 54D are directed in a direction close to the display normal 199, near to the passenger 45 while the light rays that are reflected by total internal reflection at surfaces 54B are deflected towards the driver 47 in an off-axis direction 447. In comparison to FIGS. 19C-D, FIGS. 19E-F illustrate that the turning optical componet 50 may be arranged to achieve reduced luminance at the driver 47 polar location 847. Advantageously higher security factor may be achieved for the driver 47 over a polar region with increased size.

Alternative arrangements of light deflecting wells 40 will now be described.

Figure 20A:
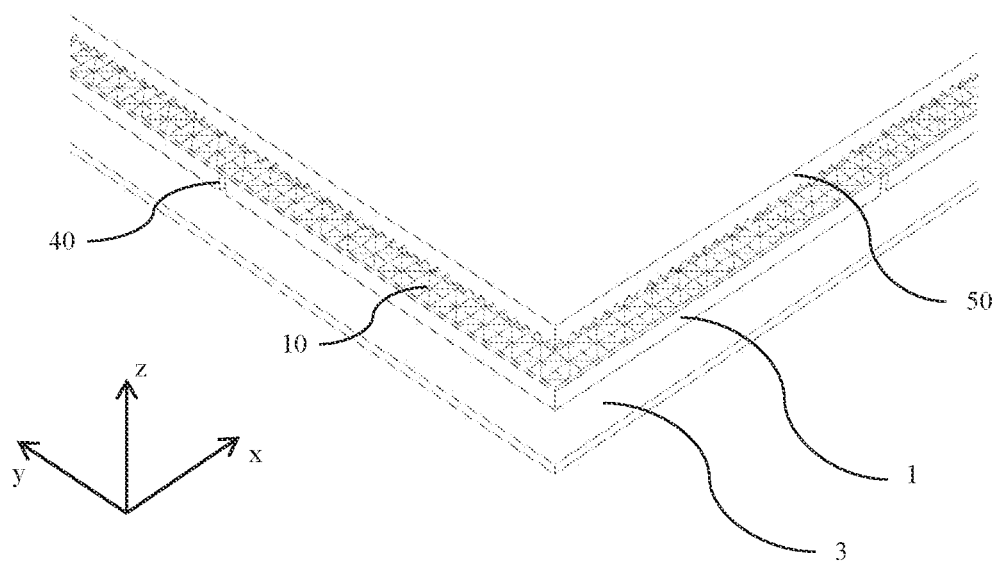
FIG. 20A is a schematic diagram illustrating in top perspective view a backlight arrangement comprising an alternative waveguide.
Figure 20B:
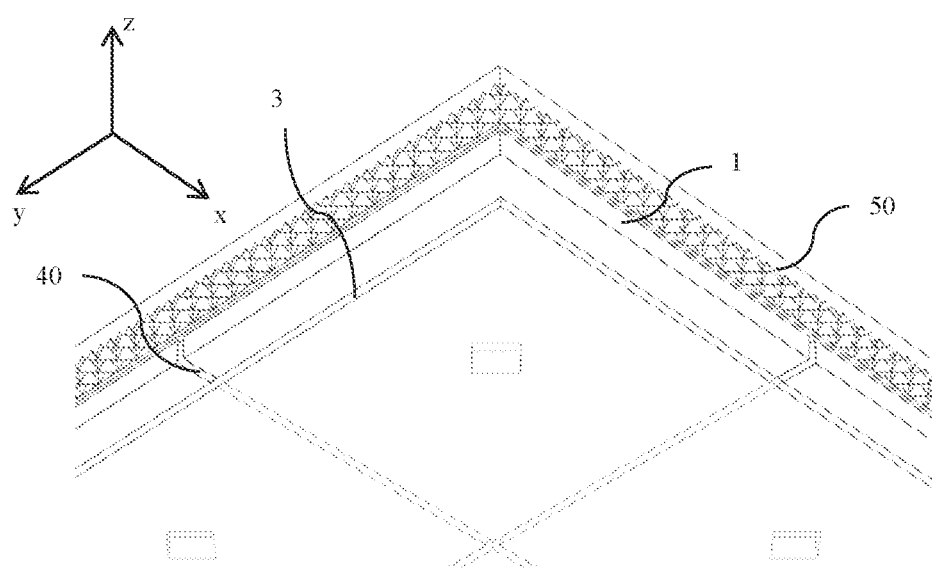
FIG. 20B is a schematic diagram illustrating in bottom perspective view a backlight arrangement comprising the alternative waveguide of FIG. 20A.
Figure 20C:
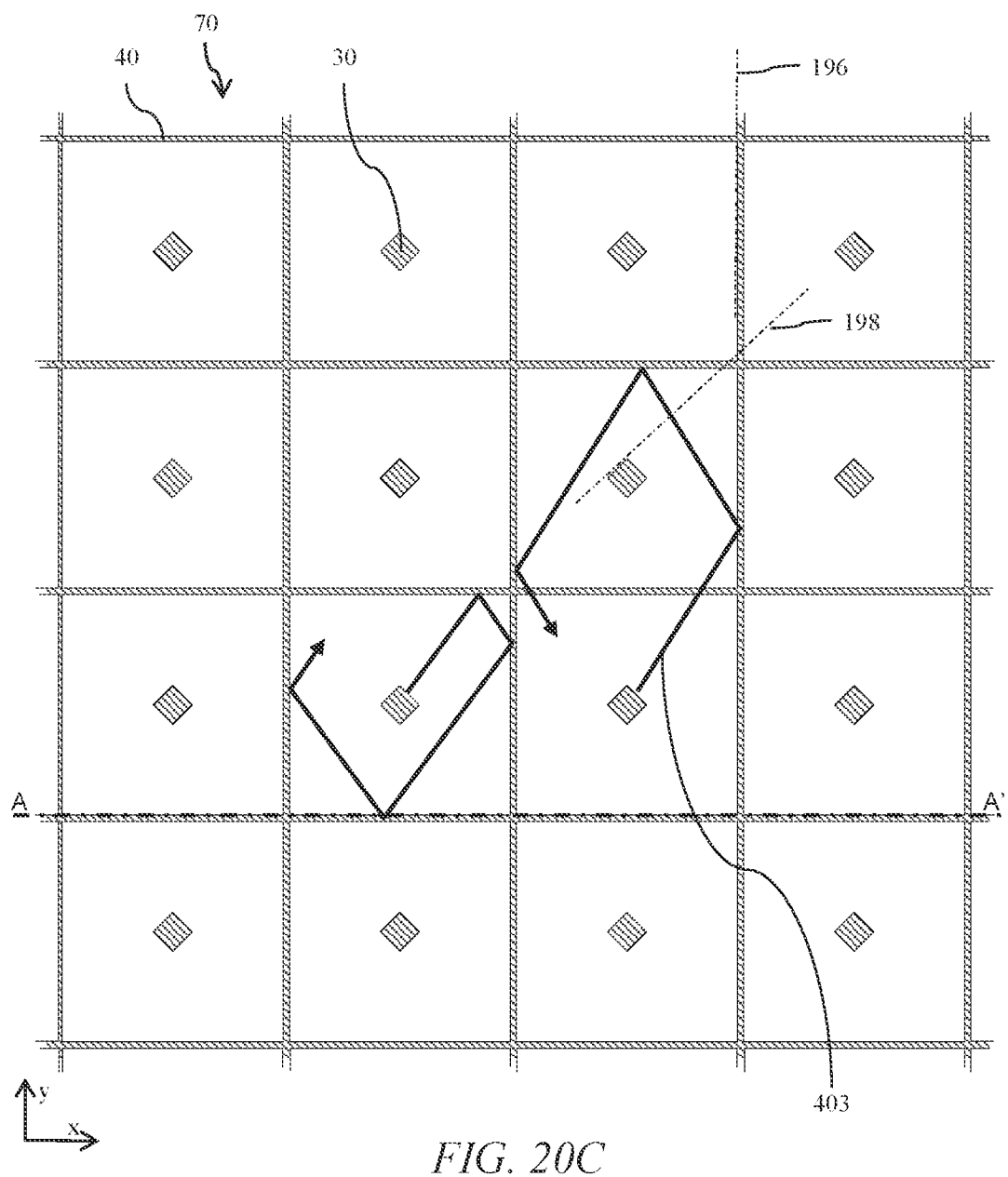
FIG. 20C is a schematic diagram illustrating in top view the arrangement of reflective ends of the light input wells and light deflecting wells for the waveguide of FIGS. 20A-B.
Figure 20D:
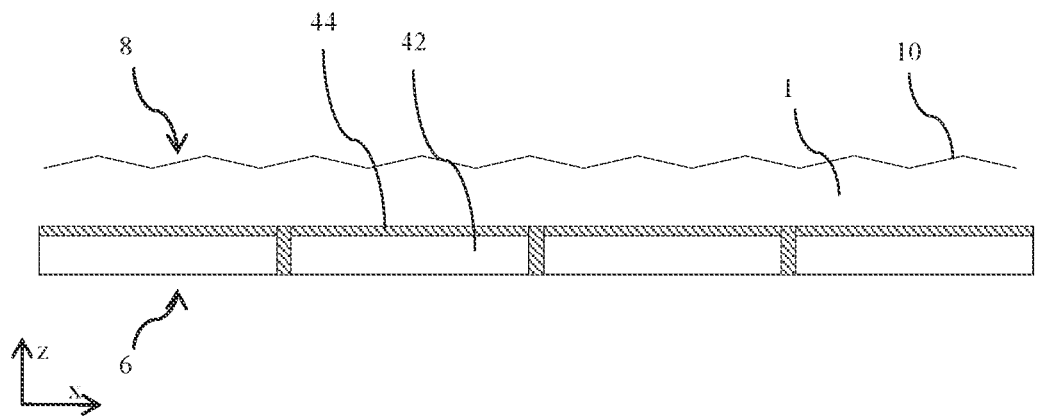
FIG. 20D is a schematic diagram illustrating in side view the arrangement of reflective ends of the light deflecting wells for the waveguide of FIGS. 20A-B.

FIG. 20A is a schematic diagram illustrating in top perspective view an illumination apparatus 20 arrangement comprising an alternative waveguide 1; FIG. 20B is a schematic diagram illustrating in bottom perspective view an illumination apparatus 20 arrangement comprising the alternative waveguide 1 of FIG. 20A; FIG. 20C is a schematic diagram illustrating in top view the arrangement of reflective ends 34 of the light input wells 30 and light deflecting wells 40 for the waveguide 1 of FIGS. 20A-B; and FIG. 20D is a schematic diagram illustrating in side view the arrangement of reflective ends 44 of the light deflecting wells 40 for the waveguide 1 of FIGS. 20A-B along the cross-section A-A' of FIG. 20C. Features of the embodiment of FIGS. 20A-B and FIGS. 20C-D not discussed in further detail may be assumed to correspond to the features with equivalent reference numerals as discussed above, including any potential variations in the features.

In the alternative embodiment of FIG. 20C, the light input wells and light deflecting wells form the pattern 70 that is different to the pattern of FIG. 5 or FIG. 14C for example.

The light deflecting wells 40 are connected at ends of the pairs of opposed faces to form a grid of complete loops around the light input wells 30. In comparison to the embodiments hereinbefore, such an arrangement may be more conveniently tooled and replicated. Further the deflection surfaces 42 of the light deflection wells 40 may not be coated as will be illustrated in FIG. 28 for example, advantageously optical efficiency may be increased and complexity of manufacture may be reduced.

Figure 21A:
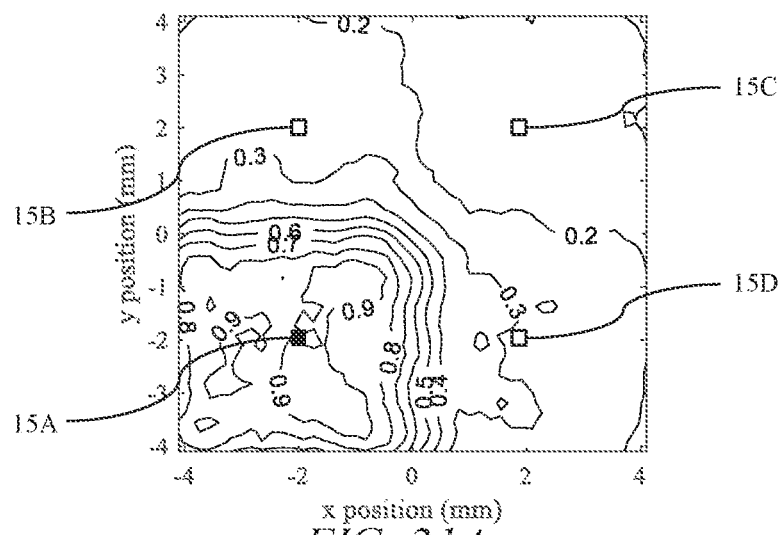
FIG. 21A is a schematic graph illustrating the variation in luminance with spatial location for a region of a backlight comprising the waveguide of FIGS. 20A-B when illuminated by a single light emitting diode.
Figure 21B:
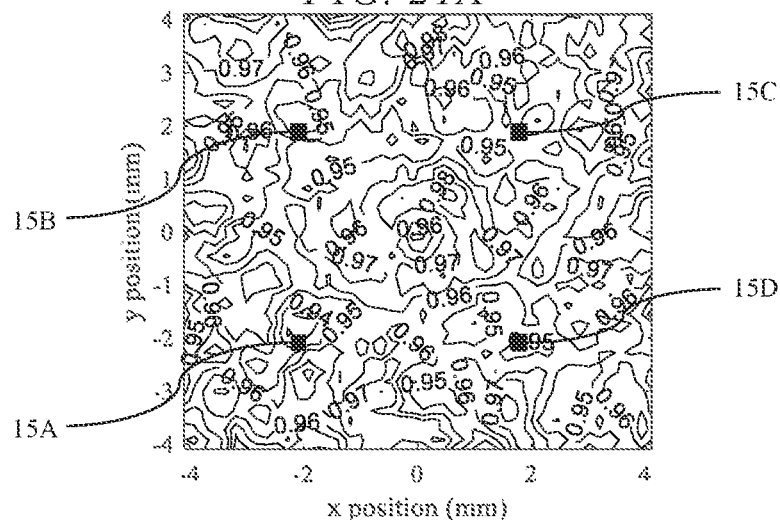
FIG. 21B is a schematic graph illustrating the variation in luminance with spatial location for a region of a backlight comprising the waveguide of FIGS. 20A-B when illuminated by all light emitting diodes.
Figure 21C:
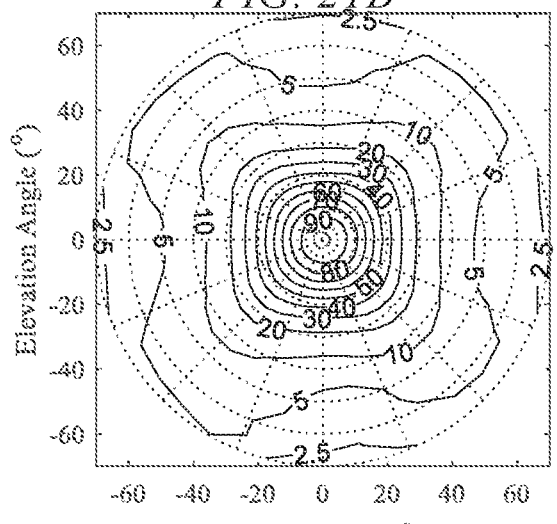
FIG. 21C is a schematic graph illustrating the variation in luminance with polar location for a backlight comprising the waveguide of FIGS. 20A-B when illuminated by a single light emitting diode.

FIG. 21A is a schematic graph illustrating the variation in luminance with spatial location for a region of an illumination apparatus 20 comprising the waveguide 1 of FIGS. 20A-B when illuminated by a single light emitting element 15A; FIG. 21B is a schematic graph illustrating the variation in luminance with spatial location for a region of the illumination apparatus 20 comprising the waveguide 1 of FIGS. 20A-B when illuminated by all light emitting elements 15A-D; and FIG. 21C is a schematic graph illustrating the variation in luminance with polar location for the illumination apparatus 20 comprising the waveguide 1 of FIGS. 20A-B when illuminated by a single light emitting element 15A. The light emitting elements 15 and respective aligned light input wells 30 of waveguide 1 are arranged on a pitch of 4 mm in x and y directions in the plane of the waveguide 1.

Such an embodiment advantageously achieves a localization of output on a rectangular grid around the light input wells 30. Further the profile of output luminance has reduced cone angle in lateral and vertical directions. Display 100 visibility in a privacy mode of operation may advantageously be reduced in the lateral and vertical directions to achieve increased visual security level for appropriately located display user 45 and snooper 47.

Alternative embodiments of waveguide 1 will now be described.

Figure 22A:
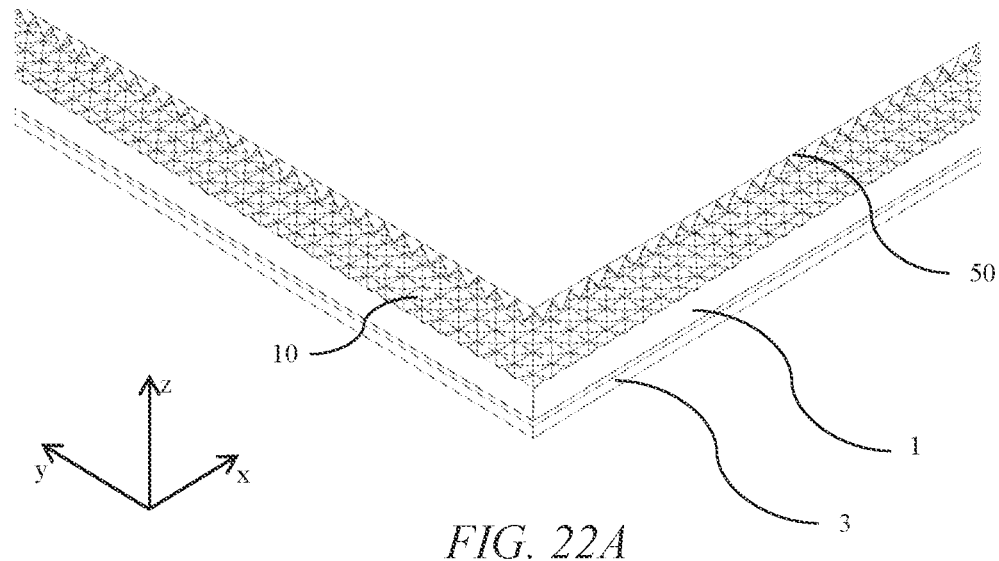
FIG. 22A is a schematic diagram illustrating in top perspective view a backlight arrangement comprising an alternative waveguide.
Figure 22B:
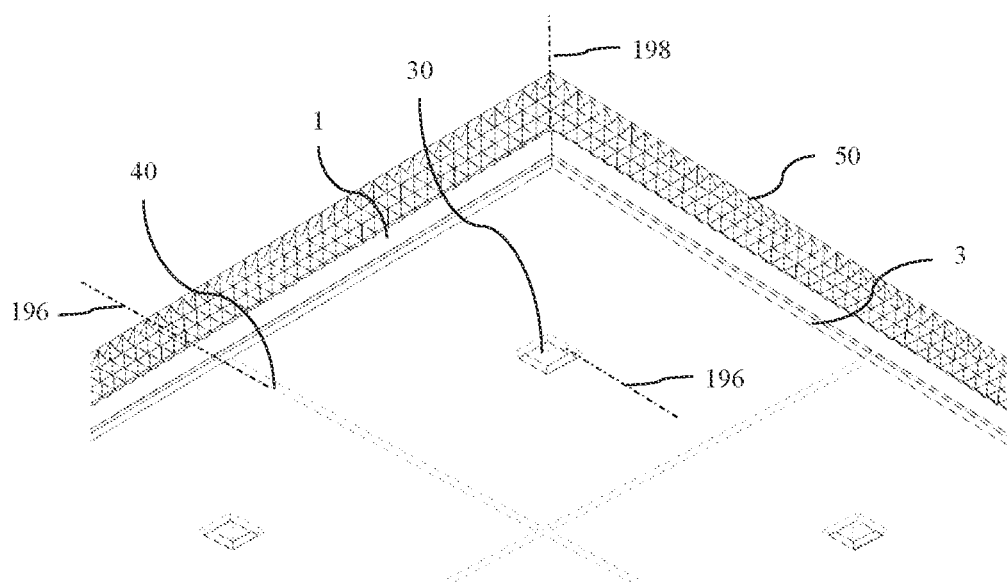
FIG. 22B is a schematic diagram illustrating in bottom perspective view a backlight arrangement comprising the alternative waveguide of FIG. 22A.
Figure 23A:
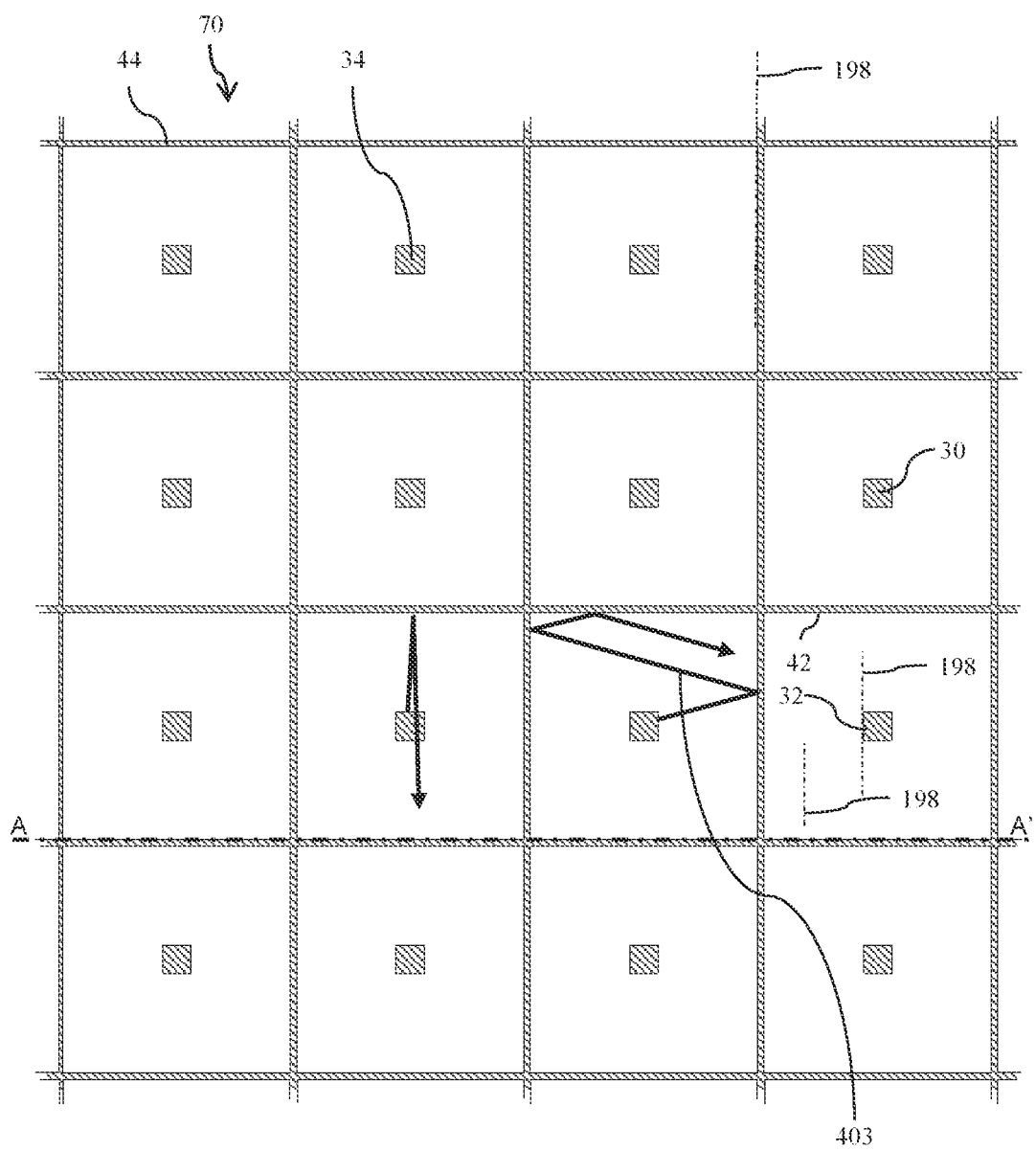
FIG. 23A is a schematic diagram illustrating in top view the arrangement of reflective ends of the light input wells and light deflecting wells for the waveguide of FIGS. 22A-B.
Figure 23B:
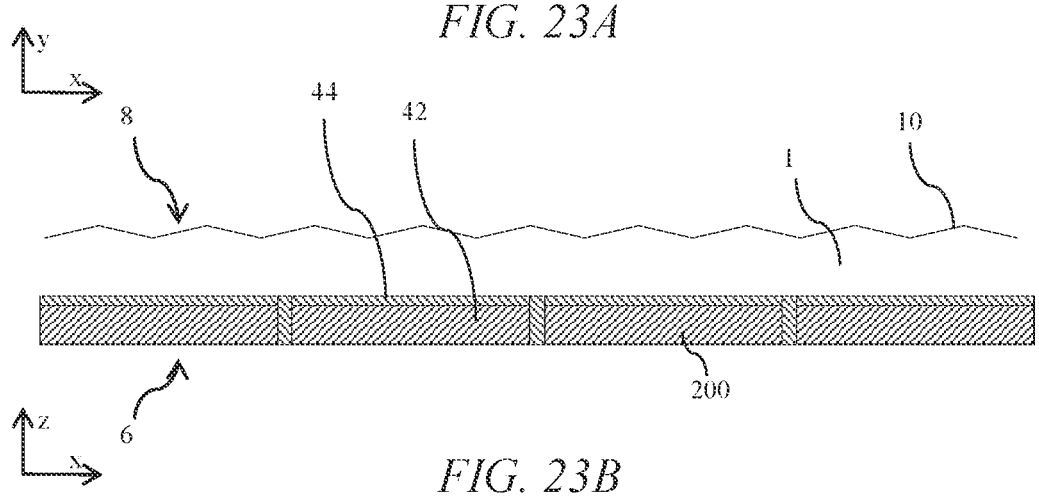
FIG. 23B is a schematic diagram illustrating in side view the arrangement of reflective ends of the light deflecting wells for the waveguide of FIGS. 22A-B.

FIG. 22A is a schematic diagram illustrating in top perspective view an illumination apparatus 20 arrangement comprising an alternative waveguide 1; FIG. 22B is a schematic diagram illustrating in bottom perspective view an illumination apparatus 20 arrangement comprising the alternative waveguide 1 of FIG. 22A; FIG. 23A is a schematic diagram illustrating in top view the arrangement of reflective ends 34, 44 of the light input wells 30 and light deflecting wells 40 respectively for the waveguide 1 of FIGS. 22A-B; and FIG. 23B is a schematic diagram illustrating in side view the arrangement of reflective ends 44 of the light deflecting wells 40 for the waveguide 1 of FIGS. 22A-B. Features of the embodiment of FIGS. 22A-B and FIGS. 23A-B not discussed in further detail may be assumed to correspond to the features with equivalent reference numerals as discussed above, including any potential variations in the features.

In comparison to FIGS. 20A-B and FIGS. 20C-D, the arrangement of the present alternative embodiment comprises light input wells 30 that have light input surfaces 32 that extend along axis 196 that is inclined at 45° to reference axis 198, where as illustrated in FIG. 4A, reference axis is determined by the alignment of the pyramidal recesses 52 of the light turning optical component 50. Thus light input well 30 input surface 32 are at angles within at most 10°, preferably at most 5°, of 0°, 90°, 180°, and 270° of light deflecting well 40 light deflecting surfaces 42. Said surfaces 32, 42 are at angles within at most 10°, preferably at most 5°, of 0°, 90°, 180°, and 270° of reference axis 198.

Further light deflecting surfaces 42 are coated with reflective coating 200 for example as illustrated in FIG. 8A. In operation, light rays 403 with highest luminous intensity are directed in directions that are close to parallel or orthogonal to the reference axis 198. As illustrated in FIGS. 11B-E advantageously are collimated close to optical axis 199.

Figure 24A:
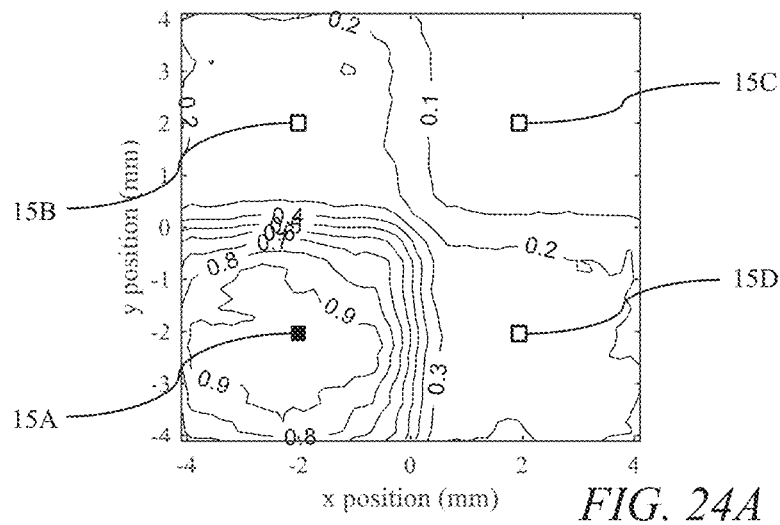
FIG. 24A is a schematic graph illustrating the variation in luminance with spatial location for a region of a backlight comprising the waveguide of FIGS. 22A-B when illuminated by a single light emitting diode.
Figure 24B:
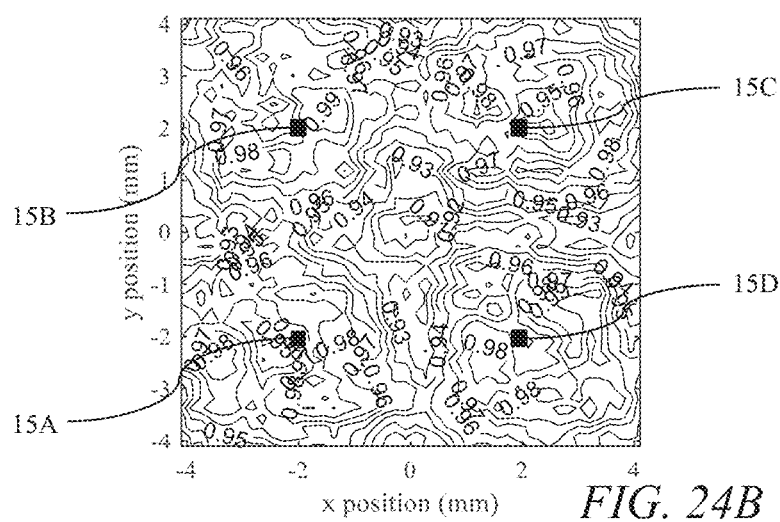
FIG. 24B is a schematic graph illustrating the variation in luminance with spatial location for a region of a backlight comprising the waveguide of FIGS. 22A-B when illuminated by all light emitting diodes.
Figure 24C:
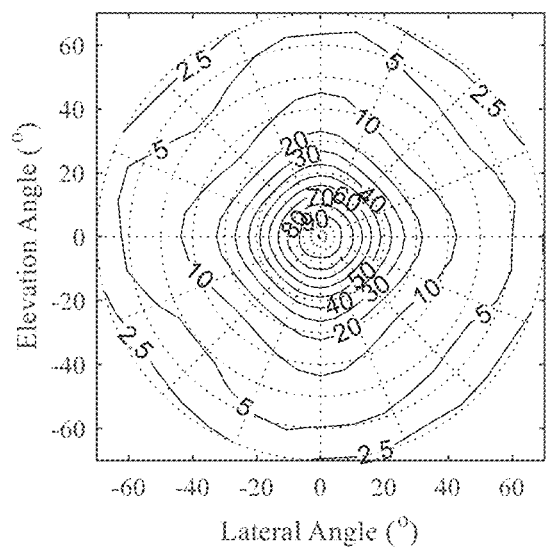
FIG. 24C is a schematic graph illustrating the variation in luminance with polar location for a backlight comprising the waveguide of FIGS. 22A-B when illuminated by a single light emitting diode.

FIG. 24A is a schematic graph illustrating the variation in luminance with spatial location for a region of an illumination apparatus 20 comprising the waveguide 1 of FIGS. 22A-B when illuminated by a single light emitting element 15; FIG. 24B is a schematic graph illustrating the variation in luminance with spatial location for a region of the illumination apparatus 20 comprising the waveguide 1 of FIGS. 22A-B when illuminated by all light emitting elements 15; and FIG. 24C is a schematic graph illustrating the variation in luminance with polar location for the illumination apparatus 20 comprising the waveguide 1 of FIGS. 22A-B when illuminated by a single light emitting element 15.

Light localization, high dynamic range operation, high uniformity and collimation is advantageously achieved.

Figure 25:
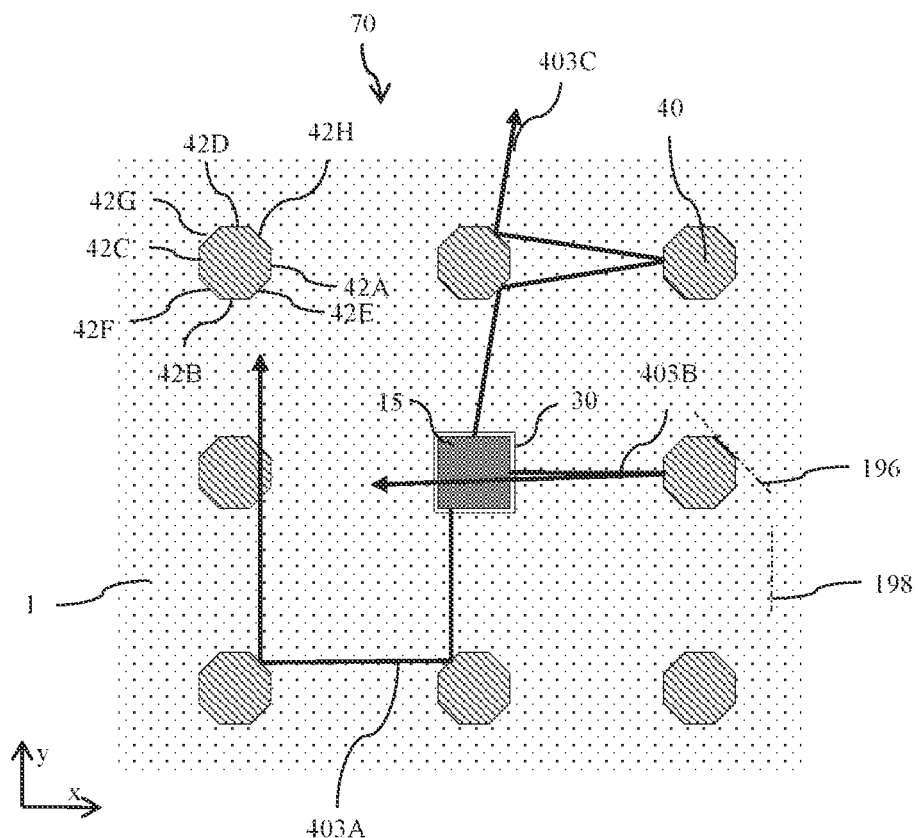
FIG. 25 is a schematic diagram illustrating in top perspective view a waveguide comprising alternative light input wells and octagonal light deflecting wells.

FIG. 25 is a schematic diagram illustrating in top perspective view a waveguide 1 comprising alternative light input wells 30 and octagonal light deflecting wells 40. Features of the embodiment of FIG. 25 not discussed in further detail may be assumed to correspond to the features with equivalent reference numerals as discussed above, including any potential variations in the features.

In comparison to the embodiment of FIG. 4E, the light deflecting surfaces 42 of the light deflecting wells 40 comprise four intermediate light deflecting faces 42E, 42F, 42G, 42H extending between the light deflecting surfaces of the first and second pairs 42A, 42C and 42B, 42D respectively. Further light deflecting surfaces 42 are coated with reflective coating 200 for example as illustrated in FIG. 8A.

In operation, light rays 403A, 403B, 403C have relatively high luminous intensity as described elsewhere herein. Light ray 403A propagates in the waveguide 1 at angles that are near to parallel or orthogonal to the reference axis 198 by reflection from faces 42G, 42H for example; light ray 403B propagates in the waveguide 1 at angles that are near to parallel or orthogonal to the reference axis 198 by reflection from faces 42C, 42A for example; and light ray 403C propagates in the waveguide 1 at angles that are near to parallel or orthogonal to the reference axis 198 by reflection from faces 42E, 42C, 42H for example. Each light ray 403A-C is maintained with a direction of propagation that achieves substantially collimated light is output after the light turning optical component 50. Light localization, high dynamic range operation, high uniformity and collimation is advantageously achieved. Further tuning of desirable uniformity and collimation may be provided by selection of relative size of the faces 42A-H.

Alternative light deflecting wells 40 will now be described.

Figure 26A:
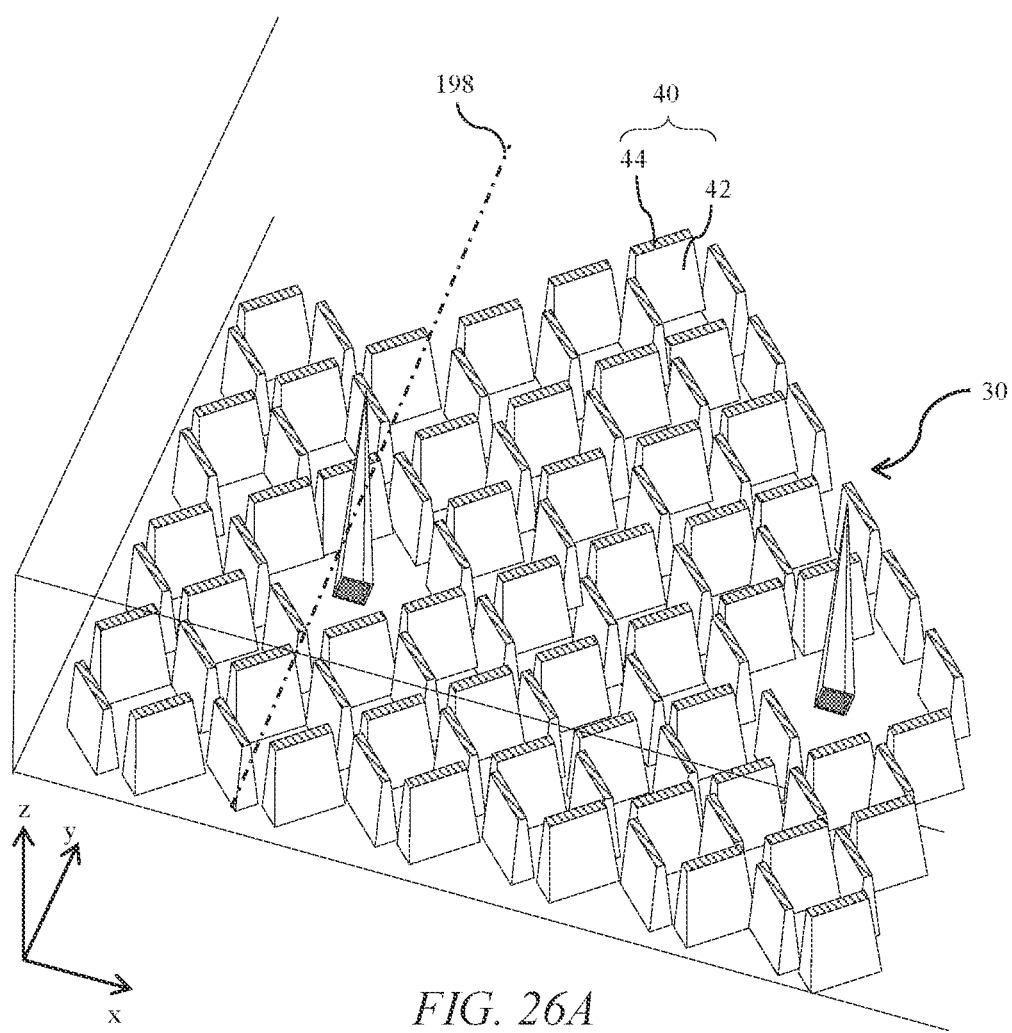
FIG. 26A is a schematic diagram illustrating in side perspective view an alternative arrangement of light input wells and light deflecting wells of a waveguide.
Figure 26B:
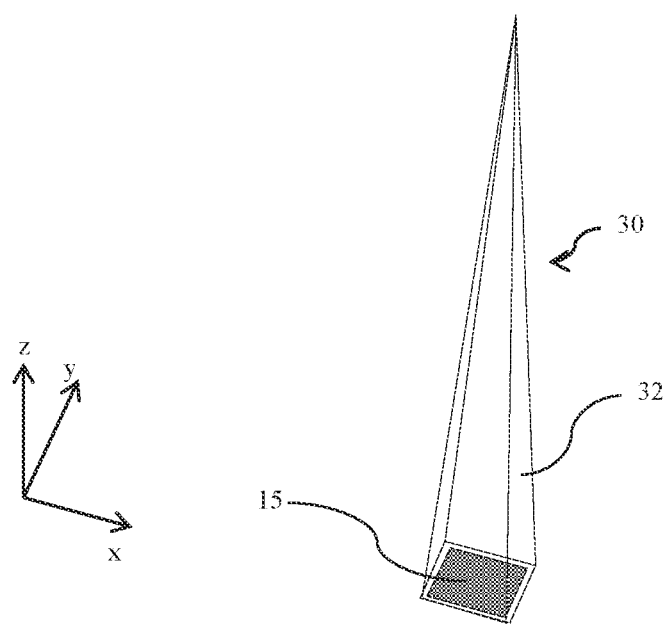
FIG. 26B is a schematic diagram illustrating in side perspective view a light input well and aligned light emitting diode of FIG. 26A.

FIG. 26A is a schematic diagram illustrating in side perspective view an alternative arrangement of light input wells 30 and light deflecting wells 40 of a waveguide 1; and FIG. 26B is a schematic diagram illustrating in side perspective view a light input well 30 and aligned light emitting element 15 of FIG. 26A. Features of the embodiments of FIGS. 26A-B not discussed in further detail may be assumed to correspond to the features with equivalent reference numerals as discussed above, including any potential variations in the features.

In comparison to the embodiments described elsewhere herein the light input well 30 may be simpler to manufacture, advantageously without a reflective end 34 being provided while achieving low visibility of hot spots around the light input well 30.

Alternative arrangements of waveguide 1 will now be described.

Figure 27:
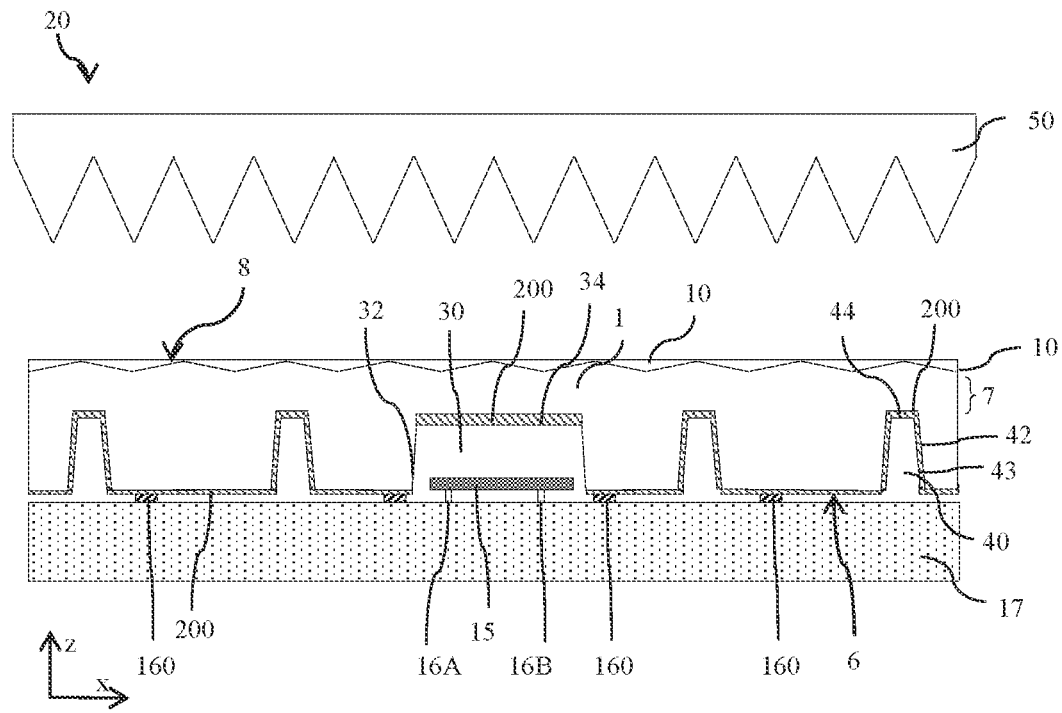
FIG. 27 is a schematic diagram illustrating in side view an alternative arrangement of waveguide and aligned light emitting diode wherein the rear light guiding surface of the waveguide is coated with a reflective coating.

FIG. 27 is a schematic diagram illustrating in side view an alternative arrangement of waveguide 1 and aligned light emitting element 15 wherein the rear light guiding surface of the waveguide 1 is coated with a reflective coating. The rear light guiding surface 6 is coated with a reflective material 200. Features of the embodiment of FIG. 27 not discussed in further detail may be assumed to correspond to the features with equivalent reference numerals as discussed above, including any potential variations in the features.

In the alternative embodiment of FIG. 27, the rear surface 6 of the waveguide 1 is coated with reflective material 200. Rear reflector 3 may be omitted, advantageously reducing cost and thickness. Further light leakage from around the light input well 30 through the rear surface 6 is reduced advantageously reducing the visibility of hot spots. Further increased numbers of seals 160 may be provided, advantageously achieving increased resilience to temperature and mechanical changes during operation and handling.

Figure 28:
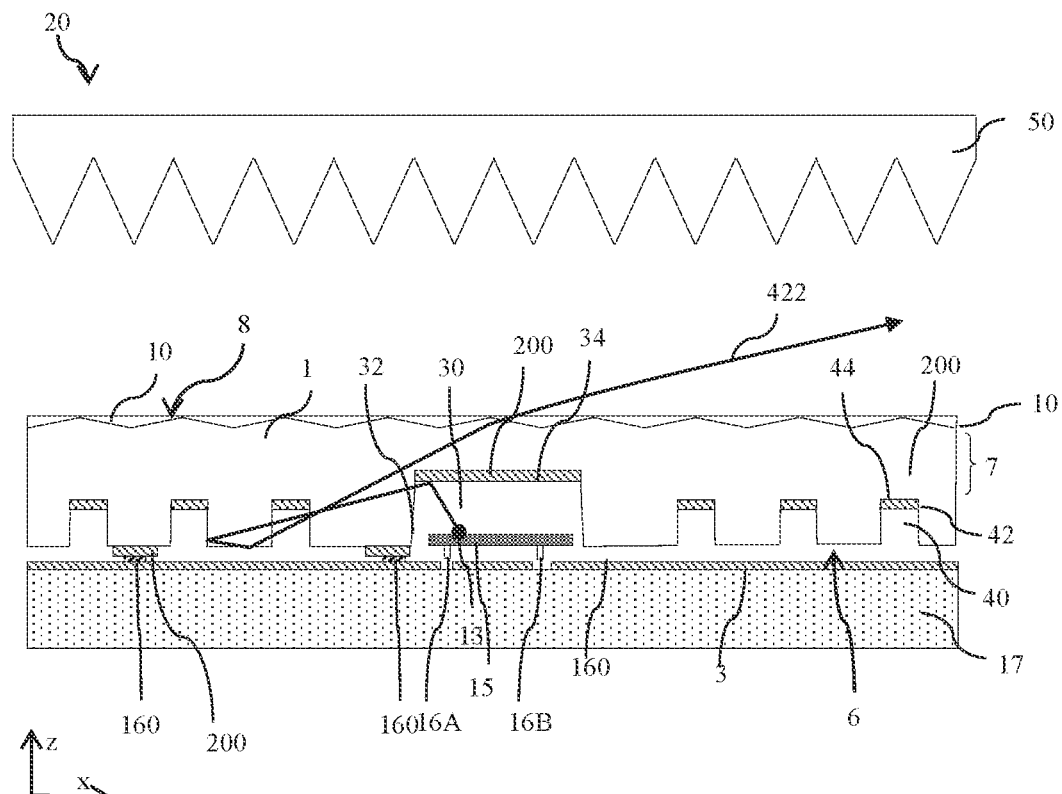
FIG. 28 is a schematic diagram illustrating in side view an alternative arrangement of waveguide and aligned light emitting diode wherein the light deflecting wells have an increased density and reduced height in comparison to the arrangement of FIG. 8A.

FIG. 28 is a schematic diagram illustrating in side view an alternative arrangement of waveguide 1 and aligned light emitting element 15 wherein the light deflecting wells 40 have an increased density and reduced height in comparison to the arrangement of FIG. 8A. Features of the embodiment of FIG. 28 not discussed in further detail may be assumed to correspond to the features with equivalent reference numerals as discussed above, including any potential variations in the features.

In the alternative embodiment of FIG. 28, regions of the rear surface 6 of the waveguide 1 are coated with reflective material 200 and seals 160 provided between the reflective material 200 and the rear reflector 3. Increased numbers of seals 160 may be provided, advantageously achieving increased resilience to temperature and mechanical changes during operation and handling. In comparison to the arrangement of FIG. 27, losses are reduced and advantageously efficiency is increased.

Considering light ray 422 some light is transmitted through sides 42 of some of the light deflecting surfaces 42 and reflected by total internal reflection at other surfaces 42 of different light deflecting wells.

Losses may advantageously be reduced and efficiency increased. Further such surfaces 42 may be more conveniently left uncoated or partially coated by reflective material 200, reducing coating cost and complexity.

FIG. 29 is a schematic diagram illustrating in side view an alternative arrangement of waveguide 1 and aligned light emitting element 15 wherein the light deflecting wells 40 do not comprise a reflective end. Features of the embodiment of FIG. 29 not discussed in further detail may be assumed to correspond to the features with equivalent reference numerals as discussed above, including any potential variations in the features.

In comparison to the embodiment of FIG. 28, the light deflecting wells 40 do not have a reflective end 44 with reflective material 200. Fabrication cost may advantageously be reduced.

In the present embodiments the density, height and arrangement of light deflecting wells 40 around the respective light input well 30 may be adjusted to modify the uniformity of light output.

Alternative locations of light extraction features 10 will now be described.

Figure 30:
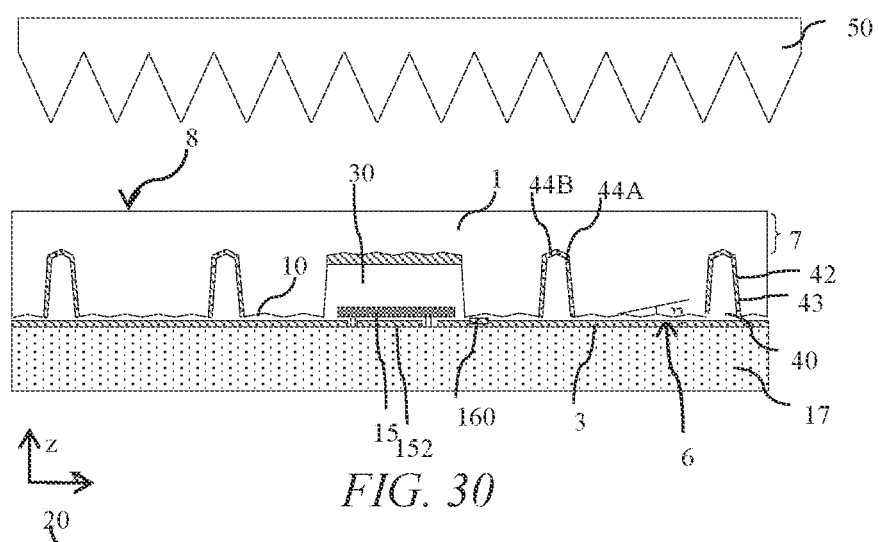
FIG. 30 is a schematic diagram illustrating in side view an alternative arrangement of waveguide and aligned light emitting diode wherein the light extracting features are arranged on the reflecting ends of the light input wells and light deflecting wells and are further arranged on the rear light guiding surface.

FIG. 30 is a schematic diagram illustrating in side view an alternative arrangement of waveguide 1 and aligned light emitting element 15 wherein the light extracting features are arranged on the reflecting ends of the light input wells 30 and light deflecting wells 40 and are further arranged on the rear light guiding surface. Features of the embodiment of FIG. 30 not discussed in further detail may be assumed to correspond to the features with equivalent reference numerals as discussed above, including any potential variations in the features.

In the embodiment of FIG. 30 the rear light guiding surface 6 comprises light extraction features 10. Further the ends 44 of the light deflecting wells 40 comprise light extraction features 44A, 44B that have a similar profile to the light extraction features 10 as described elsewhere herein, for example with reference to FIG. 4G.

In an alternative embodiment (not shown) further light extraction features 10 may be provided on at least some regions of both of the rear and front waveguide surfaces 6, 8. The output uniformity of the illumination apparatus 20 may be advantageously improved.

The operation and light paths is similar to that illustrated elsewhere herein. Fabrication cost and complexity may advantageously be reduced.

Figure 31:
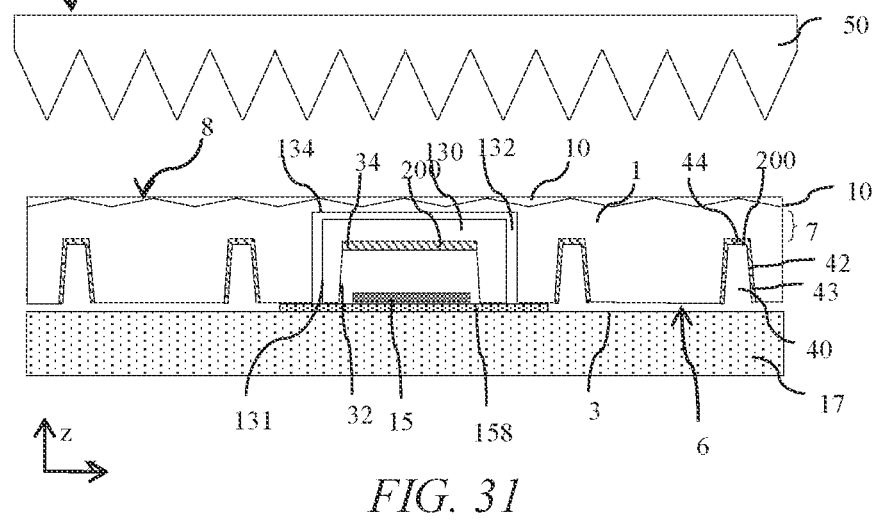
FIG. 31 is a schematic diagram illustrating in side view an alternative arrangement of backlight wherein the light input well comprises an air gap.

FIG. 31 is a schematic diagram illustrating in side view an alternative arrangement of illumination apparatus 20 wherein the light input well 30 comprises an air gap. Features of the embodiment of FIG. 31 not discussed in further detail may be assumed to correspond to the features with equivalent reference numerals as discussed above, including any potential variations in the features.

In the alternative embodiment of FIG. 31, the light emitting element 15 is arranged on a carrier 158. Light input well 30 comprises a light transmitting component 130 comprising with inner surfaces formed by light input well 30 input surface 32, light input well 30 end surface 34, reflective coating 200. The light transmitting component 130 further comprises outer surface 131 that is arranged to insert into cavity 134 in the waveguide 1. Cavity 134 may comprise a material 132 that may be a transparent material or may be air.

In assembly, light transmitting component 130 is formed with reflective coating material 200 and positioned onto carrier 158. An array of carriers is provided on substrate 17 and the waveguide 1 is aligned to the light emitting elements 15. Yield of assembly may be increased and advantageously cost may be reduced.

An illumination apparatus 20 for use with a colour conversion layer will now be described.

Figure 32A:
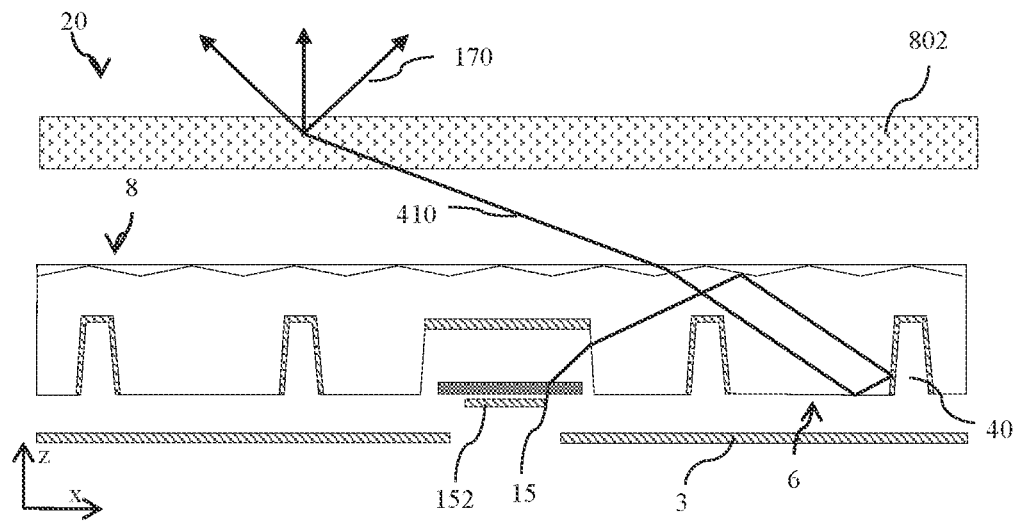
FIG. 32A is a schematic diagram illustrating in side view an alternative arrangement of backlight wherein the light turning optical component is omitted and a scattering layer is provided to receive light from the waveguide.
Figure 32B:
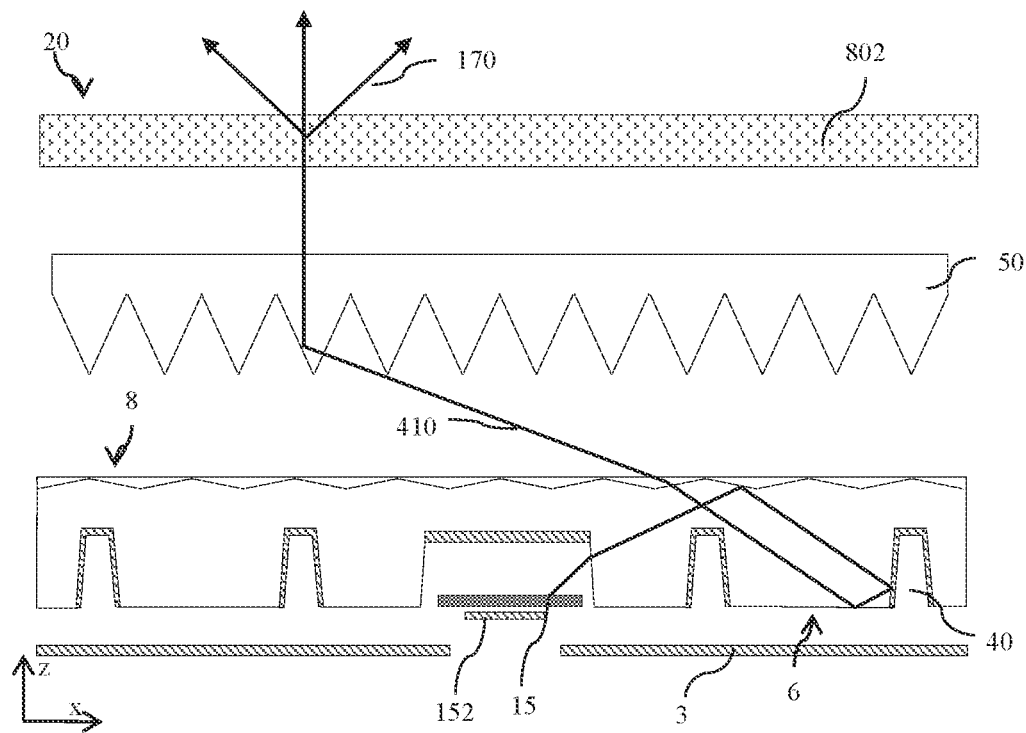
FIG. 32B is a schematic diagram illustrating in side view an alternative arrangement of backlight wherein the light turning optical component is provided to receive light from the waveguide and arranged to direct the light on to a scattering layer.
Figure 32C:
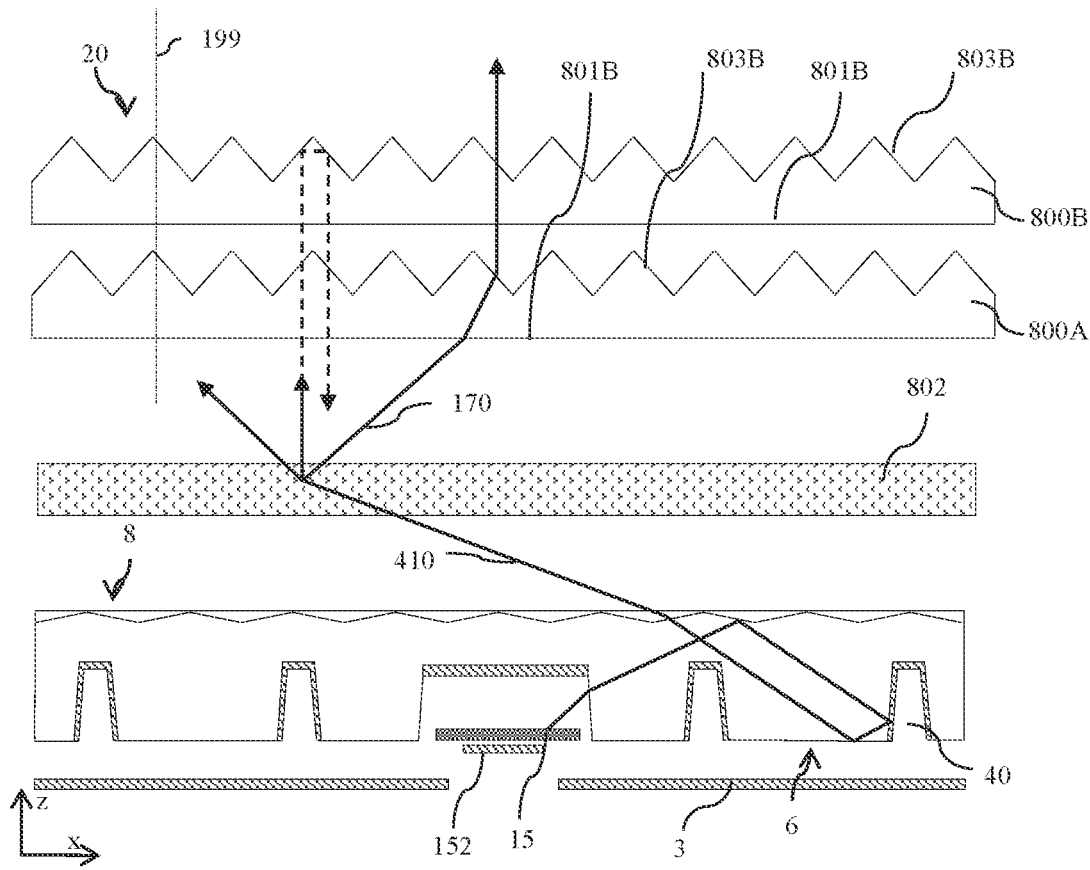
FIG. 32C is a schematic diagram illustrating in side view an alternative arrangement of backlight wherein the light turning optical component is omitted and a scattering layer is provided to receive light from the waveguide, further comprising crossed brightness enhancement films.

FIG. 32A is a schematic diagram illustrating in side view an alternative arrangement of illumination apparatus 20 wherein the light turning optical componet 50 is omitted and a scattering layer is provided to receive light from the waveguide 1; FIG. 32B is a schematic diagram illustrating in side view an alternative arrangement of backlight 20 wherein a light turning optical componet 50 is provided to receive light from the waveguide and arranged to direct the light on to a scattering layer; and FIG. 32C is a schematic diagram illustrating in side view an alternative arrangement of FIG. 32A further comprising crossed brightness enhancement films. Features of the embodiments of FIGS. 32A-C not discussed in further detail may be assumed to correspond to the features with equivalent reference numerals as discussed above, including any potential variations in the features.

In the alternative embodiment of FIG. 32A the light turning arrangement comprises a light diffusing layer 802, that is the light turning optical componet 50 is omitted. The light emitting elements 15 may be arranged to provide light output rays 410 with a single colour, such as blue or ultraviolet light or may be white light. A light diffusing layer 802 is arranged to receive light rays 410 from the waveguide 1. The light diffusing layer 802 may comprise a colour conversion material such as a phosphor or a quantum dot material and some of the light rays 410 may be converted to different spectral bands. The light diffusing layer 802 may further or alternatively comprise a diffusing surface and/or diffusing particles. The light rays 410 that are incident on the light diffusing layer 802 are provided at grazing incidence. The increased path length of the rays in the light diffusing layer advantageously achieves reduced thickness of the colour conversion material to provide a desirable colour conversion efficiency at reduced cost.

Efficient illumination of the diffusing layer with high uniformity is advantageously achieved with a thin optical structure. High dynamic range operation may be provided.

In the alternative embodiment of FIG. 32B, a light turning optical componet 50 is arranged between the waveguide 1 and light diffusing layer 802. The amount of diffusion provided by the light diffusion layer 802 may be reduced for desirable head-on luminance and back-scatter into the waveguide reduced. Advantageously efficiency may be increased.

In the alternative embodiment of FIG. 32C the light turning arrangement comprises a light diffusing layer 802 and further comprises at least one light recycling film component 800. The light recycling film components 800A, 800B each comprise a light recycling film input surface 801A, 801B extending across the light diffusing layer 802 and arranged to receive the output light from the light diffusing layer 802, and a light recycling film output surface 803A, 803B facing the light recycling film input surface 801A, 801B respectively, wherein the a light recycling film output surface 803A, 803B is prismatic and arranged to provide recirculation of the output light towards a normal 199 to a plane of the waveguide 1.

The alternative embodiment of FIG. 32C illustrates that the output light rays 170 from the light diffusing layer 802 comprising white light are incident onto crossed light recycling film components 800A, 800B such as BEF™ from 3M Corporation. Off-axis light rays 170 are directed by the light recycling film components 800A, 800B to a direction near the optical axis 199, while rays nearer the optical axis 199 are recirculated by total internal reflection in the light recycling film components 800A, 800B.

The present embodiments may achieve a high uniformity for widely dispersed light emitting element 15 in a thin package. Uniform illumination of the light diffusing layer 802 may advantageously be achieved and a high dynamic range display may be provided. Some improved gain may be provided by the crossed light recycling film components 800A, 800B; however such an output is not as collimated as embodiments comprising the light turning film as disclosed elsewhere herein.

In other embodiments (not shown) one of the light recycling film components 800A, 800B may be omitted. Luminance roll-off in one plane may be reduced, advantageously achieving increased viewing freedom in that plane.

The shape of the light input well 30 light input surface 32 will now be described.

Figure 33:
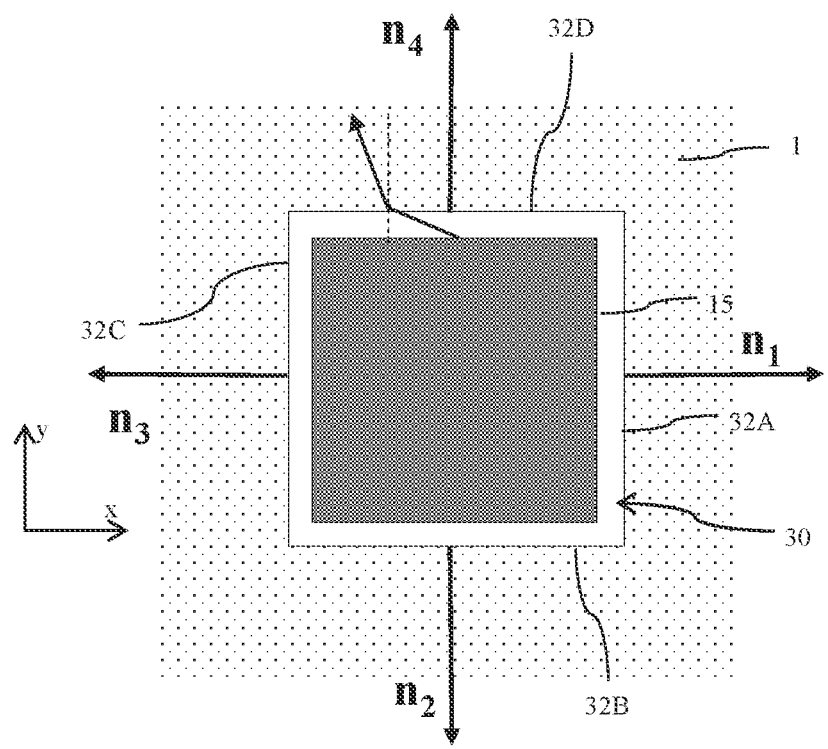
FIG. 33 is a schematic diagram illustrating in top view an arrangement of light emitting diode and emitting well comprising input surfaces with a planar profile.
Figure 34:
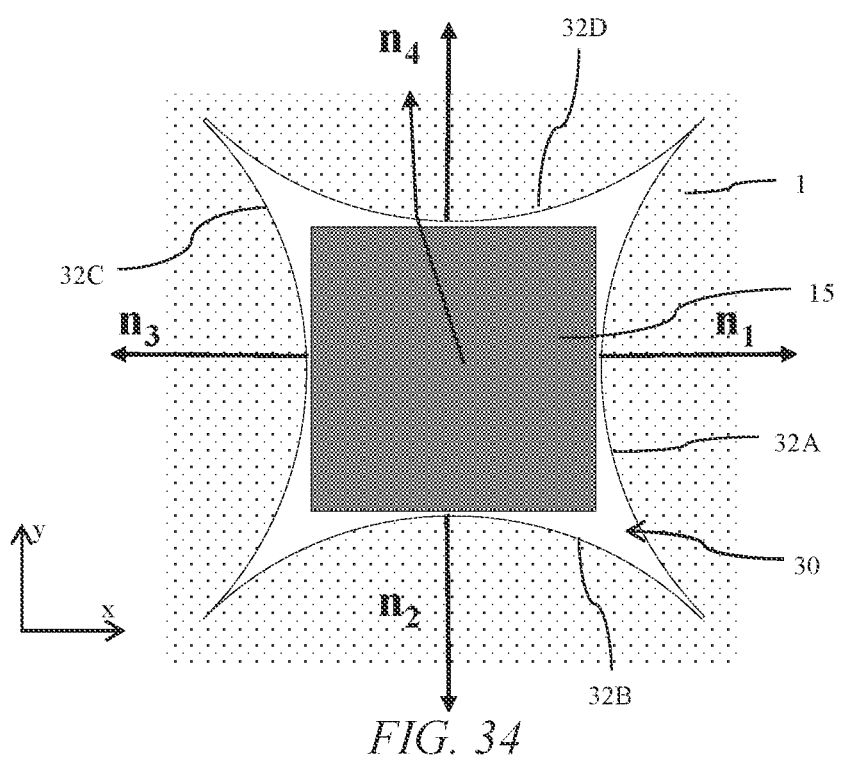
FIG. 34 is a schematic diagram illustrating in top view an arrangement of light emitting diode and emitting well comprising input surfaces with a convex profile in the material of the waveguide.

FIG. 33 is a schematic diagram illustrating in top view an arrangement of light emitting element 15 and emitting well comprising light input faces 32 with a planar profile; and FIG. 34 is a schematic diagram illustrating in top view an arrangement of light emitting element 15 and emitting well comprising light input faces 32 with a convex profile in the material of the waveguide 1. Features of the embodiments of FIGS. 33-34 not discussed in further detail may be assumed to correspond to the features with equivalent reference numerals as discussed above, including any potential variations in the features.

In the embodiment of FIG. 33 each of the light input faces 32A, 32B, 32C, 32D is planar in material of the waveguide 1 whereas in the embodiment of FIG. 34 each of the light input faces 32A, 32B, 32C, 32D is convex in material of the waveguide 1.

In the embodiment of FIG. 33 the light input surface 32 comprises four planar light input faces 32A, 32B, 32C, 32D having surface normals $n_A$, $n_B$, $n_C$, $n_D$ with components $n_1$, $n_2$, $n_3$, $n_4$ in a plane of the waveguide 1. In the embodiment of FIG. 34 the light input surface 32 comprises four convex light input faces 32A, 32B, 32C, 32D having surface normals $n_A$, $n_B$, $n_C$, $n_D$ with components $n_1$, $n_2$, $n_3$, $n_4$ in a plane of the waveguide 1 that are an average of the components of the across the respective input surfaces.

Returning to the description of FIG. 11C, which illustrates a distribution of luminous intensity of light with lateral angle in the plane of the waveguide 1, the embodiment of FIG. 34 may achieve a narrower distribution of luminous intensity in comparison to the embodiment of FIG. 33. The luminance of light near to the optical axis 199 may advantageously be increased. The efficiency of the illumination apparatus 20 may be increased.

Various arrangements of light emitting elements 15 will now be described.

Figure 35A:
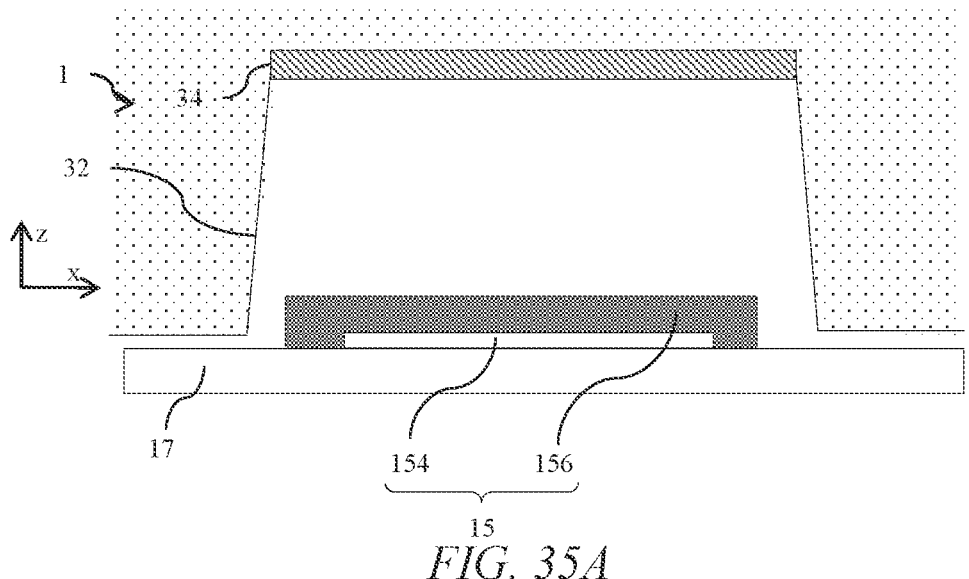
FIG. 35A is a schematic diagram illustrating in side view an arrangement of light emitting diode and colour conversion layer arranged on the light emitting diode arranged in the light input well of the waveguide.

FIG. 35A is a schematic diagram illustrating in side view an arrangement of light emitting element 15 and light diffusing layer 802 arranged on the light emitting element 15 arranged in the light input well 30 of the waveguide 1. Features of the embodiment of FIG. 35A not discussed in further detail may be assumed to correspond to the features with equivalent reference numerals as discussed above, including any potential variations in the features.

At least some of the light emitting elements 15 further comprise a colour conversion layer 156 provided on a light emitting element 15. In an illustrative embodiment, a gallium nitride light emitting diode, LED 154 may be arranged to provide blue coloured light which is incident onto colour conversion material 156 that may be a phosphor or quantum dot material for example. White light may advantageously be input into the waveguide 1.

Figure 35B:
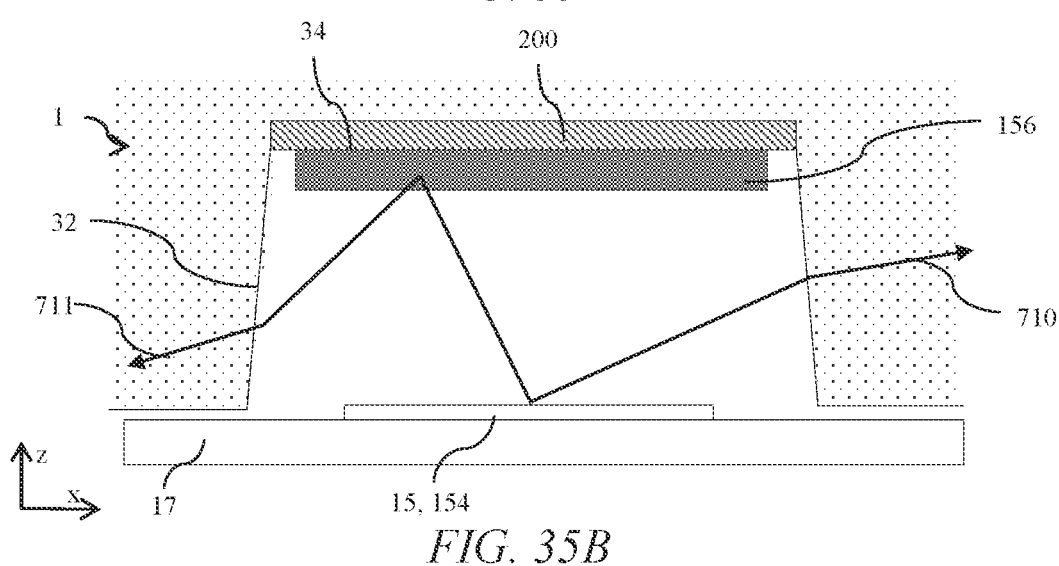
FIG. 35B is a schematic diagram illustrating in side view an arrangement of light emitting diode arranged in the light input well of a waveguide and colour conversion layer arranged on the reflective end of the light input well.

FIG. 35B is a schematic diagram illustrating in side view an arrangement of light emitting element 15 arranged in the light input well 30 of the waveguide 1 and scattering layer 156 arranged on the reflective input well end 34 of the light input well 30. Features of the embodiment of FIG. 35B not discussed in further detail may be assumed to correspond to the features with equivalent reference numerals as discussed above, including any potential variations in the features.

In the alternative embodiment of FIG. 35B the colour conversion layer 156 is provided inside the light input well 30 separated from the at least one light emitting diode 154. The colour conversion layer 156 is provided on the reflective material 200 at the reflective end 34 of the light input well 30. Some light rays 710 are output directly from the LED 154 whereas some light rays 711 are output after colour conversion and scatter at the colour conversion layer 156. The light rays 710, 711 together provide white light for input into the waveguide 1 through the input surface 32 of the light input well 30.

Heating of the colour conversion material 156 may advantageously be reduced and efficiency increased.

Figure 35C:
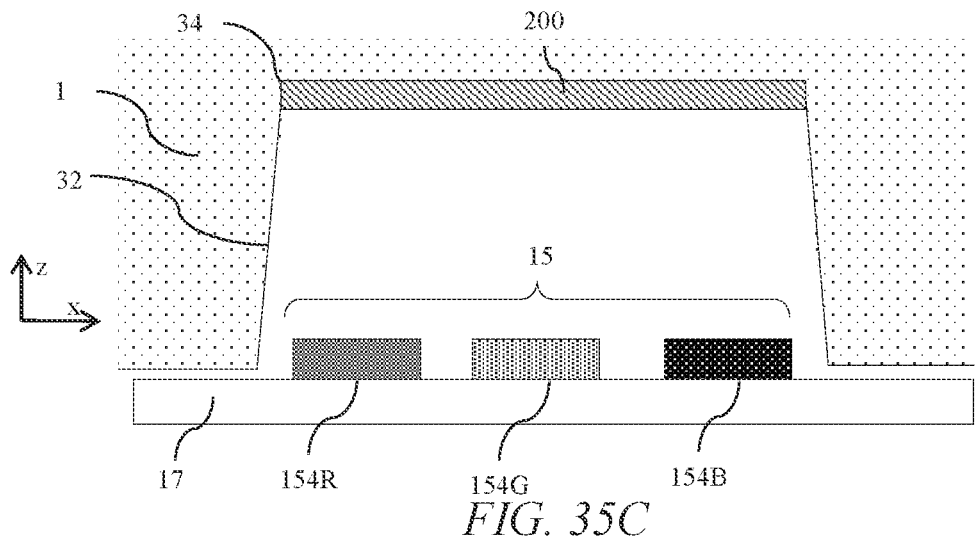
FIG. 35C is a schematic diagram illustrating in side view an arrangement of three light emitting diodes arranged in the light input well of a waveguide.

FIG. 35C is a schematic diagram illustrating in side view an arrangement of three light emitting elements 15 arranged in the light input well 30 of the waveguide 1. Each light emitting element 15 comprises plural light emitting diodes. Features of the embodiment of FIG. 35C not discussed in further detail may be assumed to correspond to the features with equivalent reference numerals as discussed above, including any potential variations in the features.

In the alternative of FIG. 35C each light emitting element 15 comprises more than one light emitting diode 154R, 154G, 154B that together may be arranged to provide white light input through the input surface 32 of the light input well 30.

Figure 35D:
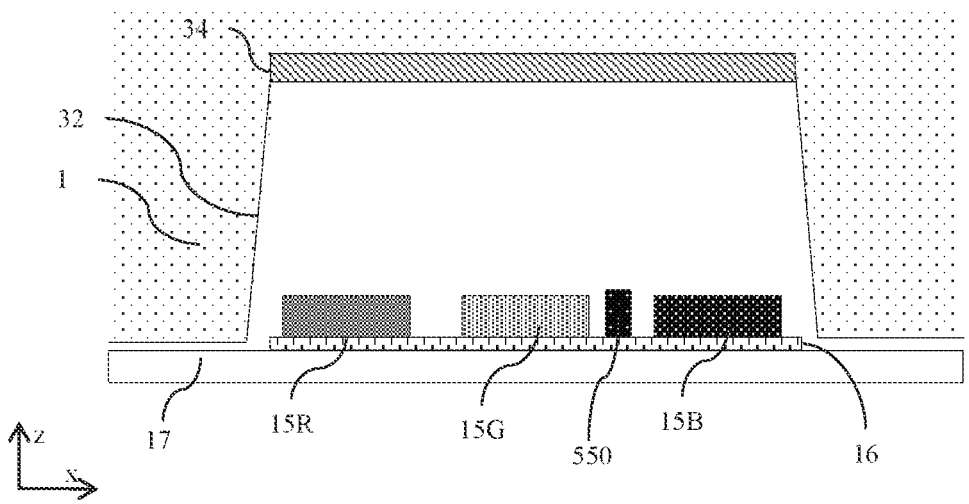
FIG. 35D is a schematic diagram illustrating in side view an arrangement of three light emitting diodes arranged on a carrier and arranged in the light input well of a waveguide.

FIG. 35D is a schematic diagram illustrating in side view an arrangement of three light emitting elements 15 arranged on a carrier 16 and arranged in the light input well 30 of the waveguide 1. Features of the embodiment of FIG. 35D not discussed in further detail may be assumed to correspond to the features with equivalent reference numerals as discussed above, including any potential variations in the features.

The carrier 16 may comprise silicon or may be an insulator. The carrier 16 may comprise active and/or passive control circuitry either added as additional components 550 to the carrier 16 in a similar way to the light emitting elements 15 or may be comprised in the carrier 16 itself. Examples of circuitry components 550 include ICs, transistors, current sources, latches or storage elements and shift resisters. In an alternative embodiment each light emitting element 15 comprises at least one light emitting diode may be provided on a semiconductor substrate 16 mounted on the support substrate 17. The semiconductor substrate 16 may comprise at least part of a drive circuit for the at least one emitting diode.

The light emitting elements 15R, 15G, 15B and optionally components 550 may be provided in a single assembly step during assembly of the backplane comprising light emitting elements 15 and substrate 17. Cost may be reduced.

Figure 35E:
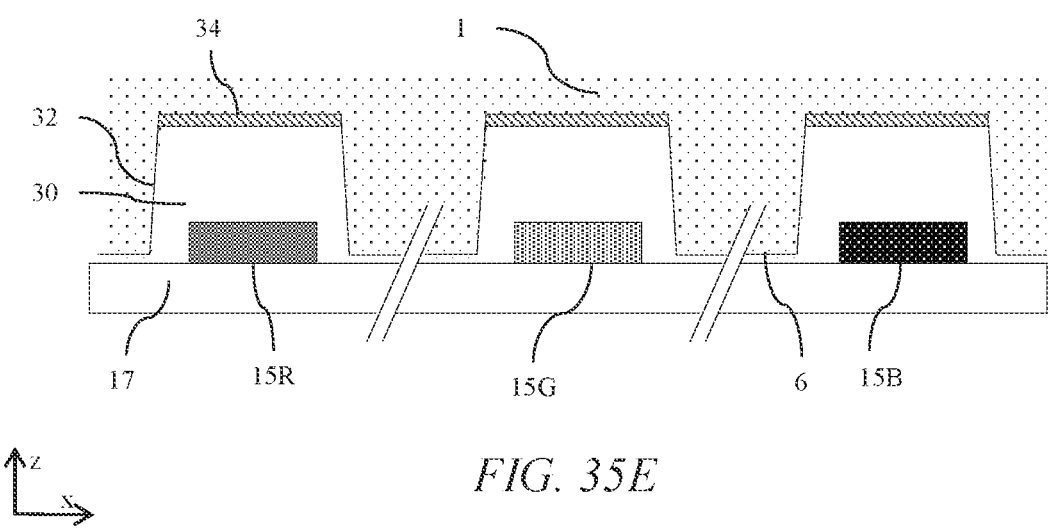
FIG. 35E is a schematic diagram illustrating in side view an arrangement of three light emitting diodes arranged in respective light input wells of a waveguide.

FIG. 35E is a schematic diagram illustrating in side view an arrangement of three light emitting elements 15 arranged in respective light input wells 30 of the waveguide 1. The plural light emitting diodes have different emission colours. Features of the embodiment of FIG. 35 not discussed in further detail may be assumed to correspond to the features with equivalent reference numerals as discussed above, including any potential variations in the features.

In the alternative embodiment of FIG. 35E each of the light emitting elements 15R, 15G, 15B may be provided in separate light input wells 30 such that the light emitting elements 15 in respect of different light input wells 30 have different colours of emission.

The size of the light input wells 30 may be reduced and the visibility of hotspots may advantageously be reduced.

Figure 35F:
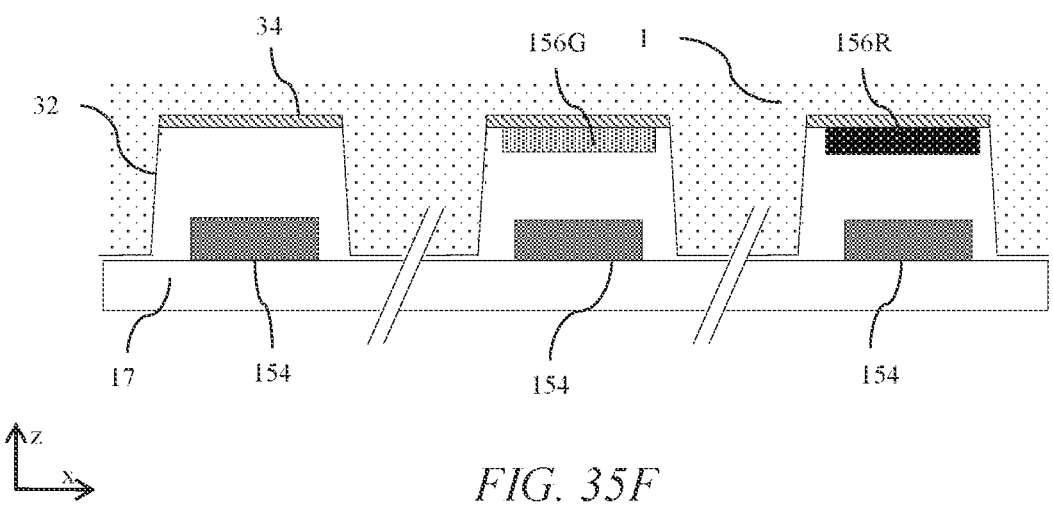
FIG. 35F is a schematic diagram illustrating in side view an arrangement of three light emitting diodes arranged in respective light input wells of a waveguide wherein some of the light input wells comprise a colour conversion layer arranged on the reflective end of the light input well.

FIG. 35F is a schematic diagram illustrating in side view an arrangement of three light emitting elements 15 arranged in respective light input wells 30 of the waveguide 1 wherein some of the light input wells 30 comprise a scattering layer 156 arranged on the reflective input well end 34 of the light input well. Features of the embodiment of FIG. 35F not discussed in further detail may be assumed to correspond to the features with equivalent reference numerals as discussed above, including any potential variations in the features.

In the alternative of FIG. 35F, each of the light input wells 30 may be provided with LEDs 154. Some of the light input wells may comprise a green light colour conversion layer 156G and other wells may be provided with a red colour conversion layer 156R. Hotspots may be reduced, and collimated white light may be provided with high dynamic range and high efficiency.

Figure 36A:
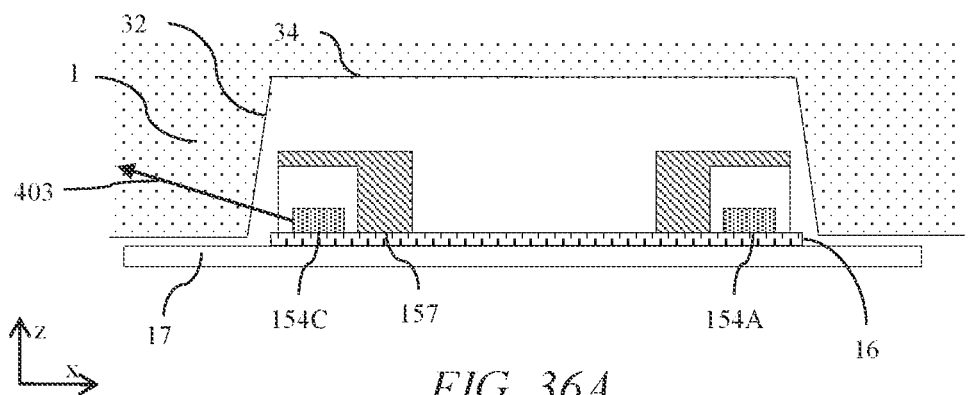
FIG. 36A is a schematic diagram illustrating in side view an arrangement of edge emitting light emitting diodes arranged in an input well of a waveguide.
Figure 36B:
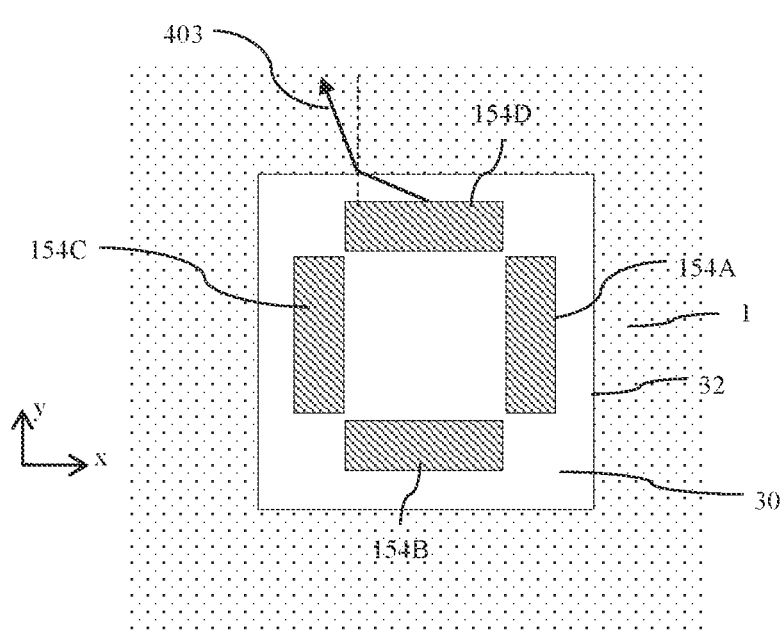
FIG. 36B is a schematic diagram illustrating in top view an arrangement of edge emitting light emitting diodes arranged in an input well of a waveguide.

FIG. 36A is a schematic diagram illustrating in side view an arrangement of edge emitting light emitting diodes arranged in an input well of the waveguide; and FIG. 36B is a schematic diagram illustrating in top view an arrangement of edge emitting light emitting diodes arranged in an input well of the waveguide. Features of the embodiments of FIGS. 36A-B not discussed in further detail may be assumed to correspond to the features with equivalent reference numerals as discussed above, including any potential variations in the features.

Each light emitting element 15 comprises four light emitting diodes 154A, 154B, 154C, 154D, each aligned with a light input face of the respective light input well 30. Carrier 16 may be arranged to provide the light emitting diodes 154A-D as an integrated unit, or the light emitting diodes 154A-D may be provided directly onto the substrate 17. Light emitting diodes 154A-D may be arranged in respective packages 157 that may be provided with electrodes and heatsink$_B$. Assembly cost may advantageously be reduced and thermal degradation reduced.

Figure 36C:
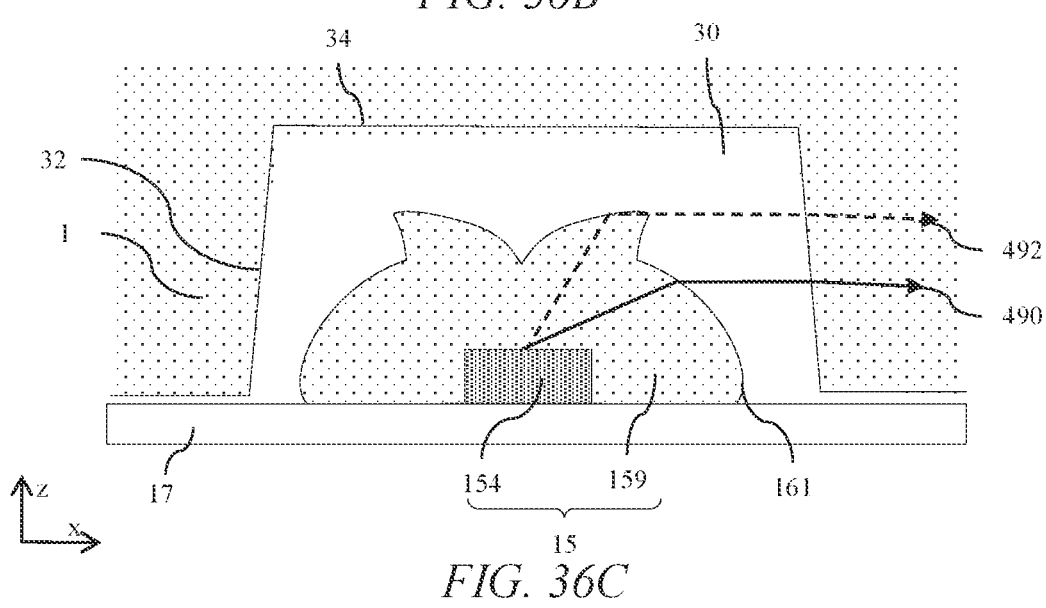
FIG. 36C is a schematic diagram illustrating in side view an arrangement of edge emitting optical element and light emitting diode arranged in an input well of a waveguide.

FIG. 36C is a schematic diagram illustrating in side view an arrangement of edge emitting optical element and light emitting diode arranged in an input well of the waveguide. Features of the embodiment of FIG. 36C not discussed in further detail may be assumed to correspond to the features with equivalent reference numerals as discussed above, including any potential variations in the features.

In the alternative embodiment of FIG. 36C, an exemplary input optical element 159 is arranged to collimate input light rays 490, 492 from the LED 154 into the plane of the waveguide 1. Light rays 490 are output by refraction at the outer surface 161 of the optical element 159 while light rays 492 are output by reflection and refraction at the outer surface 161 of the optical element 159. The brightness and efficiency of the illumination apparatus 20 advantageously may be increased.

Control of the array of light emitting elements 15 will now be described.

Figure 37:
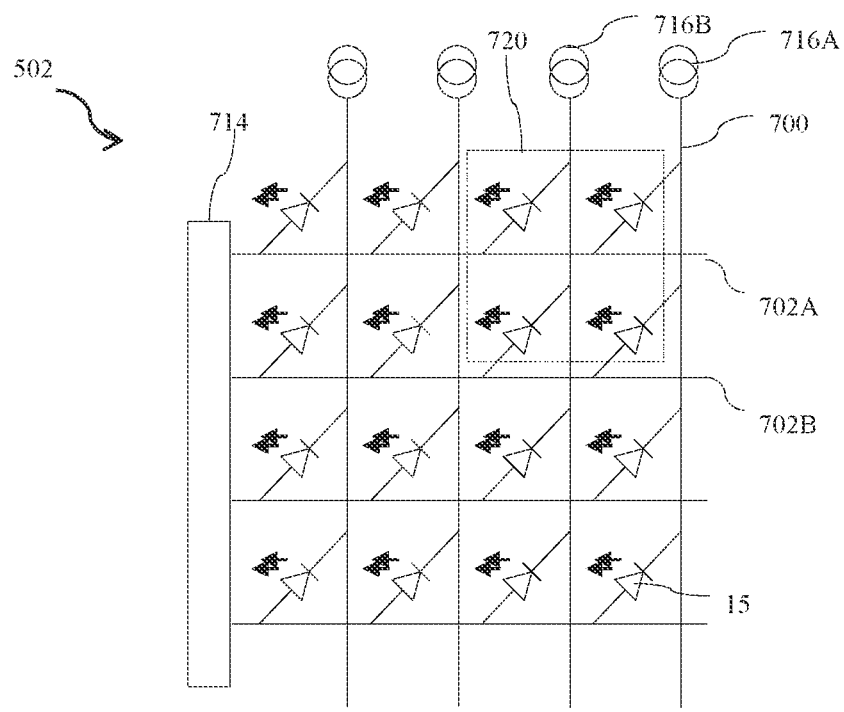
FIG. 37 and FIG. 38 are schematic circuit diagrams illustrating drive schemes for an array of light emitting diodes.
Figure 38:
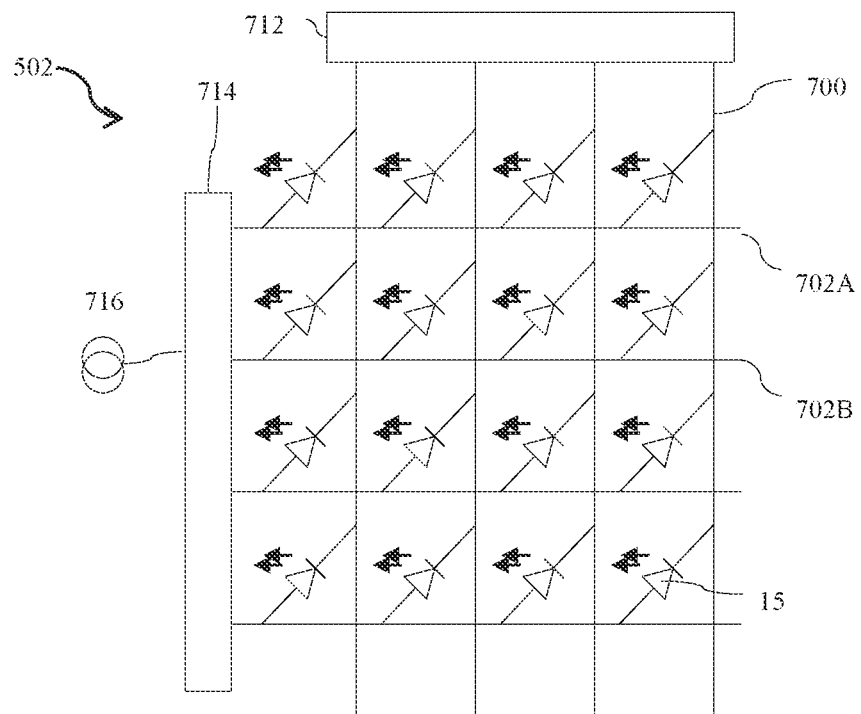

FIGS. 37-38 are schematic circuit diagrams illustrating drive schemes for the array of light emitting elements 15. Features of the embodiments of FIGS. 37-38 not discussed in further detail may be assumed to correspond to the features with equivalent reference numerals as discussed above, including any potential variations in the features.

In the illustrative embodiment of FIG. 37 the control system 500 further comprises a control system 502 arranged to control the light emitting elements 15 that may be light emitting diodes 154.

The light emitting elements 15 are connected in an XY matrix comprising row and column addressing circuitry. When the row 702A is driven high, the current sources 716A, 716B connected to column addressing electrodes 700 enable current sources to control the brightness of light emitting elements 15. Next row 702B is driven high and 702A returns to a low value. In this way the whole array of light emitting elements 15 may be sequentially addressed with image data. Alternatively, the light emitting elements 15 may be clustered together in an addressable group of 2, 4, 6 or 9 for example. As illustrated in FIG. 37, a cluster 729 of 4 light emitting elements 15 is addressed by simultaneously operating rows 702A, 702B and column drivers 716A and 716B. The drivers 716A and 716B may be a single driver connected to both of the respective columns 700 in this case. This means that by addressing clusters of light emitting elements 15, less drivers are needed saving cost. Further the same basic emitter array may be used in high resolution or lower resolution products by combing the light emitting elements 15 into different size clusters 720. An array design can be arranged with different drivers to advantageously achieve different performance products.

FIG. 38 shows an alternative configuration of row and column drive electronics, where the current sources 716 are connected to the row drive electronics 714 rather than column drive electronics 712. The row drive electronics 714 may multiplex one current source 716 for multiple row electrodes 702A, 702B saving cost.

In the illustrative embodiment of FIG. 38 the control system 500 further comprises a control system 502 arranged to control clusters of light emitting elements 15 in common.

The row drive electronics 714 and column drive electronics 712 may be comprised in a drive IC that is mounted within or below the array of light emitting elements 15. Such an IC may address a subset of the total number of light emitting elements 15. Multiple drive ICs may cooperate in order to address the entire emitting array. A drive IC may also comprise a pulse width modulation (PWM) circuit and may be located close to a group of light emitting elements 15. This drive IC can address a local group of light emitting elements 15, and the drive ICs themselves may be addressed or controlled from a controller peripheral to the array.

Alternative arrangements of near eye displays 100 to that illustrated in FIG. 1B will now be described.

Figure 39A:
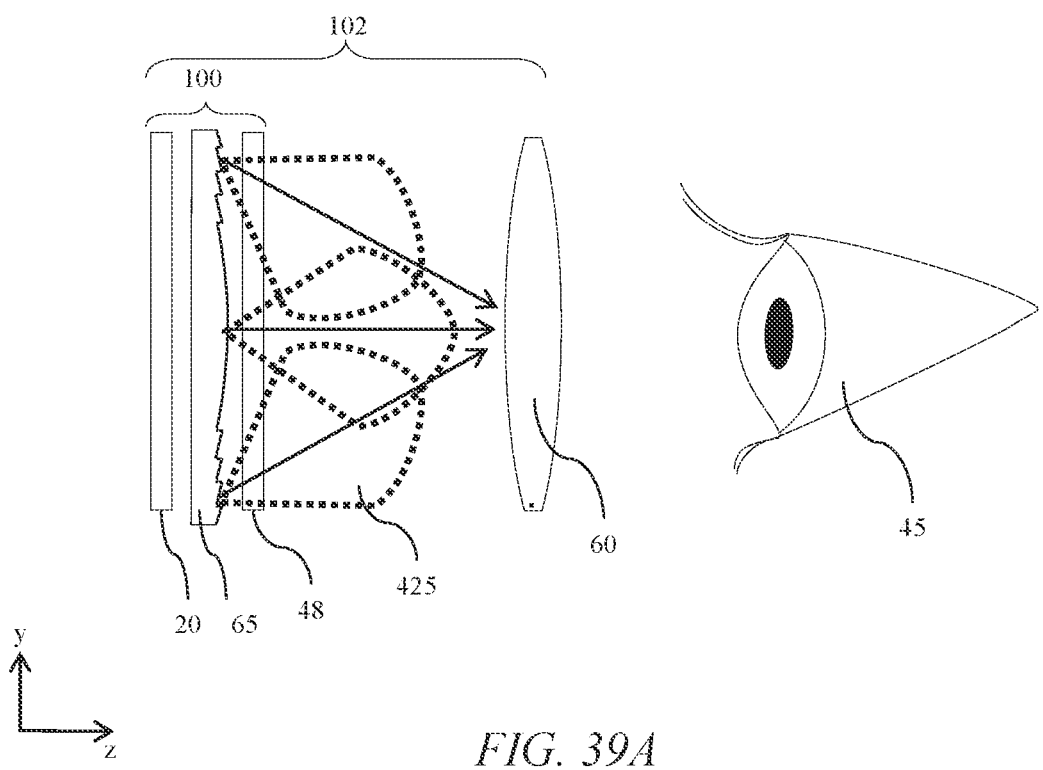
FIG. 39A is a schematic diagram illustrating in side view a near eye display apparatus comprising an illumination apparatus and a Fresnel lens arranged to direct light into the aperture of an eyepiece lens.

FIG. 39A is a schematic diagram illustrating in side view a near eye display apparatus 102 comprising illumination apparatus 20 and a Fresnel lens 65 arranged to direct light cones 425 into the aperture of an eyepiece lens 60 from across the spatial light modulator 48. Features of the embodiment of FIG. 39A not discussed in further detail may be assumed to correspond to the features with equivalent reference numerals as discussed above, including any potential variations in the features.

Illumination apparatus 20 may comprise a non-pupillated light turning optical componet 50 to provide light cones 425 from the illumination apparatus 20 that are substantially parallel. Fresnel lens 65 directs light cones 425 into the aperture of the eyepiece lens 60. Light cones 425 are coupled into the eyepiece lens 60, advantageously increasing uniformity and efficiency.

Figure 39B:
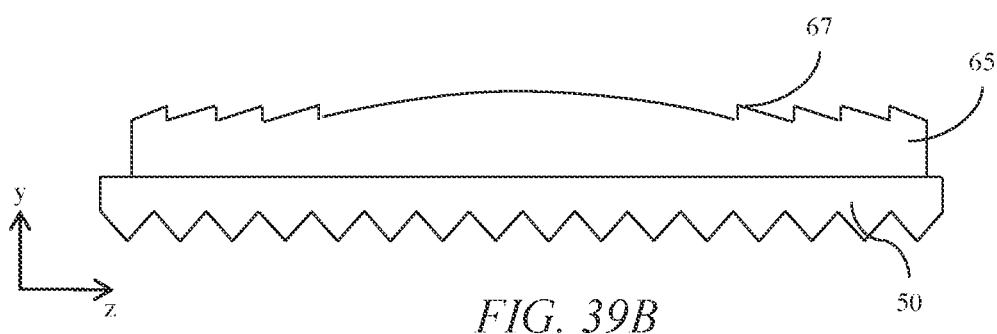
FIG. 39B is a schematic diagram illustrating in side view a light turning optical component for use in the near eye display apparatus of FIG. 39A.

FIG. 39B is a schematic diagram illustrating in side view a light turning optical component for use in the near eye display apparatus of FIG. 39. Features of the embodiment of FIG. 39B not discussed in further detail may be assumed to correspond to the features with equivalent reference numerals as discussed above, including any potential variations in the features.

An integrated body comprising light turning optical componet 50 and Fresnel lens 65 is advantageously provided with low thickness.

Figure 40:
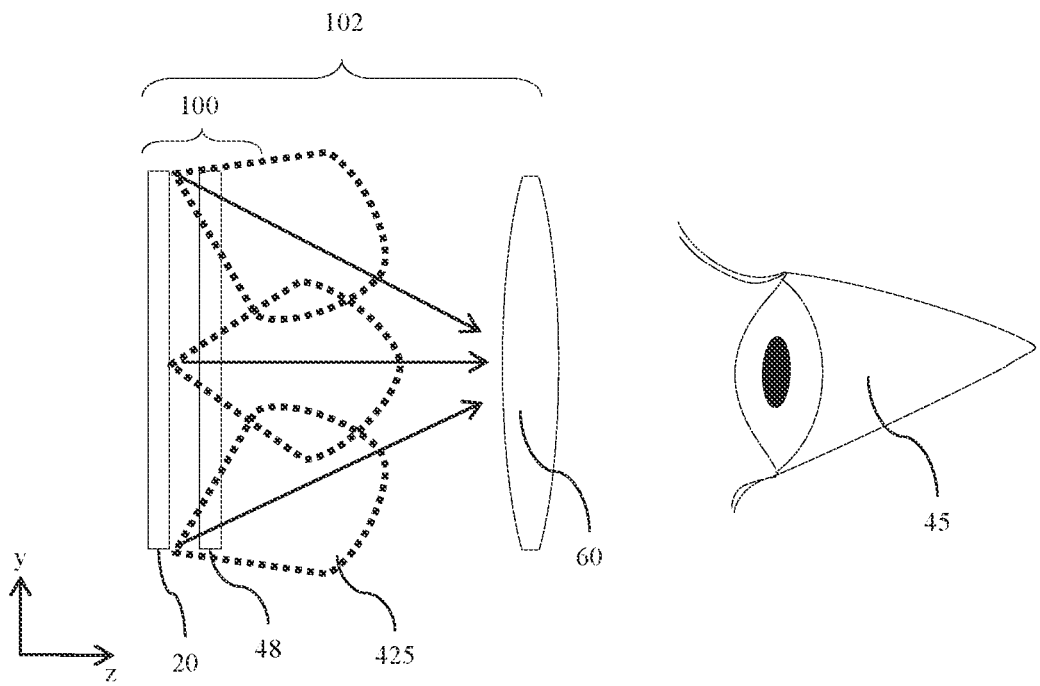
FIG. 40 is a schematic diagram illustrating in side view a near eye display apparatus comprising a pupillated illumination apparatus arranged to direct light into the aperture of an eyepiece lens.

FIG. 40 is a schematic diagram illustrating in side view a near eye display apparatus comprising a pupillated illumination apparatus arranged to direct light into the aperture of an eyepiece lens. Features of the embodiment of FIG. 40 not discussed in further detail may be assumed to correspond to the features with equivalent reference numerals as discussed above, including any potential variations in the features.

In comparison to the arrangement of FIG. 39A, illumination apparatus 20 may comprise a pupillated light turning optical componet 50 such as illustrated in FIGS. 10G-I described hereinabove. Advantageously cost and complexity is reduced. Further the appearance Moire in the illumination pattern may be reduced. Screen door appearance arising from visibility of the illumination apparatus 20 may also be reduced.

Figure 41:
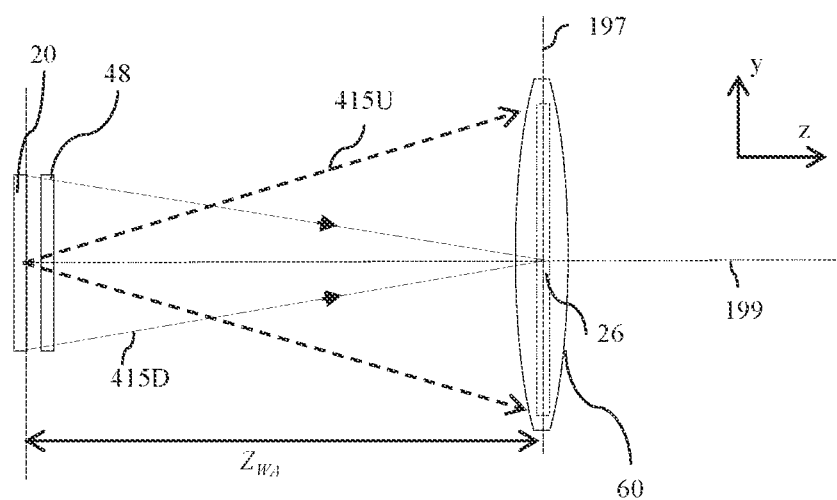
FIG. 41 is a schematic diagram illustrating in side view the imaging of an optical window into the entrance aperture of an eyepiece lens.

FIG. 41 is a schematic diagram illustrating in side view the imaging of an optical window into the entrance aperture of an eyepiece lens. Features of the embodiment of FIG. 41 not discussed in further detail may be assumed to correspond to the features with equivalent reference numerals as discussed above, including any potential variations in the features.

FIG. 41 illustrates that the optical window 26, such as illustrated in FIG. 10D may be directed towards the eyepiece lens 60. The size of the optical window 26 may be arranged to match the input aperture of the eyepiece arrangement 60 that may be a lens. Efficiency and uniformity of illumination is advantageously increased. Stray light in the near eye display apparatus 102 is reduced and contrast advantageously increased.

Methods to manufacture the waveguide 1 wherein a metal material 200 is deposited within the wells 30, 40 will now be described.

Figure 42A:
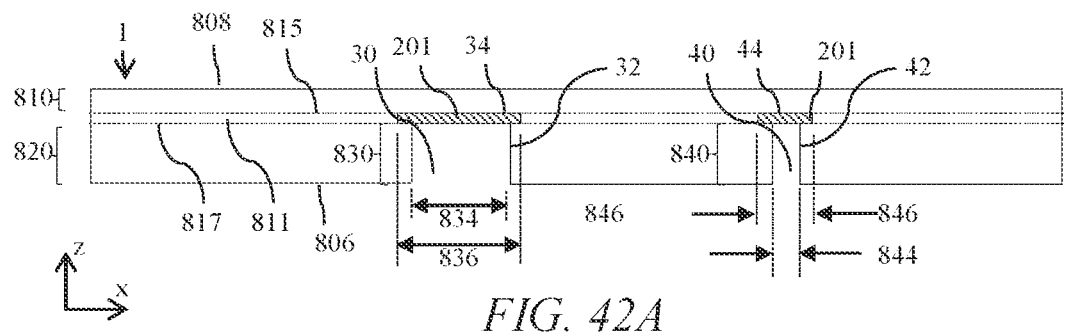
FIG. 42A is a schematic diagram illustrating in side view an arrangement of a waveguide comprising light input wells and light deflecting wells with metal arranged at the ends of the light input wells and light deflecting wells.

FIG. 42A is a schematic diagram illustrating in side view an arrangement of a waveguide 1 comprising light input wells 30 and light deflecting wells 40 with metal 201 arranged on the ends 34, 44 of the wells 30, 40. Features of the embodiment of FIG. 42A not discussed in further detail may be assumed to correspond to the features with equivalent reference numerals as discussed above, including any potential variations in the features.

FIG. 42A illustrates a waveguide 1 that may be manufactured with the methods described hereinbelow. The waveguide 1 has a plurality of wells 30, 40 having ends 34, 44 with metal 201 formed thereon.

As described elsewhere herein, the plurality of wells 30, 40 comprises: an array of light input wells 30; and an array of light deflecting wells 40, wherein each light input well 30 comprises a light input surface 32 extending into the waveguide 1 that is arranged to input light (not shown) from a respective light emitting element 15 into the waveguide 1, and each light deflecting well 40 comprises a light deflecting surface 42 extending into the waveguide so that some guided light is incident thereon and some guided light passes over the light deflecting surface 42, the light deflecting surface 42 being arranged to reflect at least some of the guided light that is incident thereon, and the light deflecting wells 40 having an arrangement around each light input well 30 that causes guided light that has been input through the light input surface 32 of the light input well 30 to be distributed around the light input well 30.

Continuous layer 810 comprises outer surface 808 and interface surface 815.

Well layer 820 comprises outer surface 806 and interface surface 817 and a plurality of apertures 830, 840 extending therethrough. Interface region 811 comprises patterned metal 201 and in regions not comprising metal 201 is arranged between the surfaces 815, 817 to provide light propagation within the waveguide 1 substantially without loss. Interface region 811 may be thin and may have a thickness of less than 100 micrometres, preferably less than 30 micrometres and most preferably less than 15 micrometres. Interface region 811 may have zero thickness in the case of direct bonding of the materials of the well layer 820 and continuous layer 810. Advantageously visibility of hot spots may be reduced.

Desirably the width 836 of the metal 201 is the same or larger than the width 834 of the aperture 830 in the well layer 820. Advantageously, in operation the visibility of hot spots is reduced.

For illustrative purposes the light extraction features 10 of the waveguide 1 are not shown in the present manufacturing method embodiments. Such light extraction features 10 may be formed by replication onto one or each of the surfaces 806, 808 of the waveguide 1 after the manufacturing steps herein or may be moulded into or onto the surface 806 of the well layer 820 or the surface 808 of the continuous layer 810 prior to or during the manufacturing steps.

Figure 42B:
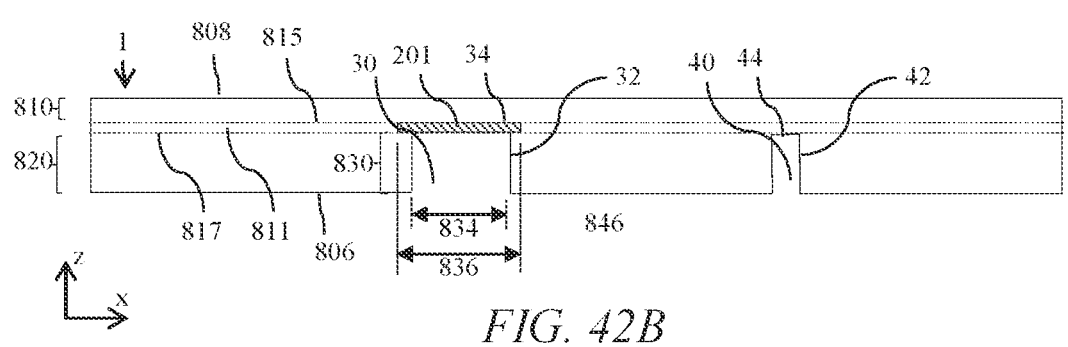
FIG. 42B is a schematic diagram illustrating in side view an arrangement of a waveguide comprising light input wells and light deflecting wells with metal arranged at the ends of the light input wells and no metal arranged at the ends of the light deflecting wells.

FIG. 42B is a schematic diagram illustrating in side view an arrangement of a waveguide 1 comprising light input wells 30 and light deflecting wells 40 with metal 201 arranged at the ends 34 of the light input wells 30 and no metal 201 arranged at the ends of the light deflecting wells 40. Features of the embodiment of FIG. 42B not discussed in further detail may be assumed to correspond to the features with equivalent reference numerals as discussed above, including any potential variations in the features.

The light deflecting wells 40 are unmetallised and the cost and complexity of the fabrication is advantageously reduced. The height of the light input wells 30 and light deflecting wells 40 is the same. The well layer 820 may advantageously be provided with reduced complexity and cost as will be described with reference to FIG. 43A hereinbelow.

Figure 42C:
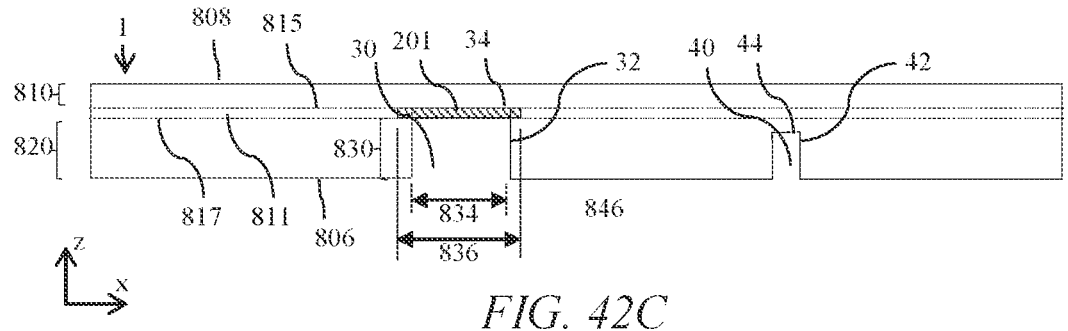
FIG. 42C is a schematic diagram illustrating in side view an arrangement of a waveguide comprising light input wells and light deflecting wells with metal arranged at the ends of the light input wells and no metal arranged at the ends of the light deflecting wells wherein the light deflecting wells have a different height to the light input wells.

FIG. 42C is a schematic diagram illustrating in side view an arrangement of a waveguide 1 comprising light input wells 30 and light deflecting wells 40 with metal 201 arranged at the ends of the light input wells 30 and no metal 201 arranged at the ends of the light deflecting wells 40. Features of the embodiment of FIG. 42C not discussed in further detail may be assumed to correspond to the features with equivalent reference numerals as discussed above, including any potential variations in the features.

In the alternative embodiment of FIG. 42C, the metal 201 may be provided with the pattern 70 of the light input wells 30 but not with the pattern 70 of the light deflecting wells 40. The complexity of the pattern 70 of metal 201 may be reduced, advantageously reducing cost. Further the depth of the light deflecting wells 40 may be arranged to vary, achieving control of the output illumination profile. Advantageously uniformity may be increased.

In the methods described hereinbelow, metal 201 is illustrated as arranged with the same pattern 70 as the light input wells 30 and light deflecting wells 40, however the metal 201 for the light deflecting wells in regions 846 may be omitted.

Figure 43A:
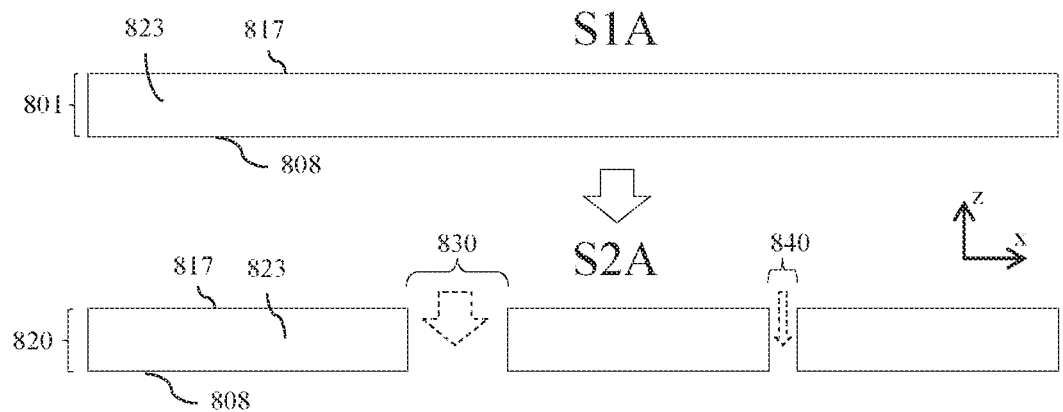
FIG. 43A is a schematic diagram illustrating in side view a method to provide a first arrangement of holes in a waveguide layer.

FIG. 43A is a schematic diagram illustrating in side view a method to provide an arrangement 820 of holes 830, 840 in a well layer 820. Features of the embodiment of FIG. 43A not discussed in further detail may be assumed to correspond to the features with equivalent reference numerals as discussed above, including any potential variations in the features.

In a first step S1A a continuous pre-layer 801 is provided with surfaces 808, 817. Pre-layer 801 may comprise a transparent material 823 suitable for the waveguide 1 such as polycarbonate, PMMA, COP or glass for example. Advantageously the surface 808 may be provided with desirable surface characteristics, such as light extraction features 10 (not shown).

The method further comprises the step S2A of forming the well layer 820 having the plurality of apertures 830, 840 extending therethrough by forming the apertures 830, 840 in the continuous pre-layer 801 to form the well layer 820. The apertures 830, 840 may be formed for example by laser processing such as laser ablation or by punching with a patterned stamper. Apertures 830, 840 may be provided in the pre-layer using a roll processing type process, advantageously reducing cost and complexity.

Figure 43B:
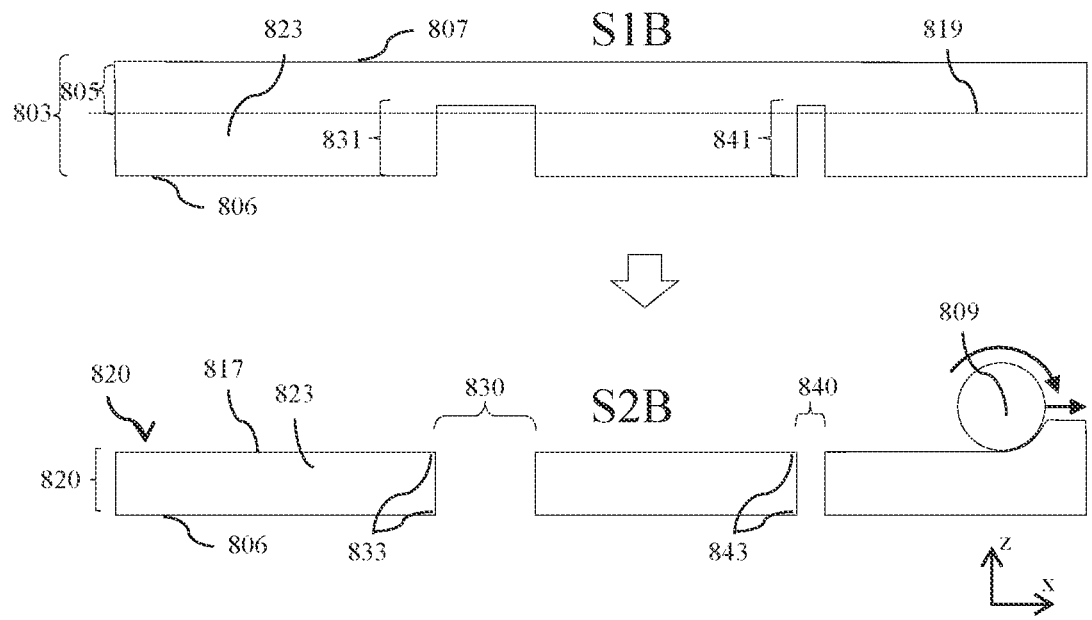
FIG. 43B is a schematic diagram illustrating in side view an alternative method to provide a first arrangement of light input apertures and light deflecting apertures in a well layer.

FIG. 43B is a schematic diagram illustrating in side view an alternative method to provide an arrangement 820 of holes 830, 840 in a well layer 820. Features of the embodiment of FIG. 43B not discussed in further detail may be assumed to correspond to the features with equivalent reference numerals as discussed above, including any potential variations in the features.

In an alternative first step SIB of forming the well layer 820 having the plurality of apertures 830, 840 extending therethrough is provided by: moulding a pre-layer 803 with a plurality of wells 831, 841 formed therein on a first side 806 of the pre-layer 803. Advantageously the surface quality of the light input surface 32 and light deflecting surface 42 may achieve low scatter and low visibility of hot spots in operation.

In the alternative second step S2B, the part 805 of the pre-layer 801 is removed from a second side 807 opposite to the first side 806 beyond a level 819 of an end of the wells 831, 841 to form the well layer 820 in which the wells 831, 841 form the apertures 830, 840. The step S2B of removal may be by means of grinding and/or polishing by removal apparatus 809 for example. In a further step (not shown) the surface 806 may also be polished.

The corner features 833, 843 of the apertures 830, 840 may be provided with high fidelity. Advantageously light input efficiency may be increased and visibility of hot spots reduced in operation.

Figure 43C:
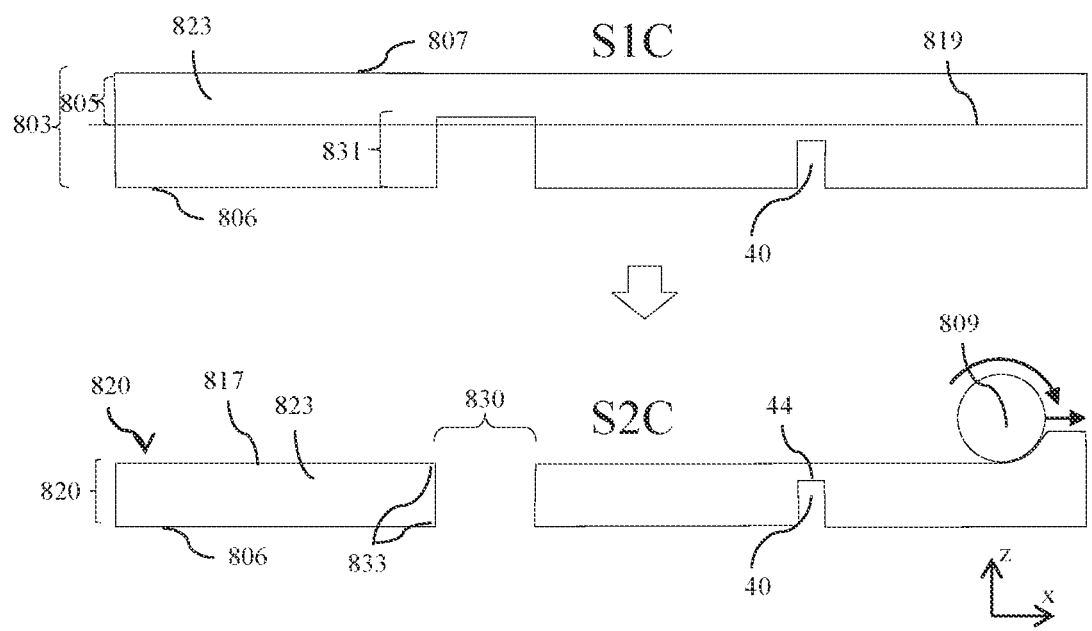
FIG. 43C is a schematic diagram illustrating in side view an alternative method to provide a first arrangement of light input apertures and light deflecting wells in a well layer.

FIG. 43C is a schematic diagram illustrating in side view an alternative method to provide a first arrangement of light input apertures 830 and light deflecting wells 40 in a well layer 820. Features of the embodiment of FIG. 43C not discussed in further detail may be assumed to correspond to the features with equivalent reference numerals as discussed above, including any potential variations in the features.

In the alternative embodiment of FIG. 43C, in the step SIC, the light deflecting wells 40 are formed to not extend within the pre-layer 803 to the level 819 and are thus in the step S2C do not extend through the well layer 820, such as illustrated in FIG. 42C. Advantageously improved control of output uniformity may be achieved and cost and complexity of providing the pattern 70 of the metal 201 reduced.

Figure 44A:
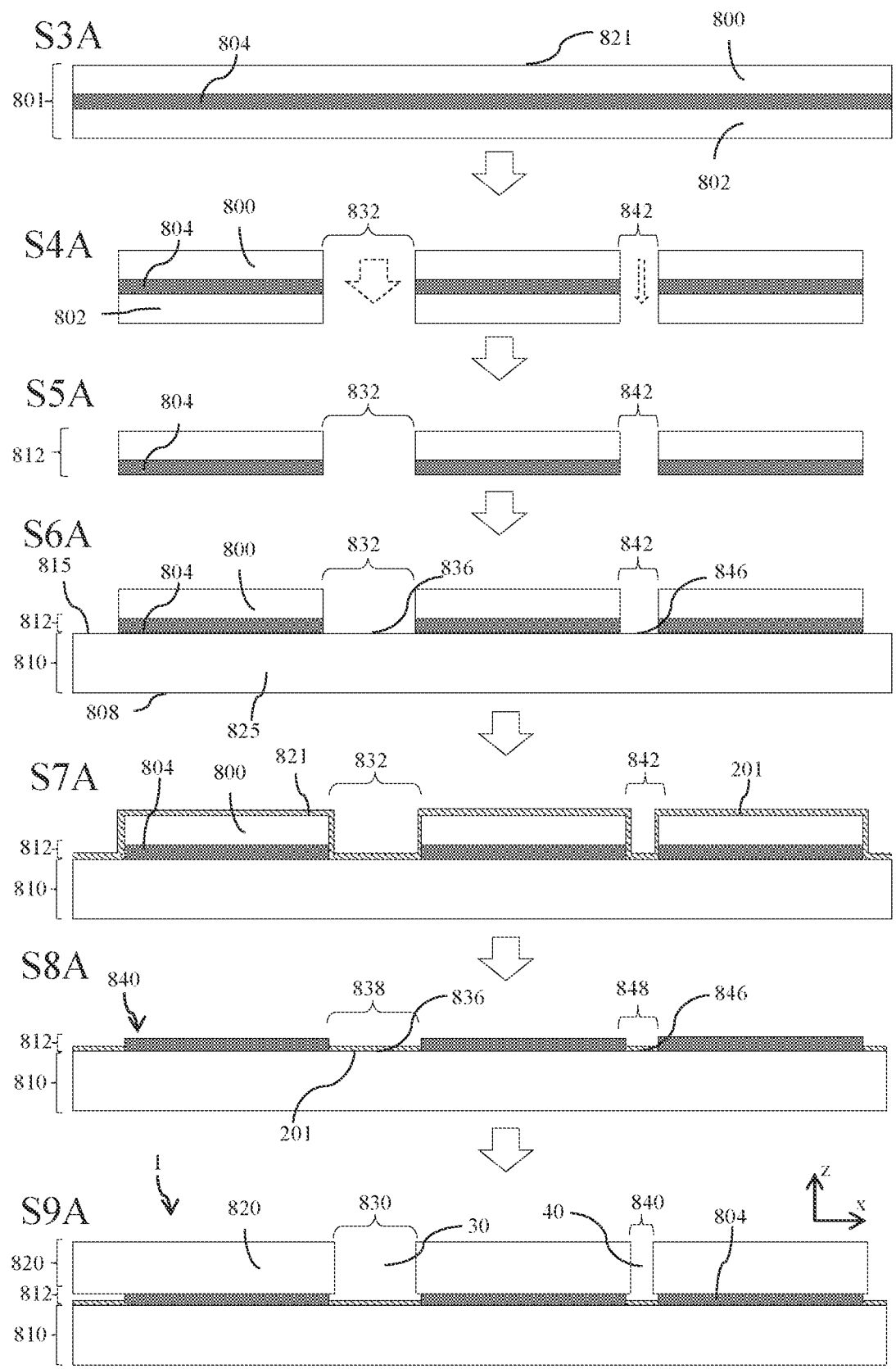
FIG. 44A is a schematic diagram illustrating in side view a method to provide a waveguide comprising light input wells and light deflecting wells wherein the waveguide comprises an adhesive layer.

FIG. 44A is a schematic diagram illustrating in side view a method to provide a waveguide 1 comprising light input wells 30 and light deflecting wells 40 wherein the waveguide 1 comprises an adhesive layer 804. Features of the embodiment of FIG. 44A not discussed in further detail may be assumed to correspond to the features with equivalent reference numerals as discussed above, including any potential variations in the features.

In this embodiment the light input wells 30 are metallised and the light deflecting wells 40 are metallised. In the step S3A for providing the waveguide 1, a continuous pre-layer 801 is provided. comprising a capping layer 800 and a protective layer 802 with an adhesive layer 804 between the capping layer 800 and the protective layer 802. The continuous pre-layer may for example comprise an adhesive 304 comprising an optically clear adhesive (OCA) or pressure sensitive adhesive (PSA) encapsulated between sacrificial capping layer 801 and protective layer 802. Such continuous pre-layers 801 may be provided advantageously with low cost and low thickness of adhesive layer 804.

In the step S4A a plurality of apertures 832, 842 is formed in the continuous pre-layer 801. The apertures 833, 843 may be formed for example by laser processing such as laser ablation, or by punching with a patterned stamper. The plurality of apertures 832, 842 of the alignment layer 812 and the plurality of apertures 830, 840 of the well layer 820 are arranged in the same pattern 70, for example as illustrated in FIG. 5, FIG. 11A and FIG. 14C hereinabove. The size of the apertures 830, 832 and the size of the apertures 840, 842 may however be different as illustrated in FIG. 42A.

In an alternative method, the pattern may not include the patter of the light extracting wells 40 and the apertures 842 are omitted.

In the step S5A, the protective layer 802 is removed to expose the adhesive layer 804 on the capping layer 800. In an alternative method (not shown), the protective layer 802 and the step S5A may be omitted.

The steps S3A-S5A thus illustrate the steps of forming an alignment layer 812 with a plurality of apertures 832, 842 extending therethrough. The alignment layer 812 provides alignment of both metal 201 and adhesive 804 to the wells 30, 40 of the waveguide 1 as will now be described. Advantageously cost and complexity of alignment and assembly is reduced.

In the step S6A the alignment layer 812 is attached to the surface 815 of the continuous layer 810 by the adhesive layer 804 so that a plurality of regions 836, 846 of the surface 815 of the continuous layer 810 are exposed in the plurality of apertures 832, 842 of the alignment layer 812.

In the step S7A, metal 201 is deposited continuously across an outer side 821 of the capping layer 800 and the plurality of regions 836, 846 of the surface 815 of the continuous layer 810 that are exposed.

In the step S8A, the capping layer 800 is removed to expose the adhesive layer 804 on the surface 815 of the continuous layer 810 and to leave a plurality of metal 201 layers 838, 848 on the plurality of regions 832, 842 of the surface 815 of the continuous layer 810 having metal 201 deposited thereon.

In the step S9A, the well layer 820 is attached to the surface 815 of the continuous layer 810 by the adhesive layer 804 with the plurality of apertures 830, 840 of the well layer 820 in alignment with the plurality of regions 836, 846 of the surface 815 of the continuous layer 820 having metal 201 deposited thereon, to form the waveguide 1 in which the apertures 830, 840 of the well layer 820 form the wells 30, 40.

In the embodiment of FIG. 44A, the apertures 830, 840 of the alignment layer 812 are larger than the corresponding apertures 830, 840 of the well layer 820 such that in cross section width 836 is larger than width 834 and width 846 is larger than width 844. Advantageously hot spots are reduced as described hereinabove.

Figure 44B:
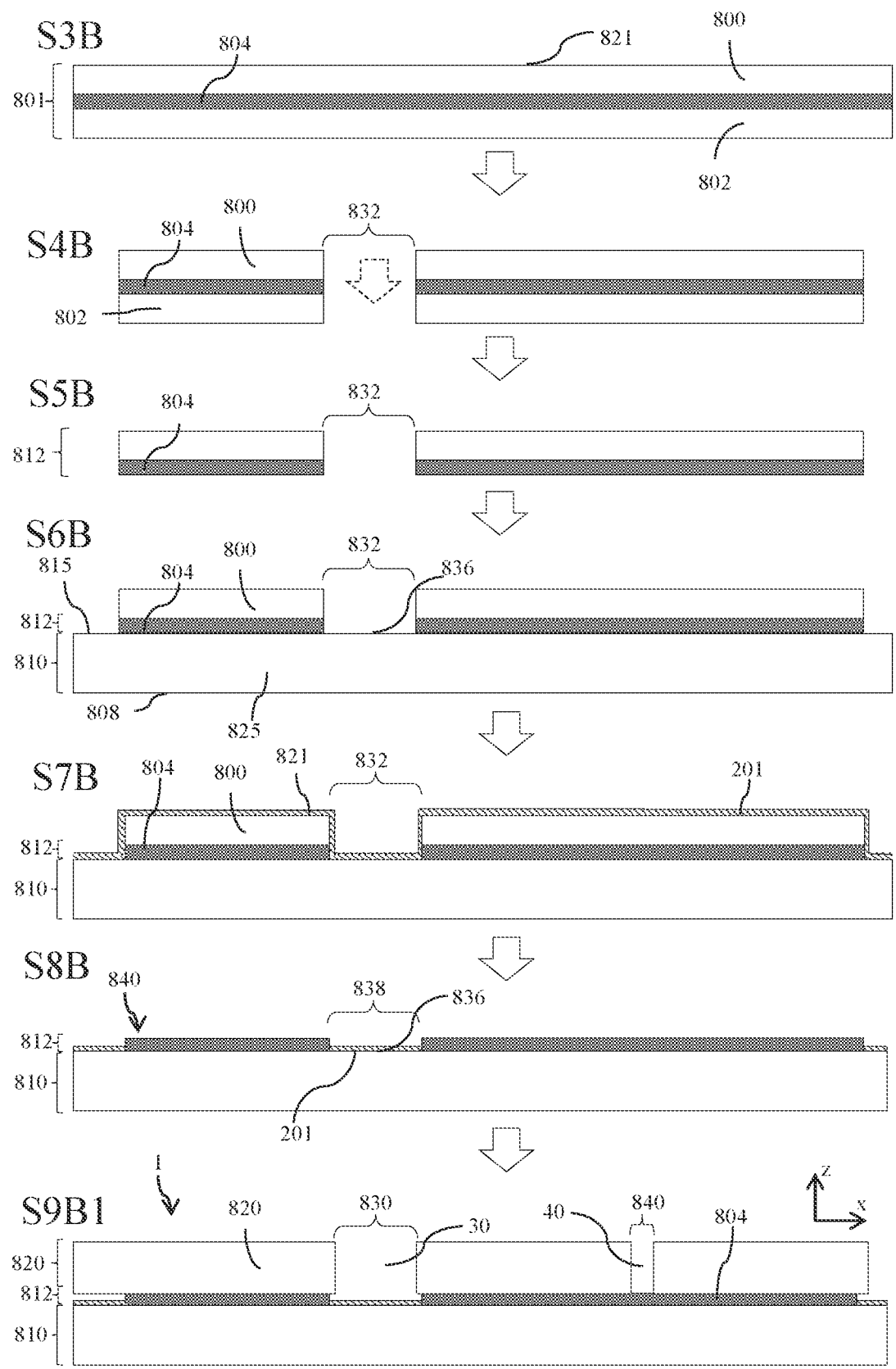
FIG. 44B is a schematic diagram illustrating in side view a method to provide a waveguide comprising light input wells and light deflecting wells wherein the waveguide comprises an adhesive layer and wherein the light deflecting wells are unmetallised.

FIG. 44B is a schematic diagram illustrating in side view a method to provide a waveguide 1 comprising light input wells 30 and light deflecting wells 40 wherein the waveguide comprises an adhesive layer 804 and wherein the light deflecting wells 40 are unmetallised. Features of the embodiment of FIG. 44B not discussed in further detail may be assumed to correspond to the features with equivalent reference numerals as discussed above, including any potential variations in the features.

In this embodiment the light input wells 30 are metallised and the light deflecting wells 40 are unmetallised. The steps S3B to S9B1 are similar to the steps S3A to S9A of FIG. 44A except that the in the step S4B, the apertures 842 of the alignment layer 812 are omitted so that the light deflecting wells are unmetallised.

Thus in FIG. 44B, the method may be a method of manufacture of a waveguide 1 further having a plurality of unmetallised wells, wherein the plurality of apertures 830 in the well layer 820 are a plurality of first apertures, and the well layer 820 further comprises a plurality of second apertures 840 extending therethrough, whereby: the plurality of apertures 832 of the alignment layer 812 and the plurality of first apertures 830 of the well layer 820 are arranged in the same pattern, the step of attaching the alignment layer 812 to the surface 815 of the continuous layer 810 by the adhesive layer 804 exposes a plurality of regions 836 of the surface 815 of the continuous layer 810 in the plurality of first apertures 832 of the alignment layer 812; and the step of attaching the well layer 820 to the surface 815 of the continuous layer 810 by the adhesive layer 804 with the plurality of first apertures 830 of the well layer 820 in alignment with the plurality of regions 836 of the surface 815 of the continuous layer 810 having metal 201 deposited thereon forms the waveguide 1 in which the first apertures 830 of the well layer 820 form the metallised wells and the second apertures 842 of the well layer 820 form the unmetallised wells.

Such an arrangement may provide a waveguide similar to that illustrated in FIG. 42B. Advantageously cost and complexity may be reduced, particularly in embodiments wherein the light deflecting wells 40 have a small size. Efficiency and uniformity of output around the light deflecting wells 40 may be improved as no metal 201 is providing in those regions.

Figure 44C:
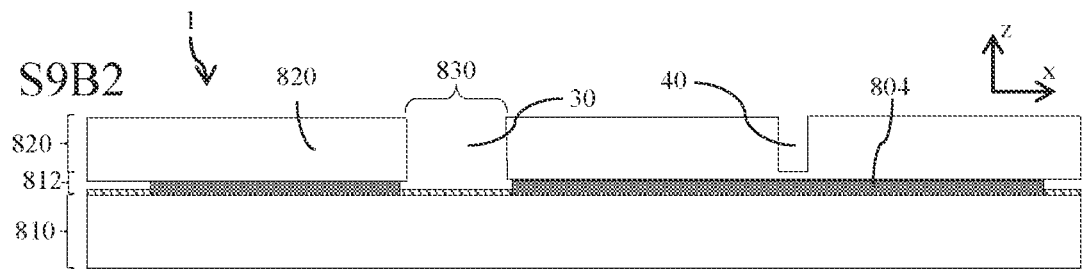
FIG. 44C is a schematic diagram illustrating in side view an alternative step of a method to provide a waveguide comprising light input wells and light deflecting wells wherein the waveguide comprises an adhesive layer and wherein the light deflecting wells are unmetallised and have a different height to the light input wells.

FIG. 44C is a schematic diagram illustrating in side view an alternative step of a method to provide a waveguide comprising light input wells and light deflecting wells wherein the waveguide comprises an adhesive layer and wherein the light deflecting wells are unmetallised and have a different height to the light input wells. Features of the embodiment of FIG. 44C not discussed in further detail may be assumed to correspond to the features with equivalent reference numerals as discussed above, including any potential variations in the features.

In the alternative method of FIG. 44C, the well layer 820 is the type as illustrated in step S2C of FIG. 43C and the step S9B1 of FIG. 44B is omitted and replaced by step S9B2 of FIG. 44C. Advantageously the waveguide 1 may have reduced cost and complexity. The light deflecting wells 40 may be adjusted in height to improve uniformity.

Thus in comparison to FIG. 44B, the well layer 820 further comprises a plurality of unmetallised wells wherein the well layer 820 further comprises a plurality of wells 40 extending partially therethrough, whereby the step of attaching the well layer 820 to the surface 815 of the continuous layer 810 by the adhesive layer 804 with the plurality of first apertures 830 of the well layer 820 in alignment with the plurality of regions of the surface 815 of the continuous layer 810 having metal 201 deposited thereon forms the waveguide 1 in which the apertures 830 of the well layer 820 form the metallised wells and the wells 40 of the well layer 820 form the unmetallised wells.

In operation of the alternative embodiment of FIGS. 44B-C, the plurality of metallised wells comprise an array of light input wells 30; and the plurality of unmetallised wells comprise an array of light deflecting wells 40, wherein each light input well 30 comprises a light input surface 32 extending into the waveguide 1 that is arranged to input light from a respective light emitting element 15 into the waveguide 1, and each light deflecting well 40 comprises a light deflecting surface 42 extending into the waveguide 1 so that some guided light is incident thereon and some guided light passes over the light deflecting surface 42, the light deflecting surface 42 being arranged to reflect at least some of the guided light that is incident thereon, and the light deflecting wells 40 having an arrangement around each light input well 30 that causes guided light that has been input through the light input surface 32 of the light input well 30 to be distributed around the light input well 30.

Figure 45A:
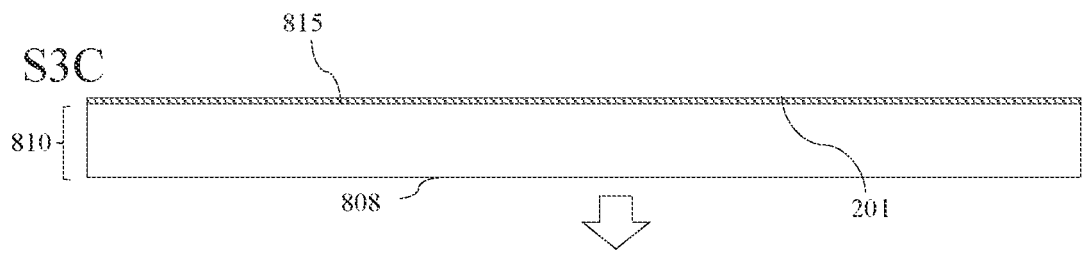
FIG. 45A is a schematic diagram illustrating in side view a method to provide a waveguide comprising light input wells and light deflecting wells wherein the waveguide comprises a welded layer.
Figure 45A:
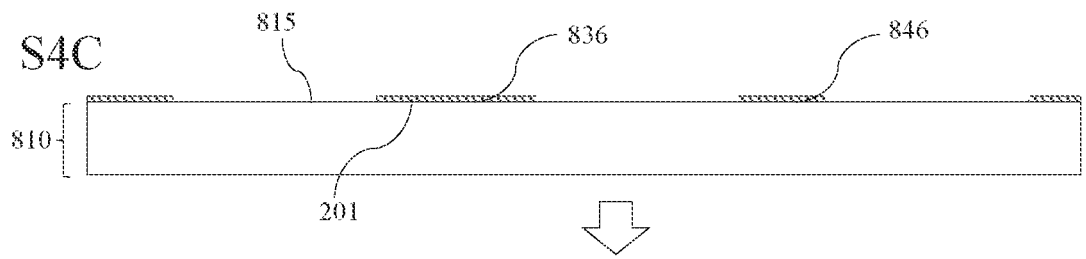
Figure 45A:
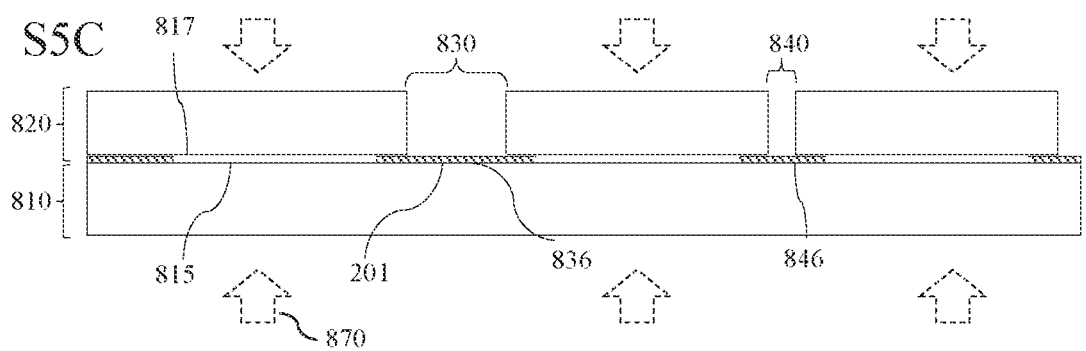
Figure 45A:
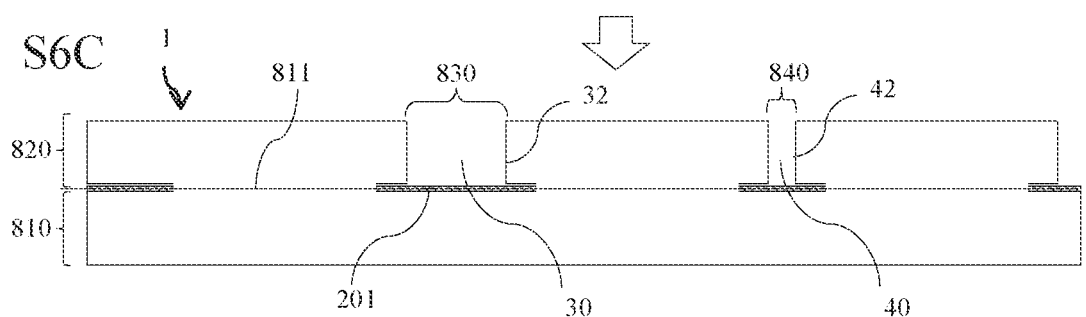

FIG. 45A is a schematic diagram illustrating in side view an alternative method to provide a waveguide 1 comprising metallised light input wells 30 and metallised light deflecting wells 40 wherein the waveguide 1 comprises a welded layer 828. Features of the embodiment of FIG. 45A not discussed in further detail may be assumed to correspond to the features with equivalent reference numerals as discussed above, including any potential variations in the features.

The method may be a method of manufacture of a waveguide 1 further having a plurality of unmetallised wells, wherein the plurality of apertures 832, 842 in the well layer 820 are a plurality of first apertures 832, and the well layer 820 further comprises a plurality of second apertures 842 extending therethrough, whereby: the plurality of first apertures 830 of the well layer 820 and the plurality of regions of the surface 815 of the continuous layer 810 are arranged in the same pattern, and the step of attaching the well layer 820 to the surface 815 of the continuous layer 810 with the plurality of first apertures 830 of the well layer 820 in alignment with the plurality of regions of the surface 815 of the continuous layer 810 having metal 201 deposited thereon forms the waveguide 1 in which the first apertures 830 of the well layer 820 form the metallised wells and the second apertures 842 of the well layer 820 form the unmetallised wells.

FIG. 45A illustrates an alternative method of manufacture of a waveguide 1 having a plurality of wells 30, 40 having surfaces with metal 201 deposited thereon. In this embodiment the light input wells 30 are metallised and the light deflecting wells 40 are metallised.

In step S3C, continuous layer 810 is provided with metal 201 deposited across a continuous part of the surface 815.

In step S4C, the metal 201 is patterned with pattern 70 so that the metal 201 is deposited on a plurality of regions 836, 846 of the surface 815 by removing the deposited metal 201 outside the plurality of regions 836, 846 to leave the deposited metal 201 on the plurality of regions 836, 846. Patterning may be provided by known patterning methods such as photoresist processing, deposition through a mask or by printing.

The regions 836, 846 of the surface 815 of the continuous layer 810 on which metal 201 is deposited may be larger than the corresponding apertures 830, 840 of the well layer 820 as described hereinabove.

As described elsewhere hereinabove, well layer 820 is provided with the plurality of apertures 830, 840 of the well layer 820 and the plurality of regions 836, 846 of the surface 815 of the continuous layer 810 being arranged in the same pattern 70, or in an alternative method the plurality of regions 846 may be omitted, for example as illustrated with respect to FIG. 42C.

In step SSC the well layer 820 is attached to the continuous layer 810 with the plurality of apertures 830, 840 of the well layer 820 in alignment with the plurality of regions 836, 846 of the surface 815 of the continuous layer 810 having metal 201 deposited thereon, to form the waveguide 1 in which the apertures 830, 840 of the well layer 820 form the wells 30, 40. The step of attaching the well layer 820 to the continuous layer 810 may be performed by laser welding, with illumination 870 provided to achieve heating of the interface region 811 and bonding between the two materials of the well layer 820 and continuous layer 810 respectively. At least one of the surfaces 815, 817 may be provided with an absorbing layer arranged to absorb laser radiation and achieve local heating of the interface region 811. Scatter and Fresnel reflections at the interface region may advantageously be reduced and the visibility of hot spots may be reduced. Alternatively the step of attaching the well layer 820 may be by means of a continuous adhesive layer (not shown) arranged in the interface region 811.

In step S6C the waveguide 1 is illustrated after attachment of the well layer 820 to the continuous layer 810 with the plurality of apertures 830, 840 of the well layer 820 in alignment with the plurality of regions 836, 846 of the surface 815 of the continuous layer 810 having metal 201 deposited thereon, to form the waveguide 1 in which the apertures 830, 840 of the well layer 820 form the wells 30, 40.

Thus the plurality of wells 30, 40 comprise: an array of light input wells 30; and an array of light deflecting wells 40, wherein each light input well 30 comprises a light input surface 32 extending into the waveguide 1 that is arranged to input light from a respective light emitting element 15 into the waveguide 1, and each light deflecting well 40 comprises a light deflecting surface 42 extending into the waveguide so that some guided light is incident thereon and some guided light passes over the light deflecting surface 42, the light deflecting surface 42 being arranged to reflect at least some of the guided light that is incident thereon, and the light deflecting wells 40 having an arrangement 70 around each light input well 30 that causes guided light that has been input through the light input surface 32 of the light input well 30 to be distributed around the light input well 30.

Figure 45B:
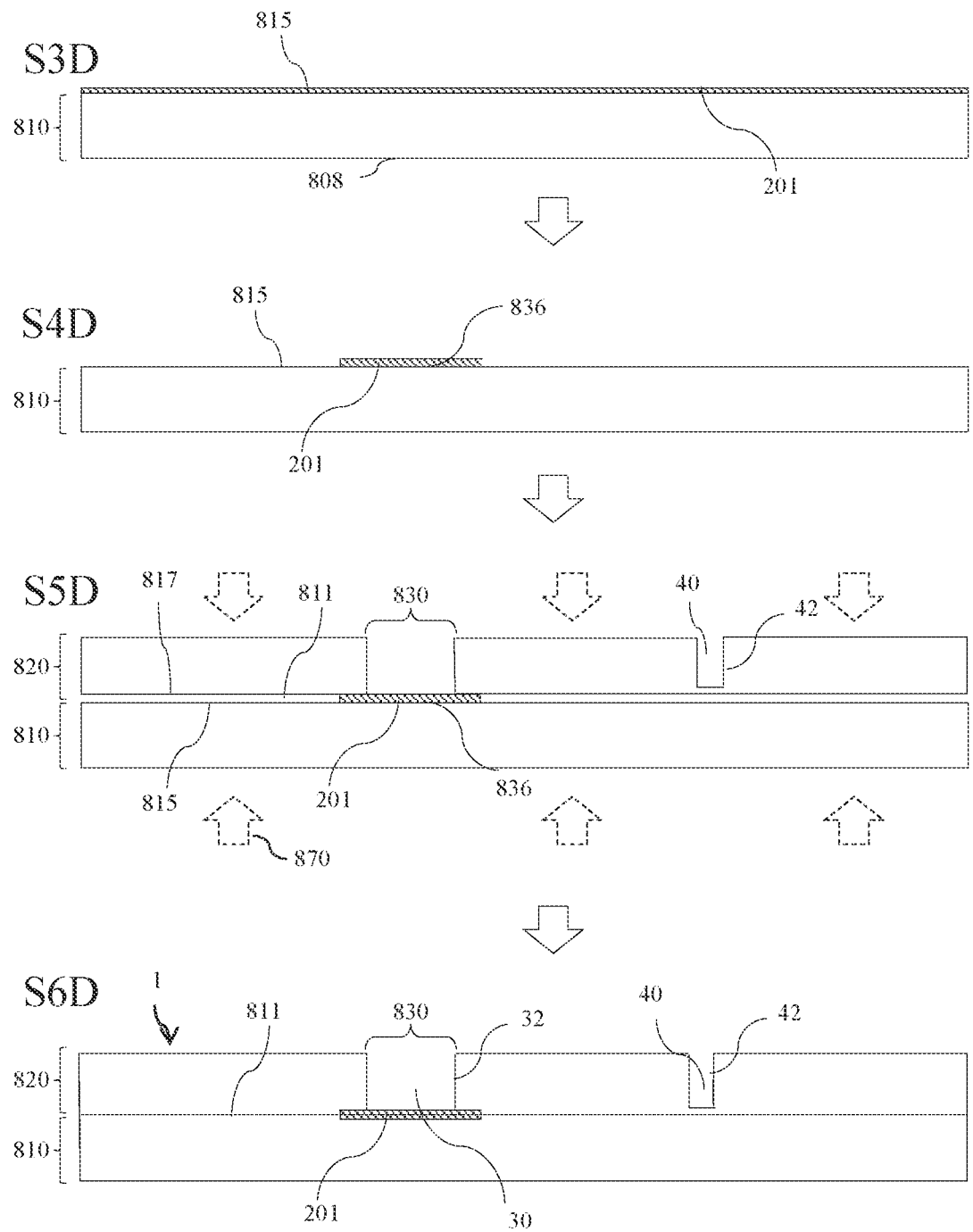
FIG. 45B is a schematic diagram illustrating in side view a method to provide a waveguide comprising light input wells and light deflecting wells wherein the waveguide comprises a welded layer and wherein the light deflecting wells are unmetallised.

FIG. 45B is a schematic diagram illustrating in side view a method to provide a waveguide 1 comprising light input wells 30 and light deflecting wells 40 wherein the waveguide 1 comprises a welded layer and wherein the light deflecting wells 40 are unmetallised. Features of the embodiment of FIG. 45B not discussed in further detail may be assumed to correspond to the features with equivalent reference numerals as discussed above, including any potential variations in the features.

In this embodiment the light input wells 30 are metallised and the light deflecting wells 40 are unmetallised.

The method may be a method of manufacture of a waveguide 1 further having a plurality of unmetallised wells, wherein the well layer 820 further comprises a plurality of wells extending partially therethrough, whereby the step of attaching the well layer 820 to the surface 815 of the continuous layer 810 with the plurality of first apertures 830 of the well layer 820 in alignment with the plurality of regions 836 of the surface 815 of the continuous layer 810 having metal 201 deposited thereon forms the waveguide 1 in which the apertures 832, 842 of the well layer 820 form the metallised wells and the wells of the well layer 820 form the unmetallised wells.

The steps S3D to S6D are similar to the steps S3C to S9C of FIG. 45A except in step S4D regions 846 of the continuous layer 810 are omitted so that the light deflecting wells 40 are unmetallised. FIG. 45B further illustrates that in step SSD a well layer 820 may be provided such as that in FIG. 43C. Advantageously the light deflecting wells 40 may have a different height to the light input wells 30. In alternative method, the well layer 820 of FIG. 43A may be provided in step SSB.

In the embodiments hereinabove wherein the plurality of metallised wells comprise an array of light input wells 30; and the plurality of unmetallised wells comprise an array of light deflecting wells 40, each light input well 30 comprises a light input surface 32 extending into the waveguide 1 that is arranged to input light from a respective light emitting element 15 into the waveguide 1, and each light deflecting well 40 comprises a light deflecting surface 42 extending into the waveguide 1 so that some guided light is incident thereon and some guided light passes over the light deflecting surface 42, the light deflecting surface 42 being arranged to reflect at least some of the guided light that is incident thereon, and the light deflecting wells 40 having an arrangement around each light input well 30 that causes guided light that has been input through the light input surface 32 of the light input well 30 to be distributed around the light input well 30.

Such arrangements may provide the waveguide similar to that illustrated in FIG. 42C. Advantageously cost and complexity may be reduced, particularly in embodiments wherein the light deflecting wells 40 have a small size. Efficiency and uniformity of output around the light deflecting wells 40 may be improved as no metal 201 is providing in those regions.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An illumination apparatus for providing illumination over a predetermined area, the illumination apparatus comprising:
    a waveguide extending over the predetermined area, the waveguide comprising front and rear light guiding surfaces for guiding light along the waveguide;

an array of light emitting elements arrayed across the predetermined area behind the waveguide, wherein:

the rear light guiding surface comprises:

an array of light input wells, each arranged over a respective light emitting element; and an array of light deflecting wells that are not arranged over the light emitting elements, each light input well comprising light input surfaces extending towards the front light guiding surface that is arranged to input light from the respective light emitting element into the waveguide, wherein the light input surface of each light input well comprise four light input faces, the four light input faces having surface normals, each surface normal with an average planar component in a plane of the waveguide, wherein a first average planar component of a first of the four light input faces is within 10 degrees of an angle 0 degrees from a reference axis, a second average planar component of a second of the four light input faces is within 10 degrees of an angle 90 degrees from the reference axis, a third average planar component of a third of the four light input faces is within 10 degrees of an angle 180 degrees from the reference axis, and a fourth average planar component of a fourth of the four light input faces is within 10 degrees of an angle 270 degrees from the reference axis, each light deflecting well comprising a light deflecting surface extending towards the front light guiding surface so that some guided light is incident thereon and some guided light passes over the light deflecting surface, the light deflecting surface being arranged to reflect at least some of the guided light that is incident thereon, and the light deflecting wells having an arrangement around each light input well that causes guided light that has been input through the light input surface of the light input well to be distributed around the light input well, wherein the light deflecting surfaces of the light deflecting wells comprise a first pair or a second pair of opposed light deflecting faces, each of the light deflecting faces having an average deflecting surface normal with a deflecting planar component in the plane of the waveguide, the first pair of opposed light deflecting faces comprising:

a first light deflecting face having a first deflecting planar component of the deflecting planar components, the first deflecting planar component positioned within 10 degrees of a 45 degree angle from the reference axis; and a second light deflecting face having a second deflecting planar component of the deflecting planar components, the second deflecting planar component positioned within 10 degrees of a 225 degree angle from the reference axis, the second pair of opposed light deflecting faces comprising:

a third light deflecting face having a third deflecting planar component of the deflecting planar components, the third deflecting planar component positioned within 10 degrees of a 135 degree angle from the reference axis; and a fourth light deflecting face having a fourth deflecting planar component of the deflecting planar components, the fourth deflecting planar component positioned within 10 degrees of a 315 degree angle from the reference axis, at least one of the front light guiding surface and the rear light guiding surface comprises light extraction features arranged to extract guided light from the waveguide as output light; and a light turning arrangement arranged to redirect at least some of the output light towards a normal to a plane of the waveguide.

2. An illumination apparatus according to claim 1, wherein the four light input faces are contiguous.

3. An illumination apparatus according to claim 1, wherein each of the light input faces is planar.

4. An illumination apparatus according to claim 1, wherein each of the light input faces is convex in material of the waveguide.

5. An illumination apparatus according to claim 1, wherein the light extraction features comprise an array of sets of four light extraction faces, each light extraction face having a surface normal with an average component in a plane of the waveguide, which average components are oriented with respect to the reference axis at angles within at most 10 degrees of 0 degrees, 90 degrees, 180 degrees, and 270 degrees.

6. An illumination apparatus according to claim 1, wherein the first and second pairs of opposed faces are contiguous.

7. An illumination apparatus according to claim 1, wherein the light deflecting surfaces of the light deflecting wells comprise at least two additional light deflecting surfaces.

8. An illumination apparatus according to claim 1, wherein the light deflecting wells are connected at ends of the pairs of opposed light deflecting faces to completely surround the light input wells within the plane.

9. An illumination apparatus according to claim 1, wherein each of the light deflecting faces is planar.

10. An illumination apparatus according to claim 1, wherein the waveguide has a rectangular shape and the reference axis is parallel to a side of the rectangular shape.

11. An illumination apparatus according to claim 1, wherein the light turning arrangement comprises a light turning optical component comprising an input surface extending across the front light guiding surface of the waveguide and arranged to receive output light from the waveguide, and an output surface facing the input surface, wherein the input surface is prismatic and arranged to provide deflection of the output light towards the normal to the plane of the waveguide.

12. An illumination apparatus according to claim 1, wherein the light turning arrangement comprises a light diffusing layer.

13. An illumination apparatus according to claim 1, wherein the light input surfaces have surface normals that are inclined from a plane of the waveguide by at most 3 degrees.

14. An illumination apparatus according to claim 1, wherein each of the light deflecting surfaces have surface normals that are inclined from a plane of the waveguide by at most 3 degrees.

15. An illumination apparatus according to claim 1, wherein each inclined light extraction feature has surface normals that are inclined from the normal of a plane of the waveguide by at most 3 degrees.

16. An illumination apparatus according to claim 1, wherein the light deflecting surfaces are coated with a reflective material.

17. An illumination apparatus according to claim 1, wherein each light input well further comprises an input well end surface extending across the light input surface, the light input well end surface being arranged to guide the guided light over the light input well.

18. An illumination apparatus according to claim 1, wherein the light input wells have openings that are larger than the respective light emitting elements over which they are arranged.

19. An illumination apparatus according to claim 1, wherein the at least one of the light deflecting wells further comprises a light deflecting well end surface connecting the light deflecting surfaces of the at least one of the light deflecting wells, the light deflecting well end surface positioned on an end of the at least one of the light deflecting wells facing the front light guiding surface to direct light at least partially toward the front light guiding surface.

20. An illumination apparatus according to claim 1, wherein the light deflecting wells are arranged in a grid having four-fold rotational symmetry around the light input wells.

21. An illumination apparatus according to claim 1, wherein the light deflecting well end surfaces have the same areas.

22. An illumination apparatus according to claim 1, wherein the light deflecting well end surfaces have areas that vary with distance from the respective aligned light input well.

23. An illumination apparatus according to claim 1, wherein the illumination apparatus is arranged to emit light in a light output distribution, wherein a ratio of luminous intensity half maximum solid angle of the light output distribution to the luminous intensity half maximum solid angle of a Lambertian light distribution is less than 1.

24. An illumination apparatus according to claim 1, wherein the light emitting elements have a maximum width of at most 1000 micrometres.

25. An illumination apparatus according to claim 1, wherein in at least one cross-sectional plane the distance between centres of the light input wells is at most 20 mm.

26. An illumination apparatus according to claim 1, wherein the front light guiding surface is arranged to guide light by total internal reflection.

27. An illumination apparatus according to claim 1, wherein the rear light guiding surface is arranged to guide light by total internal reflection.

28. An illumination apparatus according to claim 1, wherein the rear light guiding surface is coated with a reflective material.

29. An illumination apparatus according to claim 1, wherein the array of light emitting elements is supported on a support substrate.

30. An illumination apparatus according to claim 1, wherein each light emitting element comprises at least one light emitting diode.

31. An illumination apparatus according to claim 1, wherein the light emitting elements in respect of different light input wells have different colours of emission.

32. An illumination apparatus according to claim 1, further comprising a control system arranged to control the light emitting elements.

33. An illumination apparatus according to claim 1, further comprising a control system arranged to control clusters of light emitting elements in common.

34. A display device comprising:
an illumination apparatus according to claim 1; and
a transmissive spatial light modulator illuminated by the illumination apparatus.

35. An illumination apparatus according to claim 1, wherein a light input well is spaced apart from an adjacent light deflecting well in the plane.

36. An illumination apparatus according to claim 11, wherein the deflection provided by the input surface of the light turning optical component varies in at least one direction across a plane of the light turning optical component so that the deflected light is directed towards a common optical window in front of the illumination apparatus.

37. An illumination apparatus according to claim 11, wherein the input surface comprises an array of pyramidal recesses arranged to provide deflection of the output light towards the normal to the plane of the waveguide, each pyramidal recess comprising four light turning faces.

38. An illumination apparatus according to claim 37, wherein the four light turning faces of the pyramidal recesses have surface normals with average components in a plane of the waveguide, which average components are oriented with respect to the reference axis at angles within at most 10 degrees of 0 degrees, 90 degrees, 180 degrees, and 270 degrees.

39. An illumination apparatus according to claim 37, wherein the four light turning faces of the pyramidal recesses have surface normals with average components in a plane of the waveguide, which average components are oriented with respect to the reference axis at angles within at most 20 degrees of 25 degrees, 90 degrees, 205 degrees, and 270 degrees.

40. An illumination apparatus according to claim 37, wherein the surface normals of the faces of the pyramidal recesses have a tilt angle from the normal to a plane of the waveguide in a range from 35 to 80 degrees.

41. An illumination apparatus according to claim 37, wherein corresponding light turning faces of the pyramidal recesses have surface normals with inclinations that vary in at least one direction across a plane of the light turning optical component so that the deflection provided by the prismatic input surface of the light turning optical component varies in the at least one direction so that the deflected light is directed towards a common optical window in front of the illumination apparatus.

42. An illumination apparatus according to claim 37, wherein at least a pair of opposed light turning faces of the pyramidal recesses have surface normals with average components in a plane of the waveguide, which average components vary in at least one direction across a plane of the light turning optical component so that the deflection provided by the prismatic input surface of the light turning optical component varies in the at least one direction so that the deflected light is directed towards a common optical window in front of the illumination apparatus.

43. An illumination apparatus according to claim 12, wherein the light diffusing layer comprises a colour conversion material.

44. An illumination apparatus according to claim 12, further comprising at least one light recycling film component comprising a light recycling film input surface extending across the light diffusing layer and arranged to receive the output light from the light diffusing layer, and a light recycling film output surface facing the light recycling film input surface, wherein the light recycling film output surface is prismatic and arranged to provide recirculation of the output light towards a normal to a plane of the waveguide.

45. An illumination apparatus according to claim 17, wherein the light input well end surface is planar.

46. An illumination apparatus according to claim 17, wherein the light input well end surface is coated with a reflective material.

47. An illumination apparatus according to claim 19, wherein the light deflecting well end surface is planar.

48. An illumination apparatus according to claim 19, wherein the light deflecting well end surface is coated with a reflective material.

49. An illumination apparatus according to claim 27, further comprising a reflective layer behind the rear light guiding surface that is arranged to reflect light extracted from the waveguide through the rear light guiding surface back through the waveguide for output forwardly.

50. An illumination apparatus according to claim 28, wherein the waveguide is attached to a support substrate.

51. An illumination apparatus according to claim 29, further comprising light blocking elements extending around the light input wells between the support substrate and the rear light guiding surface of the waveguide.

52. An illumination apparatus according to claim 29, wherein the support substrate further supports electronic components connected to the light emitting elements.

53. An illumination apparatus according to claim 52, wherein at least some of the electronic components protrude into at least some of the light deflecting wells.

54. An illumination apparatus according to claim 29, wherein each light emitting element comprises at least one light emitting diode provided on a semiconductor substrate mounted on the support substrate.

55. An illumination apparatus according to claim 54, wherein the semiconductor substrate comprises at least part of a drive circuit for the at least one light emitting diode.

56. An illumination apparatus according to claim 54, wherein at least some of the light emitting elements further comprise a colour conversion layer.

57. An illumination apparatus according to claim 54, wherein each light emitting element comprises plural light emitting diodes.

58. An illumination apparatus according to claim 56, wherein the colour conversion layer is provided on a light emitting diode or inside the light input well separated from the at least one light emitting diode.

59. An illumination apparatus according to claim 50, wherein each light emitting element comprises four light emitting diodes, each aligned with a light input face of the respective light input well.

60. An illumination apparatus according to claim 57, wherein the plural light emitting diodes have different colours of emission.

61. A display device according to claim 34, further comprising an eyepiece optical element arranged in front of the spatial light modulator.

62. A display device according to claim 61, wherein the eyepiece optical element is a lens.

63. A waveguide extending over a predetermined area, the waveguide comprising front and rear light guiding surfaces for guiding light along the waveguide, wherein:
the rear light guiding surface comprises:
an array of light input wells for arrangement over respective light emitting elements; and
an array of light deflecting wells, wherein:
each light input well comprising light input surfaces extending towards the front light guiding surface that is arranged to input light from the respective light emitting element into the waveguide,
wherein the light input surface of each light input well comprises four light input faces, the four light input faces having surface normals, each surface normal with an average planar component in a plane of the waveguide, wherein a first average planar component of a first of the four light input faces is within 10 degrees of an angle 0 degrees from a reference axis, a second average planar component of a second of the four light input faces is within 10 degrees of an angle 90 degrees from the reference axis, a third average planar component of a third of the four light input faces is within 10 degrees of an angle 180 degrees from the reference axis, and a fourth average planar component of a fourth of the four light input faces is within 10 degrees of an angle 270 degrees from the reference axis,
each light deflecting well comprising a light deflecting surface extending towards the front light guiding surface so that some guided light is incident thereon and some guided light passes over the light deflecting surface, the light deflecting surface being arranged to reflect at least some of the guided light that is incident thereon, and the light deflecting wells having an arrangement around each light input well that causes guided light that has been input through the light input surface of the light input well to be distributed around the light input well,
wherein the light deflecting surfaces of the light deflecting wells comprise a first pair or a second pair of opposed light deflecting faces, each of the light deflecting faces having an average deflecting surface normal with a deflecting planar component in the plane of the waveguide,
the first pair of opposed light deflecting faces comprising:
a first light deflecting face having a first deflecting planar component of the deflecting planar components, the first deflecting planar component positioned within 10 degrees of a 45 degree angle from the reference axis; and
a second light deflecting face having a second deflecting planar component of the deflecting planar components, the second deflecting planar component positioned within 10 degrees of a 225 degree angle from the reference axis,
the second pair of opposed light deflecting faces comprising:
a third light deflecting face having a third deflecting planar component of the deflecting planar components, the third deflecting planar component positioned within 10 degrees of a 135 degree angle from the reference axis; and
a fourth light deflecting face having a fourth deflecting planar component of the deflecting planar components, the fourth deflecting planar component positioned within 10 degrees of a 315 degree angle from the reference axis
and
at least one of the front light guiding surface and the rear light guiding surface comprises light extraction features arranged to extract guided light from the waveguide as output light.

* * * * *